US012584634B2

(12) United States Patent
Yun et al.

(10) Patent No.: US 12,584,634 B2
(45) Date of Patent: Mar. 24, 2026

(54) COOKING APPLIANCE

(71) Applicant: LG ELECTRONICS INC., Seoul (KR)

(72) Inventors: Donghyok Yun, Seoul (KR); Hag Soo Kim, Seoul (KR); Dongseong Kwag, Seoul (KR); Sung Mun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1168 days.

(21) Appl. No.: 17/422,149

(22) PCT Filed: Jan. 10, 2020

(86) PCT No.: PCT/KR2020/000543
§ 371 (c)(1),
(2) Date: Jul. 9, 2021

(87) PCT Pub. No.: WO2020/145765
PCT Pub. Date: Jul. 16, 2020

(65) Prior Publication Data
US 2022/0090794 A1 Mar. 24, 2022

(30) Foreign Application Priority Data

Jan. 11, 2019 (KR) ........................ 10-2019-0004169
Apr. 1, 2019 (KR) ........................ 10-2019-0038037
(Continued)

(51) Int. Cl.
*F24C 7/06* (2006.01)
*A47J 37/06* (2006.01)
(Continued)

(52) U.S. Cl.
CPC ........... *F24C 7/067* (2013.01); *A47J 37/0635* (2013.01); *F24C 15/006* (2013.01);
(Continued)

(58) Field of Classification Search
CPC .... A47J 37/0635; A47J 37/0629; A47J 37/06; A47J 37/08; F24C 15/006; F24C 15/023;
(Continued)

(56) References Cited

U.S. PATENT DOCUMENTS

| | | | |
|---|---|---|---|
| 1,690,570 A | 11/1928 | Dalbey, Sr. | |
| 3,393,295 A * | 7/1968 | Ivar ....................... | A47J 27/004 |
| | | | 219/486 |

(Continued)

FOREIGN PATENT DOCUMENTS

| | | |
|---|---|---|
| CN | 101422329 A | 5/2009 |
| CN | 107319913 A | 11/2017 |

(Continued)

OTHER PUBLICATIONS

International Search Report from PCT/KR2020/000543, dated Apr. 29, 2020.
(Continued)

*Primary Examiner* — Edward F Landrum
*Assistant Examiner* — Adam M Eckardt
(74) *Attorney, Agent, or Firm* — Bryan Cave Leighton Paisner LLP

(57) ABSTRACT

The present disclosure relates to a cooking appliance. The cooking appliance includes: a housing provided therein with a cooking space surrounded by bottom, rear and both lateral surfaces of the housing, and having upper and front surfaces open; a door including a door upper surface part covering the upper surface of the housing and a door front surface part connected to a front side of the door upper surface part and covering the front surface of the housing, and swiveling with (Continued)

respect to a rear side of the door upper surface part to open and close the upper surface and the front surface of the housing; and a tray disposed in the cooking space, the cooking appliance, further comprising: a first heating part disposed at the door.

7 Claims, 56 Drawing Sheets

(30) Foreign Application Priority Data

| Apr. 5, 2019 | (KR) | 10-2019-0040379 |
| Dec. 27, 2019 | (KR) | 10-2019-0176632 |

(51) Int. Cl.

| F24C 15/00 | (2006.01) |
| F24C 15/02 | (2006.01) |
| F24C 15/04 | (2006.01) |
| F24C 15/22 | (2006.01) |
| H05B 6/12 | (2006.01) |

(52) U.S. Cl.
CPC ............ *F24C 15/023* (2013.01); *F24C 15/04* (2013.01); *F24C 15/22* (2013.01); *H05B 6/129* (2013.01)

(58) Field of Classification Search
CPC .......... F24C 15/04; F24C 15/22; F24C 15/36; F24C 7/067; F24C 7/082; F24C 15/02; F24C 15/16; F24C 15/162; F24C 7/08; F24C 15/00; F24C 7/06; F24C 15/08; H05B 2206/022; H05B 6/1245; H05B 6/129; H05B 11/00; H05B 6/12; H05B 3/40; A47F 1/12; F25D 23/02; F25D 25/02; G03G 21/16
See application file for complete search history.

(56) References Cited

U.S. PATENT DOCUMENTS

| 3,535,999 | A | * | 10/1970 | Chambon | A47J 37/041 |
| | | | | | 99/340 |
| 6,029,649 | A | | 2/2000 | Su | |
| 6,271,502 | B1 | | 8/2001 | Lee | |
| 9,022,018 | B2 | * | 5/2015 | Hensel | F24C 15/12 |
| | | | | | 126/339 |
| 2004/0007564 | A1 | | 1/2004 | Li | |
| 2008/0127833 | A1 | * | 6/2008 | Lee | F24C 15/006 |
| | | | | | 99/324 |
| 2008/0248157 | A1 | | 10/2008 | Choi | |
| 2008/0296292 | A1 | | 12/2008 | Byun | |
| 2010/0178407 | A1 | | 7/2010 | Rizzuto et al. | |
| 2013/0119838 | A1 | | 5/2013 | Becker et al. | |

FOREIGN PATENT DOCUMENTS

| EP | 1527722 A1 | 5/2005 |
| EP | 3165990 A1 | 10/2017 |
| FR | 2682461 A1 | 4/1993 |
| JP | S53026263 | 3/1978 |
| JP | 06341437 A | 2/1994 |
| JP | H07263132 A | 10/1995 |
| JP | 3822899 B2 | 9/2006 |
| JP | 5383625 B2 | 1/2014 |
| JP | 2017083166 A | 5/2017 |
| JP | 6289602 B2 | 3/2018 |
| KR | 19940025187 U | 11/1994 |
| KR | 19950019486 A | 7/1995 |
| KR | 10-1997-0011605 A | 3/1997 |
| KR | 19990048545 A | 7/1999 |
| KR | 100227978 B1 | 8/1999 |
| KR | 20060044217 A | 5/2006 |
| KR | 10-2006-0062202 A | 6/2006 |
| KR | 20080024025 A | 3/2008 |
| KR | 20080035396 A | 4/2008 |
| KR | 10-2009-0063422 A | 6/2009 |
| KR | 10-2010-0081242 A | 7/2010 |
| KR | 20-0450168 Y1 | 9/2010 |
| KR | 10-2011-0008423 A | 1/2011 |
| KR | 20-2011-0001565 U | 2/2011 |
| KR | 20120140490 A | 12/2012 |
| KR | 10-2017-0085727 A | 7/2017 |
| KR | 20180080057 A | 7/2018 |
| KR | 101881339 B1 | 8/2018 |
| WO | 2017/145792 A1 | 8/2017 |

OTHER PUBLICATIONS

Office Action of Chinsese Patent Office in Appl'n No. 202080008435. 4, dated Mar. 30, 2023.
Office Action of Korean Patent Office in Appl'n 10-2019-0177046, dated Dec. 1, 2023.
Office Action of Korean Patent Office in Appl'n 10-2019-0177047, dated Dec. 1, 2023.
Office Action of Korean Patent Office in Appl'n 10-2019-0177048, dated Dec. 1, 2023.
Office Action of Korean Patent Office in Appl'n 10-2019-0041621, dated Nov. 30, 2023.
Office Action of Korean Patent Office in Appl'n 10-2019-0041622, dated Nov. 30, 2023.
Office Action of Korean Patent Office in Appl'n 10-2019-0178617, dated Oct. 4, 2023.
Office Action of Korean Patent Office in Appl'n 10-2019-0040378, dated Sep. 14, 2023.

* cited by examiner

[FIG. 1]

[FIG. 2]
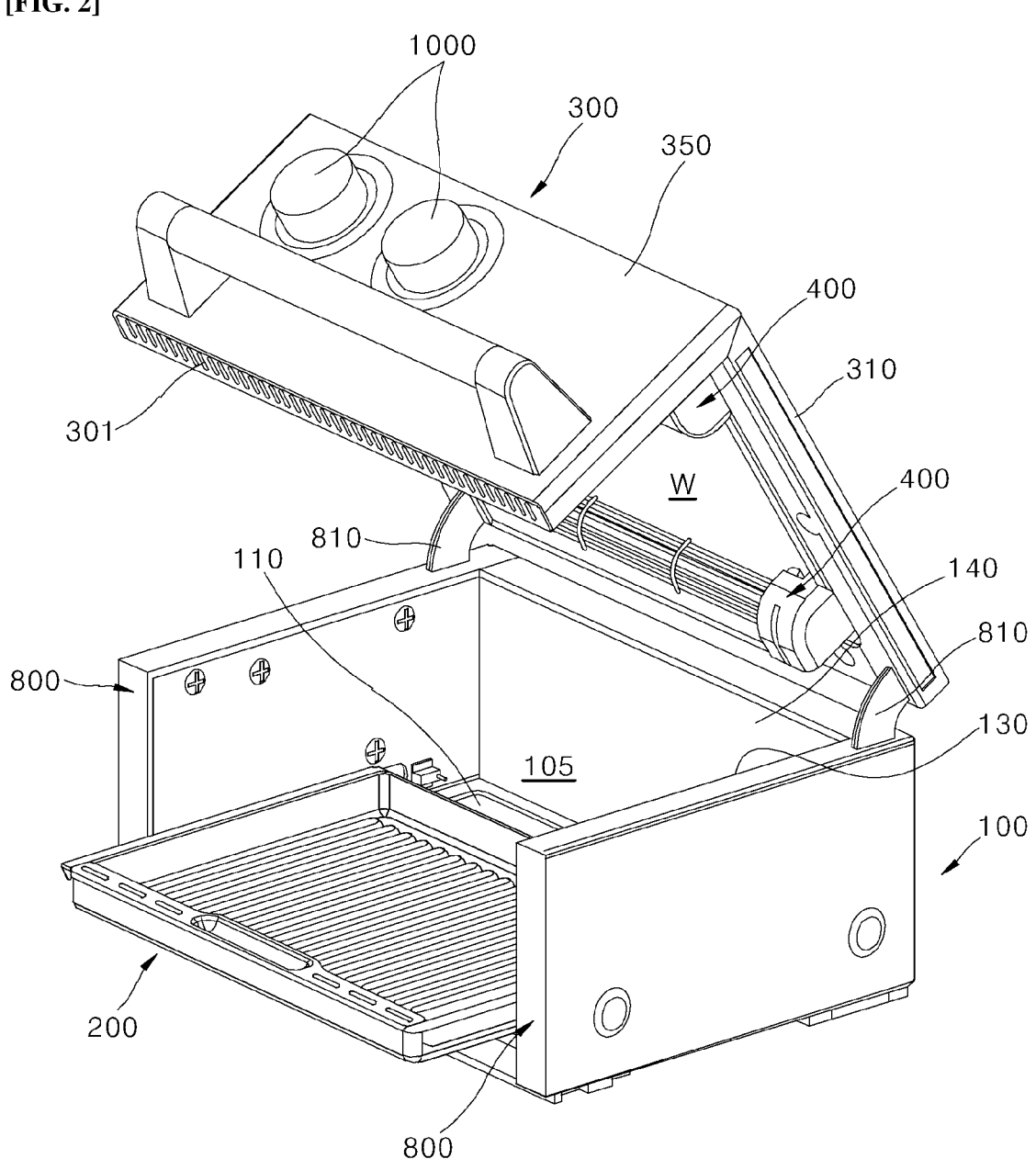

[FIG. 3]
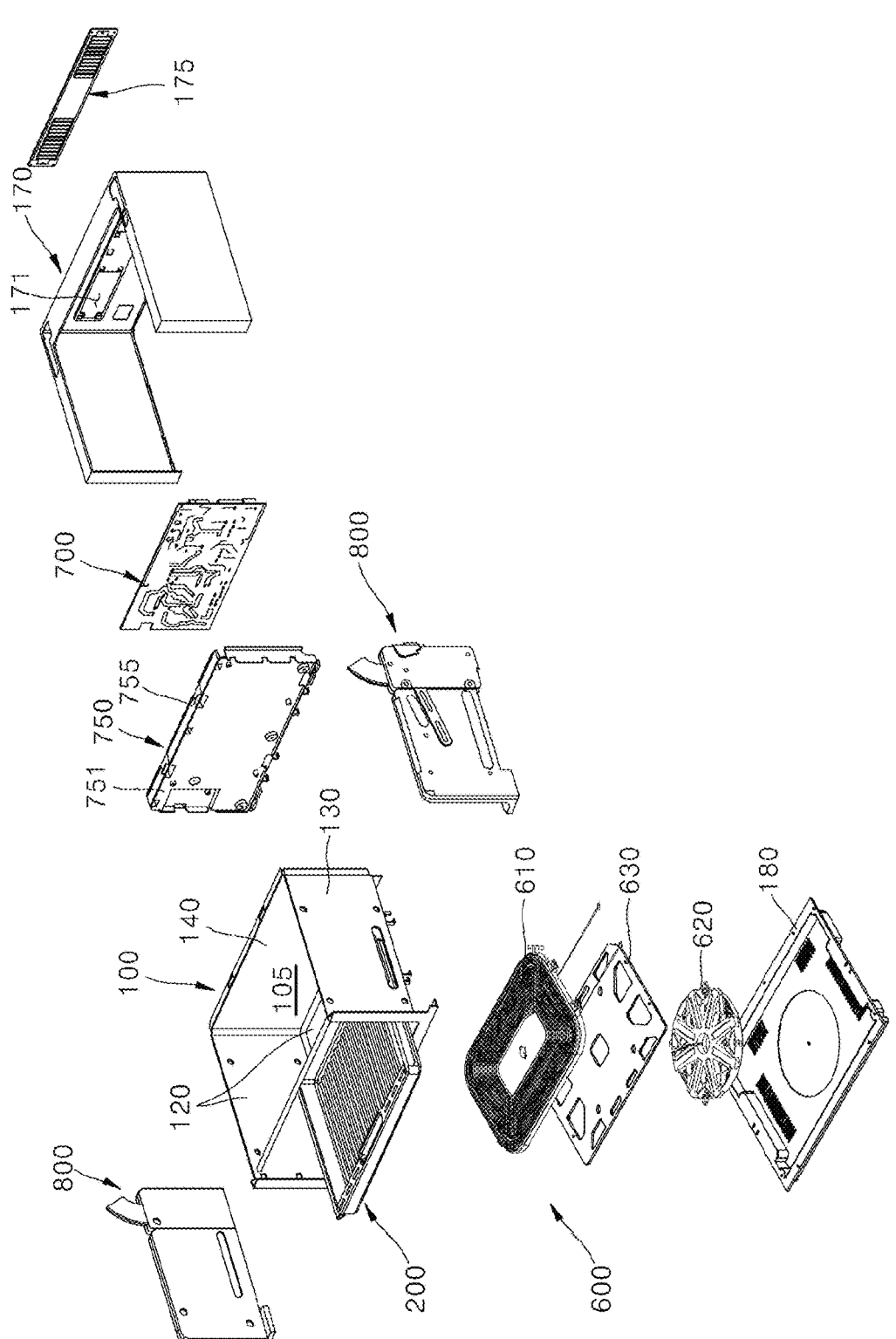

[FIG. 4]
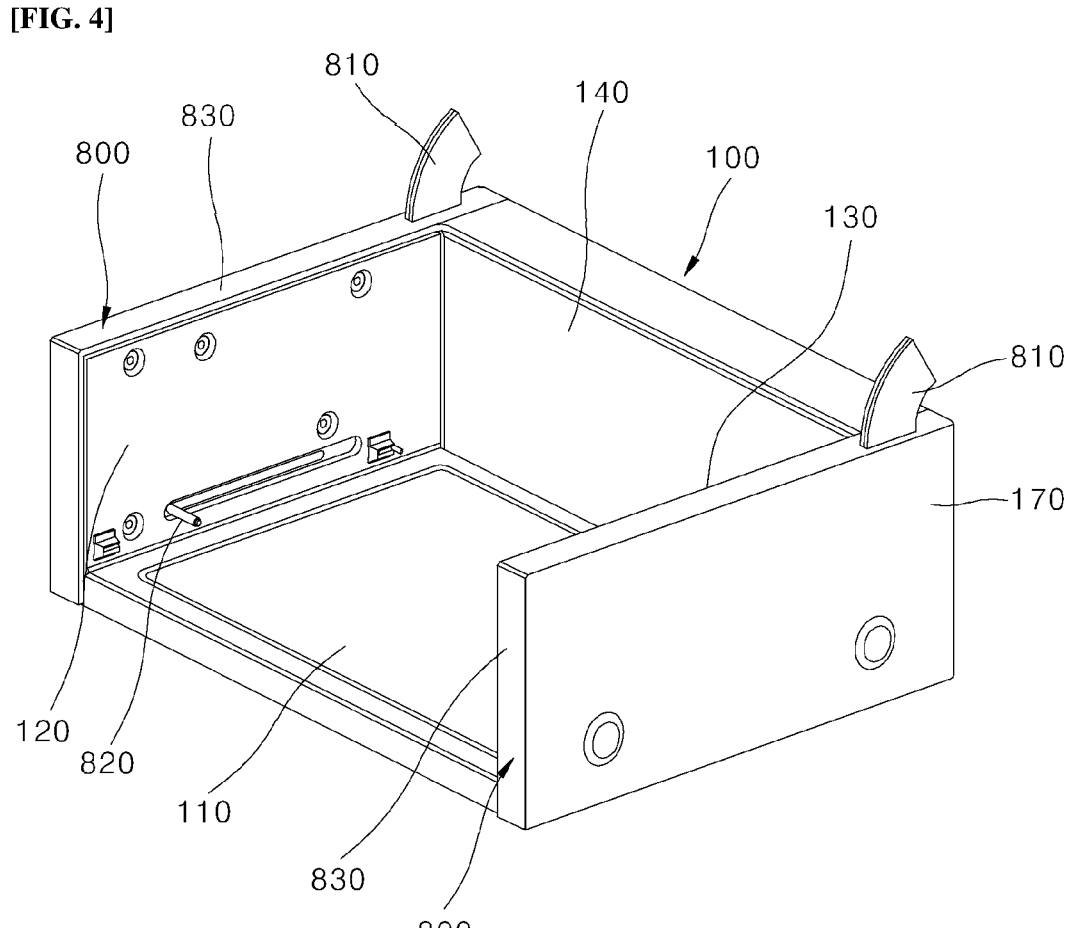

[FIG. 5]
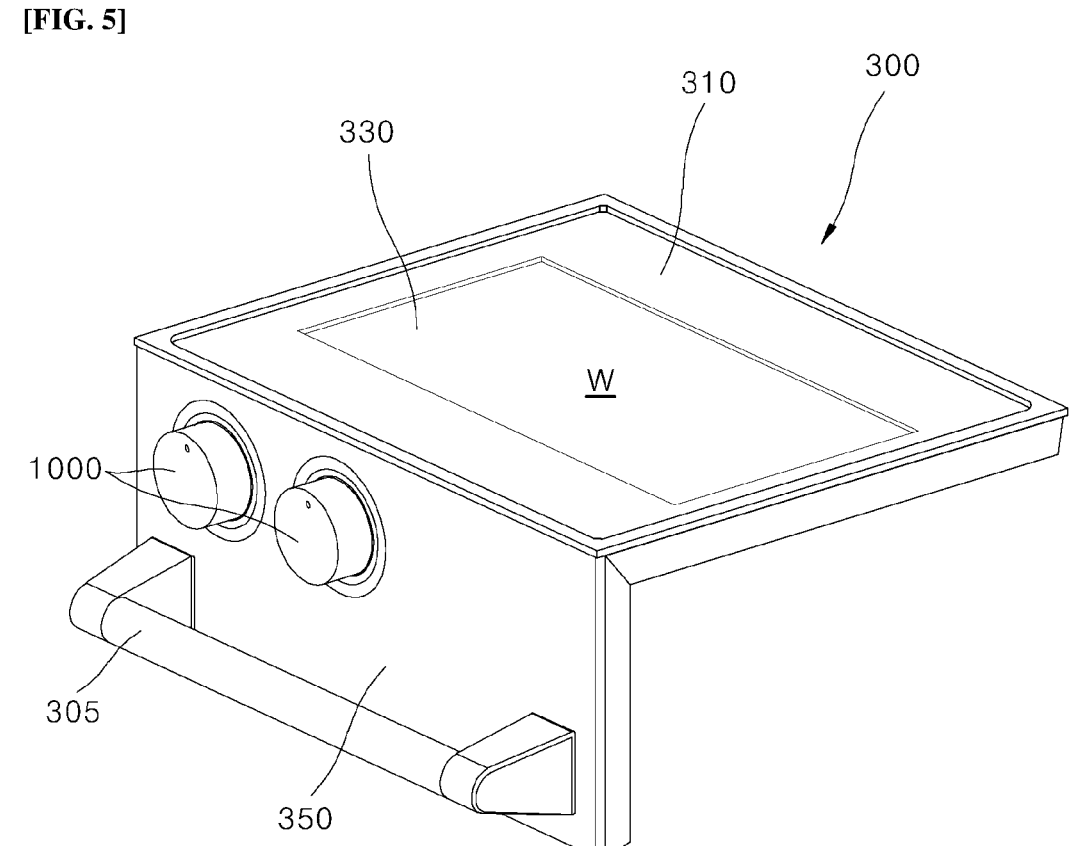

[FIG. 6]

[FIG. 7]
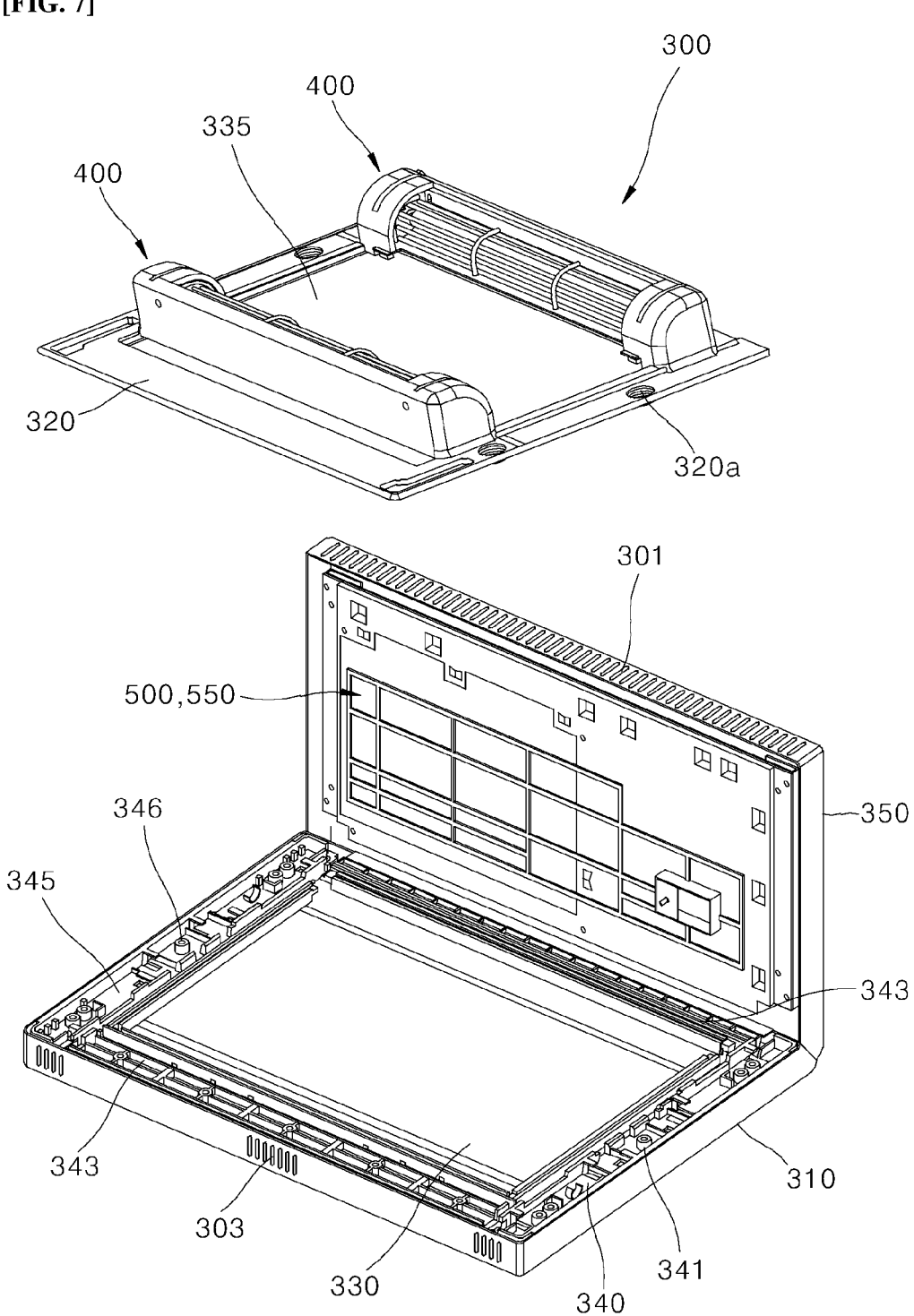

[FIG. 8]
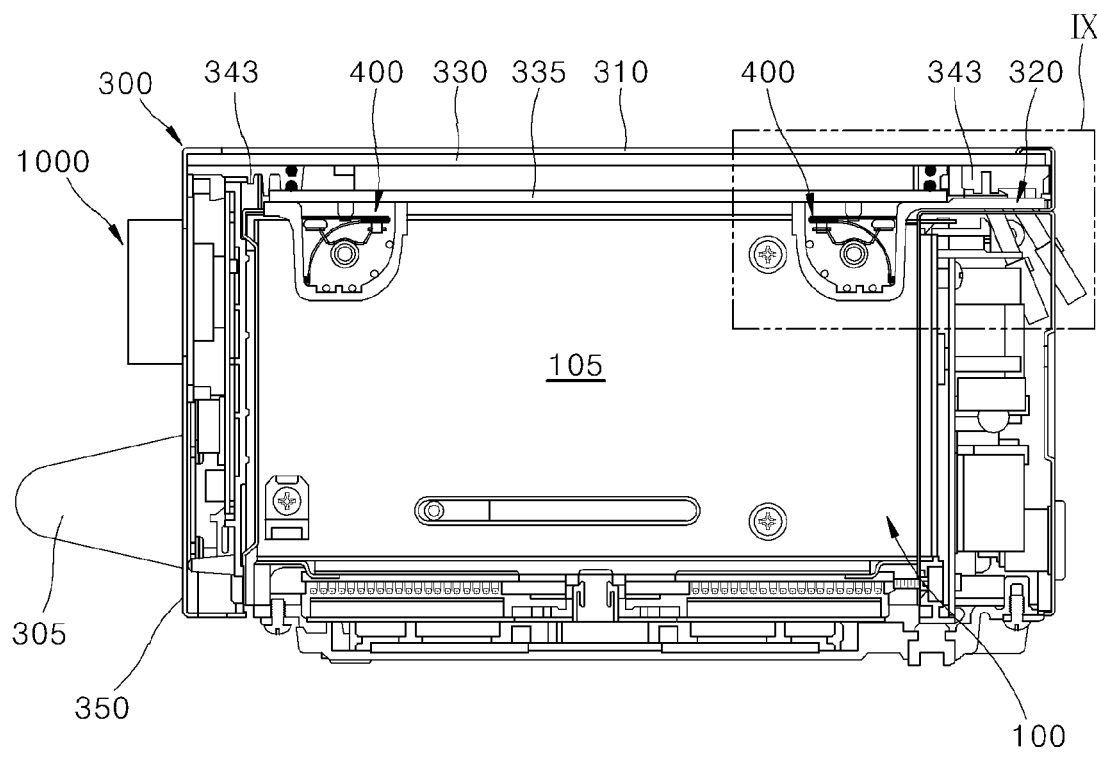
[FIG. 9]
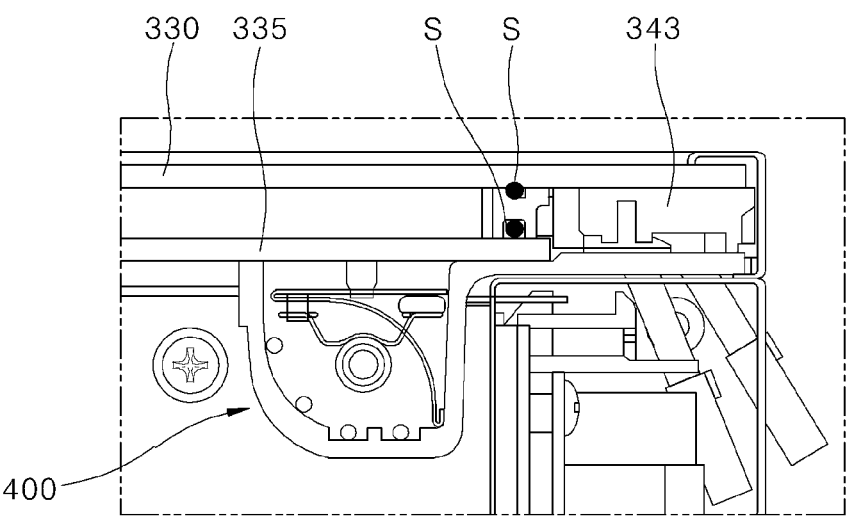

[FIG. 10]
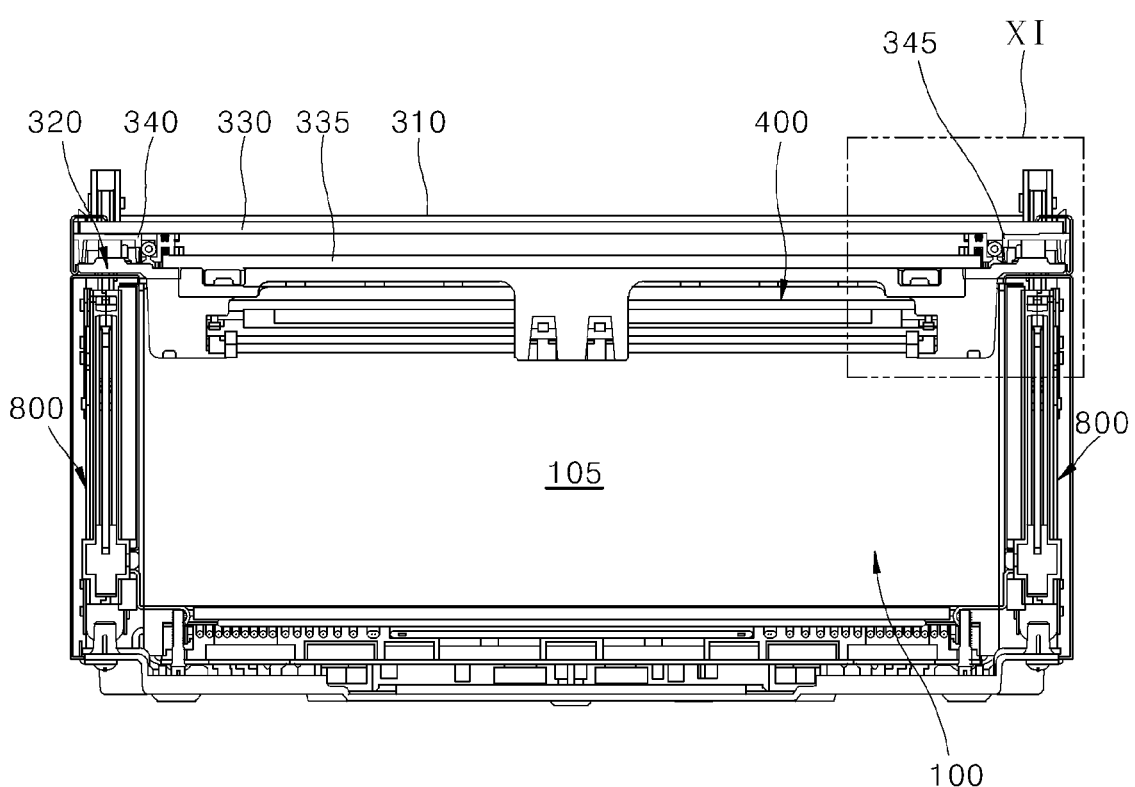

[FIG. 11]
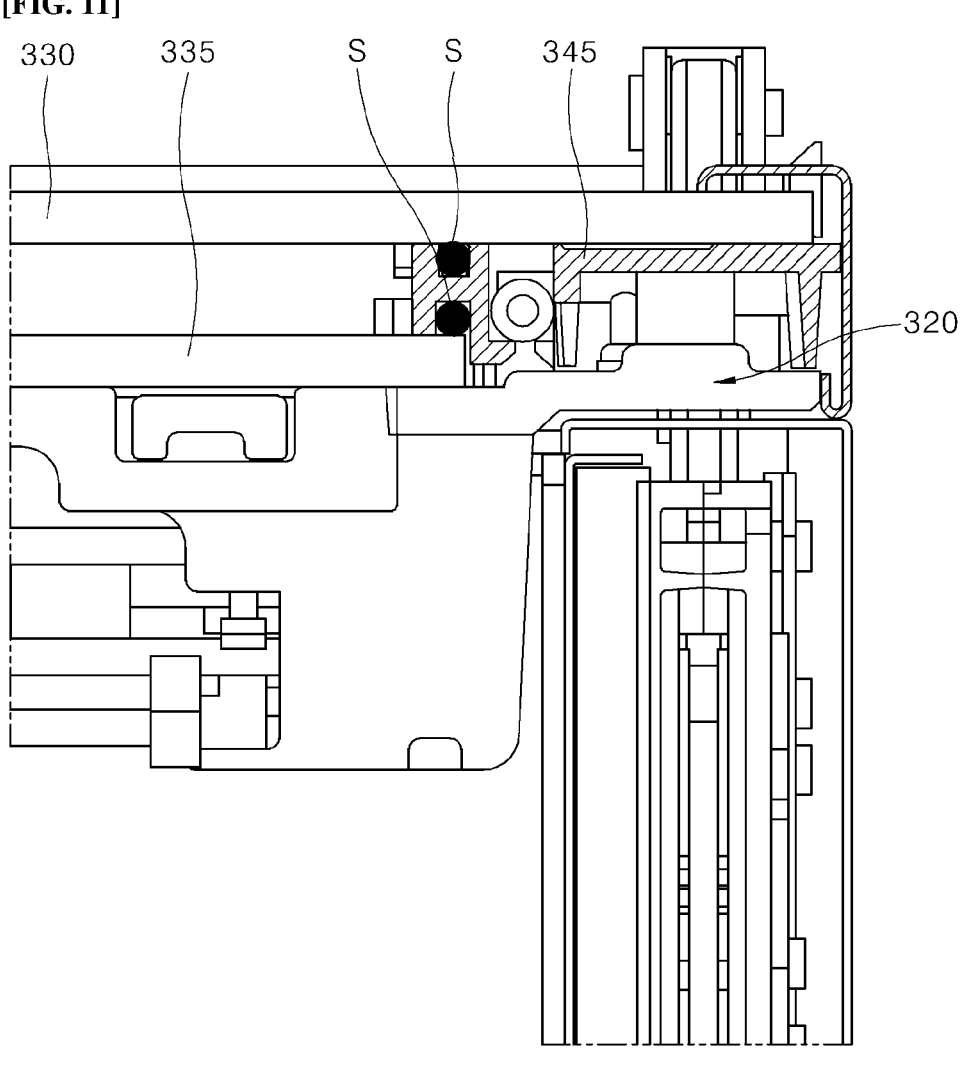

[FIG. 12]

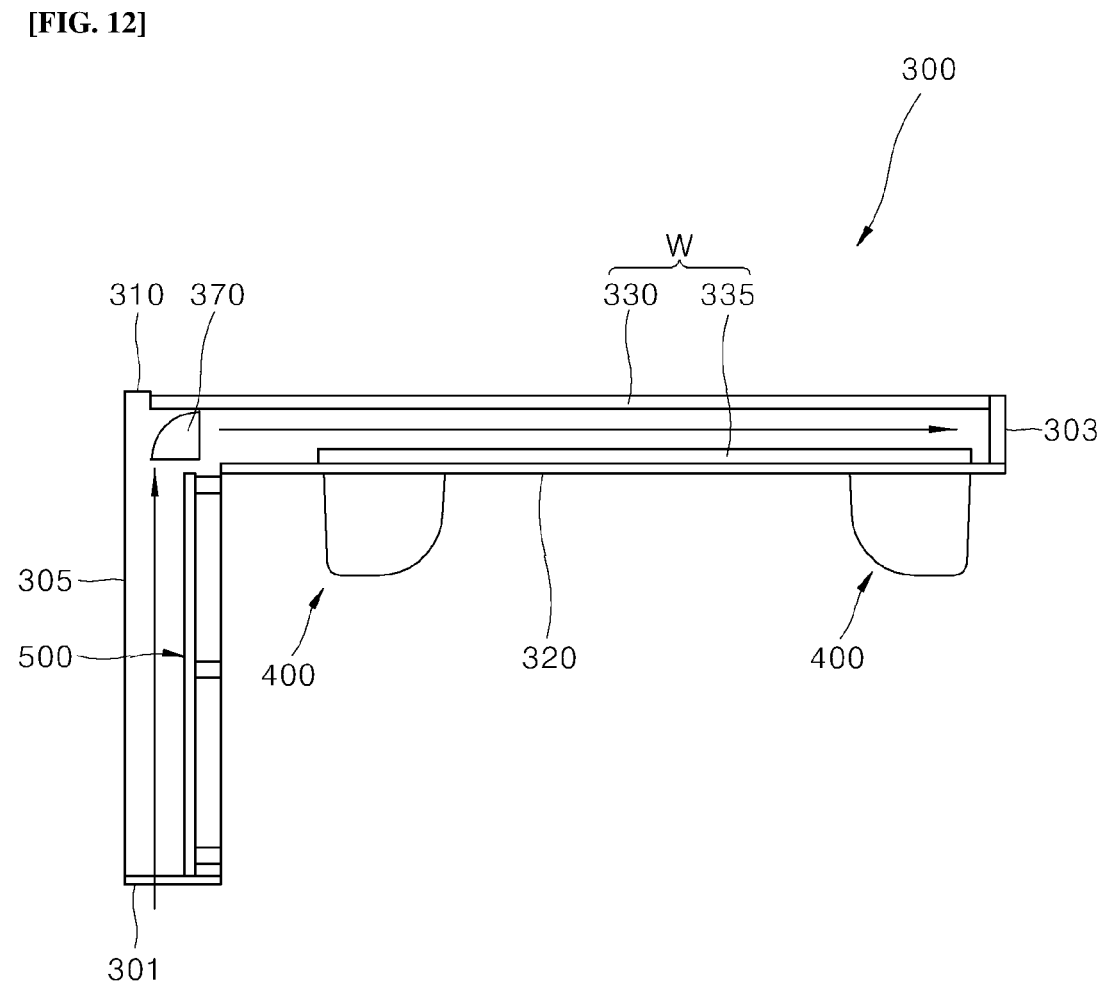

[FIG. 13]
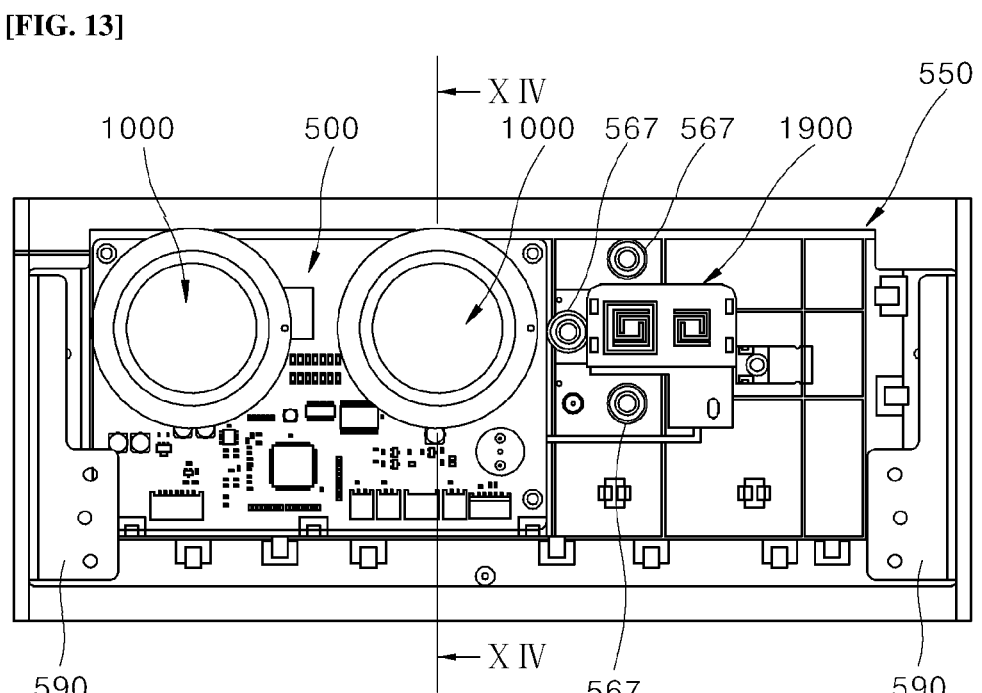

[FIG. 14]
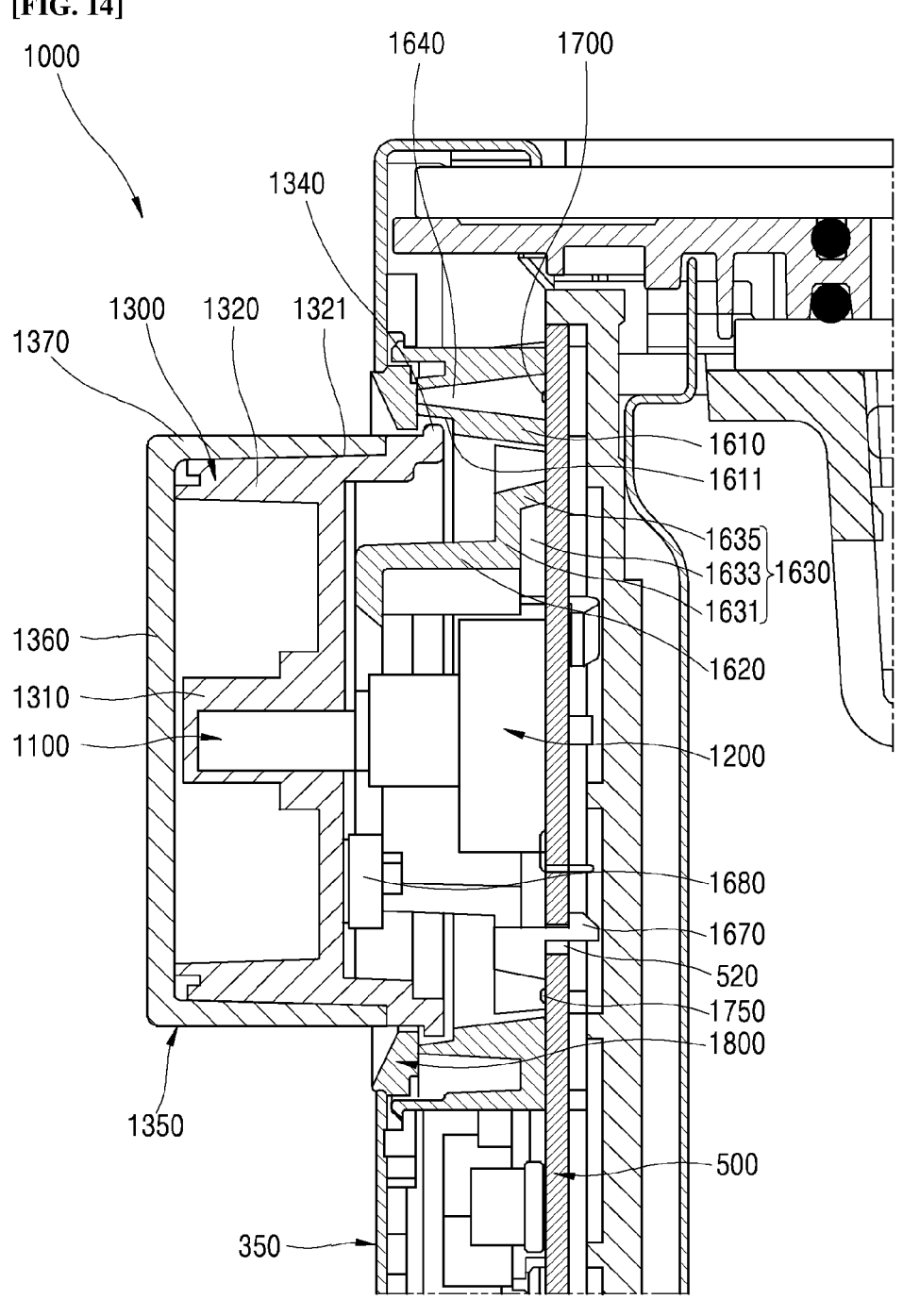

[FIG. 15]
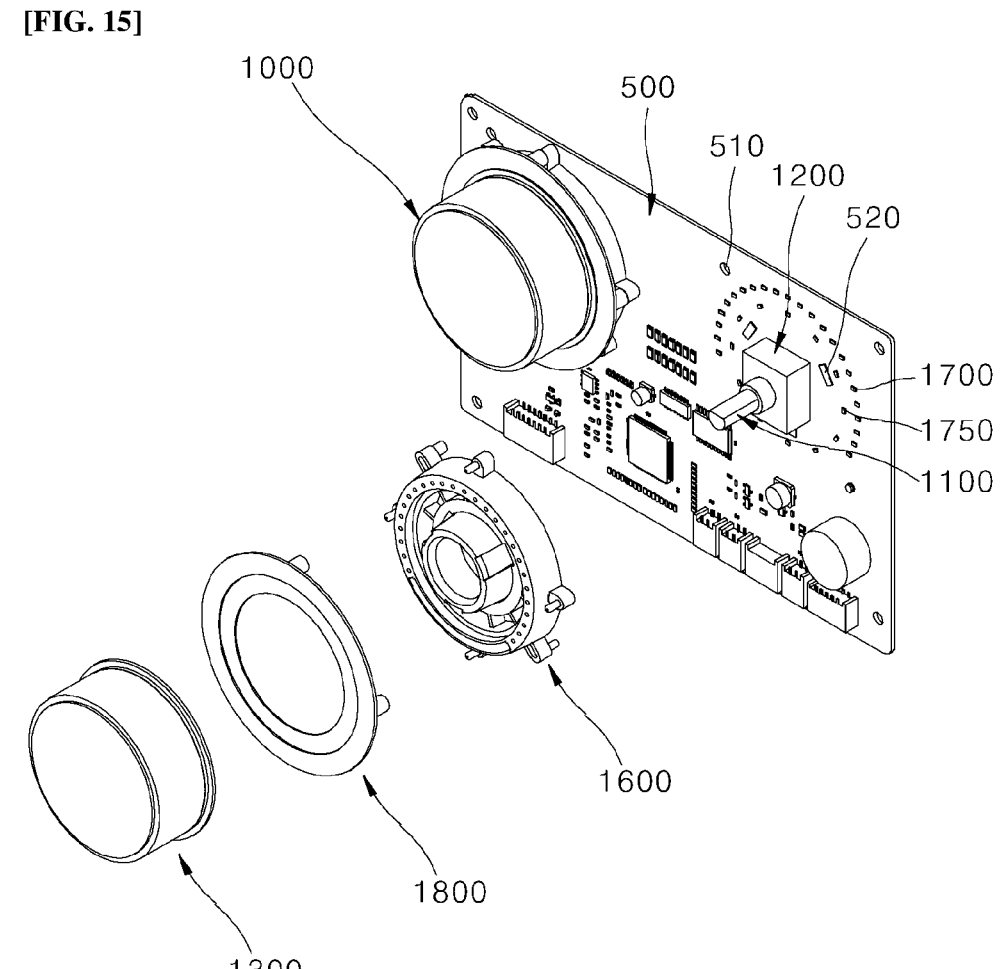

[FIG. 16]
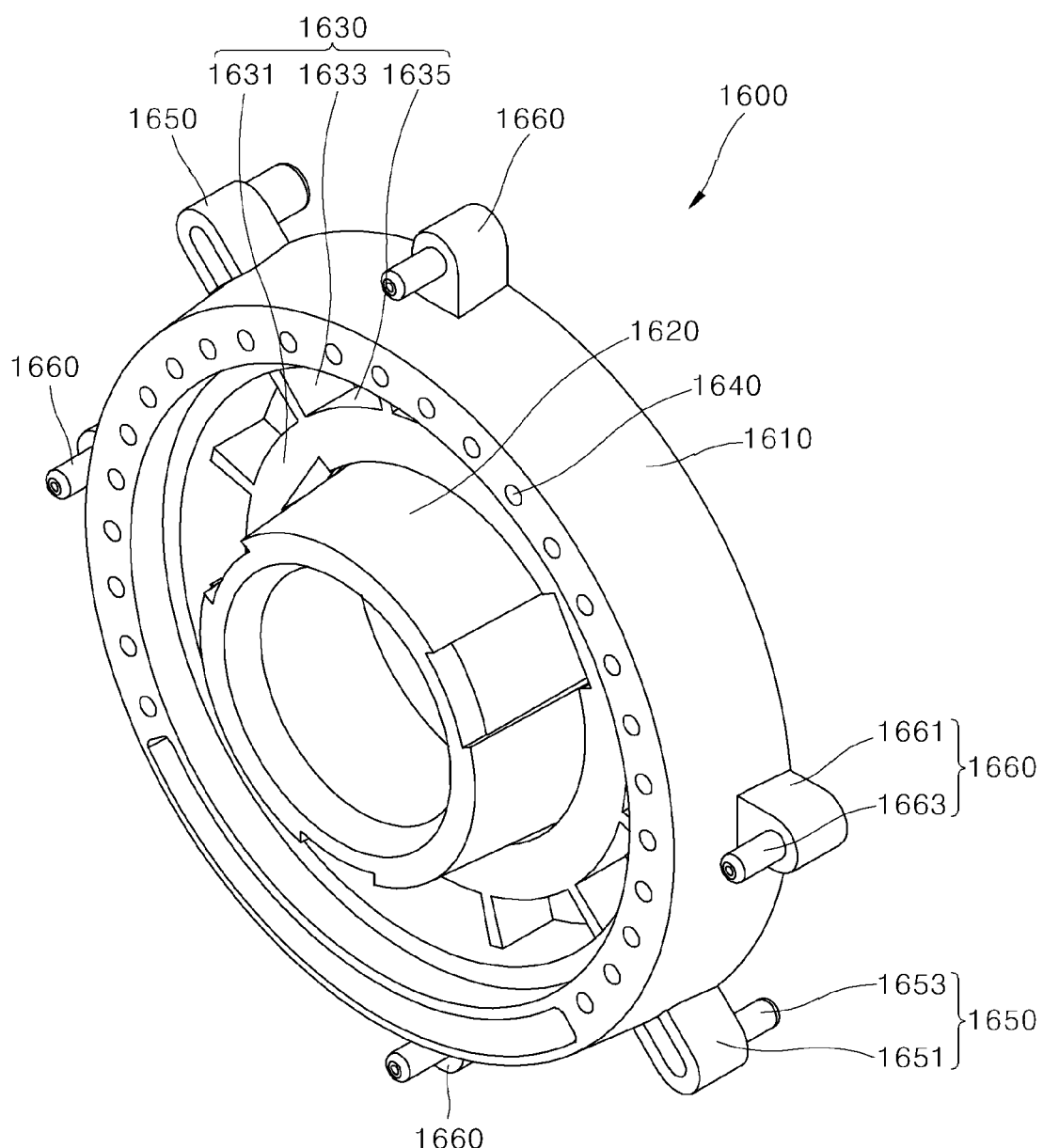

[FIG. 17]
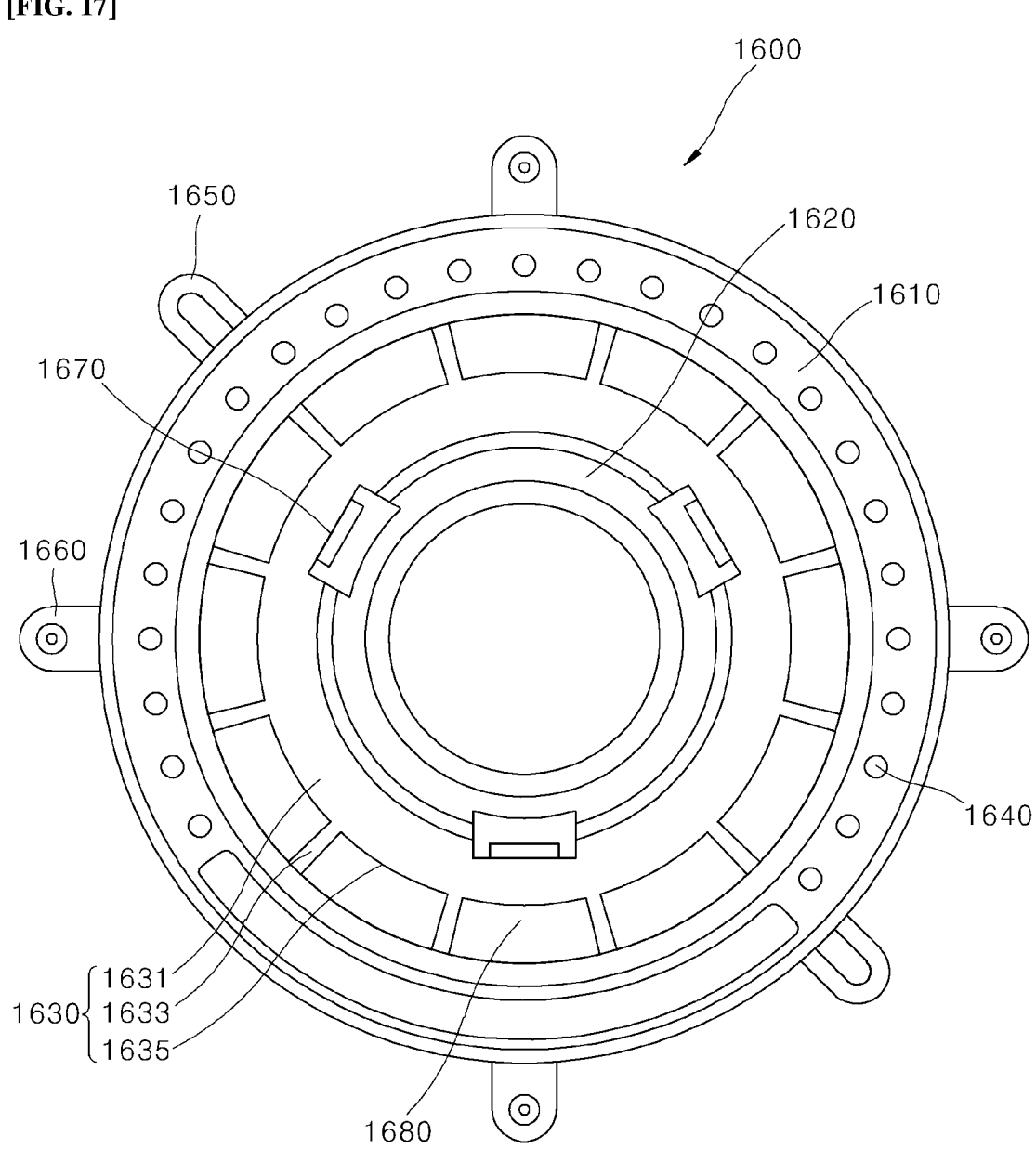

[FIG. 18]
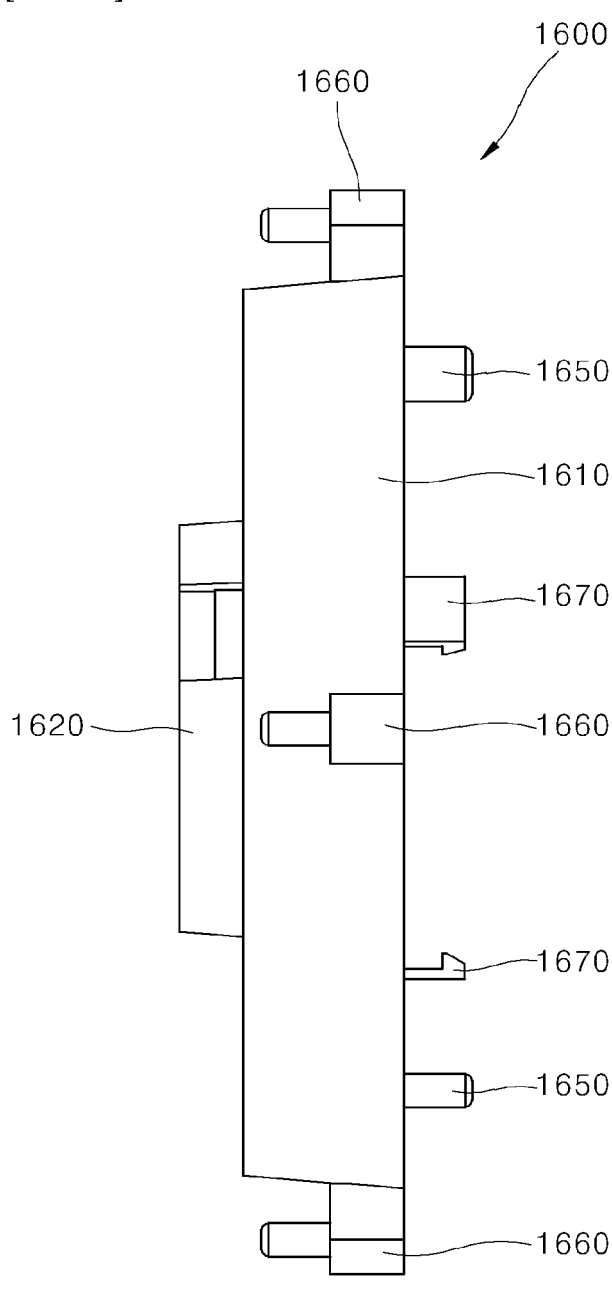

[FIG. 19]
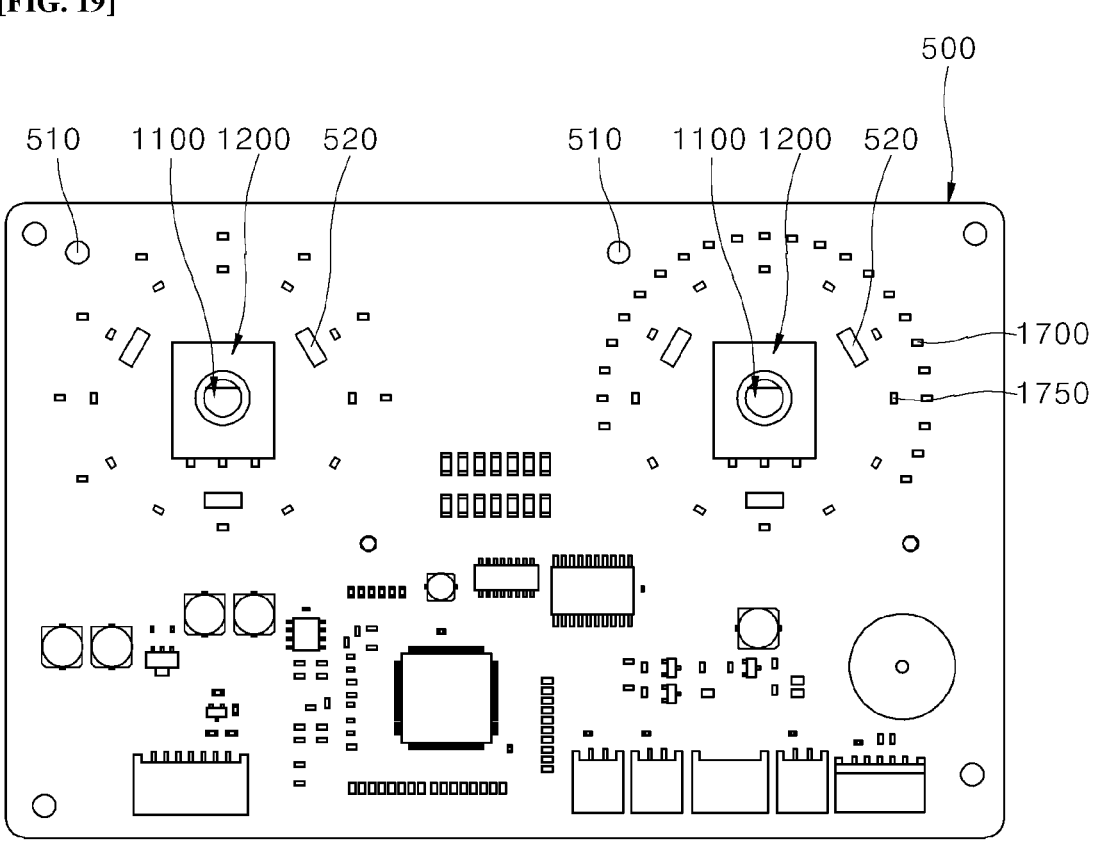

[FIG. 20]
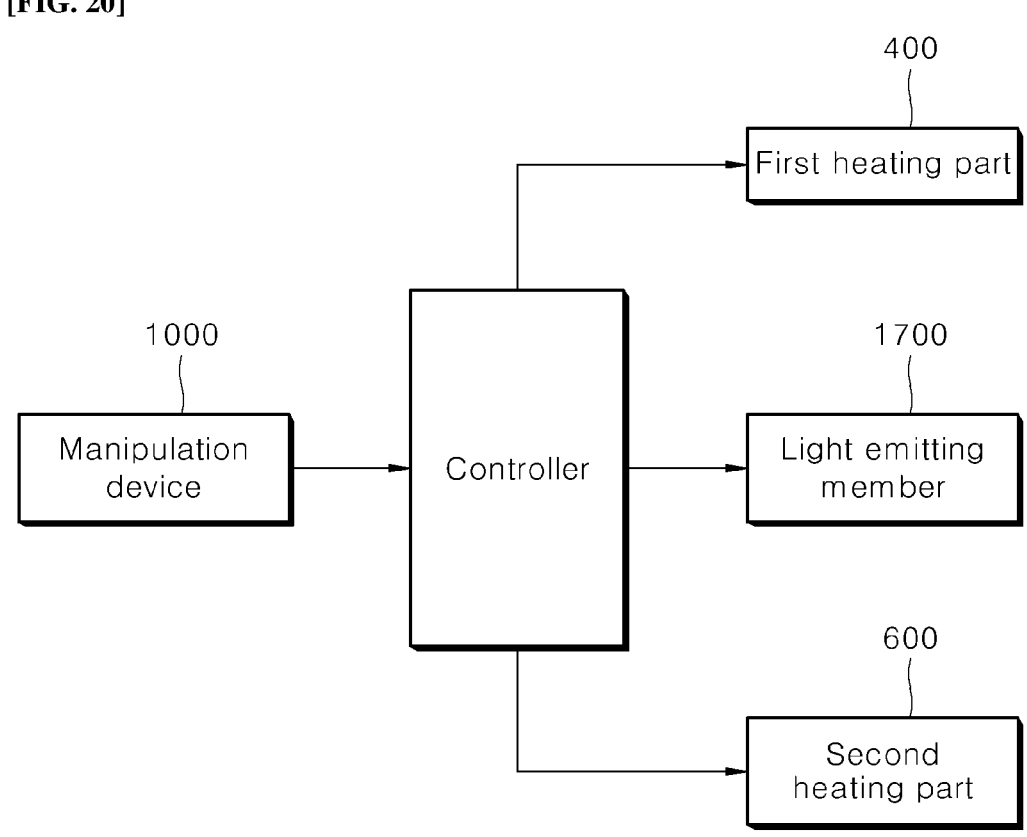
[FIG. 21]
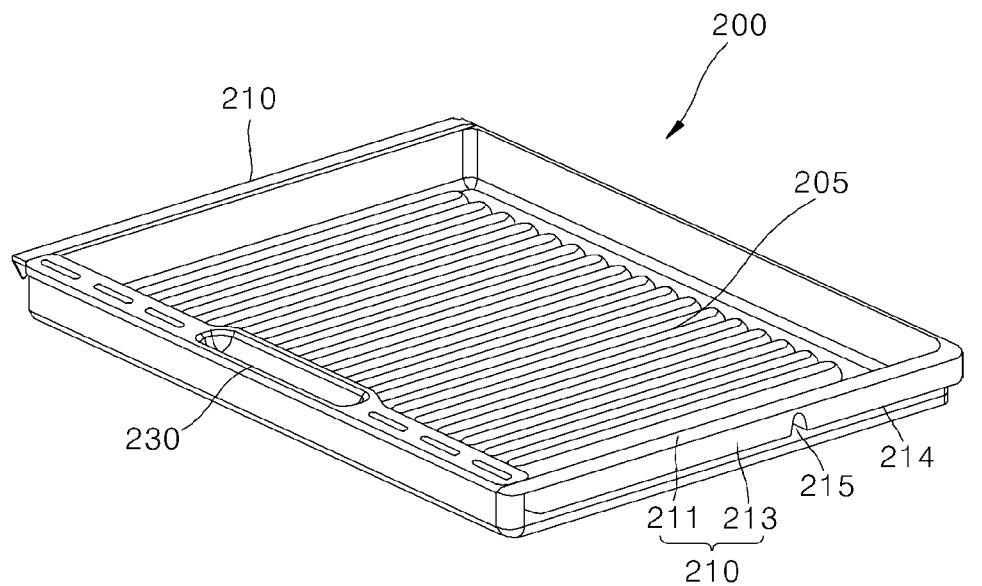

[FIG. 22]
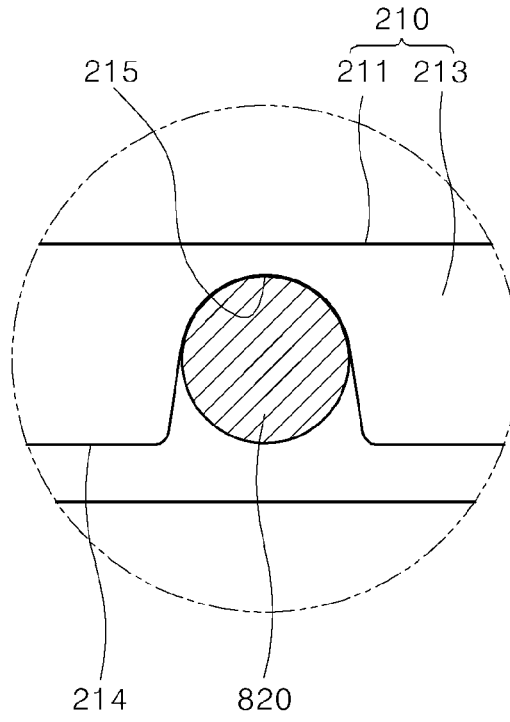
[FIG. 23]
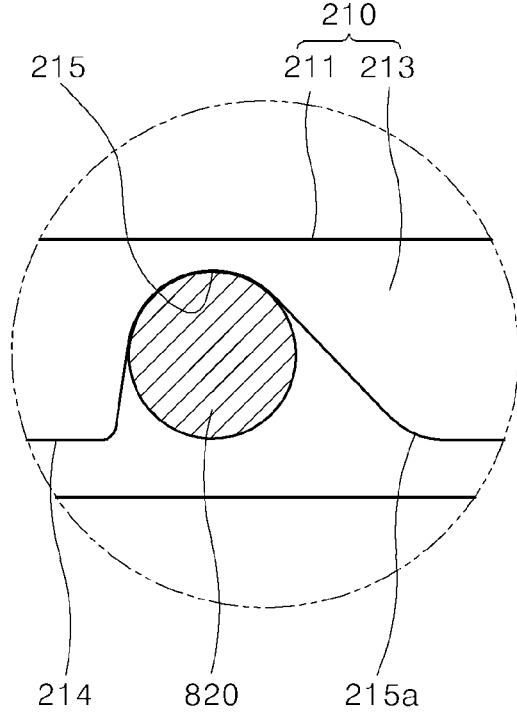

[FIG. 24]
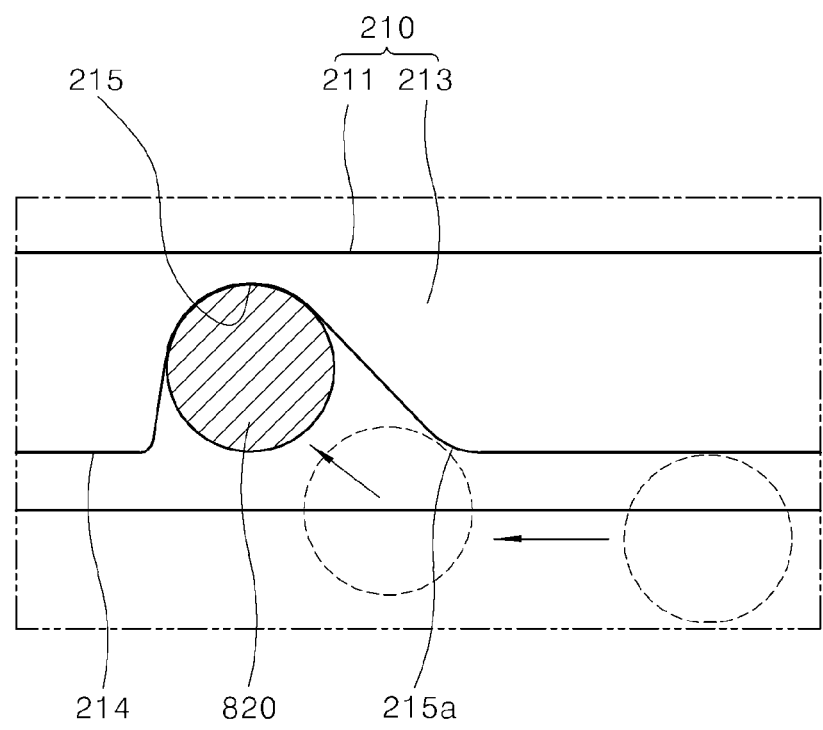
[FIG. 25]
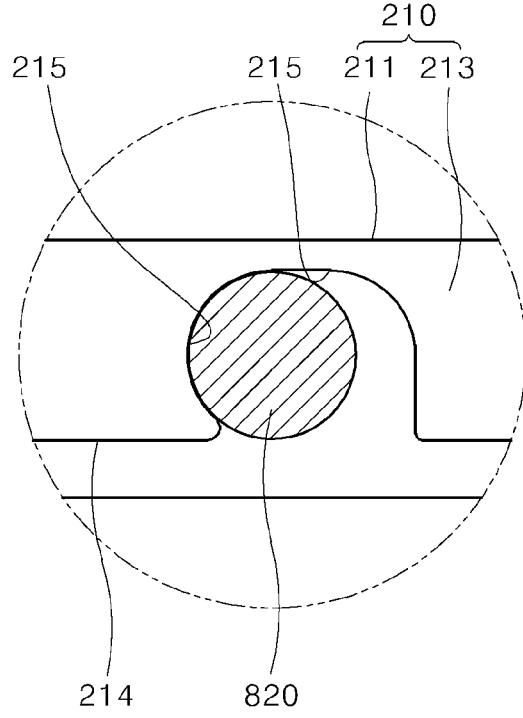

[FIG. 26]
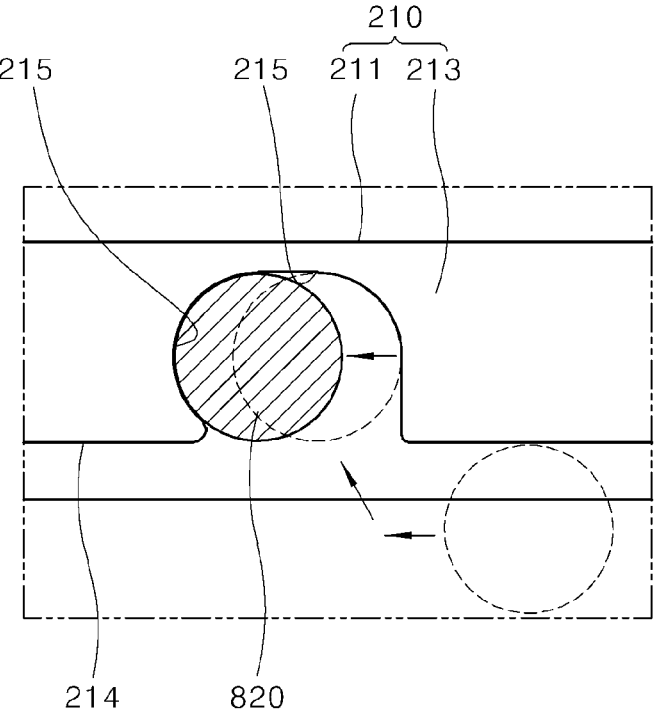
[FIG. 27]
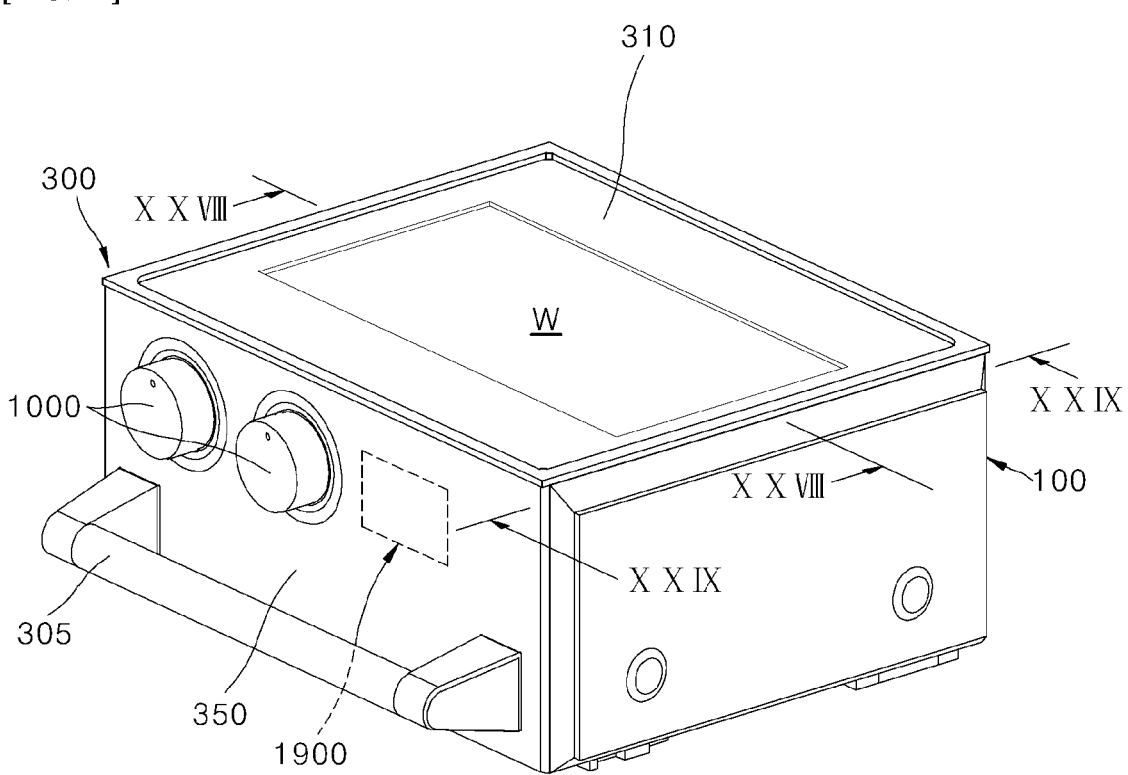

[FIG. 28]
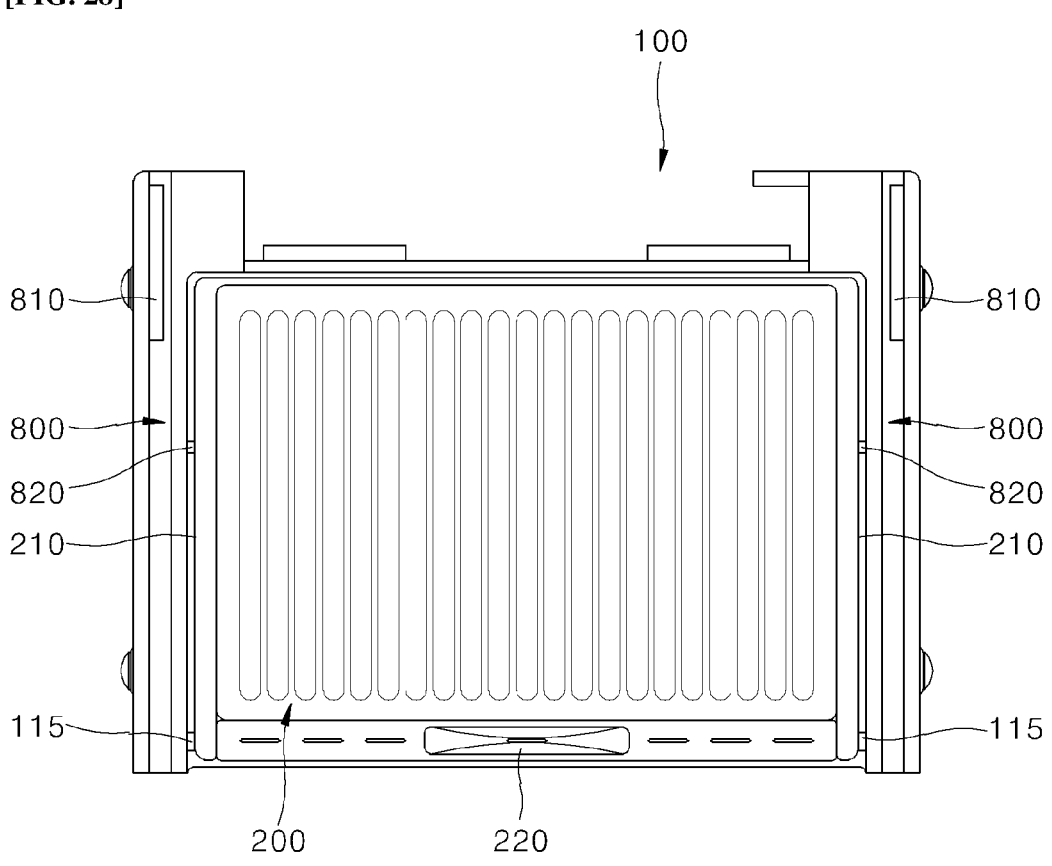
[FIG. 29]
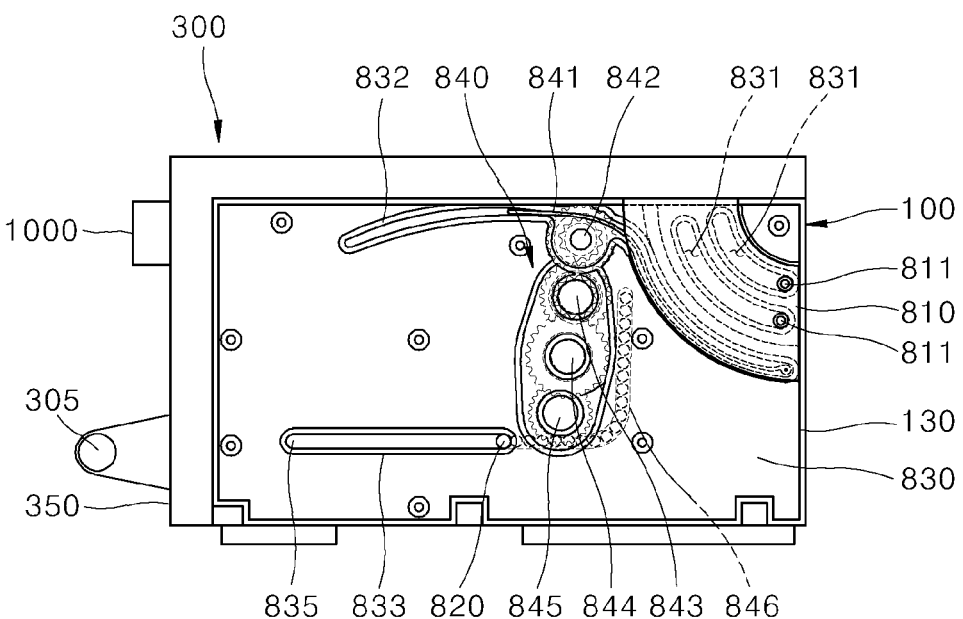

[FIG. 30]
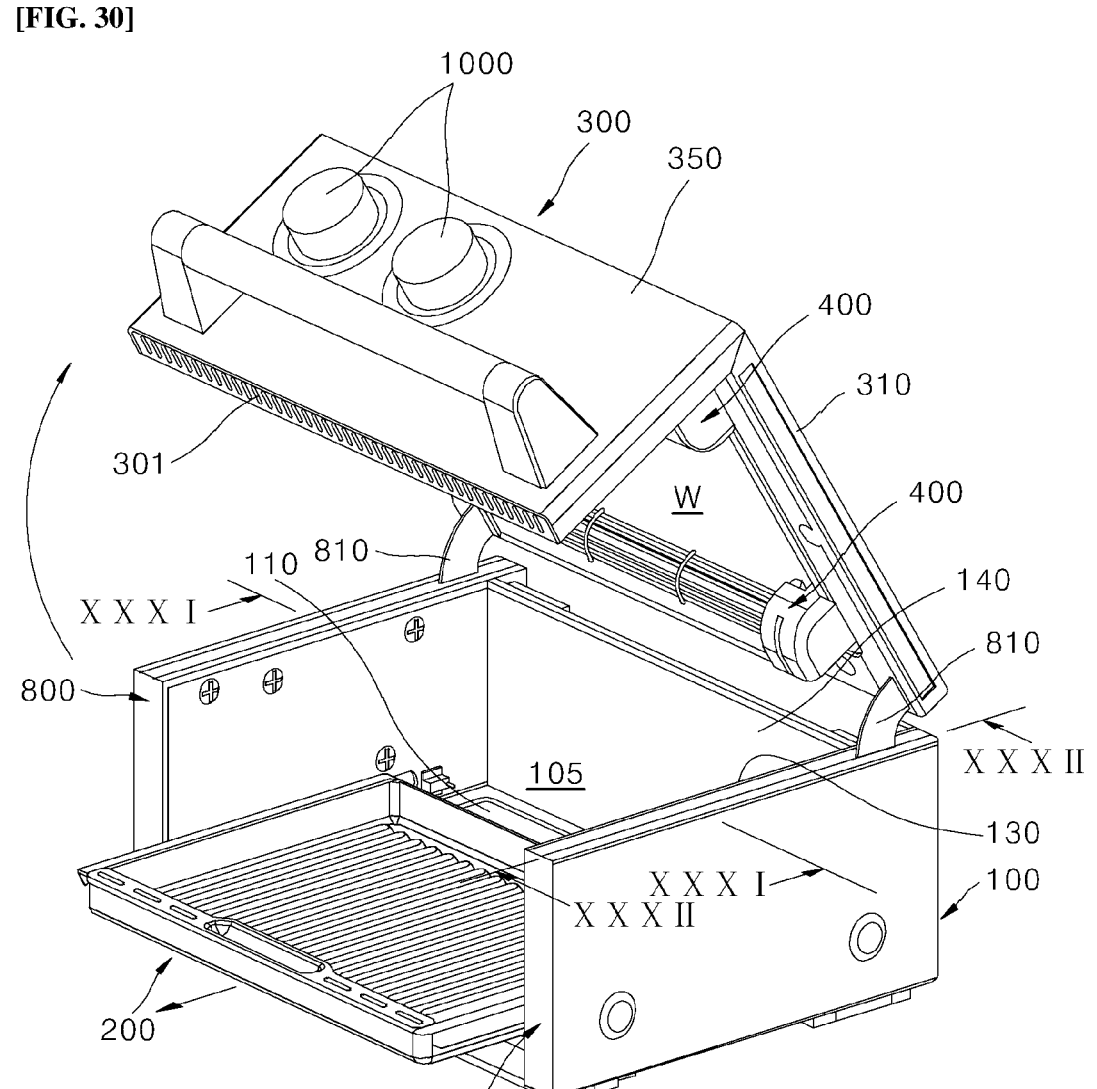

[FIG. 31]
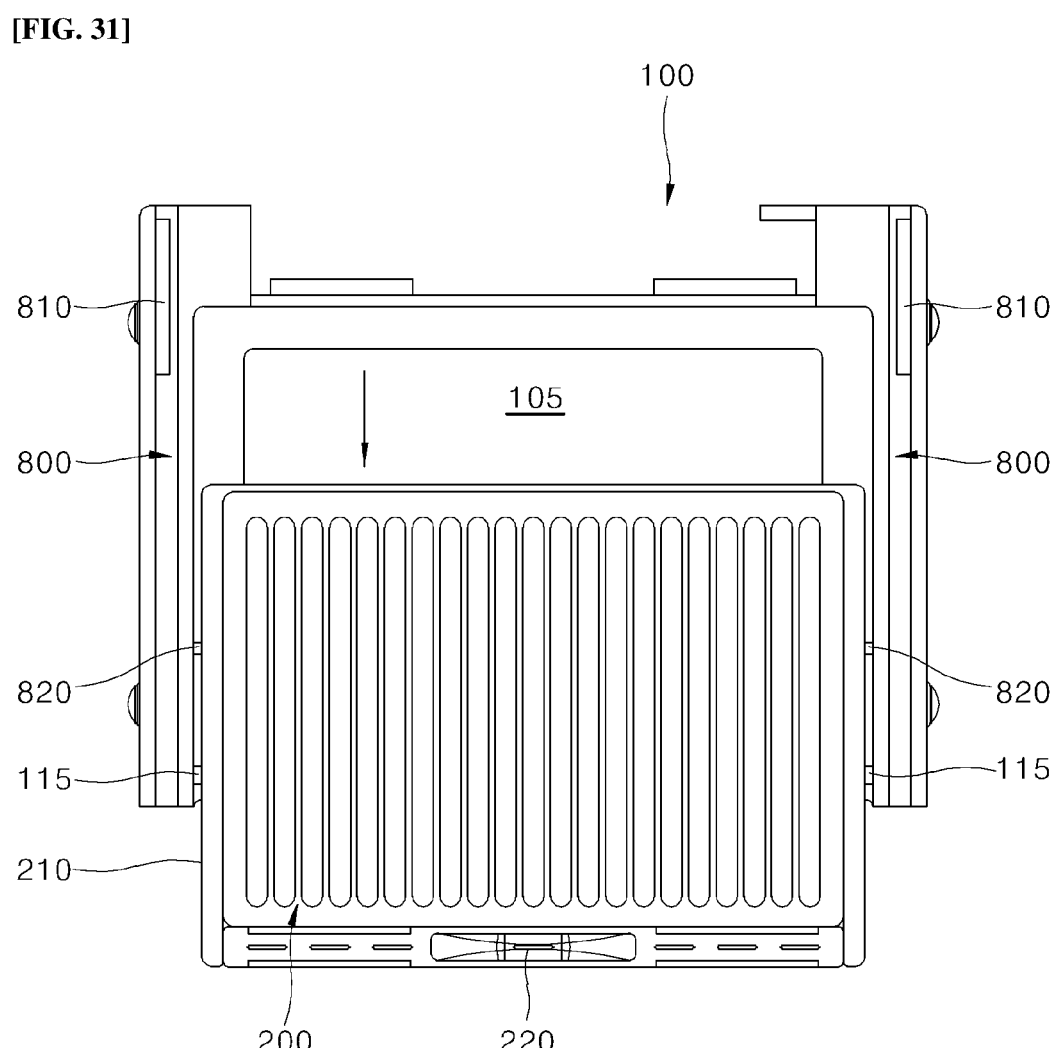

[FIG. 32]

[FIG. 33]
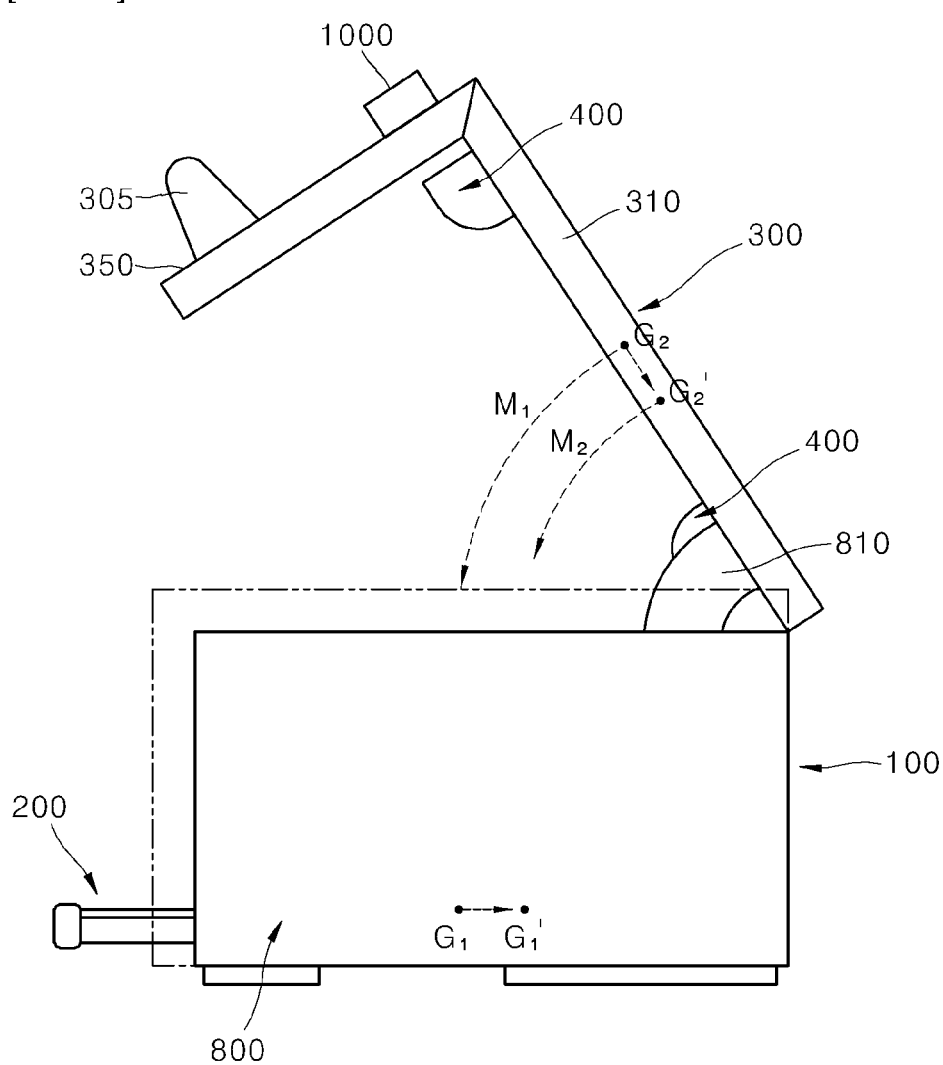

[FIG. 34]
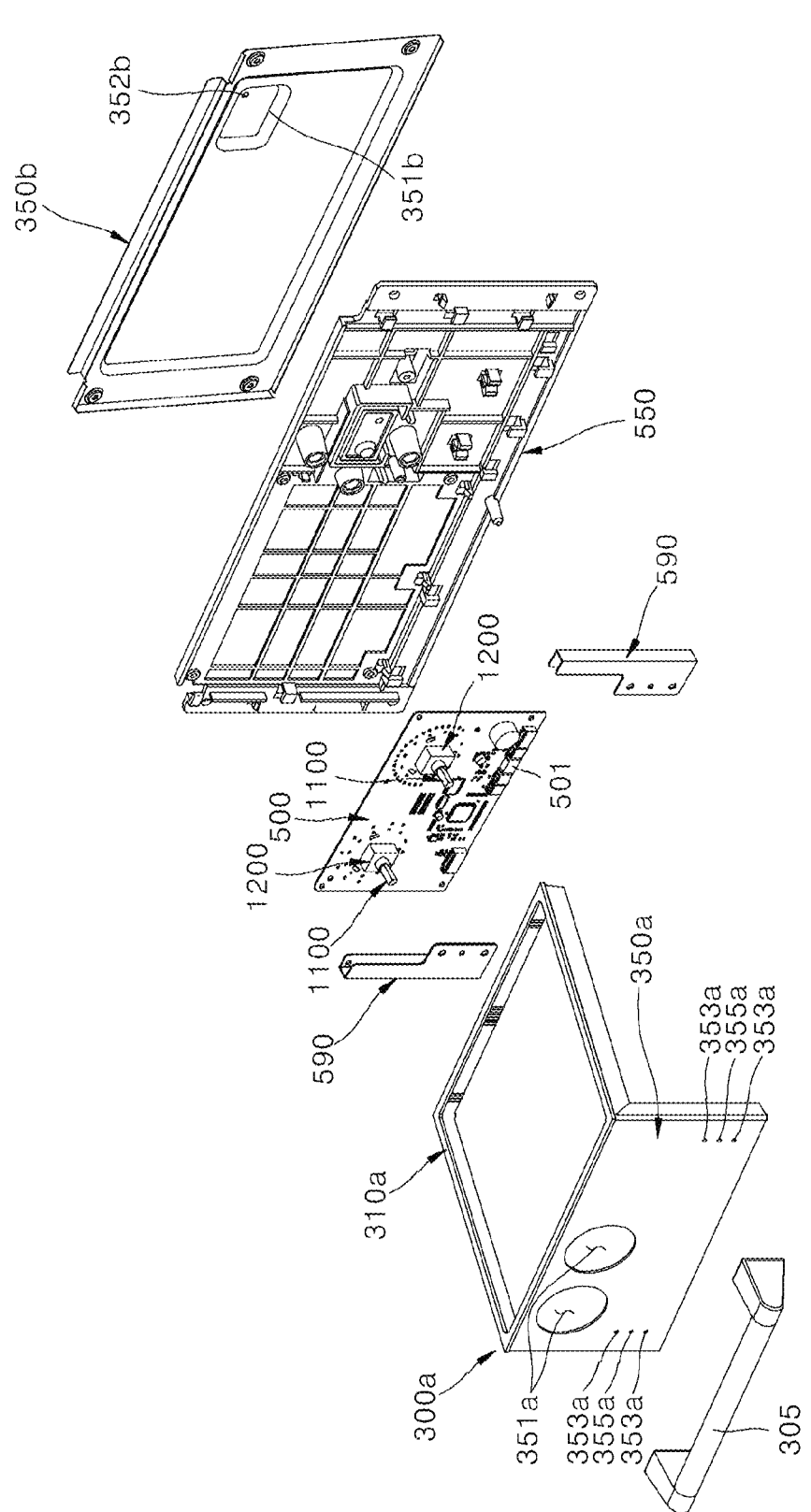

[FIG. 35]
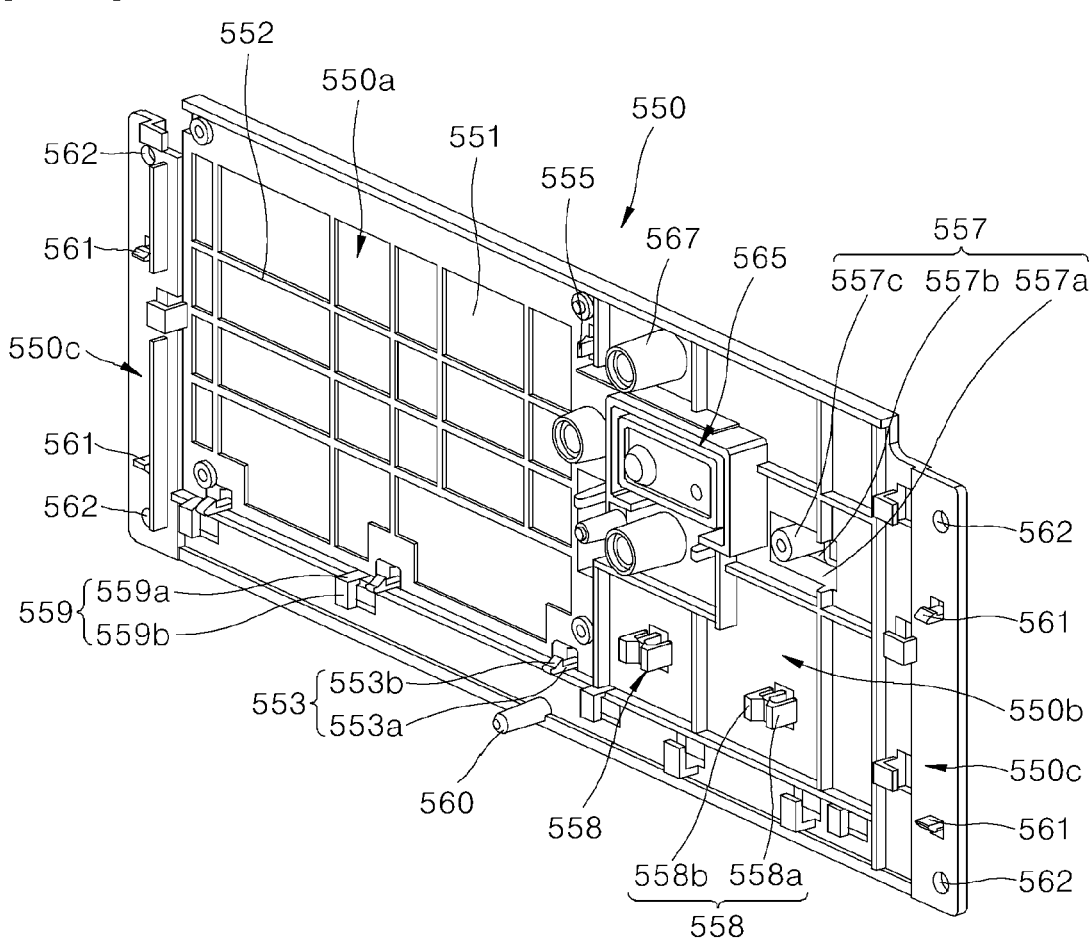
[FIG. 36]
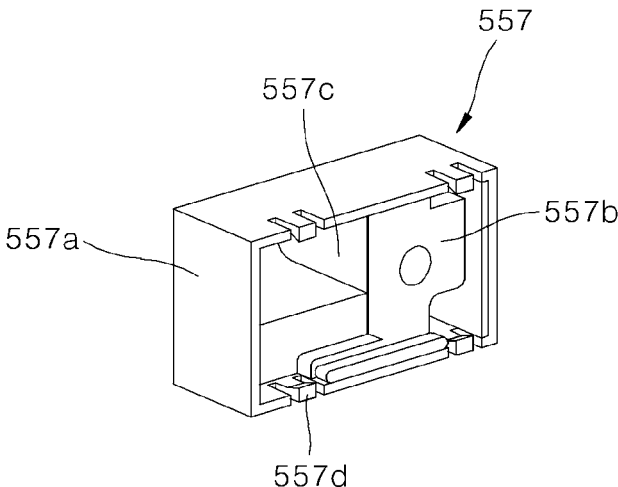

[FIG. 37]
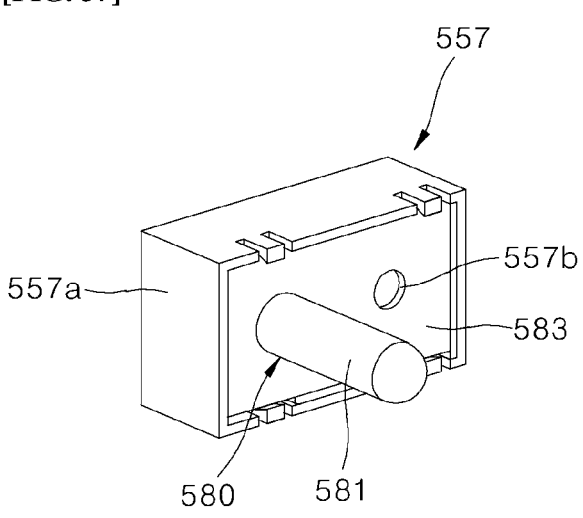
[FIG. 38]
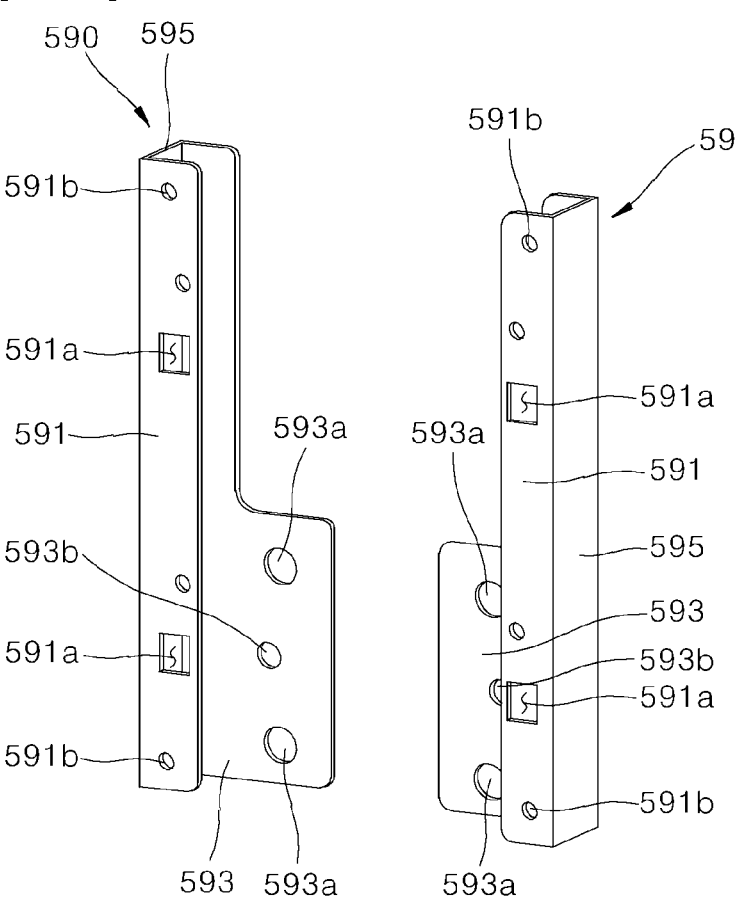

[FIG. 39]
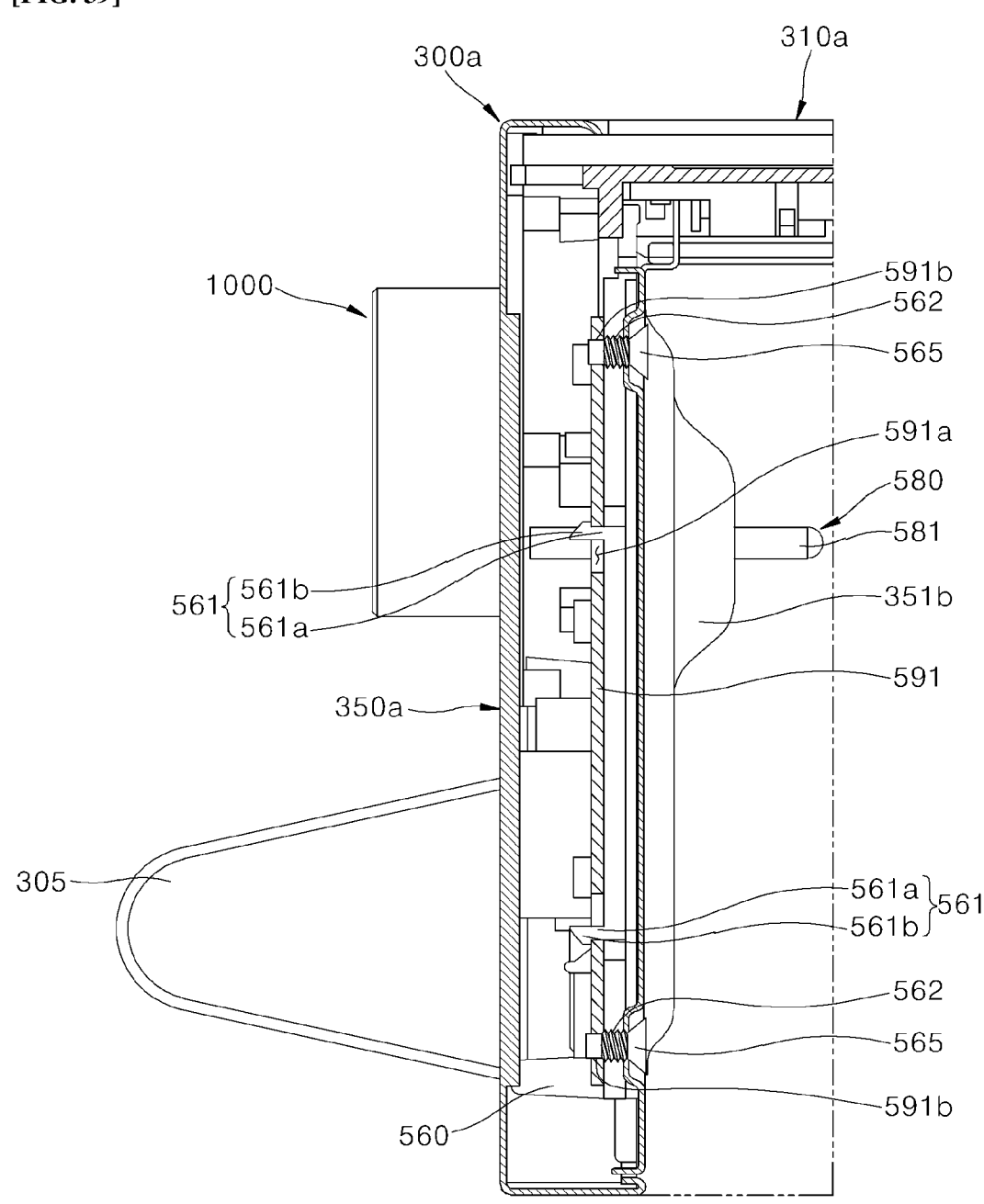

[FIG. 40]
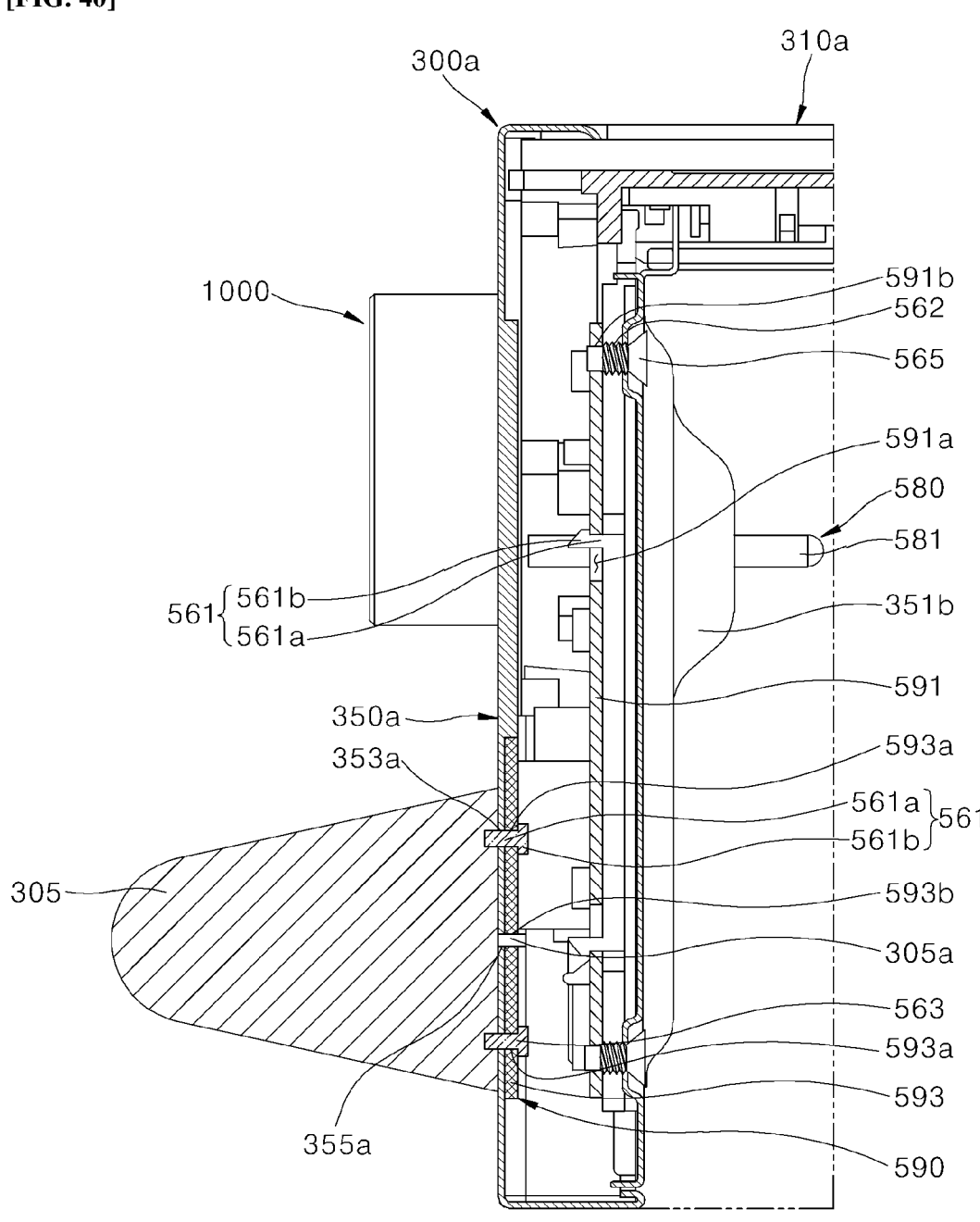

[FIG. 41]
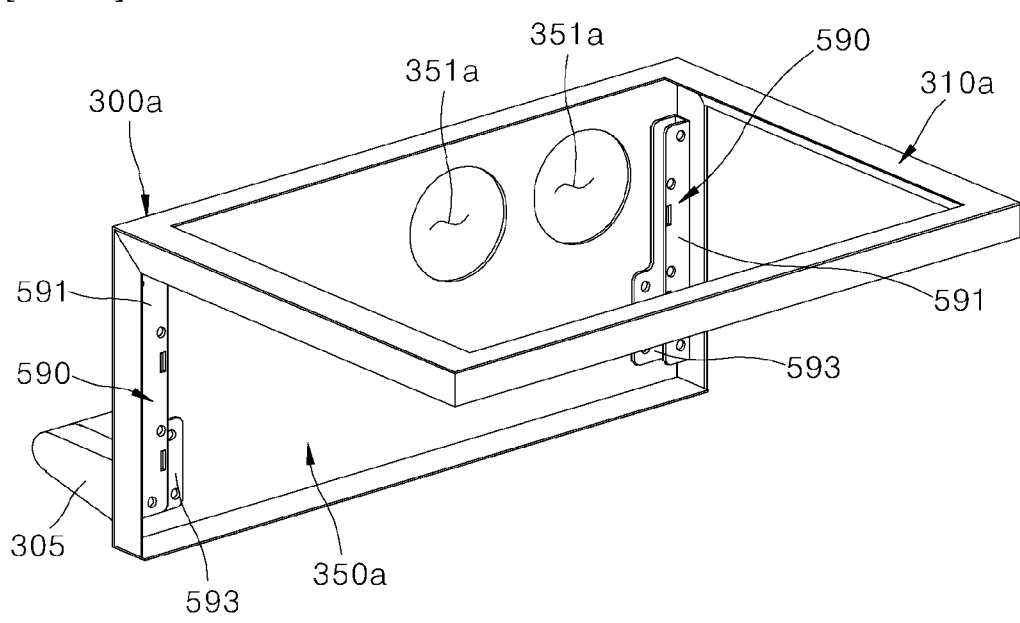
[FIG. 42]
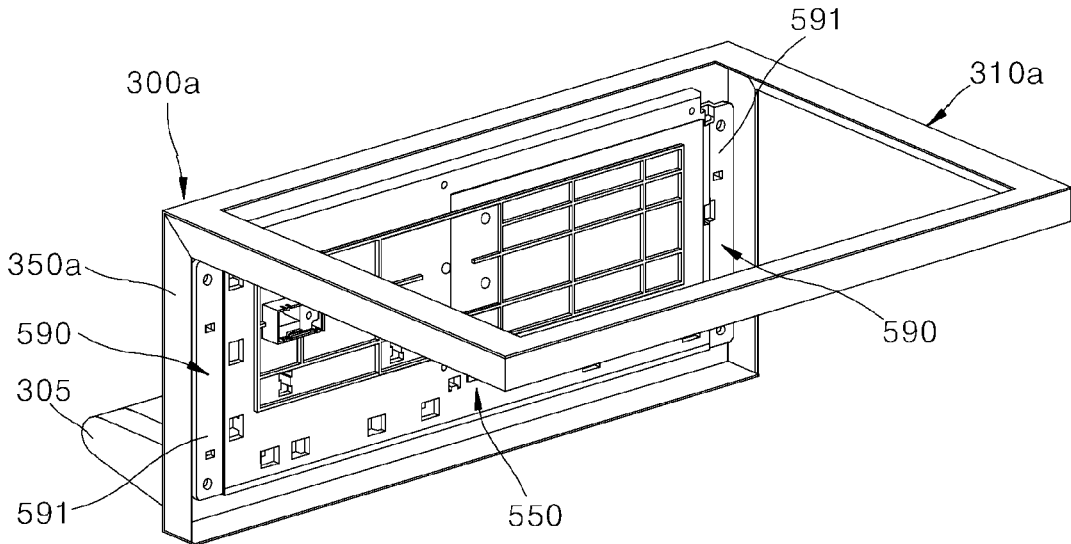

[FIG. 43]

[FIG. 44]
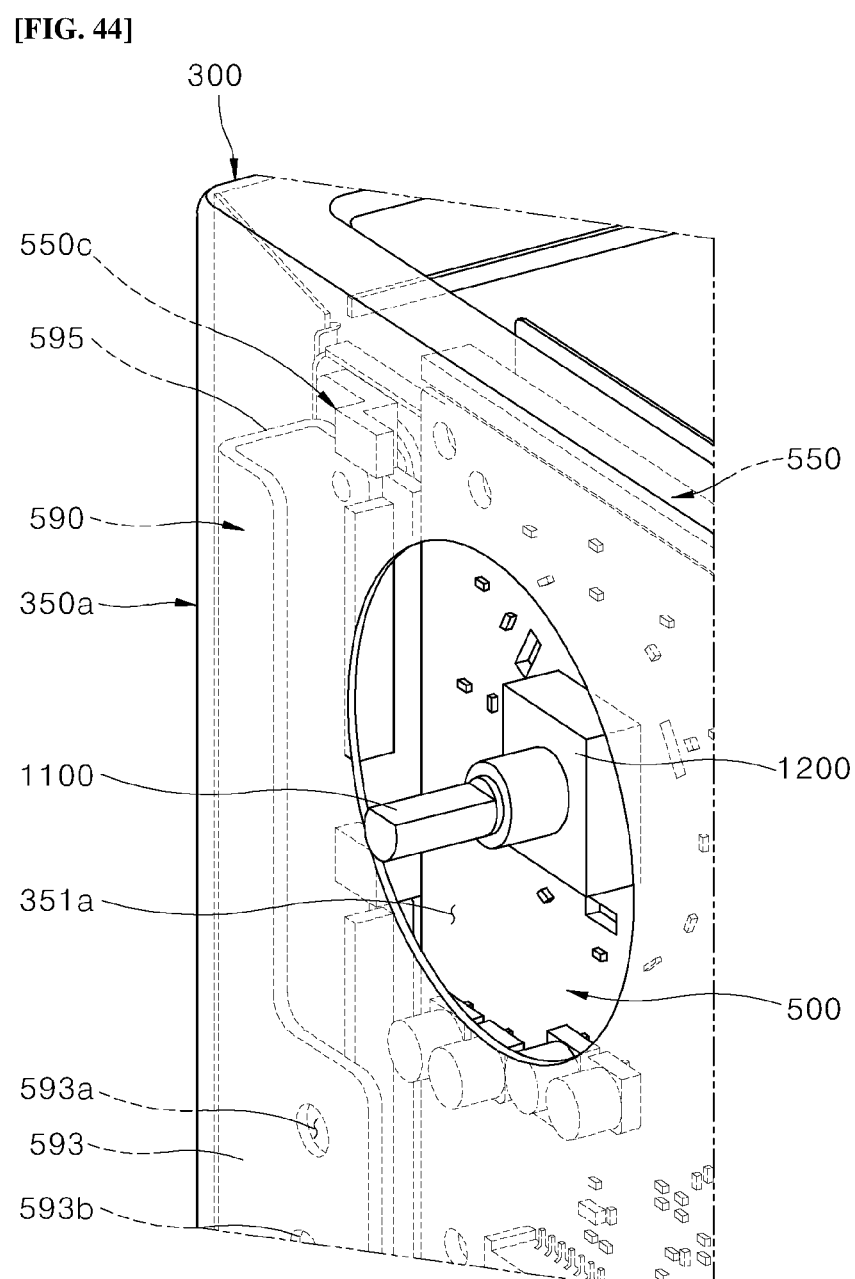

[FIG. 45]
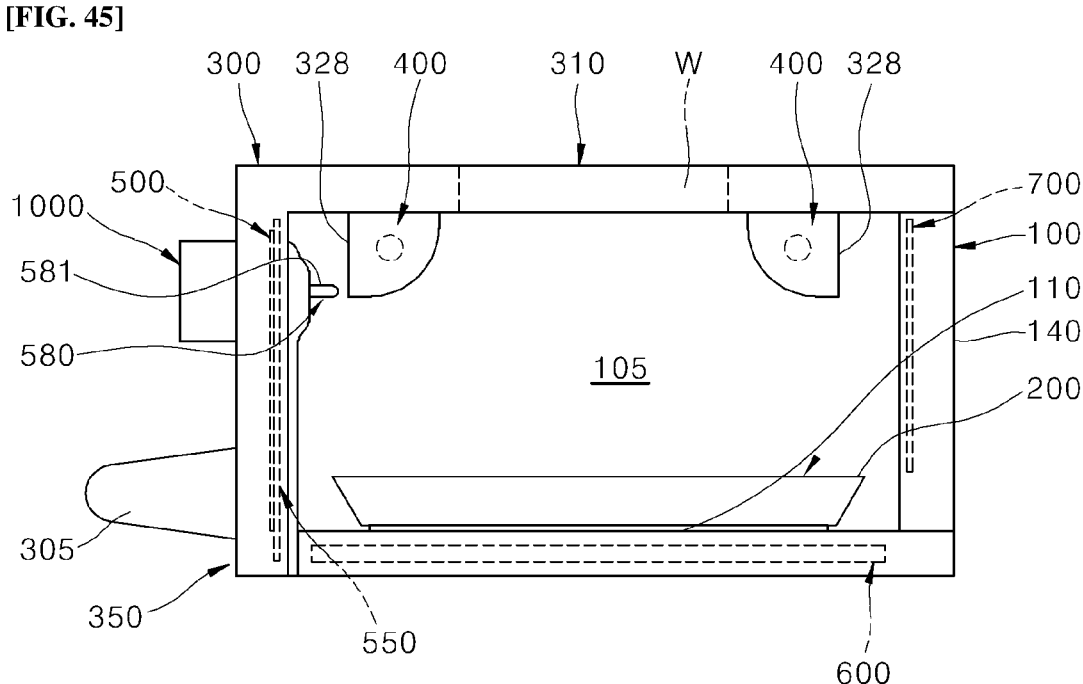

[FIG. 46]

[FIG. 47]

[FIG. 48]
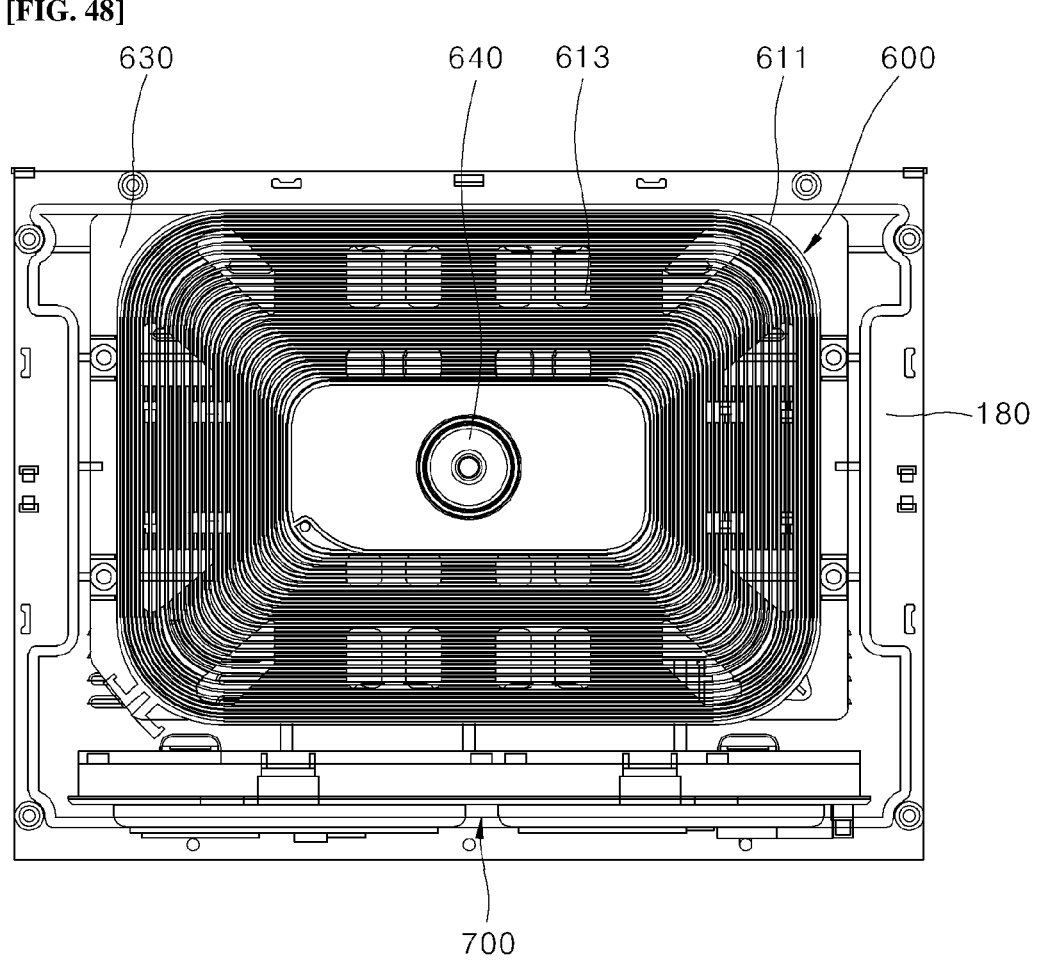

[FIG. 49]
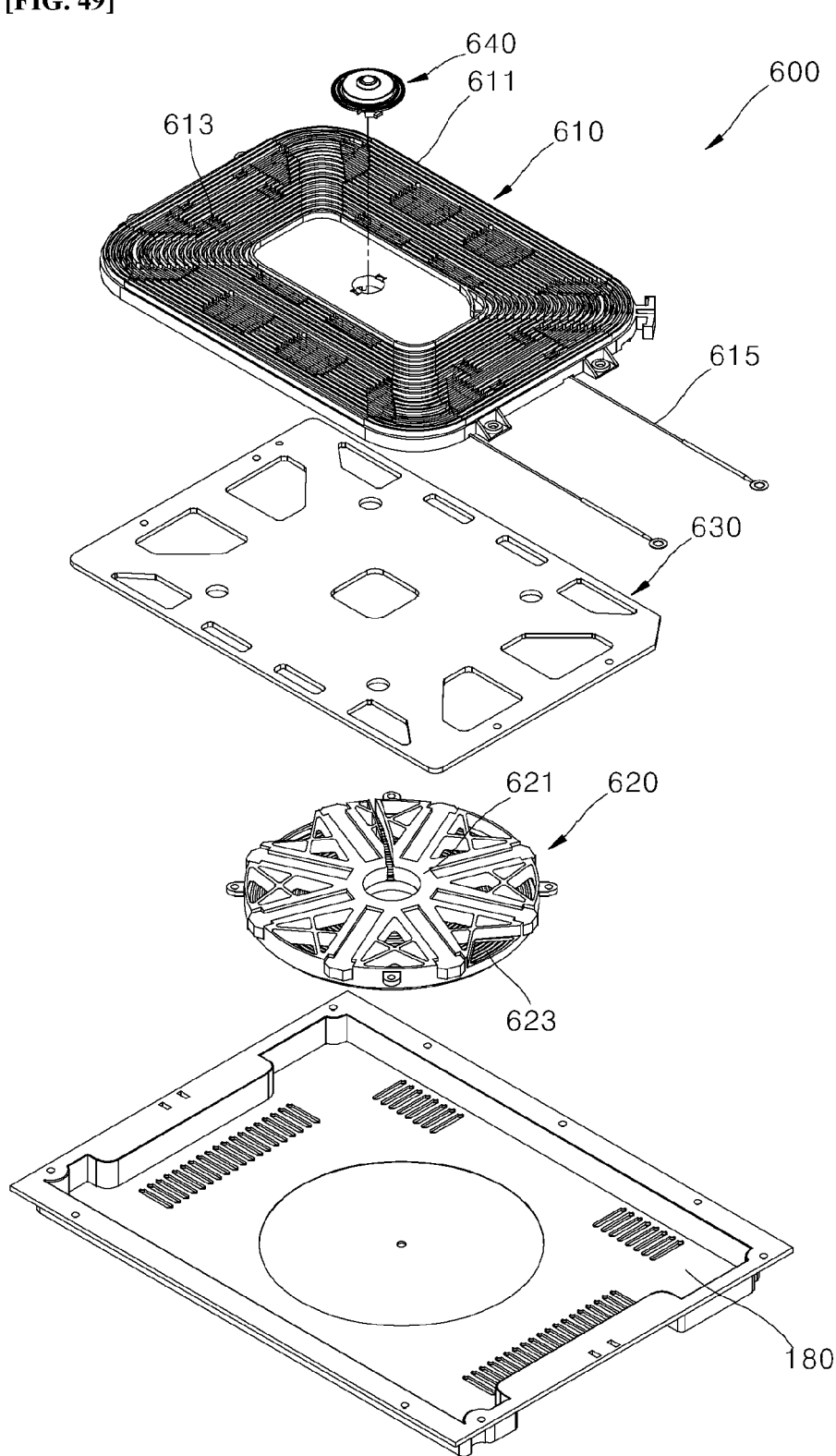

[FIG. 51]
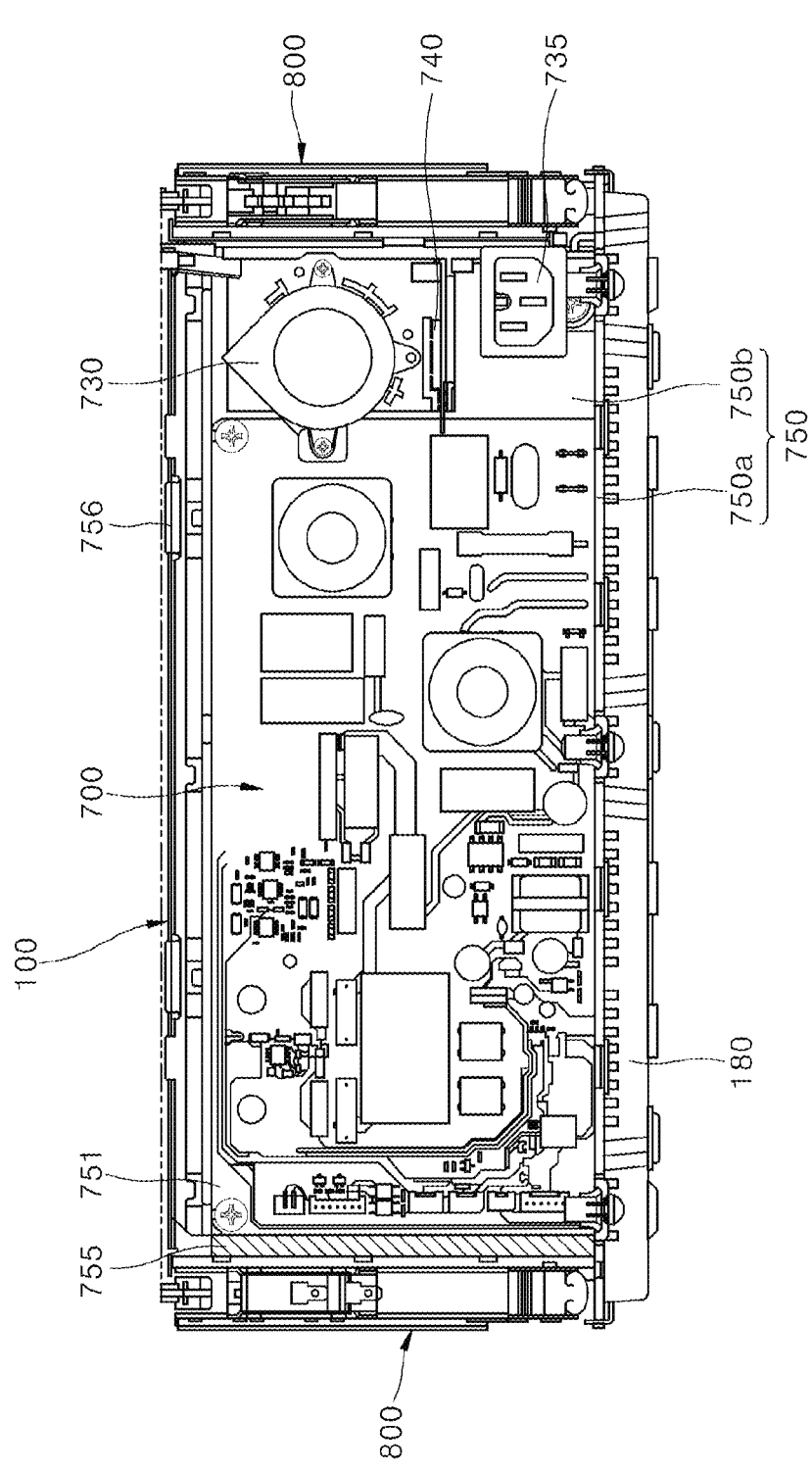

[FIG. 52]
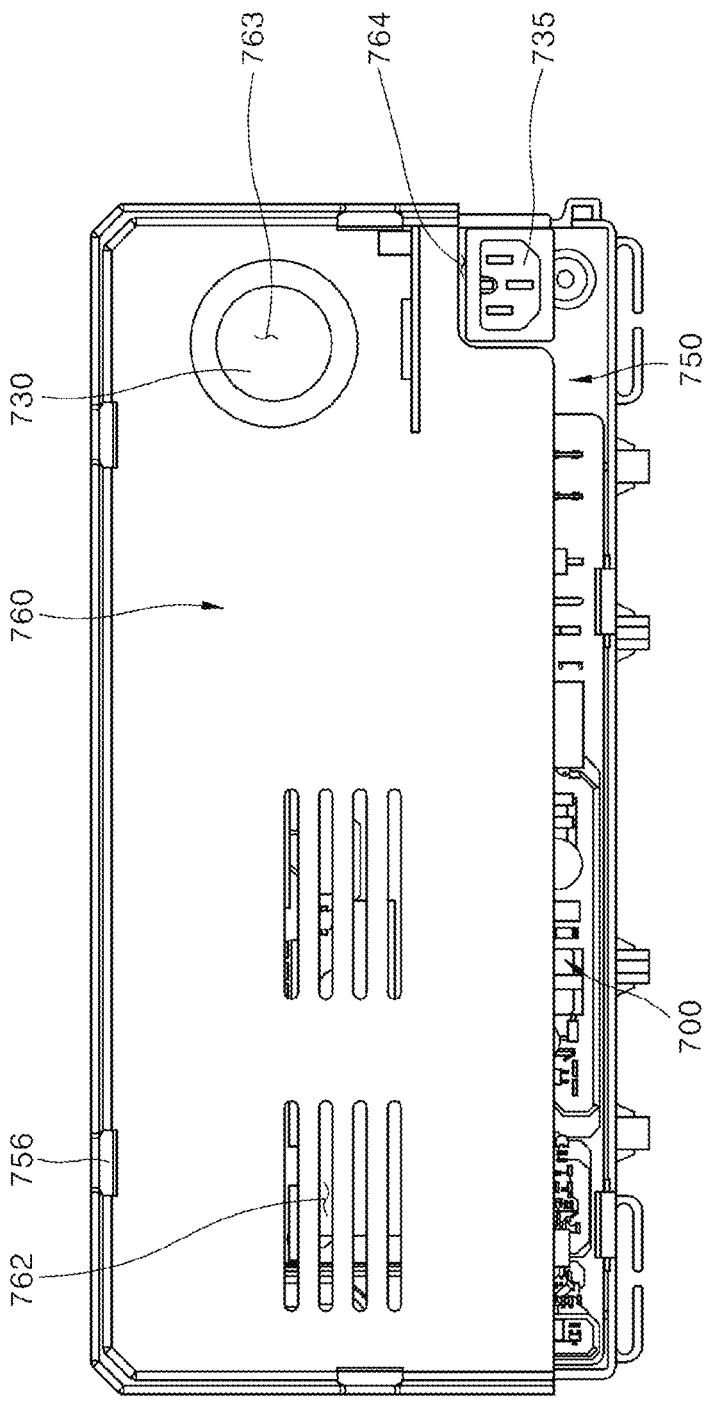

[FIG. 53]
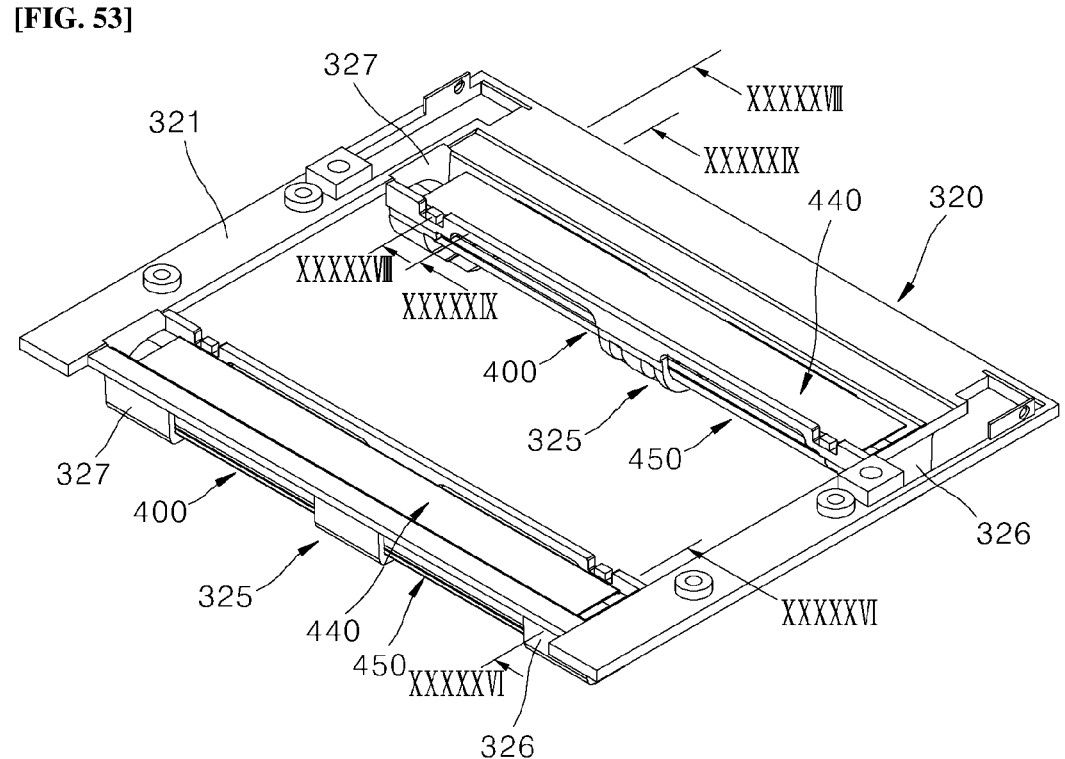

[FIG. 54]
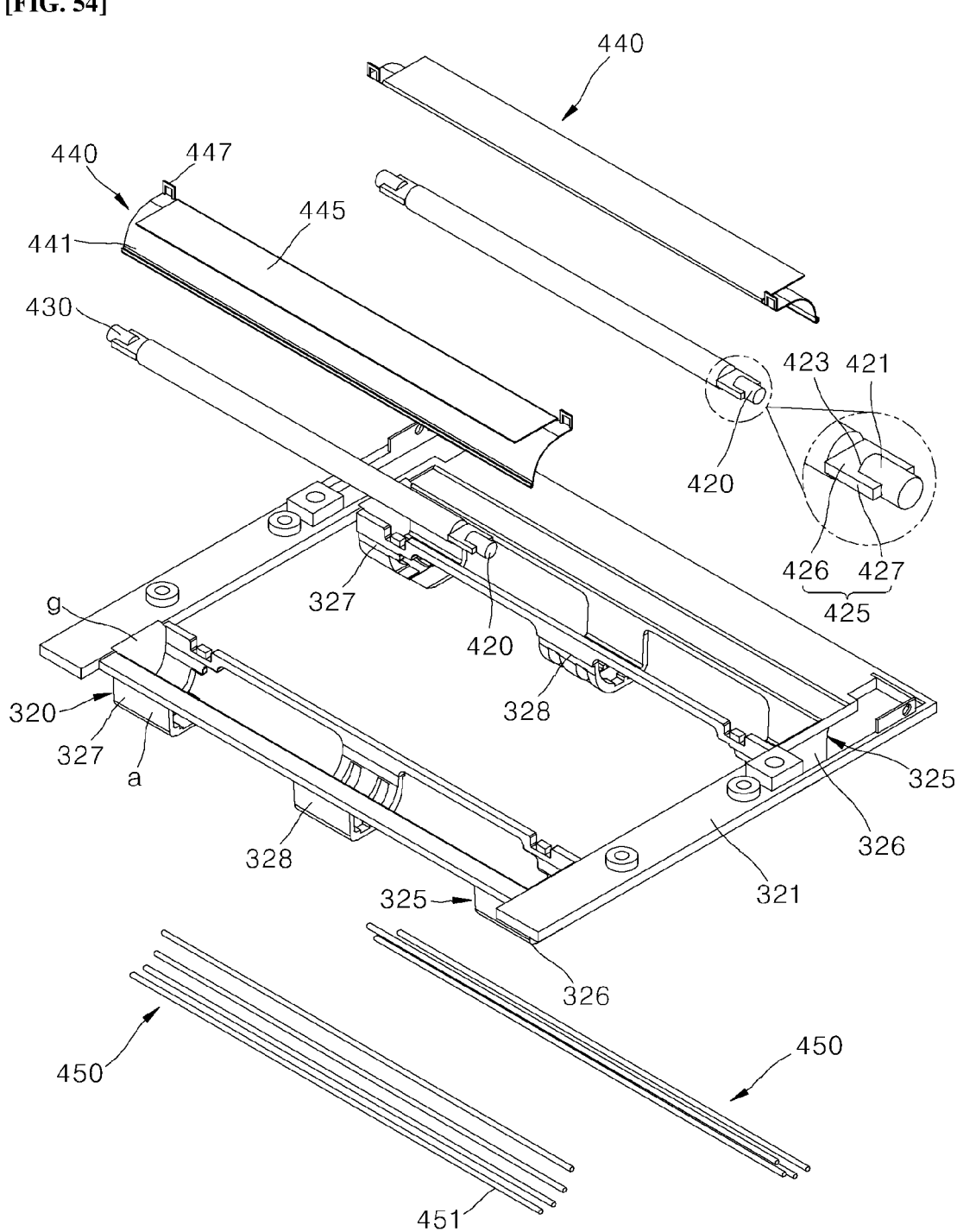

[FIG. 55]
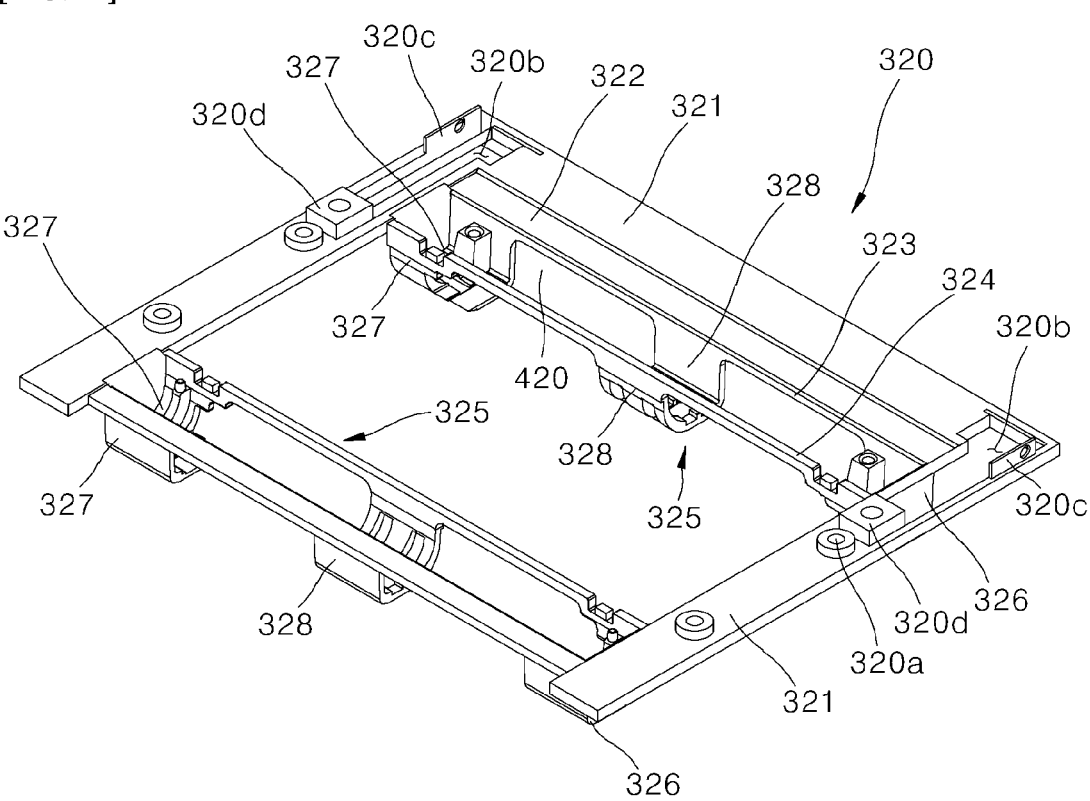

[FIG. 56]
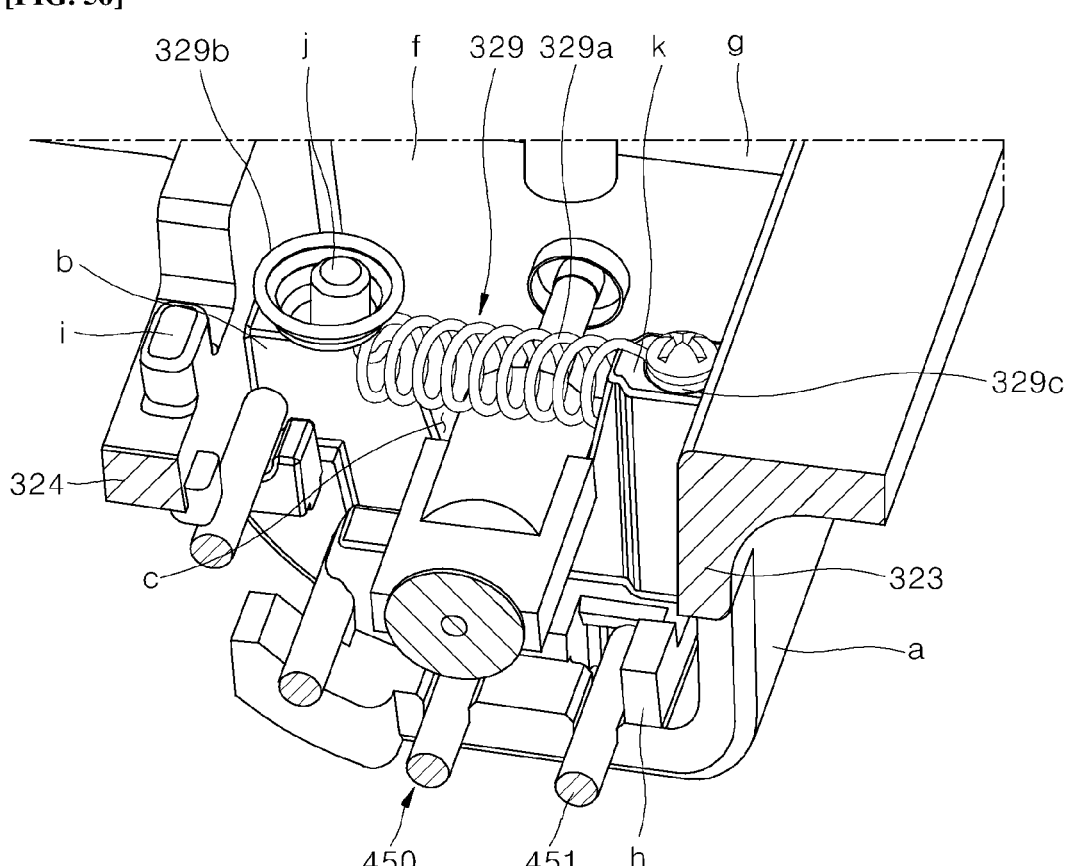

[FIG. 57]
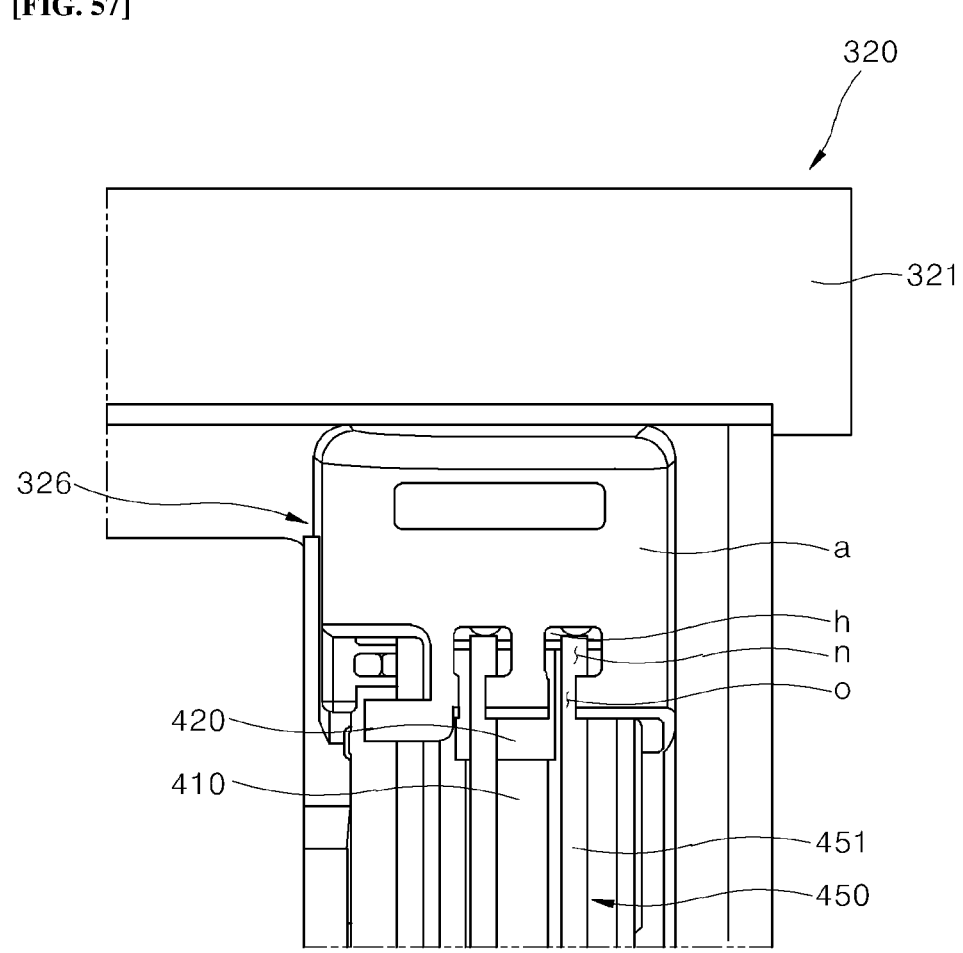

[FIG. 58]
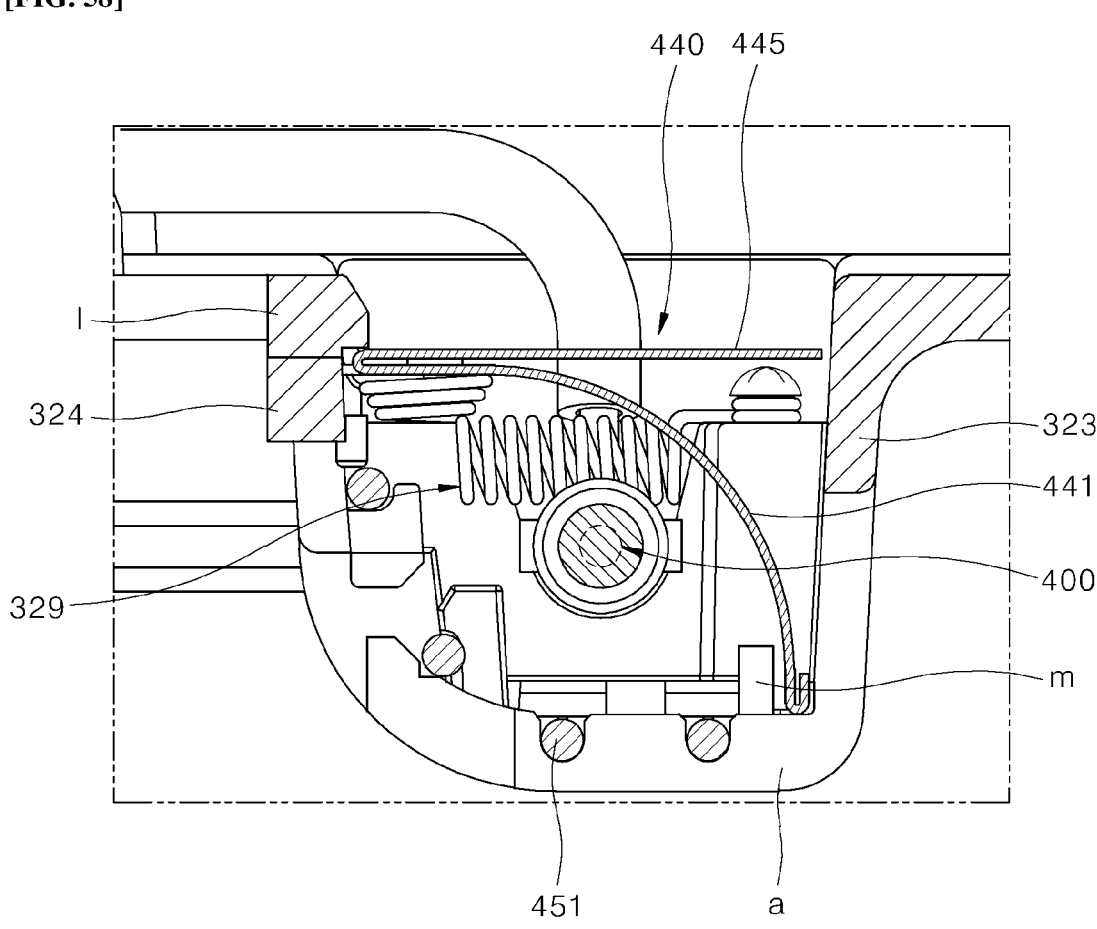

[FIG. 59]
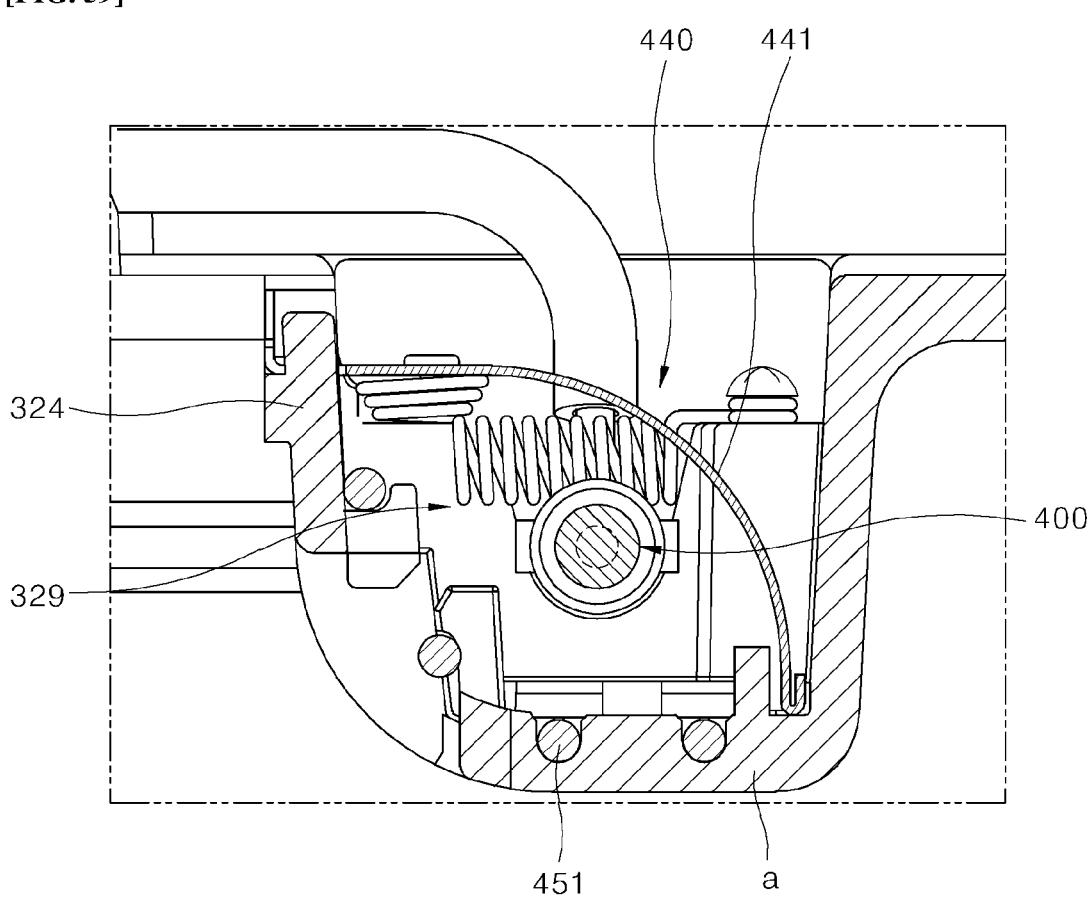

[FIG. 60]
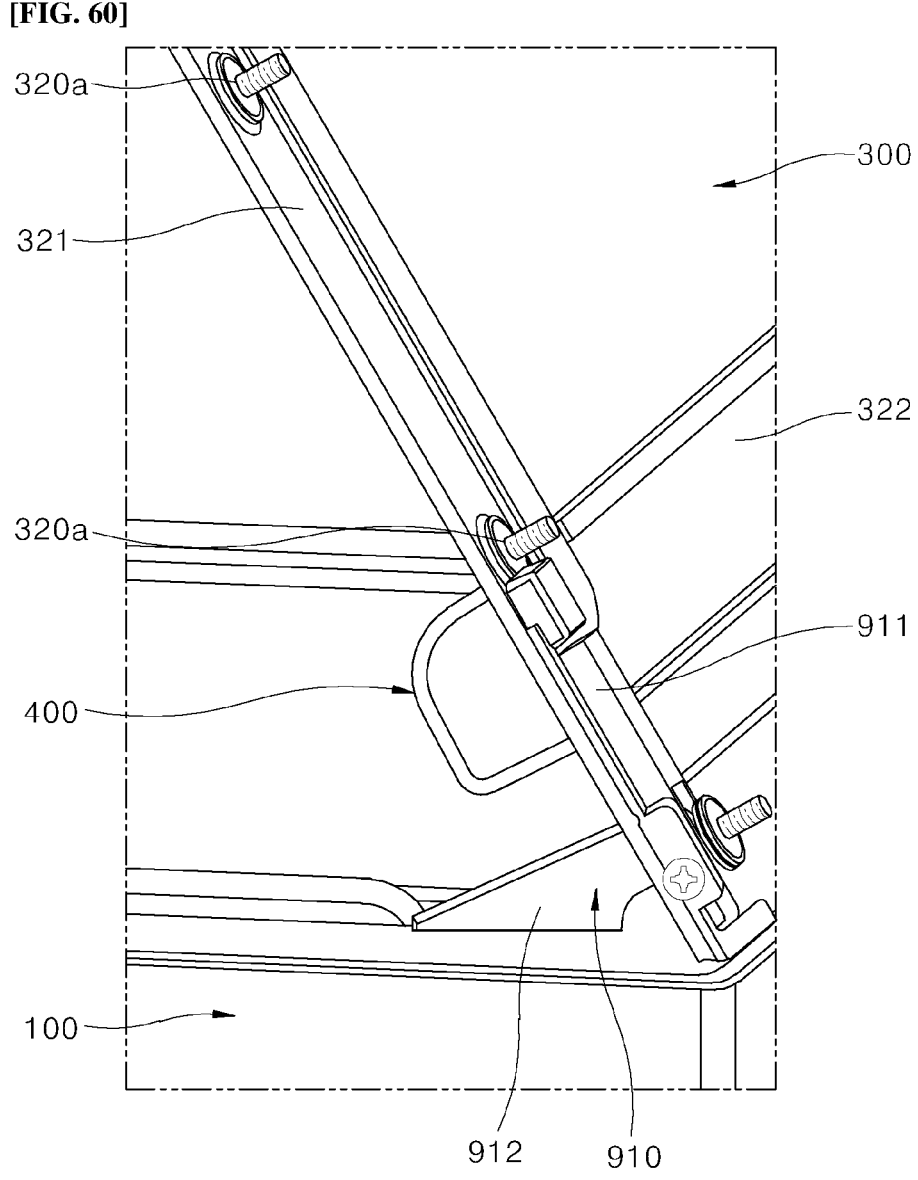

[FIG. 61]
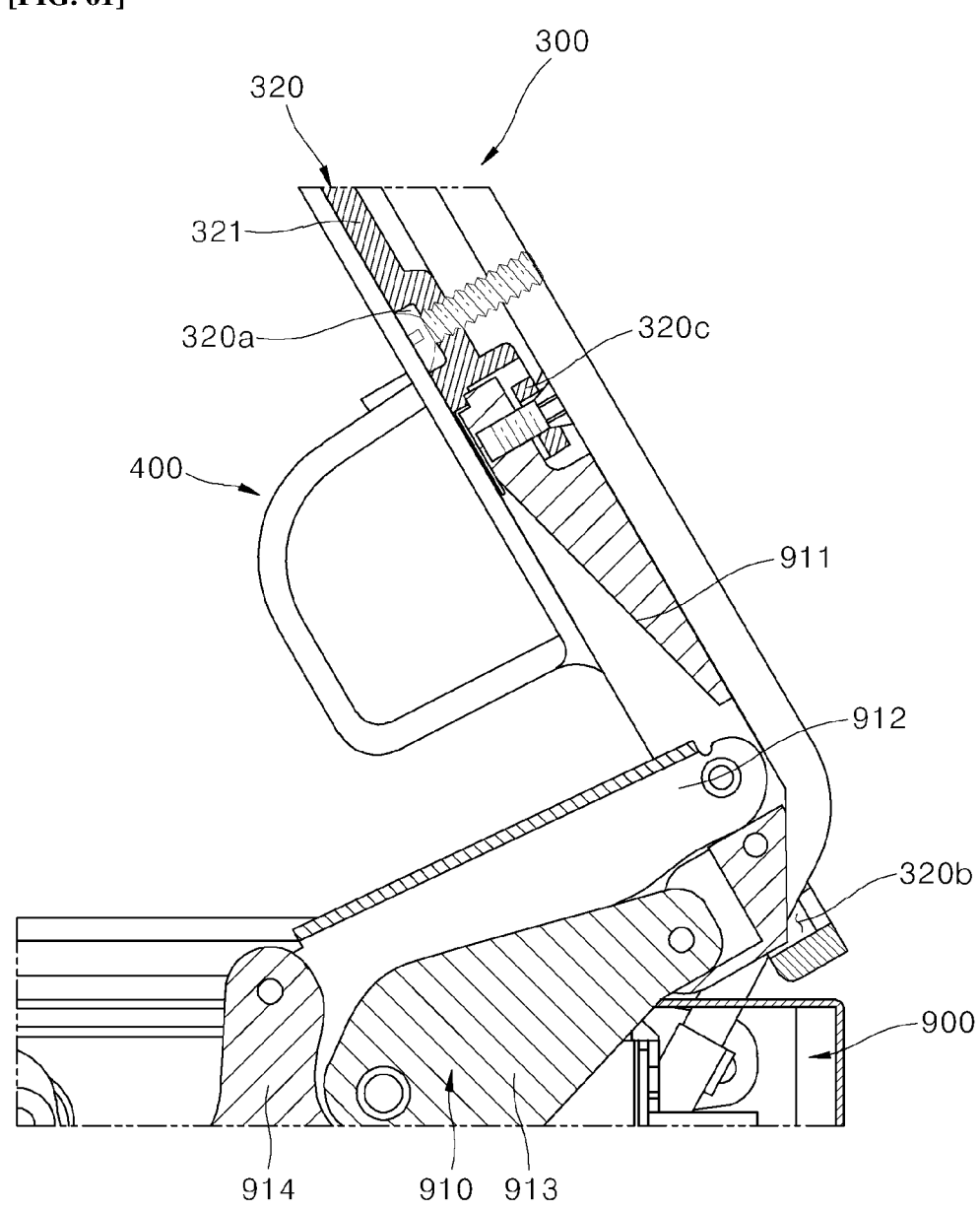

[FIG. 62]
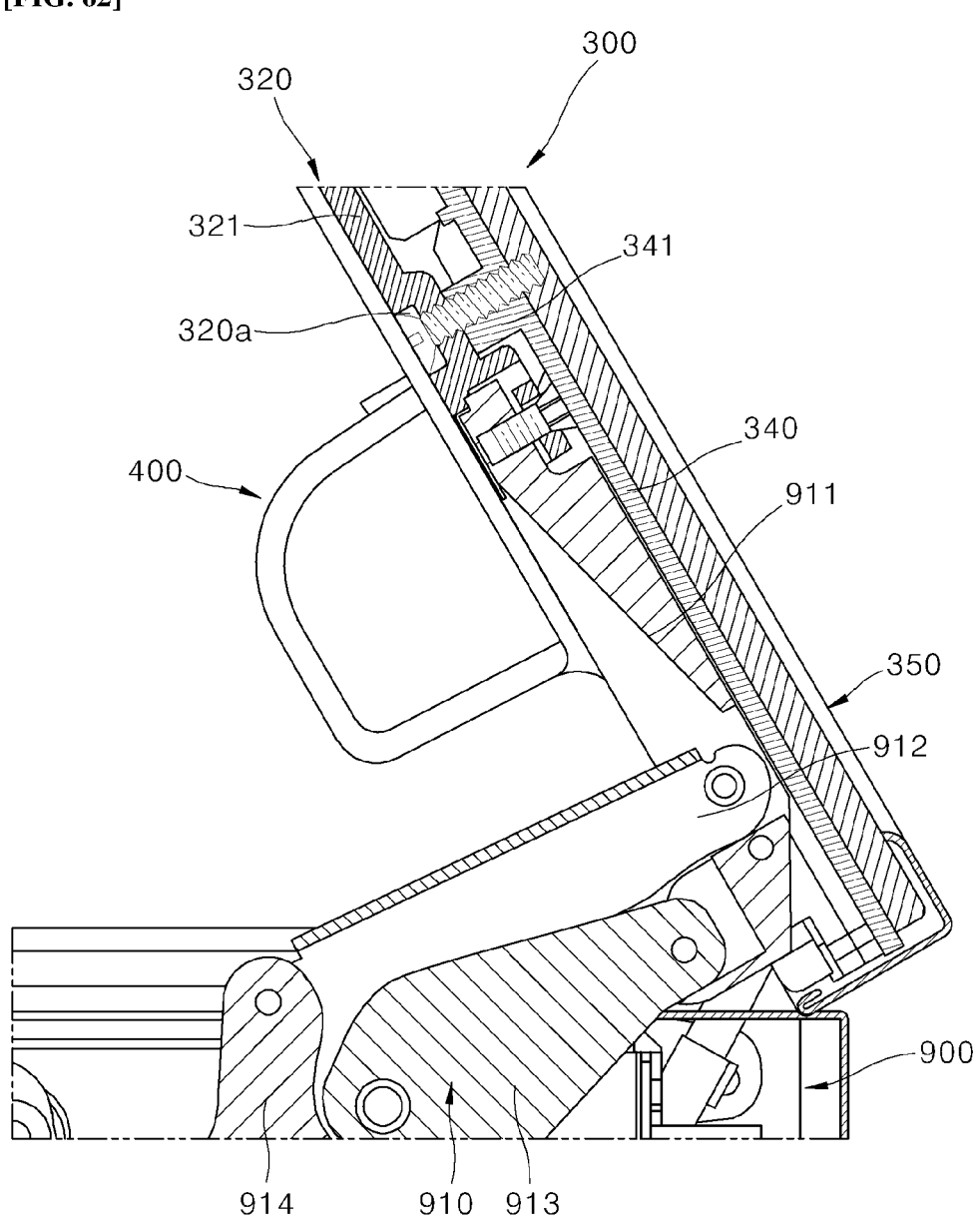

[FIG. 63]
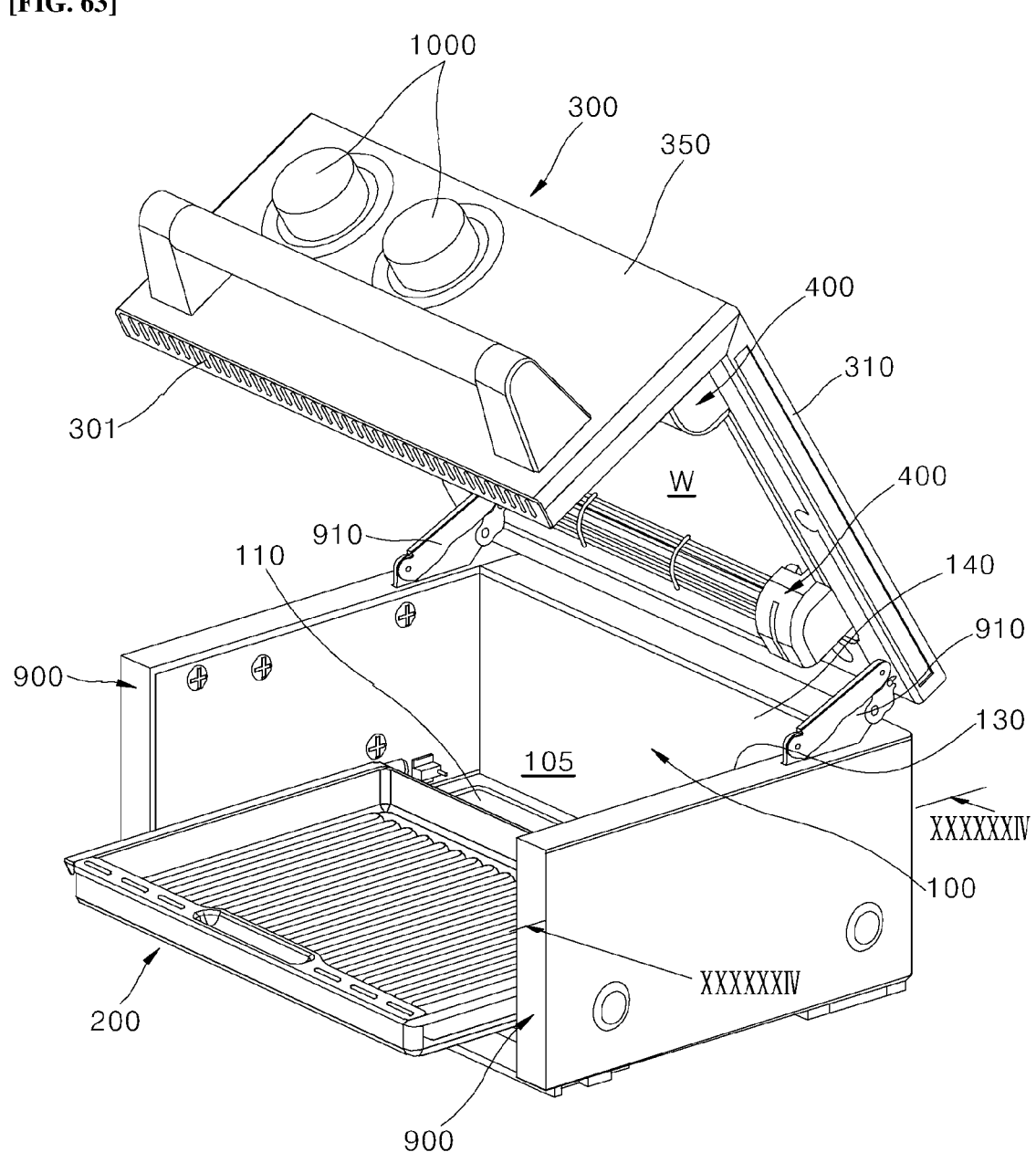

[FIG. 64]
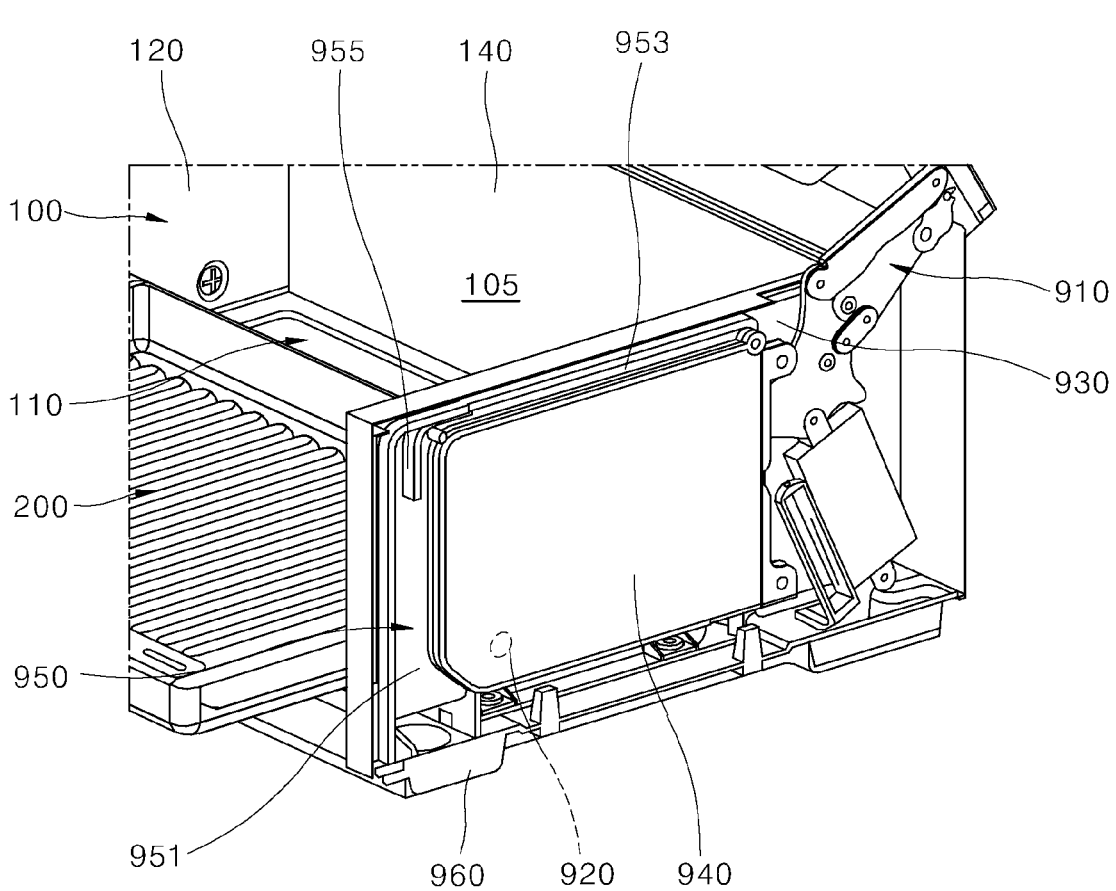

[FIG. 65]
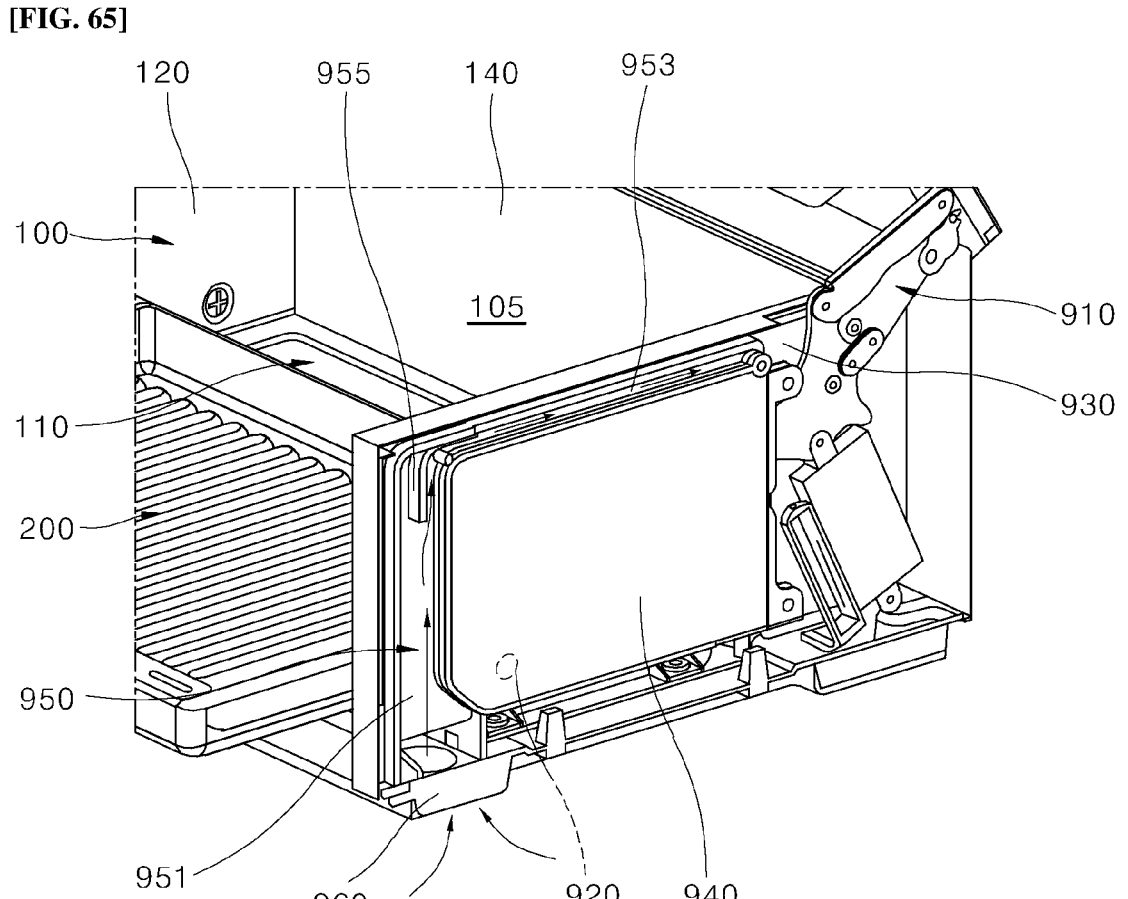

COOKING APPLIANCE

This application is the National Stage filing under 35 U.S.C. 371 of International Application No. PCT/KR2020/000543, filed on Jan. 10, 2020, which claims the benefit of and priority to Korean Patent Application No. 10-2019-0004169, filed on Jan. 11, 2019, Korean Patent Application No. 10-2019-0038037, filed on Apr. 1, 2019, Korean Patent Application No. 10-2019-0040379, filed on Apr. 5, 2019 and Korean Patent Application No. 10-2019-0176632, filed on Dec. 27, 2019, the contents of which are all hereby incorporated by reference herein in their entirety.

TECHNICAL FIELD

Disclosed herein is a cooking appliance.

BACKGROUND

Cooking appliances are installed in the kitchen and cook food as a user intends. The cooking appliances can fall into different categories, based on a heat source or a type, and the sort of fuel.

Additionally, the cooking appliances can be categorized into an open cooking appliance in which food is placed in an open space, and a sealed cooking appliance in which food is placed in a closed space, based on a way of cooking food. The sealed cooking appliance includes an oven, a microwave oven and the like, and the open cooking appliance includes a cooktop, a hob, and the like.

In the sealed cooking appliance, a space, in which food is placed, is shielded, and the shielded space is heated to cook food. The sealed cooking appliance is provided with a cooking space in which food is placed and which is shielded when the food is cooked. In the cooking space, food is actually cooked.

The sealed cooking appliances are broadly classified into gas ovens and electric ovens according to the type of heat source. The gas ovens use gas as a fuel and cook food using flames generated as gas is supplied to a plurality of burners, and the burners are ignited, which burns the supplied gas. Unlike the gas ovens, the electric ovens use electricity as a heat source and cook food using heat emitted from a plurality of heaters, which are heated by the electricity.

Of the gas ovens and the electric ovens, the use of the electric ovens has increased due to a faster cooking speed, higher thermal efficiency, and better stability when compared with the gas ovens. Also, reducing the size of the electric ovens is easier than reducing the size of the gas ovens. Accordingly, the electric ovens in the form of mini ovens having a small size (hereinafter referred to as "mini ovens") have also been released.

The mini ovens have a small size, and thus are not suitable for cooking food of a large size but are suitable for baking or warming a small amount of food which does not require the use of large-capacity ovens.

Particularly, the mini ovens have advantages of being conveniently usable in toasting bread. In addition, the mini oven are usable in cooking a small amount of food or food having a small size. Accordingly, the use of the mini ovens as cooking appliances for replacing conventional toasters has increased.

In general, the mini oven includes an outer case for housing all its components, a plurality of shelves for placing food during cooking, and a cooking space having an open front surface through which food may be placed in the cooking space and cooked.

Also, the mini oven includes an oven heater for heating food to an appropriate temperature, and a door for opening and closing the cooking space.

The door is provided so that, while food is placed in the cooking space and cooked, the inside of the cooking space is closed from the outside environment and sealed. The door may include a handle for easily opening and closing the door and a glass window for viewing the inside of the cooking space without opening the door.

In the mini oven, the door is mostly provided as a downward opening type. That is, the door of the mini oven may have a lower end portion rotatably coupled to the outer case through a door hinge. The door opens the cooking space by rotating downward about the lower end portion rotatably coupled to the outer case and closes the cooking space by rotating upward when the cooking space is open.

The door may open the cooking space by rotating at an angle of about 90° when the cooking space is closed, and the shelves may be withdrawn or inserted while the cooking space is opened by the door.

That is, the door is opened in a state of being substantially parallel to the shelves inserted into the mini oven, and the withdrawal and insertion of the shelves are directly performed by the user.

However, the mini oven having the above configuration has the following disadvantages.

First, there is a problem in that, when the door is opened, the door inevitably protrudes from the front of the mini oven by as much as a height of the door. Thus, the opening of the door and the withdrawal and insertion of the shelves are difficult when the mini oven is installed in a narrow space.

Second, there is a problem in that, when the door is opened, the door protrudes from the front of the mini oven by as much as the height of the door, and the center of gravity of the mini oven is biased toward the front.

Due to the characteristics of the mini oven being lightweight as well as having a small size, the center of gravity of the mini oven is inevitably biased toward the front when the door opens forward from the mini oven. In this case, there is an increased risk that the mini oven may fall over.

Particularly, when the shelves are withdrawn, the shelves are often placed on the door for checking a cooking state or temporarily placing the shelves. In such a structure in which the center of gravity of the mini oven is biased toward the front, the risk of the mini oven's falling over is inevitably increased.

Furthermore, the risk is greater when the weight of the shelves or foods placed on the shelves are heavy. This not only adds risks to the cooking of heavyweight foods but also causes an increase in the weight of the shelves. That is, even when it is necessary to adopt shelves formed of a thick, heavy material to improve the cooking performance, adopting such shelves becomes difficult due to the risk of the mini oven's falling over.

Third, various limitations occur because a passage for the withdrawal and insertion of the shelves and a passage for checking the cooking state are limited to the front side of the mini oven.

That is, since the directions of the withdrawal and insertion of the shelves are limited to a front-rear direction, inconvenience occurs during the withdrawal and insertion of the shelves when the mini oven is installed at a low place. Since the passage for checking the cooking state is limited to the glass window provided in the door, there is considerable inconvenience in checking the cooking state when the mini oven is installed at a low place.

Generally, for properly checking the cooking state of the entire food, opening the door is not enough, and the withdrawal of the tray should necessarily be performed.

That is, when the user wants to properly check the cooking state of the entire food, the user should open the door and then withdraw the shelf containing the entire food. However, when the mini oven is installed at a low place, it is very inconvenient to perform such tasks. Also the possibility that the user will be exposed to the risk of injuries such as burns when the user withdraws and inserts the shelf is also increased.

Fourth, the user directly pushes a shelf into a cooking space and pulls the shelf out of the cooking space to insert and withdraw the shelf, increasing inconvenience and the risk of an accident.

There are times when the user directly checks a state of a food item being cooked by withdrawing the shelf during a cooking procedure. In this case, the user opens the door and then holds and withdraws the shelf. Additionally, when the cooking procedure starts again, the user directly holds and pushes the shelf into the cooking space.

That is, the user opens the door, and withdraws and inserts the shelf directly to check a state of a food item being cooked, causing inconvenience and increasing the risk of injury such as burns and the like.

In the procedure, the center of gravity of a mini oven shifts to a front, and the mini oven is highly likely to fall over, posing a threat to the safety of the user.

A heating and cooking appliance is disclosed in JP Patent No. 6289602 as a related art. The heating and cooking appliance includes a cooking plate that comes in and out of a cooking space in association with the opening and closing of the door.

In the configuration according to document 1, a cooking space is provided with a pair of sliding rails (herein after "first sliding rail"), and a door is provided with a pair of sliding rails (hereinafter "second sliding rail") that are detachably coupled to the sliding rails installed in the cooking space.

The second sliding rail is coupled to the first sliding rail in a slidable manner, and accordingly, the door opens and closes the cooking space while sliding in a front-rear direction.

The pair of second sliding rails is provided with a supporting member, and a cooking plate is hung from above at an upper end of the supporting member and supported by the supporting member. That is, the cooking plate is supported by the second sliding rails, using the supporting member and the second sliding rails are supported by the first sliding rails.

With the structure, the cooking plate moves in the front-rear direction along the door moving in the front-rear direction. That is, the cooking plate comes in and out of the coking space while moving in the front-rear direction in association with the door's front-rear movement to open and close the cooking space.

In the heating and cooking appliance according to document 1 configured as described above, since the cooking plate comes in and out in association with the door's opening and closing operation, the cooking plate is inserted into and withdrawn from the cooking space more easily.

The heating and cooking appliance according to document 1 has problems the same as the first and second problems with the mini oven described above.

That is, in the heating and cooking appliance according to document 1, the door protrudes to a front of the heating and cooking appliance by a height of the door at a time when the door is opened, and since the door protrudes to the front of the heating and cooking appliance by a height of the door at a time when the door is opened, the center of gravity of the heating and cooking appliance shifts to the front.

In the heating and cooking appliance disclosed in document 1, the cooking plate's insertion and withdrawal is simply associated with the door's opening and closing operations. Accordingly, the door needs to be opened by the user directly causing inconvenience to the user such that the user checks a state of a food item being cooked.

A door opening and closing device of a toaster is disclosed in document 2 (Korean Utility Model No. 20-2011-0001565). The door opening and closing device of a toaster has a structure in which a front and a partial upper portion of an inner space of the toaster are open together.

In the configuration according to document 2, a door is disposed at a front of the toaster, and the door swivels toward a front side of the toaster to open the inner space of the toaster. In this case, the door covers the partial upper portion as well as the front of the toaster. Accordingly, at a time when the door is opened, the front and the partial upper portion of the inner space of the toaster are opened together.

In the configuration according to document 2, a toaster holder is installed in the door, and at a time when the door is opened, the toaster holder swivels forward along with the door and is withdrawn out of the toaster.

In the door opening and closing device of a toaster according to document 2 configured as described above, the toaster holder's insertion and withdrawal is associated with the door's opening and closing operations, thereby enabling the toaster to be inserted into and withdrawn from the toaster more readily.

In the door opening and closing device of a toaster according to document 2, the partial upper portion of the inner space of the toaster is opened at a time when the door is opened. Accordingly, interference between the toaster accommodated in the toaster holder and a frame of the toaster can be avoided at a time when the door is opened.

The door opening and closing device of a toaster, configured as described above, has problems the same as the first and second problems with the mini oven described above.

That is, in the door opening and closing device of a toaster, the door protrudes to a front of the door opening and closing device of a toaster by a height of the door at a time when the door is opened, and since the door protrudes to the front of the door opening and closing device of a toaster by a height of the door at a time when the door is opened, the center of gravity of the door opening and closing device of a toaster shifts to the front. Additionally, a passage for inserting and withdrawing a shelf and a passage for checking a state of a food item being cooked are limited to the front of the door opening and closing device of a toaster. In the heating and cooking appliance according to document 1, a passage for inserting and withdrawing a shelf and a passage for checking a state of a food item being cooked are limited to the front of the heating and cooking appliance.

In the device disclosed in document 2, the toaster holder's insertion and withdrawal is simply associated with the door's opening and closing operations. Accordingly, the door needs to be opened by the user directly causing inconvenience to the user such that the user checks a state of a food item being cooked.

Further, in the device disclosed in document 2, since the toaster holder is installed in the door, the center of gravity of the toaster shifts eccentrically to the front at a time when the door is opened.

That is, in the configuration disclosed in document 2, at a time when the door is opened, the door is unfolded to the front of the toaster, and weight of the toaster holder, and weight of the toaster accommodated in the toaster holder are added to weight of the door unfolded toward the front. Thus, the center of gravity of the toaster shifts eccentrically to the front, and the toaster is highly likely to fall over at a time when the door is opened.

An oven provided with a front door and a top cover is disclosed in document 3 (U.S. Pat. No. 6,271,502).

In the configuration disclosed in document 3, the front door is disposed at a front of the oven. The top cover is installed in an upper portion of the oven. The front door and the top cover are disposed at different positions, and independently operate. A front of an inner space of the oven is opened and closed by the front door, and an upper portion of the inner space of the oven is opened and closed by the top cover.

The oven according to document 3 has problems the same as the first and second problems with the mini oven described above.

That is, in the oven according to document 3, the door protrudes to a front of the oven by a height of the door at a time when the door is opened, and since the door protrudes to the front of the oven by a height of the door at a time when the door is opened, the center of gravity of the oven shifts eccentrically to the front.

In the configuration disclosed in document 3, the inner space opened and closed by the front door, and the inner space opened and closed by the top cover separate from each other and do not connect to each other.

Although the front door and the top cover are opened together, a degree to which the inner space is opened by the front door does not increase, and a degree to which the inner space is opened by the top cover increases.

An oven door structure is disclosed in document 4 (U.S. Pat. No. 6,029,649). The oven door structure is installed in a cylindrical oven, and opens and closes the oven.

According to document 4, a door is disposed at a cylindrical body, and opens and closes the cylindrical body while rotating around the body. At a time when the door is opened, the door does not protrude to any of the front or the rear of the body. The door opens and closes the body only by rotating around the body.

The oven door structure according to document 4, configured as described above, has the following problems.

First, the door disclosed in document 4 is applied only to a cylinder-shaped main body of a cooking appliance. Accordingly, the door cannot be applied to a cuboid-shaped main body of an ordinary cooking appliance. Thus, the door has low compatibility.

Second, a structure for mounting a food item, such as a shelf, is hardly installed in the body disclosed in document 4. Additionally, although a structure such as a shelf is installed in the body, it is difficult for the shelf to be withdrawn from and inserted into the body due to the structure of the body.

Further, since the door is opened and closed while rotating around the body, it is difficult to associate the shelf's withdrawal and insertion with the door's opening and closing operations.

In the structure of the door disclosed in document 4, a manipulation switch cannot be disposed on a front surface or an upper surface of a cooking appliance since most of the front surface and the upper surface of a body are covered by the door or are within a range of rotation of the door. Thus, in document 4, a manipulation switch such as a timer is disposed on a lateral surface of the body.

When the manipulation switch is disposed on the lateral surface of the cooking appliance rather than the front surface or the upper surface of the cooking appliance, user inconvenience can be caused when the user checks a state of the manipulation switch or manipulates the manipulation switch. Accordingly, arranging the manipulation switch as disclosed in document 4 is not a good of improving user convenience.

Furthermore, none of documents 1 to 4 suggests an arrangement of a manipulation switch on a door. Documents 1 to 4 present an arrangement of a manipulation switch at a main body.

In documents 1 and 3, a manipulation switch is disposed outside a door in a left-right direction while being disposed at a main body of a cooking appliance. In this configuration, a width of the main body in a left-right direction needs to be elongated as much as a space required for installing the manipulation switch. Accordingly, while the cooking appliance is entirely scaled up, a width opened by the door is narrowed.

In document 2, a manipulation switch is disposed in a lower portion of a main body of a cooking appliance. In this configuration, the manipulation switch is disposed at a low position, making it difficult for the user to manipulate the manipulation switch. In the configuration disclosed in document 2, a length of the main body in the up-down direction needs to be elongated as much as a space required for installing the manipulation switch. Accordingly, while the cooking appliance is entirely scaled up, a width opened by the door is narrowed.

In document 4, when a manipulation switch is disposed on a lateral surface of a cooking appliance, it is difficult for the user to check a state of the manipulation switch or manipulate the manipulation switch.

In the configurations disclosed in documents 1 to 4, the manipulation switch cannot be disposed on the door. In the configurations disclosed in documents 1 to 4, a see-through window is provided on the door such that the user looks into a cooking space. The see-through window takes up most of the area of the door. Thus, there is not enough space for installing a manipulation switch on the door.

When the manipulation switch is disposed on the door, a control board electrically connected to the manipulation switch needs to be installed in the door. However, there is not enough space for installing the control board in the door.

Thus, there is a growing need for a configuration as a solution to the above problems to dispose a manipulation switch on a door.

PRIOR ART DOCUMENT

Patent Document

Document 1: JP Patent No. 6289602
Document 2: KR Patent No 20-2011-0001565
Document 3: U.S. Pat. No. 6,271,502
Document 4: U.S. Pat. No. 6,029,649

DESCRIPTION OF INVENTION

Technical Problem

The present disclosure is directed to a cooking appliance that may be scaled down and have an improved structure in which a passage opened by a door has an increased width.

The present disclosure is also directed to a cooking appliance that may have an improved structure in which a manipulation switch is disposed on a door.

The present disclosure is also directed to a cooking appliance that may help to easily check a state of a food item being cooked and ensure improvement in structural reliability.

The present disclosure is also directed to a cooking appliance that may ensure ease of opening a door and inserting and withdrawing a shelf.

The present disclosure is also directed to a cooking appliance that may have an improved structure in which various types of components for the door are stably disposed at the door.

The present disclosure is also directed to a cooking appliance that may have an improved structure in which various types of components for the door are disposed at the door easily and rapidly.

The present disclosure is also directed to a cooking appliance that may have an improved structure in which the cooking appliance is effectively manipulated for use of various functions and provided with aesthetic qualities.

The present disclosure is also directed to a cooking appliance that may have an improved structure in which unnecessary manipulations and errors in manipulation of the cooking appliance are prevented and the cooking appliance is manipulated conveniently and readily.

The present disclosure is also directed to a cooking appliance that may have an improved structure in which both the press manipulation and the rotation manipulation are performed and a position of a pressed surface for the press manipulation is maintained at a predetermined angle regardless of rotation for manipulation.

The present disclosure is also directed to a cooking appliance that may have an improved structure in which a force of pressing the pressed surface is effectively delivered to a rotation shaft connected to a knob while the position of the pressed surface for the press manipulation is maintained at a predetermined angle regardless of rotation for manipulation.

The present disclosure is also directed to a cooking appliance that may have an improved structure in which a force of rotating the knob is effectively delivered to the rotation shaft connected to the knob while the position of the pressed surface for the press manipulation is maintained at a predetermined angle regardless of rotation for manipulation.

Technical Solution

To achieve the above aims, a cooking appliance according to one aspect may enable a front and an upper portion of a housing to be opened together at a time when a door is opened.

A cooking appliance according to another aspect may enable a front and an upper portion of a housing are opened together when a door is opened and enables a tray to be withdrawn forward in association with the opening of the door.

A cooking appliance according to another aspect may include a hinge assembly that moves a tray in association with opening and closing of a door.

A cooking appliance according to another aspect may include a hinge assembly that moves a tray in association with opening and closing of a door, and the hinge assembly is provided therein with a cooling channel for cooling a front surface and an upper surface of the cooking appliance.

The cooling channel may be disposed at a position eccentric to a front and an upper portion of the hinge assembly.

The cooling channel may be provided with a cooling fan in a lower portion thereof.

Accordingly, portions, which are easily affected by heat causing an increase in temperature and are highly likely to be contacted by a user, may be cooled, and the risk of an accident, and damage to components in the door, caused due to overheating of the door, may be prevented.

A control board may be disposed at a rear of the housing, and a rear surface cover may be disposed at a rear of the control board.

The rear surface cover may be made of an insulating material, and may be disposed between a cabinet made of a metallic material and a control board.

According to another aspect, a space portion may be respectively formed in the door front surface part and a door upper surface part, and the door front surface part may have an air intake port, and the door upper surface part may have an air exhaust port.

Thus, external air may be introduced into the door through the air intake port, and the introduced air may cool a first control board and a space portion in a see-through window and then be discharged through the air exhaust port.

According to another aspect, the door upper surface part may be provided therein with a cable mounting part, and a cable for connecting between the first control board and a first heating part may be installed in the door upper surface part.

With the configuration, the user may look into a cooking space from above through the see-through window formed in an upper portion of the cooking appliance. Thus, the user may check a state of a food item being cooked conveniently and readily without leaning forward and bending the user's knees.

According to another aspect, a supporting panel may be coupled at least one of a door main body part and a door rear surface cover and fixed to an inside of the door main body part, and the control board may be fixed to the supporting panel.

According to another aspect, a handle, the supporting panel and the door may be coupled to a single bracket together.

According to another aspect, the rear surface cover, the control board, the supporting panel and the door may be coupled to a single bracket together.

Accordingly, components included in the door may be stably fixed to the inside of the door, and a man hour for assembling the door may be reduced, and the door may be assemble more easily and rapidly.

According to another aspect, the door for opening and closing the cooking space may be provided with a temperature sensor, and the temperature sensor may protrude out of the door toward the cooking space.

According to another aspect, the door for opening and closing the cooking space may be provided with a temperature sensor, and the temperature sensor may be disposed at a position eccentric to an upper portion of the cooking space while protruding out of the door toward the cooking space.

The temperature sensor may be disposed closer to a heating part than to the tray while being disposed between the tray and the heating part.

The temperature sensor may be disposed at a position adjacent to an edge on an upper side of the door front surface part.

The temperature sensor may be disposed at a position where the heating part is hidden by a shielding plate.

According to another aspect, the see-through window may be disposed in the door upper surface part.

Accordingly, even though the cooking appliance is disposed at a low position, the user may check a state of a food item being cooked conveniently and readily without leaning forward and bending the user's knees.

According to another aspect, the first heating part may be disposed in the door upper surface part.

The first heating part disposed over the tray may be installed in the door upper surface part covering the upper portion of the housing, and accordingly, the first heating part may be spaced apart from a manipulation device and a first control board, and the center of gravity of the door may be eccentric to a rear side.

According to another aspect, the first heating part and the see-through window may be disposed in the door upper surface part, and the manipulation device may be disposed in the door front surface part where the first heating part and the see-through window are not installed.

According to another aspect, components such as glass, a heater and the like that are relatively heavy may be disposed in the door upper surface part such that the center of gravity of the cooking appliance may shift from a center to a rear in a front-rear direction when the door opens the front surface and the upper surface of the housing.

The cooking appliance, configured as described above, may reduce the possibility of the fall of the cooking appliance when the door is opened and a shelf is withdrawn, since the center of gravity of the cooking appliance shifts from the center to the rear in the front-rear direction when the door opens the cooking space.

A cooking appliance according to an aspect may include: a housing provided therein with a cooking space surrounded by bottom, rear and both lateral surfaces of the housing, and having upper and front surfaces open; a door including a door upper surface part covering the upper surface of the housing and a door front surface part connected to a front side of the door upper surface part and covering the front surface of the housing, and swiveling with respect to a rear side of the door upper surface part to open and close the upper surface and the front surface of the housing; and a tray disposed in the cooking space.

The cooking appliance may further include a first heating part disposed at the door.

The cooking appliance may further include a door frame supporting the first heating part and coupled to the door.

The door frame may cover a lower portion of the door upper surface part and may be coupled with the door. The first heating part may be installed in the door frame and may be disposed in the lower portion of the door upper surface part.

Further, the door frame may include: a heater mounting part to which the first heating part is coupled; and a coupling part that is coupled with the door upper surface part and supports the heater mounting part in the door upper surface part.

Further, the first heating part may include an electric heater provided with a heating element and a a connecting end disposed respectively at an end of one side of the heating element in a length-wise direction thereof and at an end of the other side of the heating element in the length-wise direction thereof, and the heater mounting part may include a first connecting end fixing part for fixing a connecting end disposed at the end of one side of the heating element in the length-wise direction thereof, and a second connecting end fixing part for fixing a connecting end disposed at the end of the other side of the heating element in the length-wise direction thereof.

Further, at least one of the first connecting end fixing part and the second connecting end fixing part may include: a cover that surrounds surrounding portions of the connecting end from an outer side of the connecting end in a circumferential direction. At least one of the first connecting end fixing part and the second connecting end fixing part may further include a support wall which partitions a space surrounded by the cover into inner and outer spaces of the first heating part in a length-wise direction and into which the connecting end is fitted.

The door frame may further include a protective grill that encircles the first heating part from the outside.

Further, the protective grill may include a plurality of steel wires that extend in the length-wise direction of the first heating part, and the plurality of steel wires may be arranged to surround a surrounding portion of the first heating part from an outside of the first heating part in a circumferential direction.

Further, at least one of the first connecting end fixing part and the second connecting end fixing part may further include a grill fixing part that fixes the steel wires to the heater mounting part. The grill fixing part may include a plurality of fixing ribs that are formed to protrude from the cover toward the first heating part. The plurality of steel wires may be fitted into fixing grooves formed between the plurality of fixing ribs.

The cooking appliance according to the present disclosure may further include a grill supporting part disposed between the first connecting end fixing part and the second connecting end fixing part, and supporting the steel wire between the first connecting end fixing part and the second connecting end fixing part.

The cooking appliance according to the disclosure may further include a first transverse supporter disposed father from a center of the cooking space in the front-rear direction thereof than the first heating part, and connecting between the first connecting end fixing part and the second connecting end fixing part; and a second transverse supporter disposed to face the first transverse supporter with the cover between the first transverse supporter and the second transverse supporter, and connecting the first connecting end fixing part and the second connecting end fixing part, and one side of the grill supporting part may connect to the first transverse supporter while the other side of the grill supporting part may connect to the second transverse supporter.

The fixing rib may be disposed in a space encircled by the cover and the support wall, and the cover may be provided with a grill passing hole that forms a passage for allowing the steel wire to be inserted from an outside of the cover into the space where the fixing rib is disposed, and may be disposed between the support wall and the grill passing hole.

The grill passing hole may include a wide width part disposed between an end of the cover in a length-wise direction thereof and the fixing rib and formed to penetrate the cover; and a narrow width part disposed between the wide width part and the fixing rib and formed to pass through the cover, and the narrow width part may connect to the wide width part and have a width less than that of the wide width part.

The coupling part may be provided with a through hole inside the coupling part in a flat surface direction thereof, and a glass covering the through hole may be disposed in an upper portion of the heater mounting part.

The cooking appliance according to the disclosure may further include a first transverse supporter disposed father from a center of the cooking space in the front-rear direction thereof than the first heating part, and connecting between the first connecting end fixing part and the second connecting end fixing part; and a reflector blocking the first heating part from the first transverse supporter and blocking the first heating part from the glass, and reflecting heat of the first heating part.

Further, the reflector may include a first reflector disposed between the first heating part and the glass and blocking the first heating part from the glass and blocking the first heating part from the first transverse supporter; and a second reflector disposed between the first reflector and the glass and blocking the first reflector from the glass.

The first reflector may be formed into a surface that is across among the first heating part, the first transverse supporter and the glass at a slant, the second reflector may be formed into a flat surface parallel with the glass, and a space encircled by the first reflector, the second reflector and the first transverse supporter may be formed between the first reflector and the second reflector.

The cooking appliance according to the disclosure may further include a second transverse supporter disposed to face the first transverse supporter with the cover between the first transverse supporter and the second transverse supporter, and connecting the first connecting end fixing part and the second connecting end fixing part, and the second transverse supporter may be provided with a first reflector supporting projection protruding from the second transverse supporter to the first transverse supporter, and the first reflector supporting projection may interfere with the second reflector to regulate an up-down position of the second reflector.

The cover may include a bottom surface below the reflector, a lateral wall at a front or rear of the reflector, and a second reflector supporting projection that protrudes from the bottom surface of the cover in a way that the second reflector supporting projection is spaced a predetermined distance apart from the lateral wall of the cover, and an end of the first reflector may be inserted into a space between the lateral wall of the cover and the second reflector supporting projection such that a front-rear position of the first reflector is regulated.

Additionally, the reflector may be formed in a way that a single metal plate is bent in a " ㄷ" form such that the first reflector and the second reflector connect integrally, and may be made of an elastically deformable material.

The support wall may have a seating groove that is concavely formed on the support wall and has an entrance open toward an upper portion, and the heater mounting part may further include a connecting end supporting member that fixes the connecting end to the support wall while pressing the connecting end seated in the seating groove against the support wall.

The connecting end supporting member may include a coil spring disposed across the entrance of the seating groove and blocking the entrance of the seating groove from the connecting end, and the connecting end may be elastically supported by the connecting end supporting member in the seating groove.

The cooking appliance according to the disclosure may further include a hinge assembly disposed in a lateral portion of the housing, and the hinge assembly may include a hinge case provided therein with an accommodating space, and a cooling channel formed in the hinge case.

An entrance of the cooling channel may be open toward a lower portion of the hinge case, and a cooling fan may be disposed at the entrance of the cooling channel.

The hinge assembly may include a hinge part hinge-coupled to the door and changing a posture in association with swiveling of the door; a mounting projection onto which the tray is mounted and which moves the tray in the front-rear direction while moving in the front-rear direction in association with a change in the posture of the hinge part; and a converting and outputting part converting a force input as a result of a change in the posture of the hinge part into a linear force for moving the mounting projection in the front-rear direction.

The converting and outputting part may be disposed in the hinge case and connect to the hinge part at a position eccentric to a rear in the hinge case, and the cooling channel may be formed in an area at a front of the converting and outputting part and an area in an upper portion of the converting and outputting part.

The cooling channel may include a first section that passes from the lower portion of the hinge case to the area at the front of the converting and outputting part, and a second section that passes from an upper side of the first section to the area in the upper portion of the converting and outputting part, and the first section may be disposed at a position adjacent to the front surface of the housing and the door front surface part, and the second section may be disposed at a position adjacent to the upper surface of the housing and the door upper surface part.

The cooking appliance may further include a control board disposed on the rear surface of the housing and electrically connecting to the first heating part.

The cooking appliance according to the disclosure may further include a second heating part below/the tray, and the control board may electrically connect to the second heating part, through an inner space below the bottom surface of the housing and an inner space behind the rear surface of the housing that connect to each other.

The cooking appliance according to the disclosure may further include a rear surface supporting panel that is coupled to the rear surface of the housing and supports the control board.

The cooking appliance according to the disclosure may further include a rear surface cover that is disposed at a rear of the rear surface supporting panel and coupled to the rear surface supporting panel, and the control board may be disposed in a space encircled by the rear surface supporting panel and the rear surface cover.

The cooking appliance according to the disclosure may further include a power source connecting part disposed on the rear surface supporting panel, and the power source connecting part may be disposed in a lateral portion of the control board and electrically connect to the control board.

The cooking appliance according to the disclosure may further include a cooling fan disposed on the rear surface supporting panel, and the cooling fan may be disposed in the lateral portion of the control board and an upper portion of the power source connecting part.

The cooking appliance according to the disclosure may further include a communication module disposed on the rear surface supporting panel, and the communication module may be disposed in the lateral portion of the control board, the upper portion of the power source connecting part and a lower portion of the cooling fan.

The cooking appliance according to the disclosure may further include a cabinet coupled to the housing outside the housing, and the control board may be installed in a space encircled by the rear surface supporting panel and the cabinet.

The rear surface of the cabinet, facing the control board, may have a through hole that is formed in a way that penetrates in the front-rear direction, and the cooking appliance may further include an intake and exhaust grill disposed in the through hole.

Advantageous Effect

According to the present disclosure, a door may not be unfolded forward but may swivel upward to open both the front surface and the upper surface of a cooking space, thereby enabling the door to be open easily smoothly even in a narrow space and enabling a food item or a tray to be withdrawn conveniently and readily.

According to the present disclosure, since the front surface and the upper surface of the cooking space may be opened by the door, a tray may be exposed further. Accordingly, an object to be cooked may be easily put into and out of the cooking space only by partially withdrawing the tray, thereby ensuring improvement in convenience and safety.

According to the present disclosure, since the door is not unfolded forward but swivels upward to be opened and closed, it is unlikely that the center of gravity of the cooking appliance shifts forward at a time when the door is opened, thereby significantly reducing the risk of a fall of the cooking appliance.

According to the present disclosure, since a center of swiveling of the door is formed on a rear side of the cooking appliance, the center of gravity of the door may be more eccentric to a door upper surface part than to a door front surface part, and the center of gravity of the cooking appliance may be eccentric to the rear side of the cooking appliance at a time when the door is opened, thereby significantly reducing the risk of a fall of the cooking appliance and improving safety and ease of use of the cooking appliance.

According to the present disclosure, the cooking appliance may have a stable structure that helps to significantly reduce the possibility of a fall of the cooking appliance, thereby freely adopting a tray having an increased thickness and weight for improvement in cooking performance and being available in an environment where an induction heater is used.

According to the present disclosure, a passage may be expanded such that a food item or a tray is conveniently and easily inserted into and withdrawn from a cooking space by a user, and at a time when the door is opened and closed, a tray may be automatically withdrawn from and inserted into the cooking space, thereby withdrawing and inserting the food item or the tray more conveniently and easily.

According to the present disclosure, since a manipulation device is installed on the door, a housing may be scaled down, and an entrance of the cooking space may be large enough for a tray and a food item to come in and out, thereby ensuring a compact exterior and improving usability.

According to the present disclosure, a see-through window may be disposed in an upper portion of the door, and the manipulation device may be disposed at a front of the door such that the user checks a state of food item being cooked more conveniently and readily without leaning forward and bending the user's knees, thereby enabling the user to manipulate a manipulation switch conveniently and readily while facing the cooking appliance.

According to the present disclosure, components included in the door may be stably fixed to an inside of the door, and a man hour for assembling the door may be reduced, and the door may be assembled more easily and rapidly.

According to the present disclosure, portions which are easily affected by heat, causing an increase in temperature, and are highly likely to be contacted by the user may be cooled, thereby preventing a safety accident and preventing damage to the components in the door, caused by the overheating of the door.

BRIEF DESCRIPTION OF DRAWING

FIG. 1 is a perspective view showing a cooking appliance in one embodiment.

FIG. 2 is a perspective view showing a state in which a door of the cooking appliance in FIG. 1 is open.

FIG. 3 is an exploded perspective view showing the cooking appliance in FIG. 1.

FIG. 4 is a perspective view separately showing the housing and the hinge assemblies in FIG. 1.

FIG. 5 is a perspective view separately showing a door in one embodiment.

FIG. 6 is a bottom perspective view showing a bottom surface side of the door in FIG. 5.

FIG. 7 is an exploded perspective view showing a configuration of the door in FIG. 6.

FIG. 8 is a cross-sectional view taken along line "VIII-VIII" of FIG. 1.

FIG. 9 is an enlarged view showing portion "IX" in FIG. 8.

FIG. 10 is a cross-sectional view taken along line "X-X" of FIG. 1.

FIG. 11 is an enlarged view showing portion "XI" in FIG. 10.

FIG. 12 is a cross-sectional view schematically showing a flow of air in the door in one embodiment.

FIG. 13 is a perspective view showing a state in which a portion of the door in FIG. 5 is removed.

FIG. 14 is a cross-sectional view taken along line "XIV-XIV" of FIG. 13.

FIG. 15 is an exploded perspective view showing a configuration of the manipulation device in FIG. 14.

FIG. 16 is an exploded perspective view separately showing the socket member in FIG. 15.

FIG. 17 is a front view showing the socket member in FIG. 16.

FIG. 18 is a side view showing the socket member in FIG. 16.

FIG. 19 is a front view schematically showing a configuration of the first control board in FIG. 15.

FIG. 20 is a block diagram schematically showing a configuration of the cooking appliance in one embodiment.

FIG. 21 is a perspective view showing a tray in one embodiment.

FIG. 22 is a cross-sectional view schematically showing a coupling structure between the tray and the mounting projection in FIG. 21.

FIG. 23 is a cross-sectional view schematically showing another coupling structure between the tray and the mounting projection in FIG. 22.

FIG. 24 is a view showing a procedure for a coupling between the tray and the mounting projection in FIG. 23.

FIG. 25 is a cross-sectional view schematically showing yet another coupling structure between the tray and the mounting projection in FIG. 22.

FIG. 26 is a view showing a procedure for a coupling between the tray and the mounting projection in FIG. 25.

FIG. 27 is a perspective view showing a state in which the door of the cooking appliance in one embodiment is closed.

FIG. 28 is a cross-sectional view taken along line "XXVIII-XXVIII" in FIG. 27.

FIG. 29 is a cross-sectional view taken along line "XXIX-XXIX" in FIG. 27.

FIG. 30 is a perspective view showing a state in which the door of the cooking appliance in FIG. 27 is open.

FIG. 31 is a cross-sectional view taken along line "XXXI-XXXI" in FIG. 30.

FIG. 32 is a cross-sectional view taken along line "XXXII-XXXII" in FIG. 30.

FIG. 33 is a view showing a change in center of gravity in a state in which a door of a cooking appliance is open.

FIG. 34 is a perspective view separately showing components constituting a door front surface part.

FIG. 35 is a front perspective view separately showing the supporting panel in FIG. 34.

FIG. 36 is a rear perspective view showing a rear surface of the supporting panel in FIG. 35.

FIG. 37 is a rear perspective view showing a state in which a temperature sensor is installed.

FIG. 38 is a perspective view separately showing the bracket in FIG. 34.

FIG. 39 is a cross-sectional view showing a coupling structure between a supporting panel and a door rear surface cover.

FIG. 40 is a cross-sectional view showing a coupling structure between a front surface of a door main body part and a supporting panel.

FIG. 41 is an enlarged view showing a portion of a configuration in a door front surface part.

FIGS. 42 to 44 are rear perspective views showing a procedure for assembly of a door front surface part.

FIG. 45 is a cross-sectional view schematically showing a structure in a cooking appliance.

FIG. 46 is a cross-sectional view taken along line "XXXXVI-XXXXVI" in FIG. 27.

FIG. 47 is an exploded perspective view separately showing a housing and a second heating part in one embodiment.

FIG. 48 is a plan view showing the second heating part in FIG. 47.

FIG. 49 is an exploded perspective view separately showing the second heating part, the receiver coil and the electromagnetic shielding plate in FIG. 47.

FIG. 50 is a cross-sectional view showing a coupling between the second heating part and the temperature sensor, and a coupling between the receiver coil and the electromagnetic shielding plate in FIG. 47.

FIG. 51 is a rear view showing the second control board in FIG. 47.

FIG. 52 is a rear view showing a state in which a rear surface cover is disposed on a rear surface of the second control board in FIG. 51.

FIG. 53 is a perspective view separately showing a door frame and components installed in the door frame in one embodiment.

FIG. 54 is an exploded perspective view showing the door frame and the components installed in the door frame in FIG. 53.

FIG. 55 is a perspective view separately showing the door frame in FIG. 54.

FIG. 56 is a cross-sectional view taken along line "XXXXXVI-XXXXXVI" in FIG. 53.

FIG. 57 is a cross-sectional view taken along line "XXXXXVII-XXXXXVII" in FIG. 53.

FIG. 58 is a cross-sectional view taken along line "XXXXXVIII-XXXXXVIII" in FIG. 53.

FIG. 59 is an enlarged view showing a portion of the door frame in FIG. 53.

FIG. 60 is a perspective view showing a coupling structure between a door frame and a hinge part.

FIG. 61 is a cross-sectional view showing a coupling structure between a door frame and a hinge part.

FIG. 62 is a cross-sectional view showing a coupling structure among a door frame, a hinge part and a door.

FIG. 63 is a perspective view showing a cooking appliance in another embodiment.

FIG. 64 is a cross-sectional view taken along line "XXXXXXIV-XXXXXXIV" in FIG. 63.

FIG. 65 is a view showing a flow of air in the cooling channel in FIG. 64.

DETAILED DESCRIPTION OF EXEMPLARY EMBODIMENT

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the subject matter of the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

When one component is described as being "in an upper portion (or a lower portion)" of another component, or "on (or under)" another component, one component can be placed on the upper surface (or under the lower surface) of another component, and an additional component may be interposed between another component and one component on (or under) another component.

When one component is described as being "connected", "coupled", or "connected" to another component, one component can be directly connected, coupled or connected to another component. However, it is also to be understood that an additional component can be "interposed" between the two components, or the two components can be "connected", "coupled", or "connected" through an additional component.

Throughout the disclosure, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "have" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

[Entire Structure of Cooking Appliance]

Figure 1:
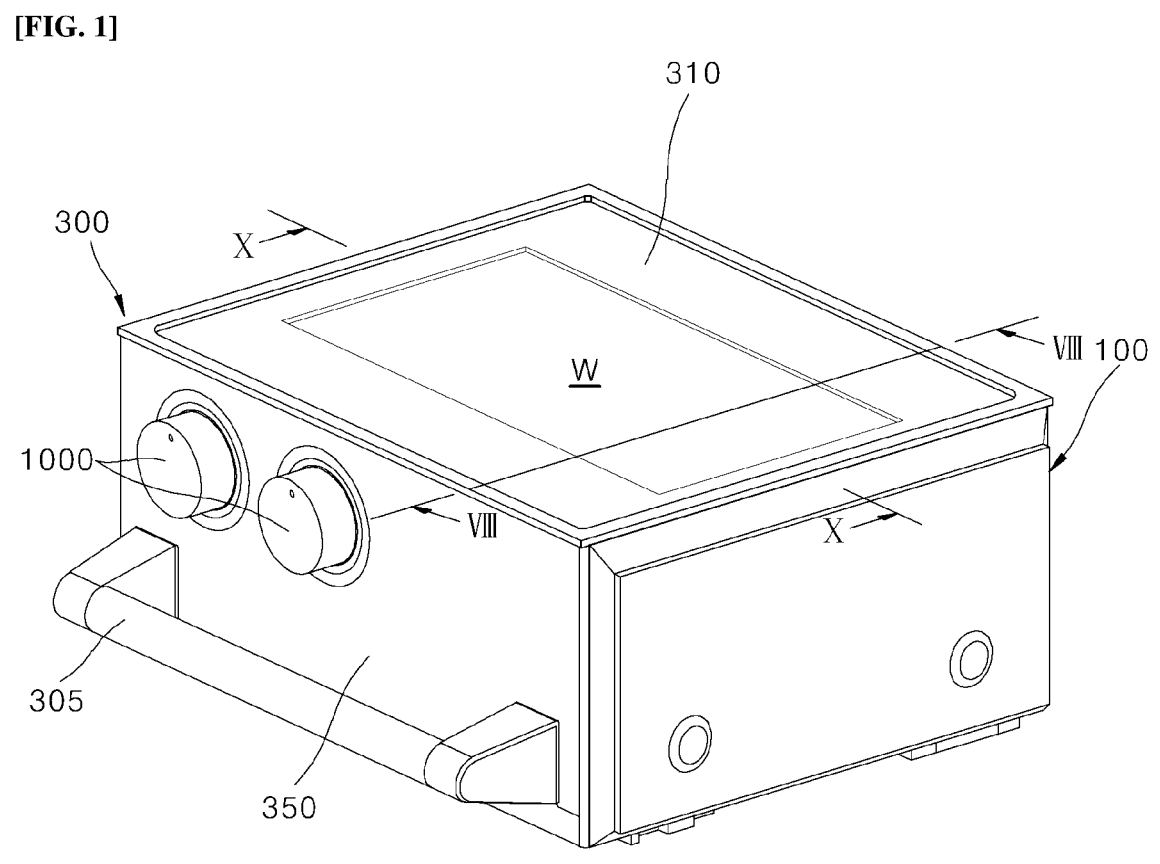

FIG. 1 is a perspective view showing a cooking appliance in one embodiment, FIG. 2 is a perspective view showing a state in which a door of the cooking appliance in FIG. 1 is open, and FIG. 3 is an exploded perspective view showing the cooking appliance in FIG. 1.

Referring to FIGS. 1 to 3, the cooking appliance according to an embodiment of the present disclosure may include a housing 100, a door 300, a tray 200, and heating parts 400 and 600.

The housing 100 forms a frame of the cooking appliance in this embodiment. According to this, various components constituting the cooking appliance are installed in the housing 100. A cooking space 105 which provides a space for cooking food is formed inside the housing 100.

In the present embodiment, the housing 100 is illustrated as being formed in a hexahedral shape with open upper and front surfaces. That is, the housing 100 includes a bottom surface 110, a pair of lateral surfaces 120 and 130, and a rear surface 140, which forms a space therein, and is provided in a form in which the upper surface and the front surface may open. The cooking space 105 surrounded by the bottom surface 110, both the lateral surfaces 120 and 130, and the rear surface 140 of the housing 100 is formed inside the housing 100.

The tray 200 is disposed in the cooking space 105 inside the housing 100. The tray 200 is provided so that an object to be cooked is seated thereon. The tray 200 may be detachably installed inside the cooking space 105. Also, for convenience of a user, the tray 200 may be provided to be withdrawable from the front side of the cooking space 105.

The tray 200 may be installed in a way that the tray can move in a front-rear direction in association with an operation of opening or closing the door 300, and the movement of the tray 200 in the front-rear direction may be guided by hinge assemblies 800 which will be described below.

The door 300 is provided to open or close the open upper and front surfaces of the housing 100. In the present embodiment, the housing 100 forms an exterior of a bottom surface, lateral surfaces, and a rear surface of the cooking appliance while the door 300 forms an exterior of an upper surface and a front surface of the cooking appliance. The door 300 may include a door upper surface part 310 and a door front surface part 350.

The door upper surface part 310 forms an upper surface of the door 300 and corresponds to a component which covers the open upper surface of the housing 100 when the door 300 closes the cooking space 105 inside the housing 100. Also, the door front surface part 350 forms a front surface of the door 300 and corresponds to a component which covers the open front surface of the housing 100 when the door 300 closes the cooking space 105.

In the present embodiment, the door 300 is illustrated as being formed in an L-shape. That is, at the door 300, the door upper surface part 310 forming the upper surface of the door 300 and the door front surface part 350 forming the front surface of the door 300 are formed in the form of being connected to each other in an L-shape. The door 300 formed in this way opens or closes the cooking space 105 as the door upper surface part 310 and the door front surface part 350 connected to each other in an L-shape rotate together when the door 300 rotates for opening or closing the cooking space 105.

The door 300 is rotatably installed at an upper portion of the housing 100 and is rotatably coupled to the housing 100 via the hinge assemblies 800 installed at the housing 100. In this case, the hinge assemblies 800 are disposed at each lateral portion of the housing 100, and a rear side of the door upper surface part 310 is rotatably coupled to the hinge assemblies 800.

Also, a handle 305 may be provided at the front surface of the door 300, and a user may open or close the cooking space 105 by holding the handle 305 and rotating the door 300 in an up-down direction.

The heating parts 400 and 600 may be installed at the housing 100 and/or the door 300 to heat the tray 200 disposed in the cooking space 105. In the present embodiment, the heating parts 400 and 600 are illustrated as including a first heating part 400 disposed at the door 300 and a second heating part 600 disposed in the housing 100.

The first heating part 400 is installed at the door 300 such that, when the door 300 closes the cooking space 105, the first heating part 400 is housed inside the cooking space 105. The first heating part 400 is installed at the door upper surface part 310 in such a way that the first heating part 400 is disposed at a bottom surface side of the door upper surface part 310 facing the bottom surface of the housing 100.

In the present embodiment, the first heating part 400 is illustrated as being provided in the form including an electric heater. The first heating part 400 may heat the object to be cooked which is seated in the tray 200 from an upper portion of the object.

The second heating part 600 is installed at the housing 100, and is disposed at a lower portion of the tray 200. The second heating part 600 is provided in the form of a heating part which heats the tray 200 using a different heating method from the first heating part 400, e.g., an induction heating part.

The second heating part 600 may be provided in the form including a working coil 610 installed at a lower portion of the bottom surface 110 of the housing 100 and may induce heating of the tray 200 from the lower portion of the bottom surface 110. To this end, the tray 200 may be formed of a material which may be inductively heated by the second heating part 600.

In summary, the cooking appliance in this embodiment includes a housing 100 in which the cooking space 105 is formed, the door 300 provided to be able to simultaneously open the front and the top of the cooking space 105, the first heating part 400 provided to be able to heat the inside of the cooking space 105 from the top, and the second heating part 600 provided to be able to inductively heat the tray 200 inside the cooking space 105, wherein the withdrawal and insertion of the tray 200 may be performed in association with the operation of opening or closing the door 300.

Detailed descriptions of the above-mentioned components and other components not mentioned yet will be sequentially given below.

[Structure of Housing]

FIG. 4 is a perspective view separately showing the housing and the hinge assemblies in FIG. 1.

Referring to FIGS. 3 and 4, as described above, the housing 100 includes a bottom surface 110, a pair of lateral surfaces 120 and 130, and a rear surface 140, which forms a space therein, and is provided in the form in which the upper surface and the front surface are open.

The cooking space 105 may be formed in the inner space surrounded by the bottom surface 110, both the lateral surfaces 120 and 130, and the rear surface 140 of the housing 100, and the tray 200 may be installed in the cooking space 105 so as to be withdrawable therefrom.

Also, the second heating part 600 may be installed at the lower portion of the bottom surface of the housing 100, and an electronic component, e.g., a second control board 700 which will be described below, related to operation of the second heating part 600 may be installed at the rear of the rear surface of the housing 100.

Further, the hinge assemblies 800 may be installed at outer sides of the lateral surfaces 120 and 130 of the housing 100, and the door 300 may be rotatably installed at the housing 100 by being coupled to the hinge assemblies 800 installed as above.

As one example, the housing 100 may be produced in such a form that a metal plate is bent in a U-shape and the metal plate bent in this way forms the bottom surface and both lateral surfaces of the housing 100. When the housing 100 is produced in this form, the bottom surface 110 of the housing 100 may be integrally connected to both lateral surfaces 120 and 130 of the housing 100 without a joint.

Thereby, internal aesthetic of the cooking space 105 may be improved, and an effect of preventing foreign materials from being jammed in gaps between the bottom surface 110 and both lateral surfaces 120 and 130 of the housing 100 or preventing the foreign materials from coming out through the gaps to contaminate the second heating part 600 may be obtained.

As another example, the housing 100 may be produced in such a form that a metal plate includes left and right protrusion portions forming a T-shape which are bent upward to form the bottom surface 110 and both the lateral surfaces 120 and 130 of the housing 100, and a rear protrusion portion is bent upward to form the rear surface 140 of the housing 100. When the housing is produced in this form, the bottom surface 110, both the lateral surfaces 120 and 130, and the rear surface 140 of the housing 100 may be integrally formed without joints between the bottom surface 110 and both the lateral surfaces 120 and 130 of the housing 100, and between the bottom surface 110 and the rear surface 140 of the housing 100.

Thereby, when viewed from the front and the top, an inner surface of the cooking space 105 may maintain a smooth surface where internal joints of the cooking space 105 are nearly not seen. Thus, the internal aesthetic of the cooking space 105 may be further improved, and an effect of easily removing contaminants attached to the inner surface of the cooking space 105 may be additionally obtained.

Meanwhile, the bottom surface 110 of the housing 100 may include a ceramic glass. The ceramic glass may have the shape of a rectangular flat plate having a prescribed thickness.

For example, the ceramic glass may be disposed at a cut middle portion of the bottom surface 110 formed of a metal material. The ceramic glass may be disposed between the second heating part 600 and the tray 200.

Also, a rear surface case 150 which houses the second control board 700 which will be described below is disposed at the rear of the rear surface 140 of the housing 100. The second control board 700 is housed in the rear surface case 150 and installed at the rear of the housing 100, and an insulating plate 160 is disposed between the rear surface 140 of the housing 100 and the rear surface case 150.

The insulating plate 160 serves to block transfer of hot air from the inside of the cooking space 105 to the second control board 700 via the rear surface 140 of the housing 100 and insulate the housing 100 and the rear surface case 150, in which the second control board 700 is installed, from each other.

Further, the housing 100 of the present embodiment may further include a cabinet 170. The cabinet 170 is provided to cover both the lateral surfaces 120 and 130 and the rear surface 140 of the housing 100. The cabinet 170 may surround and protect the hinge assemblies 800 installed at both the lateral surfaces 120 and 130 of the housing 100 and the second control board 700 installed at the rear surface 140 of the housing 100 from the outside and form an exterior of the lateral portions and the rear of the cooking appliance.

[Structure of Door]

Figure 6:
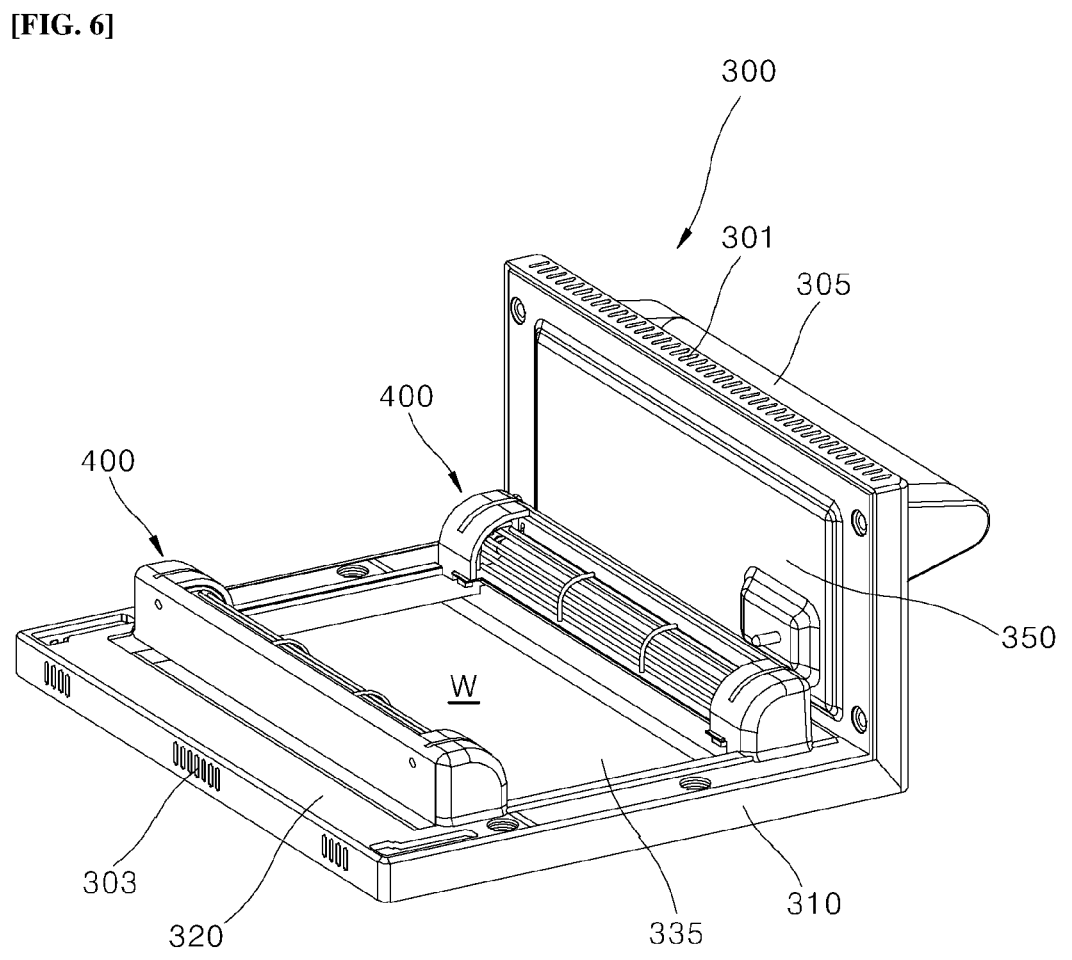

FIG. 5 is a perspective view separately showing a door in one embodiment, FIG. 6 is a bottom perspective view showing a bottom surface side of the door in FIG. 5, FIG. 7 is an exploded perspective view showing a configuration of the door in FIG. 6, FIG. 8 is a cross-sectional view taken along line "VIII-VIII" of FIG. 1, FIG. 9 is an enlarged view showing portion "IX" in FIG. 8, FIG. 10 is a cross-sectional view taken along line "X-X" of FIG. 1, and FIG. 11 is an enlarged view showing portion "XI" in FIG. 10.

Referring to FIGS. 5 to 11, the door 300 is provided in the form in which the door upper surface part 310 forming the upper surface of the door 300 and the door front surface part 350 forming the front surface of the door 300 are integrally connected to each other in an L-shape.

The door upper surface part 310 may be formed in a quadrilateral shape such that the door upper surface part 310 is formed in a rectangular shape in which a front-rear length is longer than a left-right length. A door frame 320 may be installed at the door upper surface part 310. The door frame 320 may be installed at a lower portion of the door upper surface part 310, and the first heating part 400 may be installed at the lower portion of the door upper surface part 310 while being coupled to the door frame 320.

The door 300 may include a see-through window W. The see-through window W may be disposed at the door upper surface part 310 such that the see-through window W is provided to be located at a central portion of the door upper surface part 310 in a planar direction.

The see-through window W may include a pair of glasses 330 and 335 which are disposed to be spaced a predetermined distance apart from each other in the up-down direction so that a space portion is formed inside the see-through window W. For example, of the glasses 330 and 335, the glass 330 (hereinafter referred to as "first glass") may be installed at the door upper surface part 310, and the other glass 335 (hereinafter referred to as "second glass") may be installed at the door frame 320.

A through hole may be formed in each of the door upper surface part 310 and the door frame 320. The through holes may be formed at the center of the door upper surface part 310 in the planar direction and at the center of the door frame 320 in the planar direction, respectively.

In this embodiment, the first glass 330 is installed in the door upper surface part 310 in such a way that the through hole formed in the door upper surface part 310 is covered by the first glass 330 from the top, and the second glass 335 is installed in the door frame 320 in such a way that the through hole formed in the door frame 320 is covered by the second glass 335 from the top.

The first glass 330 and the second glass 335 may be formed of glass formed of a transparent or translucent material. The see-through window W may be formed at portions of the through holes covered by the first glass 330 and the second glass 335.

The user may view the inside of the cooking space 105 from the top through the see-through window W formed as above, and in this way, a cooking state of food inside the cooking space 105 may be checked. Due to characteristics of a mini oven, the cooking appliance of the present embodiment is often used at a point which is significantly lower than the user's face. Therefore, the see-through window W formed at the upper surface of the door 300 may be provided as a means that allows the user to easily and conveniently check the cooking state of food without lowering their posture or bending their waist forward.

Further, the pair of glasses 330 and 335 forming the see-through window W are coupled to different components, that is, one is coupled to the door upper surface part 310 and the other is coupled to the door frame 320, and are disposed to be spaced a predetermined distance apart from each other. Accordingly, a separation space between the two glasses 330 and 335 is formed inside the see-through window W.

For example, a first glass 330 may be disposed in an upper portion of the door upper surface part 310, and a second glass 335 may be disposed in the door frame 320. Accordingly, the first glass 330 and the second glass 335 may be spaced from each other by at least a thickness of the door upper surface part 310.

That is, a separation space, which is at least as thick as the door upper surface part 310, may be formed between the first glass 330 and the second glass 335 forming the see-through glass W. Accordingly, the separation space formed by the two glasses 330 and 335 may be formed in the see-through glass W. Air may flow into the separation space formed as describe above, and the air introduced into the separation space may form an air layer in the separation space.

The air layer formed in the separation space formed in this way may serve to block transfer of heat, which has heated the second glass 335 directly exposed to the cooking space 105, to the first glass 330 disposed at the door upper surface part 310.

In this way, the see-through window W provided in the double-window structure as described above has a function of preventing, to a significant level, the occurrence of safety accidents caused by the overheating of the see-through window W, the occurrence of steaming up of the see-through window W due to a temperature rise of the see-through window W, and the like.

Additionally, a through hole formed in the door upper surface part 310 may have a width less than a width of a through hole formed in the door frame 320. Further, when seen from above, the through hole formed in the door upper surface part 310 may be formed in a way that the through hole is disposed in an area inside the through hole formed in the door frame 320.

That is, the through hole may be formed in the door upper surface part 310 such that an inner edge of the door frame 320 is not exposed through the see-through window W. In this case, since the door frame 320 is not exposed through the see-through window W, aesthetic qualities may be ensured.

The first heating part 400 is installed at the door upper surface part 310 in such a way that the first heating part 400 is disposed in a region not exposed through the see-through window W when viewed from the top. The first heating part 400 is disposed at a front outer side and a rear outer side of the see-through window W on a plane in a horizontal direction corresponding to the door upper surface part 310. In other words, the first heating part 400 may be respectively disposed outside the through holes formed in the door upper surface part 310 and the door frame 320. That is, the cooking appliance of the present embodiment may include a pair of first heating parts 400 disposed at the front outer side and the rear outer side of the see-through window W.

When the first heating part 400 is disposed in a region exposed through the see-through window W, it is aesthetically not desirable. Also a problem may occur in securing the field of view through the see-through window W, and a problem in that a temperature of a portion of the see-through window W rises may also occur.

Also, in consideration of the shape of the door front surface part 350 having a rectangular shape in which a front-rear length is longer than a left-right length, the first heating part 400 should be disposed at the front outer side and the rear outer side of the see-through window W for a length of the first heating part 400 to be increased accordingly, and improvement in thermal power of the first heating part 400 may be expected in proportion to the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving the thermal power of the first heating part 400.

The door front surface part 350 may be formed in a rectangular shape like the door upper surface part 310. However, when the door upper surface part 310 forms a plane in the horizontal direction, the door front surface part 350 forms a plane in a vertical direction.

For example, the door front surface part 350 may be formed extending downward from a front end portion of the door upper surface part 310. Also, the door front surface part 350 and the door upper surface part 310 may be connected in the form in which an inner space of the door front surface part 350 and an inner space of the door upper surface part 310 are connected to each other. That is, the door 300 may be provided in the form in which the door front surface part 350 and the door upper surface part 310, whose inner spaces are connected to each other, are integrally connected in an L-shape.

A manipulation device 1000 and a first control board 500 may be disposed in the door front surface part 350. In this embodiment, a space portion may be formed inside the door front surface part 350, for example (see FIG. 9). In the space portion, at least a portion of the manipulation device 1000 and the first control board 500 may be housed.

The manipulation device 1000 may include various manipulation switches for controlling and manipulating operation of the cooking appliance in this embodiment. The manipulation device 1000 may be provided to be exposed to a front surface of the door front surface part 350, and the user may directly manipulate the manipulation device 1000 to control operation of the cooking appliance.

The first control board 500 is installed inside the door front surface part 350. Various components and circuits related to reception of manipulation signals input via the manipulation device 1000, generation of control signals for controlling operations of the first heating part 400 and the second heating part 600, and the like are provided on the first control board 500.

The first control board 500 may be electrically connected to the manipulation device 1000, the first heating part 400, and the second heating part 600. The first control board 500 is disposed in the door front surface part 350 like the manipulation device 1000 and may be disposed at a position very close to the manipulation device 1000. The first control board 500 may be disposed at a position which is also very close to the first heating part 400 disposed on the door 300.

In this embodiment, the manipulation device 1000 may be electrically connected to the first control board 500 in the state of being directly mounted on the first control board 500. In this case, each of the manipulation switches included in the manipulation device 1000 may pass through the door front surface part 350 and connect to the first control board 500. Additionally, the first heating part 400 may be electrically connected to the manipulation device 1000 and the first control board 500 via a cable installed through the inside of the door front surface part 350 and the inside of the door upper surface part 310 which are connected to each other.

That is, since the first control board 500, the manipulation device 1000, and the first heating part 400 which need to be electrically connected to one another are disposed at positions very close and spatially connected to one another, not only is it possible to easily and promptly perform a task for electrically connecting the first control board 500, the manipulation device 1000, and the first heating part 400, but also it is possible to maintain a connection structure thereof in a very stable state.

Also, the cooking appliance of the present embodiment may further include cable mounting parts 340 and 345. The cable mounting parts 340 and 345 are disposed between the door upper surface part 310 and the door frame 320, which are disposed in the up-down direction, in such a way that the cable mounting parts 340 and 345 are disposed at both outer sides of the see-through window W.

Further, a connecting member 341 is disposed at each of the front outer side and the rear outer side of the see-through window W. The pair of connecting members 341 connect the pair of cable mounting parts 340 and 345 spaced apart from each other. That is, the pair of cable mounting parts 340 and 345 and the pair of connecting members 341 may be provided in a square shape surrounding the see-through window W from the outside.

An assembly of the cable mounting parts 340 and 345 and the connecting members 341 provided as above is installed in the door upper surface part 310 in the form of being inserted into the space portion formed between the door upper surface part 310 and the door frame 320.

The inside of the door upper surface part 310 in which the cable mounting parts 340 and 345 are installed as described above is connected to the inside of the door front surface part 350. Also, cables C1 and C2 which connect the first control board 500 and the first heating part 400 through the inside of the door upper surface part 310 and the inside of the door front surface part 350, which are connected to each other, are installed at the cable mounting parts 340 and 345 installed in the door upper surface part 310.

A power cable C2 which supplies power to the first heating part 400 and the first control board 500 may be installed at any one of the cable mounting parts 340 and 345 disposed at both outer sides of the see-through window W. Also, a signal cable C1 which transmits a control signal generated in the first control board 500 to the first heating part 400 may be installed at the other one of the cable mounting parts 340 and 345 disposed at both outer sides of the see-through window W.

That is, in the door 300, the first heating part 400 is respectively disposed on both sides of the see-through window W in the front-rear direction, and the power cable C2 and the signal cable C1 are respectively disposed on both sides of the see-through window W in a left-right direction.

As a result, the first heating part 400, the power cable C2, and the signal cable C1 are disposed considering the disposition structure of the first heating part 400 and the hinge assembly 800.

In this embodiment, each first heating part 400 is disposed in the form in which a heating element thereof extends longitudinally in the left-right direction. Also, the hinge assembly 800 (see FIG. 3) is disposed at both sides of the see-through window W in the left-right direction.

The power cable C2 and the signal cable C1 are not only connected to the components disposed in the door 300 such as the first heating part 400 and the first control board 500, but also connected to the components disposed in the housing 100 such as the second control board 700 (see FIG. 68).

In order to pass through a portion between the door 300 and the housing 100 with the least possible exposure to the outside, the power cable C2 and the signal cable C1 may pass through the portion in which the hinge assembly 800 is disposed, which is a connecting portion between the door 300 and the housing 100.

For example, sections of the power cable C2 and the signal cable C1 connecting the housing 100 and the door 300 to each other may be disposed in the form of passing through the inside of the hinge assembly 800. In this way, exposure of the power cable C2 and the signal cable C1 to the outside of the cooking appliance may be suppressed in a section between the housing 100 and the door 300, and the power cable C2 and the signal cable C1 may be protected from the risk of damage.

Further, considering that the heating element of the first heating part 400 extends longitudinally in the left-right direction, the power cable C2 and the signal cable C1 may be disposed at the farthest possible side from the heating element and disposed to extend in a direction different from a direction in which the heating element extends.

This is a result of designing to avoid an influence of heat generated in the first heating part 400 on the power cable C2 and the signal cable C1. Also, considering that a plurality of first heating parts 400 are disposed to be spaced apart from each other in the front-rear direction, a structure in which the power cable C2 and the signal cable C1 are disposed at both sides of the first heating parts 400 in the left and right direction may be advantageous for connecting the first heating parts 400 using the power cable C2 and the signal cable C1.

Also, in the present embodiment, the power cable C2 and the signal cable C1 may be disposed to be spaced apart from each other in the left-right direction with the see-through window W disposed therebetween and may be installed at the cable mounting parts 340 and 345 different from each other.

In this case, the power cable C2 passes through the inside of any one of the hinge assemblies 800 disposed at both lateral surfaces of the housing 100 and is installed at the cable mounting parts 340 and 345 adjacent thereto. Also, the signal cable C1 passes through the inside of the other one of the hinge assemblies 800 disposed at both lateral surfaces of the housing 100 and is installed at the cable mounting parts 340 and 345 adjacent thereto.

For example, the power cable may pass through the inside of the hinge assembly 800 disposed at the left side of the housing 100 and be installed at the cable mounting parts 340 and 345 disposed at the left side of the door 300. Also, the signal cable C1 may pass through the inside of the hinge assembly 800 disposed at the right side of the housing 100 and be installed at the cable mounting parts 340 and 345 disposed at the right side of the door 300.

Through the structure in which the cables having different functions are disposed at different positions, a wiring task for electrically connecting the components constituting the cooking appliance may be more easily and promptly performed, and maintenance and repair tasks related thereto may also be easily performed.

The cable mounting part 340 and 345 and the connecting member 343 may be disposed between the first glass 330 and the second glass 335 that are spaced from each other in the up-down direction. That is, the cable mounting part 340 and 345 and the connecting member 343 may be mounted onto the second glass 335/, and the first glass 330 may be mounted onto the cable mounting part 340 and 345 and the connecting member 343 the cable mounting part 340 and 345 and the connecting member 343.

A mounting groove may be formed respectively on the upper surface of the cable mounting part 340 and 345, contacting the first glass 330, and the lower surface of the cable mounting part 340 and 345, contacting the second glass 335.

Additionally, a mounting groove may be respectively formed on the upper surface of the connecting member 343, contacting the first glass 330, and an upper surface of the connection member 343, contacting the second glass 335.

A sealing member s may be respectively installed in the each of the mounting grooves. That is, the sealing member s may be disposed respectively between the cable mounting part 340 and 345 and the first glass 330, between the cable mounting part 340 and 345 and the second glass 335, between the connecting member 343 and the first glass 330, and between the connecting member 343 and the second glass 335.

Accordingly, a sealing structure may be formed among the cable mounting part 340 and 345, the connecting member 343 and the first glass 330, and among the cable mounting part 340 and 345, the connecting member 343, and the second glass 335, using the sealing member s.

The sealing structure, formed as described above, may prevent moisture from permeating between the glasses 330 and 335, and as a result, may prevent formation of humidity or dew on the glasses 330 and 335.

[Cooling Structure in Door]

FIG. 12 is a cross-sectional view schematically illustrating a flow of air inside the door in one embodiment.

Referring to FIG. 12, a space portion is formed inside each of the door upper surface part 310 and the door front surface part 350. Particularly, a space portion is formed between the pair of glasses 330 and 335, which are disposed to be spaced a predetermined distance apart from each other in the up-down direction, inside the see-through window W installed in the door upper surface part 310. Also, the space portion inside the door upper surface part 310 including the see-through window W and the space portion inside the door front surface part 350 are connected to each other.

An air intake port 301 is formed at a lower end of the door front surface part 350. The air intake port 301 is formed to pass through the lower end of the door front surface part 350 and forms a passage which opens the space portion inside the door front surface part 350 to the outside on the door front surface part 350.

An air exhaust port 303 is formed at a rear end of the door upper surface part 310. The air exhaust port 303 is formed to pass through the rear end of the door upper surface part

310 and forms a passage which opens the space portion inside the door upper surface part 310 to the outside on the door upper surface part 310.

Further, the cooking appliance of the present embodiment may further include a first cooling fan 370 disposed inside the door 300. The first cooling fan 370 may be installed inside the door upper surface part 310 or inside the door front surface part 350. In this embodiment, the first cooling fan 370 is illustrated as being installed in the space portion inside the door front surface part 350.

Since the see-through window W, the first heating part 400 and the like are disposed in the door upper surface part 310, there is no clearance in the door upper surface part 310. Unlike the door upper surface part 310, no components of great volume is not disposed in the door front surface part 350 except for the first control board 500. Accordingly, the door front surface part 350 has more space than the door upper surface part 310. As a result, the first cooling fan 370 may be installed in the door front surface part 350.

The first cooling fan 370 provided as above generates a flow of air which causes outside air to be introduced into the door 300 via the air intake port 301 and causes air inside the door to be discharged via the air exhaust port 303.

By the flow of air generated by the first cooling fan 370 as above, the outside air is introduced into the door front surface part 350 via the air intake port 301, and the outside air introduced into the door front surface part 350 cools the first control board 500. Also, the air which has cooled the first control board 500 is introduced into the door upper surface part 310, passes through the space portion inside the see-through window W, and then is discharged to the outside of the door 300 via the air exhaust port 303.

During operation of the cooking appliance, the temperature of the first control board 500 is at a level significantly lower than the temperature of the see-through window W heated by the first heating part 400. Therefore, the air which has cooled the first control board 500 after being introduced into the door 300 via the air intake port 301 may pass through the inside of the see-through window W while the temperature of the air is sufficiently low for cooling the see-through window W. Therefore, the cooling of the first control board 500 and the cooling of the see-through window W may be sufficiently efficiently performed by the flow of air generated by the first cooling fan 370.

By the cooling structure inside the door 300 formed as above, the occurrence of overheating and deterioration of the components inside the door 300 such as the first control board 500 is suppressed. In this way, the occurrence of breakdown of the cooking appliance, deterioration of performance of the cooking appliance, etc., may be effectively suppressed.

Also, since the cooling air passing through the inside of the door 300 blocks heat transfer between the pair of glasses 330 and 335 constituting the see-through window W and suppresses the occurrence of overheating of the see-through window W, the occurrence of accidents in which the user suffers an injury such as a burn due to coming into contact with the see-through window W may be effectively reduced.

[Entire Structure of Manipulation Device]

Referring to FIG. 5, the manipulation device 1000 may include various manipulation switches for controlling and manipulating operation of the cooking appliance in this embodiment.

The manipulation device 1000 may be exposed to the front surface of the door front surface part 350, and the user may manipulate the manipulation device 1000 directly to control operation of the cooking appliance.

In an example, the manipulation device 1000 may include a manipulation switch for selecting the sort and a state of an object to be cooked, a manipulation switch for selecting a cooking degree or cooking time, and the like.

In another example, the manipulation device 1000 may include a manipulation switch for controlling the turn-on/off or adjusting thermal power of the first heating part 400 (see FIG. 3), a manipulation switch for controlling the turn-on/off or adjusting thermal power of the second heating part 600 (see FIG. 3), a timer manipulation switch for adjusting operation time of the first heating part 400 or the second heating part 600, and the like.

In this embodiment, the manipulation device 1000 includes two manipulation switches, for example. One may be a manipulation switch for selecting the sort and a state of an object to be cooked, and the other may be a manipulation switch for selecting a cooking degree or cooking time.

At least one of the manipulation switches may be rotated and pressed for manipulation. In this embodiment, each manipulation switch is rotated and pressed for manipulation, for example.

Additionally, in this embodiment, the manipulation device 1000 includes manipulation switches that respectively have identical or similar components, for example. In this case, each of the manipulation switches may be configured to provide different functions using the identical or similar components.

For example, all the two manipulation switches may be rotated and pressed for manipulation, and one may be a manipulation switch for selecting the sort and a state of an object to be cooked, and the other may be a manipulation switch for selecting a cooking degree or cooking time.

Hereunder, one of the two manipulation switches is provided as an example to describe a configuration of the manipulation device 1000.

FIG. 13 is a perspective view showing a state in which a portion of the door in FIG. 5 is removed, FIG. 14 is a cross-sectional view taken along line "XIV-XIV" of FIG. 13, and FIG. 15 is an exploded perspective view showing a configuration of the manipulation device in FIG. 14.

Referring to FIGS. 13 to 15, the manipulation device 1000 may include a manipulation switch and the manipulation switch may include a shaft 1100 and a knob 1300.

The shaft 1100 may be arranged in an encoder 1200 included in the manipulation device 1000. The shaft 1100 may be formed into a shaft that extends in the front-rear direction. Additionally, the shaft 1100 may make one rotation around the shaft in the front-rear direction.

The encoder 1200 may sense a rotation angle of the shaft 1100. In this embodiment, the encoder 1200 is disposed on the first control board 500, for example. The encoder 1200 may be disposed on the first control board 500 and may be disposed in the door front surface part 350.

The encoder 1200 may electrically connect to the first control board 500. The encoder 1200 may sense a rotation angle or an axial movement of the shaft 1100, and may transmit a signal corresponding to results of the sensing to the first control board 500. The first control board 500 may generate a control signal for controlling operation of the first heating part 400 (see FIG. 3), the second heating part 600 (see FIG. 3), and a light emitting member 1700 described below, based on a signal received from the encoder 1200.

The knob 1300 may be a component rotated by the user for manipulation. The knob 1300 may be coupled to the shaft 1100, and as a result, connected to the shaft 1100. The knob 1300 may connect to the shaft 1100 to make a rotation and an axial movement along with the shaft 1100.

The knob 1300 may include a shaft coupling part 1310. The shaft coupling part 1310 may be formed into a lying cylinder. A shaft coupling hole 1311 may be formed in the shaft coupling part 1310. The shaft coupling hole 1311 may be concavely formed in the shaft coupling part 1310, and may be formed into a shape corresponding to the shape of the shaft 1100.

The shaft coupling hole 1311 may be open toward a rear of the shaft coupling part 1310. Additionally, a front of the shaft coupling hole 1311 may be closed by a front surface of the shaft coupling part 1310. A position at which the shaft 1100 coupled to the shaft coupling part 1310 is installed and a depth at which the shaft 1100 is inserted may be guided thanks to the shape of the shaft coupling part 1310.

The manipulation device 1000 in this embodiment may further include a socket member 1600. The socket member 1600 may be provided to allow the door 300 to support the knob 1300 in a rotatable manner and an axially movable manner. The socket member 1600 may be installed in the door 300, specifically, in the door front surface part 350.

The socket member 1600 may be installed in the door front surface part 350 in a way that accommodates the encoder 1200, installed in the door front surface part 350, in a diameter direction from the outside. The shaft 1100 connected to the encoder 1200 may protrude forward from the socket member 1600, passing through an approximate center in the diameter direction of the socket member 1600.

The socket member 1600 may accommodate the encoder 1200 therein, protect the encoder 1200, support the knob 1300 coupled to the shaft 1100 in the diameter direction from the outside, support the knob 1300 from a rear, define a path of light emitted from a light emitting member 1700 described hereunder, and the like.

The manipulation device 1000 in this embodiment may further include a light emitting member 1700. The light emitting member 1700 may be disposed on the first control board 500, and may be lit and emit light as a result of control of operations performed through the first control board 500.

The light emitting member 1700 may be disposed at a rear of the socket member 1600. Additionally, the socket member 1600 may have a passage for allowing light emitted from the light emitting member 1700 to pass through the front of the socket member 1600.

The path of light emitted from the light emitting member 1700 may be defined by the socket member 1600, and the light may play a role of displaying information on state of the manipulation device 1000, a state of control over operations performed as a result of manipulation of the manipulations device 1000, and the like.

The manipulation device 1000 in this embodiment may further include a light emitting member 1750 for mood lighting. Each light emitting member 1750 for mood lighting may be disposed on the first control board 500, and may be disposed at the rear of the socket member 1600. The light emitting member 1750 may be disposed further inward in a diameter direction than the light emitting member 1700.

Light emitted from each light emitting member 1750 may pass through the socket member 1600 through the passage formed in the socket member 1600 and be emitted from a rear of the knob 1300. In this case, the passage may be formed in a way that passes through a first connecting and supporting part 1630. Specifically, the passage may be disposed radially, and may be a hole formed among a plurality of rib-shaped parts 1633 spaced a predetermined distance apart from one another.

The mood lighting performed by the light emitting member 1750 may provide indirect lighting that lights up a rear of the manipulation device 1000 instead of directly emitting light to the front of the cooking appliance. The mood lighting may provide welcome lighting that indicates the manipulation device is ready to be manipulated in an operation standby state of the cooking appliance.

The mood lighting performed by the light emitting member 1750 may provide mood lighting capable of improving an aesthetic quality of the manipulation device and provide lighting enabling manipulation of the manipulation device even in the dark.

[Structure of Socket Member]

FIG. 16 is an exploded perspective view separately showing the socket member in FIG. 15, and FIG. 17 is a front view showing the socket member in FIG. 16. FIG. 18 is a side view showing the socket member in FIG. 16, FIG. 19 is a front view schematically showing a configuration of the first control board in FIG. 15, and FIG. 20 is a block diagram schematically showing a configuration of the cooking appliance in one embodiment.

Referring to FIGS. 15 to 20, the socket member 1600 may include an outer supporter 1610. The outer supporter 1610 may include a surface extending in the front-rear direction. In this embodiment, the outer supporter 1610 is formed into an approximately lying cylinder, for example. The outer supporter 1610 may be disposed outside the knob 1300 in a diameter direction of the knob, and at least a portion of the knob 1300 may be inserted into an area encircled by the outer supporter 1610.

The knob 1300 may be coupled to the outer supporter 1610 in a way that an end on a rear side of the knob 1300 contacts an inner circumferential surface of the outer supporter 1610. In this case, the end on the rear side of the knob 1300 may be coupled to the inner circumferential surface of the outer supporter 1610 in a slidable manner. Accordingly, the knob 1300 may be supported by the socket member 1600 in a rotatable manner and an axial movable manner.

The outer supporter 1610 may be provided with an inserting groove 1611 on the inner circumferential surface thereof, i.e., an inner surface thereof adjacent to the end on the rear side of the knob 1300. The inserting groove 1611 may be concavely formed on the inner circumferential surface of the outer supporter 1610 in a centrifugal direction. The end on the rear side of the knob 1300 may be inserted into the inserting groove 1611. Accordingly, the knob 1300 and the socket member 1600 may be coupled. Description in relation to this is provided hereunder.

Additionally, the socket member 1600 may further include an inner supporter 1620. The inner supporter 1620 may include a surface extending in the front-rear direction. In this embodiment, the inner supporter 1620 is formed into an approximately lying cylinder, for example. The inner supporter 1620 may be disposed inside the outer supporter 1610 in a diameter direction of the outer supporter 1610.

The inner supporter 1620 may be disposed between the encoder 1200 and the outer supporter 1610. The encoder 1200 may be inserted into an area encircled by the inner supporter 1620. That is, the inner supporter 1620 may be provided in a way theta the inner supporter 1620 encircles the encoder 1200 in the outer supporter 1610.

The socket member 1600 may further include a first connecting and supporting part 1630 that supports the outer supporter 1610 and the inner supporter 1620. The first connecting and supporting part 1630 may connect the outer supporter 1610 and the inner supporter 1620 and support the outer supporter 1610 and the inner supporter 1620.

The first connecting and supporting part 1630 may be disposed at rears of the outer supporter 1610 and the inner supporter 1620. The first connecting and supporting part 1630 may form a rear surface of the socket member 1600, and support the outer supporter 1610 and the inner supporter 1620 at the rears of the outer supporter 1610 and the inner supporter 1620.

In this embodiment, the socket member 1600 may be coupled to the first control board 500 installed in the door front surface part 350 while being installed in the door front surface part 350. In this case, the first connecting and supporting part 1630 forming the rear surface of the socket member 1600 may be a coupling surface in contact with the first control board 500 when the socket member 1600 is mounted onto the first control board 500.

The first connecting and supporting part 1630 may include a flange-shaped part 1631 and a rib-shaped part 1633. The flange-shaped part 1631 may protrude from the inner supporter 1620 in the centrifugal direction. The flange-shaped part 1631 may be formed into a flange that protrudes from the inner supporter 1620.

The rib-shaped part 1633 may connect the flange-shaped part 1631 and the outer supporter 1610. The rib-shaped part 1633 may be formed into a rib that protrudes from the flange-shaped part 1631 in the centrifugal direction, A plurality of rib-shaped parts 1633 may be radially disposed between the flange-shaped part 1631 and the outer supporter 1610. The rib-shaped parts 1633 formed as described above may effectively increase the entire strength of the socket member 1600 while suppressing an increase in the entire weight of the socket member 1600.

The inner supporter 1620 may be disposed at the rear of the shaft coupling part 1310 of the knob 1300. The inner supporter 1620 may support the shaft coupling part 1310 of the knob 1300, which moves rearward, from the rear to suppress an excessive movement of the knob 1300, thereby preventing an excessive load applied to the shaft 1100 and the encoder 1200.

Additionally, while the inner supporter 1620 may be supported by the first connecting and supporting part 1630, a certain degree of elasticity may be applied between the inner supporter 1620 and the first connecting and supporting part 1630.

In this embodiment, the socket member 1600 may be made of a plastic material, and the outer supporter 1610, the inner supporter 1620 and the first connecting and supporting part 1630 may be integrally formed.

A skirt-shaped part 1635 may connect between the flange-shaped part 1631 and the rib-shaped part 1633 of the first connecting and supporting part 1630. The skirt-shaped part 1635 may protrude rearward from an outer circumferential surface of the flange-shaped part 1631. Accordingly, the flange-shaped part 1631 and the rib-shaped part 1633 may connect in a " ⌐ " shape, and elasticity may be applied between the inner supporter 1620 and the first connecting and supporting part 1630 and between the outer supporter 1610 and the first connecting and supporting part 1630.

Thus, when the inner supporter 1620 is pressed rearward as a result of pressing the knob 1300, the inner supporter 1620 may stably suppress a rearward movement of the knob 1300 while elastically supporting the knob 1300. Further, the inner supporter 1620 may apply a force, needed to return the knob 1300 to a primary position, to the knob 1300 while the inner supporter 1620 returns to a primary state when the knob 1300 is released from a force of pressing the knob 1300.

The socket member 1600 may be provided with a light passing hole 1640. The light passing hole 1640 may be formed in a way that passes through the socket member 1600, specifically, the outer supporter 1610 in the front-rear direction. The light passing hole 1640 may be disposed at a position where the light passing hole 1640 and the light emitting member 1700 disposed on the first control board 500 overlap in the front-rear direction.

In this embodiment, a plurality of light emitting members 1700 may be disposed on the first control board 500. The light emitting member 1700 may be disposed at a position where the light emitting member 1700 and the outer supporter 1610 overlap in the front-rear direction while being disposed behind the outer supporter 1610. That is, the plurality of light emitting members 1700 may be disposed behind the outer supporter 1610 along a perimeter direction of the outer supporter 1610.

The outer supporter 1610 may be provided with a plurality of light passing holes 1640, and the plurality of light passing holes 1640 may be disposed at a position where the plurality of light passing holes 1640 and the plurality of light emitting members 1700 overlap in the front-rear direction. The light emitting members 1700 and the light passing holes 1640 may be arranged in a way that one light emitting member 1700 is inserted into one light passing hole 1640.

Accordingly, light emitted from each of the light emitting members 1700 may pass through the socket member 1600 through each of the light passing holes 1640 disposed in front of each of the light emitting members 1700 and may be emitted forward. That is, a path of movement of the light emitted by each of the light emitting members 1700 may be led by each of the light passing holes 1640 disposed in front of each of the light emitting members 1700. Accordingly, a brightened light emitting member 1700 of the plurality of light emitting members 1700 may be surely ascertained outside the manipulation device 1000.

Additionally, the socket member 1600 may further include a first coupling part 1420. The first coupling part 1420 may include a first protruding projection 1651 and a first coupling projection 1653. The first protruding projection 1651 may protrude from the outer supporter 1610 in the centrifugal direction. The first coupling projection 1653 may protrude rearward from the first protruding projection 1651.

The first coupling projection 1653 may be fitted-coupled to a fitting hole 510 formed on the first control board 500, and accordingly, the socket member 1600 and the first control board 500 may be coupled.

A position of the first coupling part 1420 on the socket member 1600 may be determined considering the position of the light passing hole 1640 and the position of the light emitting member 1700. That is, when the first coupling projection 1653 is fitted-coupled to the fitting hole 510 of the first control board 500, the first coupling part 1420 may be preferably disposed at a position where the positions of the plurality of light passing holes 1640 and the positions of the plurality of light emitting members 1700 are aligned in the front-rear direction.

Thus, the first coupling part 1420 may guide the socket member 1600 on the first control board 500 to a position at which the socket member 1600 is installed. That is, the socket member 1600 may be guided to a predetermined position only by fitted-coupling the first coupling part 1420 to the first control board 500.

The socket member 1600 may further include a second coupling part 1660. The second coupling part 1660 may include a second protruding projection 1661 and a second coupling projection 1663. The second protruding projection 1661 may protrude from the outer supporter 1610 in the centrifugal direction. The second coupling projection 1663 may protrude from the second protruding projection 1661 forward.

The second coupling part 1660 may be provided for a coupling between a front surface cover member 1800 described below and the socket member 1600. The second protruding projection 1661 may be fitted-coupled to the front surface cover member 1800. Accordingly, the front surface cover member 1800 and the socket member 1600 may be coupled.

The socket member 1600 may be provided with a plurality of first coupling parts 1420 and a plurality of second coupling parts 1660. In this embodiment, the socket member 1600 may be provide with two first coupling parts 1420 and four second coupling parts 1660, for example, but not limited. The number of the first coupling parts 1420 and the second coupling parts 1660 may increase or decrease when necessary.

Additionally, the socket member 1600 may further include a third coupling part 1670. The third coupling part 1670 may protrude from the first connecting and supporting part 1630, specifically, the flange-shaped part 1631 rearward. The third coupling part 1670 may be formed into a hook.

The third coupling part 1670 may be fitted-coupled to the first control board 500 through a fastening hole 520 formed on the first control board 500, and accordingly, the socket member 1600 may be fixed to the first control board 500.

The socket member 1600 may be provided with a plurality of third coupling parts 1670. The plurality of third coupling parts 1670 may be spaced a predetermined distance apart from each other along a perimeter direction of the flange-shaped part 1631. The plurality of third coupling parts 1670 disposed as described above may be coupled to the first control board 500 at a plurality of points, such that the socket member 1600 and the first control board 500 may be stably coupled.

[Structure of Knob]

Referring to FIGS. 13 to 15, the knob 1300 may be a component for the user to rotate for manipulation, and connect to the shaft 1100 through the shaft coupling part 1310. The knob 1300 may further include a skirt part 1320.

The skirt part 1320 may be disposed outside the shaft coupling part 1310 in the diameter direction. The skirt part 1320 may include a surface extending in the front-rear direction. In this embodiment, the skirt part 1320 is formed in to a cylinder having a hollow hole. The knob 1300 including the shaft coupling part 1310 and the skirt part 1320 may be formed in a way that the shaft coupling part 1310 and the skirt part 1320 form a concentric circle.

The knob 1300 may further include a second connecting and supporting part 1330. The second connecting and supporting part 1330 may be disposed at the rear of the shaft coupling part 1310 and formed into a circular plate connecting between the shaft coupling part 1310 and the skirt part 1320 from the rear of the shaft coupling part 1310.

The second connecting and supporting part 1330 formed as described above may enable the shaft coupling part 1310 and the skirt part 1320 to connect to each other, and support the skirt part 1320 such that the skirt part 1320 is not dent in a radial direction.

The second connecting and supporting part 1330 may be disposed near the front of the inner supporter 1620 included in the socket member 1600, and when the knob 1300 moves rearward, may be a portion pressing the inner supporter 1620 rearward.

The manipulation device 1000 in this embodiment may further include a knob cover 1350. The knob cover 1350 may be formed into a cylinder having a rear open. The knob cover 1350 may be coupled to an outer circumferential surface of the skirt part 1320 and encircle the knob 1300 from the outside in the diameter direction.

In this embodiment, a coupling groove 1321 may be formed on the outer circumferential surface of the skirt part 1320. The coupling groove 1321 may be concave from the outer circumferential surface of the skirt part 1320 in the radial direction. The knob cover 1350 may be mounted onto the skirt part 1320 in a state of being inserted into coupling groove 1321.

In this case, the knob cover 1350 may be disposed at the knob 1300 in a way that the knob cover 1350 is not exposed from the skirt part 1320 in the centrifugal direction. That is, the knob cover 1350 may be formed at the skirt part 1320 in a way that the knob cover 1350 forms the same flat surface as a centrifuge-wise outer most surface of the skirt part 1320 adjacent to the knob cover 1350.

The knob cover 1350 may include a front surface part 1360 and a lateral surface part 1370. The front surface part 1360 may include a surface crossing a shaft extending in the front-rear direction.

A front surface of the front surface part 1360 may be disposed at the same height as the front surface of the door front surface part 350. A rear surface of the front surface part 1360 may contact ends on front sides of the shaft coupling part 1310 and the skirt part 1320 when the knob cover 1350 is disposed at the knob 1300. As the rear surface of the front surface part 1360 contacts the ends on the front sides of the shaft coupling part 1310 and the skirt part 1320, a front-rear position of the knob cover 1350 disposed at the knob 1300 may be guided.

The knob cover 1350 may be a portion held by the user's hand to manipulate the knob 1300 and forming an exterior of the knob 1300. Accordingly, the knob cover 1350 needs to be made of a material appropriate for the user to hold and manipulate the knob and needs to provide aesthetic qualities.

In this embodiment, an outer circumferential surface of the lateral surface part 1370, forming an exterior of the lateral surface of the knob cover 1350, may be disposed at the same height as the outer circumferential surface of the skirt part 1320, which is not covered by the knob cover 1350. Additionally, the front surface of the front surface part 1360, forming an exterior of the front surface of the knob cover 1350, may be disposed at the same height as a front surface of a pressing part 1410 of a button 1400.

Thus, the manipulation device 1000 in this embodiment may have a simple and smooth exterior since the manipulation device 1000 itself has no portion protruding convexly or being dent concavely, thereby ensuring aesthetic qualities that can improve the user's satisfaction.

[Structure of Front Surface Cover Member]

The manipulation device 1000 in this embodiment may further include a front surface cover member 1800. The front surface cover member 1800 may be disposed outside the knob 1300 in the diameter direction of the knob 1300. Additionally, the front surface cover member 1800 may be disposed in front of the door front surface part 1360 to be exposed to the front of the door 300.

The front surface cover member 1800 may be disposed outside the knob 1300 in the diameter direction of the knob 1300 in a way that encircles the knob 1300 from the outside in the diameter direction thereof. In this embodiment, the front surface cover member 1800 is formed into a ring that encircles the knob 1300 from the outside in the diameter direction, for example.

The front surface cover member 1800 may be disposed at the front of the socket member 1600, and coupled to the front of the socket member 1600. The front surface cover member 1800 may shield the socket member 1600, specifically, an outer support portion 1610 at the front of the socket member 1600.

The front surface cover member 1800, formed into a ring, may have a shape corresponding to a shape of the outer support portion 1610 seen from the front. The front surface cover member 1800 may be coupled to the socket member 1600 and cover the outer support portion 1610 from the front. Accordingly, a front of the light passing hole 1640 formed in the outer support portion 1610 may be shielded by the front surface cover member 1800, such that the light passing hole 1640 and the light emitting member 1700 at the rear of the light passing hole 1640 may be covered by the front surface cover member 1800 and not be seen from the outside.

Additionally, the front surface cover member 1800 may be made of a light transmitting material or a semi-light transmitting material. In this embodiment, the front surface cover member 1800 is made of a semi-light transmitting material having metal texture, for example. The front surface cove member 1800 may prevent the socket member 1600, the light passing hole 1640 formed at the socket member 1600, and the light emitting member 1700 from being exposed to the outside, and may allow light emitted from the light emitting member 1700 to have a softly diffused glow.

That is, the front surface cover member 1800 may be used as a finishing material that covers a portion, which would otherwise be exposed to the outside of the door 300 and deteriorate an aesthetic quality, to provide an aesthetic quality, may have metal texture to make the finishing portion look more exquisite, and may allow light shining through the portion to have a softly diffused glow.

The front surface cover member 1800 may provide an aesthetic quality to the manipulation device 1000 and the area around the manipulation device, and may make a display light of the manipulation device 1000 look more soft and beautiful.

Each of the light emitting members 1700 may be lit in association with a rotation of the shaft 1100.

In an example, as a result of rotation of the shaft 1100, a light emitting member 1700 in response to the rotation may be lit, and when the shaft 1100 continues to rotate, another light emitting member 1700 in response to the rotation may be lit.

The rotation of the shaft 1100 may be detected by the encoder 1200. Information on the rotation of the shaft 1100, obtained by the encoder 1200, may be generated as a manipulation signal, and a controller on the first control board 500 may receive the information and control the turn-on of the light emitting member 1700.

The front surface cover member 1800 and the socket member 1600 may be fitted-coupled. To this end, the front surface cover member 1800 may be provided with a coupling boss 1810. The coupling boss 1810 may protrude from the front surface cover member 1800 rearward.

The second coupling part 1660, specifically, the second protruding projection 1661 of the socket member 1600 may be fitted-coupled to the coupling boss 1810. Based on the coupling between the coupling boss 1810 and the second coupling part 1660, the front surface cover member 1800 and the socket member 1600 may be coupled.

The front surface cover member 1800 may be provided with a plurality of coupling bosses 1810. In this case, the number and positions of the coupling bosses 1810 may be determined to correspond to the number and positions of the second coupling parts 1660.

The socked member 1600, coupled to the front surface cover member 1800, may be provided with an inserting groove 1611. The inserting groove 1611 may be concavely formed on the inner circumferential surface of the outer supporter 1610 in the centrifugal direction.

In response, the knob 1300 may be provided with a projection 1340. The projection 1340 may protrude from the end of the rear side of the skirt part 1320 in the centrifugal direction. The projection 134, formed as described above, may be inserted into the inserting groove 1611, and thus, may be coupled to the inner circumferential surface of the outer supporter 1610 in a slidable manner.

In this embodiment, the inserting groove 1611 may be open toward the inside and the front of the socket member 1600. Additionally, the front surface cover member 1800 may be disposed at the front of the socket member 1600 and shield the open front of the inserting groove 1611. The projection 1340 may be inserted into a space encircled by the inserting groove 1611 and the front surface cover member 1800.

The projection 1340 may be inserted into the inserting groove 1611 through the open front of the inserting groove 1611, and the knob 1300 may be disposed at the socket member 1600 in a way that the knob can move in the front-rear direction. Additionally, the front surface cover member 1800 may be disposed at the front of the socket member 1600 at which the knob 1300 is disposed such that the knob 1300 is prevented from moving forward and from escaping.

[Withdrawal Structure of Tray]

FIG. 21 is a perspective view showing a tray in one embodiment, and FIG. 22 is a cross-sectional view schematically showing a coupling structure between the tray and the mounting projection in FIG. 21.

Referring to FIGS. 2 and 3 and FIGS. 21 and 22, the tray 200 is disposed in the cooking space 105 formed inside the housing 100. The tray 200 may be installed in a way that the tray can move in the front-rear direction in association with an operation of opening or closing the door 300, and the movement of the tray 200 in the front-rear direction may be guided by the hinge assembly 800.

The tray 200 may include a tray main body 205 and a mounting part 210.

The tray main body 205 has a bottom surface formed in a shape corresponding to the bottom surface 110 of the housing 100. In the present embodiment, the tray main body 205 is illustrated as being formed in the shape of a box which has an open upper portion and is flat in the up-down direction. The bottom surface of the tray main body 205 is formed in a shape corresponding to the bottom surface 110 of the housing 100, e.g., the shape of a quadrilateral plate, and four lateral surfaces of the tray 200 are formed in the form of extending in upward from edges of the bottom surface of the tray 200.

The mounting part 210 is provided at each lateral surfaces facing both lateral surfaces of the housing 100 in the left-right direction among the four lateral surfaces of the tray main body 205. The mounting part 210 may include a first protrusion 211 protruding toward the outside of the tray main body 205 from an upper end portion of the lateral surface of the tray main body 205 and a second protrusion 213 extending downward from an outer end portion of the first protrusion 211. For example, the mounting part 210 may be formed in which the first protrusion 211 and the second protrusion 213 are connected to each other in an L-shape.

The hinge assemblies 800 are associated with the rotation of the door 300 and cause the tray 200 to be withdrawn forward from the inside of the cooking space 105 when the door is opened. Also, the hinge assemblies 800 may be associated with the rotation of the door 300 and cause the tray 200 to be inserted inward toward the inside of the cooking space 105 when the door is closed. The hinge assemblies 800 may be installed at both sides of the housing 100 in the left-right direction so that the hinge assemblies 800 are disposed at both outer sides of the tray 200 in the left-right direction. Also, each of the hinge assemblies 800 may include a hinge part 810 and a mounting projection 820.

The hinge part 810 is provided to be hinge-coupled to the rear side of the door upper surface part 310. A state of the hinge part 810 may be changed by the hinge part 810 in association with rotation of the door 300.

The mounting projection 820 is connected to one of the connecting members of the hinge part 810 inside the hinge case 830 and protrudes toward the inside of the cooking space 105 via the first slot 835 formed in the hinge case 830 and a second slot 125 formed in the housing 100 (see FIG. 3). Here, the second slot 125 may be formed in a lateral surface of the housing 100 and formed with a shape overlapping the first slot 835 and at a position overlapping the first slot 835.

The tray 200 may be mounted on the mounting projection 820. Specifically, the tray 200 may be mounted on the mounting projection 820 by the mounting projection 820 being fitted to the mounting groove 215 formed in the lateral portion of the tray 200 (see FIG. 12).

In this embodiment, the mounting groove 215 is formed in the mounting part 210 provided at each lateral surfaces of the tray 200. The mounting groove 215 may be formed in which a groove is cut out from the mounting part 210, more specifically, from the lower end of the second protrusion 213. The mounting projection 820 may be fitted into the mounting groove 215, and the tray 200 and the mounting projection 820 may be fitted and coupled to each other by the mounting groove 215.

Further, a sliding surface 214 may be formed at the mounting part 210, more specifically, at the lower end of the second protrusion 213. The sliding surface 214 is provided to allow sliding of the mounting projection 820 coming into contact with the lower end of the second protrusion 213. The sliding surface 214 may extend in the front-rear direction and be connected to the mounting groove 215.

The user may perform cooking using the cooking appliance while the tray 200 is installed inside the cooking space 105 or take the tray 200 out of the cooking space 105 in order to take out the cooked food or wash the tray 200.

When taking the tray 200 out of the cooking space 105, the tray 200 may be taken out after slightly lifting the tray 200 upward so that the mounting projection 820 may disengage with the mounting groove 215.

Also, when attempting to install the withdrawn tray 200 back into the cooking space 105, the tray 200 may be pushed to the inside of the cooking space 105 so that the mounting projection 820 is engaged with the mounting groove 215.

However, since the mounting groove 215 is disposed at the lower portion of the tray 200 and the mounting projection 820 is covered by the tray 200, it is difficult for the user to accurately see the positions of the mounting groove 215 and the mounting projection 820.

In consideration of such an aspect, in the present embodiment, the sliding surface 214 is formed at the lower end of the second protrusion 213 so as to extend in the front-rear direction, and the sliding surface 214 is connected to the mounting groove 215.

Accordingly, when pushing the tray 200 back into the cooking space 105, the user does not have to accurately fit the mounting projection 820 into the mounting groove 215 from the beginning. The user just has to push the tray 200 into the cooking space 105 so that the sliding surface 214 is placed on the mounting projection 820 and then move the tray 200 in the front-rear direction until the mounting projection 820 engages with the mounting groove 215.

In this process, the mounting projection 820 may slide on the sliding surface 214 due to the tray 200 moving in the front-rear direction and then be engaged with the mounting groove 215.

That is, the mounting projection 820 does not have to be accurately fitted to the mounting groove 215 for installing the tray 200 back into the cooking space 105. Simply by placing the tray 200 on the mounting projection 820 and then moving the tray 200 in the front-rear direction, the mounting projection 820 and the mounting groove 215 may be fitted and coupled to each other and, in this way, fitting and coupling the mounting projection 820 and the tray 200 to each other may be easily and promptly performed.

The above-described structure for fitting and coupling the mounting groove 215 and the mounting projection 820 to each other is merely an example, and various other modifications may be possible.

FIG. 23 is a cross-sectional view schematically showing another coupling structure between the tray and the mounting projection in FIG. 22, and FIG. 24 is a view showing a procedure for a coupling between the tray and the mounting projection in FIG. 23. Additionally, FIG. 25 is a cross-sectional view schematically showing yet another coupling structure between the tray and the mounting projection in FIG. 22, and FIG. 26 is a view showing a procedure for a coupling between the tray and the mounting projection in FIG. 25.

As one of the modifications of the structure for fitting and coupling the mounting groove 215 and the mounting projection 820 to each other, as illustrated in FIG. 23, an inclined surface 215a may be formed between the mounting groove 215 and the sliding surface 214. As illustrated in FIG. 24, the inclined surface 215a may be formed on a path along which the mounting projection 820, which slides while in contact with the sliding surface 214, inserts into the mounting groove 215 and may guide the movement of the mounting projection 820.

When the inclined surface 215a is formed between the mounting groove 215 and the sliding surface 214 as described above, impact and noise that may be generated during the process in which the mounting projection 820 is being fitted into the mounting groove 215 may be reduced, and, in this way, fitting and coupling the tray 200 and the mounting projection 820 to each other may be more smoothly and stably performed.

The inclined surface 215a may be disposed at a rear side of the mounting groove 215. This is a result of designing in consideration of the fact that, when the user pushes the tray 200 into the cooking space 105 in order to install the tray 200 inside the cooking space 105, the tray 200 is often not pushed enough to the position where the mounting groove 215 and the mounting projection 820 are fitted and coupled to each other.

When the inclined surface 215a is formed at the rear side of the mounting groove 215 as described above, fitting and coupling between the mounting groove 215 and the mounting projection 820 may be smoothly and stably guided even when the tray 200 is mounted on the mounting projection 820 in a state in which the tray 200 is not pushed enough to position where the mounting groove 215 and the mounting projection 820 are fitted and coupled to each other.

As another one of the modifications of the structure for fitting and coupling the mounting groove 215 and the mounting projection 820 to each other, as illustrated in FIG. 25, a fitting groove 215b may be further provided in the second protrusion 213. The fitting groove 215b may be formed in which a portion of the second protrusion 213 is cut out. The fitting groove 215b may be formed in a groove which is concavely depressed in the front-rear direction. The fitting groove 215b may be formed to be connected to the mounting groove 215 in such a way that the fitting groove 215b is concavely depressed in the front-rear direction at an upper end of the mounting groove 215.

The fitting groove 215b may be disposed at a front side of the mounting groove 215. Accordingly, when the mounting projection 820 is engaged with the mounting groove 215, and the user further pushes the tray 200 rearward toward the inside of the cooking space 105 as illustrated in FIG. 26, the mounting projection 820 which has engaged with the mounting groove 215 may be engaged with the fitting groove 215b extending to the front of the mounting groove 215.

When the mounting projection 820 and the fitting groove 215b are fitted and coupled to each other as described above, since movement of the tray 200 in the up-down direction is restricted by the coupling between the mounting projection 820 and the fitting groove 215b, the risk of the tray 200's falling over is significantly lowered.

Meanwhile, the mounting projection 820 may be associated with a change in the state of the hinge part 810 to move in the front-rear direction. The mounting projection 820 may move the tray 200 mounted on the mounting projection 820 in the front-rear direction. That is, the tray 200 mounted on the mounting projection 820 may be moved in the front-rear direction in association with the movement of the mounting projection 820 in the front-rear direction.

Figure 32:
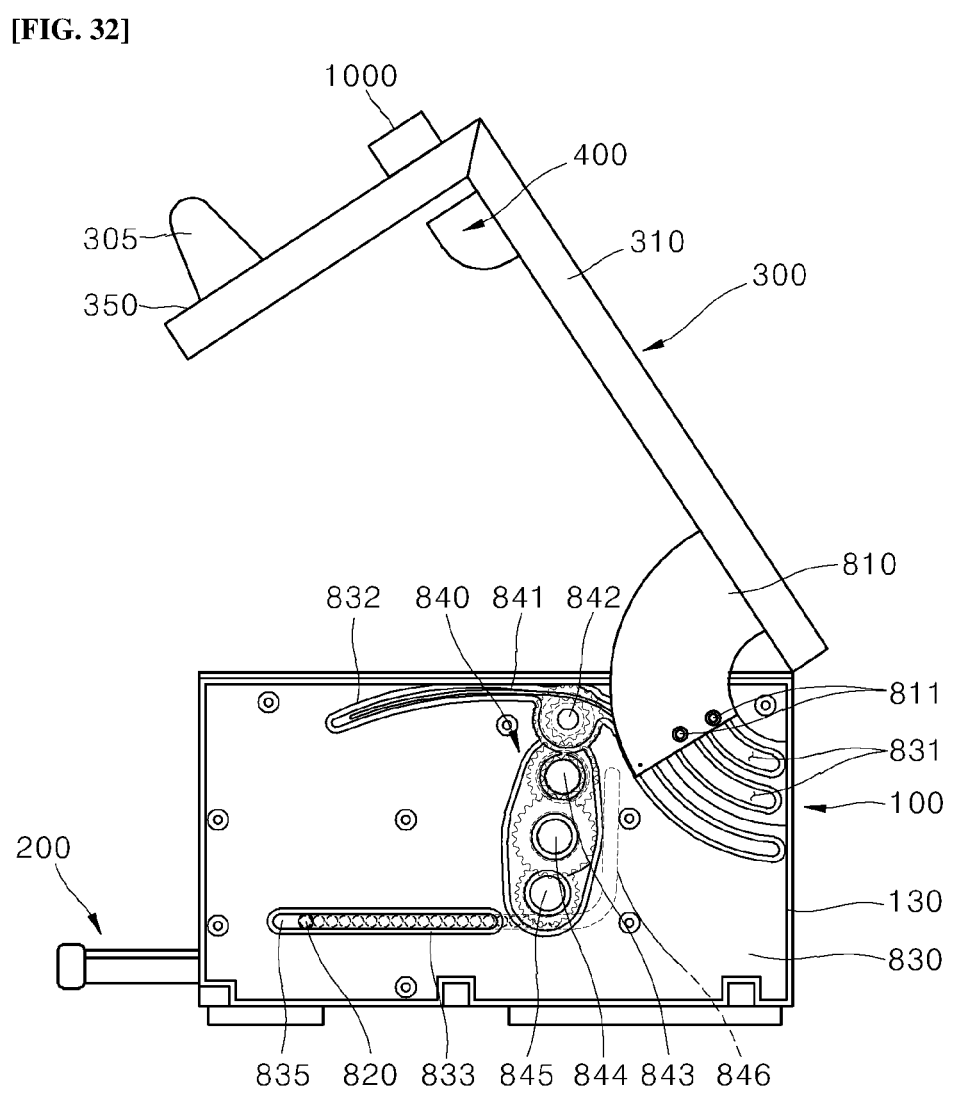

FIG. 27 is a perspective view showing a state in which the door of the cooking appliance in one embodiment is closed, and FIG. 28 is a cross-sectional view taken along line "XXVIII-XXVIII" in FIG. 27. Additionally, FIG. 29 is a cross-sectional view taken along line "XXIX-XXIX" in FIG. 27, and FIG. 30 is a perspective view showing a state in which the door of the cooking appliance in FIG. 27 is open. Further, FIG. 31 is a cross-sectional view taken along line "XXXI-XXXI" in FIG. 30, and FIG. 32 is a cross-sectional view taken along line "XXXII-XXXII" in FIG. 30.

In this embodiment, in a state in which the cooking space 105 is closed by the door 300 as illustrated in FIGS. 27 and 28, the tray 200 is inserted into the cooking space 105 (see FIG. 18). Also, the mounting projection 820 on which tray 200 is mounted is disposed at a position biased toward the rear side of the cooking space 105.

The rear side of the tray 200 may be supported by a pair of mounting projections 820. Also, the front side of the tray 200 may be supported by a pair of support rollers 115.

That is, the tray 200 may be stably supported by the pair of mounting projections 820 disposed at the rear side and the pair of support rollers 115 disposed at the front side and may be installed in the cooking space 105 so as to be movable in the front-rear direction.

The support rollers 115 may be disposed at both the lateral surfaces 120 and 130 of the housing 100 in such a way that the support rollers 115 are disposed at the front side of the housing 100 adjacent to the door 300. The mounting part 210, more specifically, the sliding surface 214 (see FIG. 38), of the tray 200 may be seated on the support roller 115. The support roller 115 may roll along with the movement of the tray 200 and support the tray 200 so that the tray 200 may move smoothly.

Also, the door 300 may be rotatably installed at the housing 100 via the hinge assemblies 800 and rotate in the up-down direction to open or close the cooking space 105.

The hinge assemblies 800 are disposed at both lateral portions of the housing 100, and a rear side of the door upper surface part 310 is rotatably coupled to the hinge assemblies 800.

That is, a left side corner portion and a right side corner portion at the rear side of the door upper surface part 310 are rotatably coupled to the hinge assemblies 800 disposed at both the lateral portions of the housing 100. The door 300 opens or closes the upper surface and the front surface of the housing 100 by rotating in an up-down direction about the rear side of the door upper surface part 310 rotatably coupled to the hinge assemblies 800.

Referring to FIGS. 27 to 29, each of the hinge assemblies 800 may include a hinge case 830, the hinge part 810, the mounting projection 820, and a converting and outputting part 840.

The hinge case 830 forms an exterior of the hinge assembly 800 and houses portions of the hinge part 810 and the mounting projection 820 and the converting and outputting part 840 therein. Various structures for supporting the hinge part 810, the mounting projection 820, and the converting and outputting part 840 may be formed in the hinge case 830.

The hinge part 810 is installed in the hinge case 830 such that the position of the hinge part 810 is changeable. The hinge part 810 may be installed in the hinge case 830 such that the hinge part 810 may rotate along a trajectory corresponding to a rotational trajectory of the door 300. An upper end of the hinge part 810 may be coupled to the door 300. The posture of the hinge part 810 coupled to the door 300 in this way may be changed by the hinge part 810 in association with the rotation of the door 300. Also, the trajectory and range of rotation of the door 300 coupled to the hinge part 810 may be guided by the hinge part 810.

For example, the hinge part 810 may be provided in the form of a flat plate. The hinge part 810 maybe formed to be curved along the shape corresponding to the rotational trajectory of the door 300.

Also, a guiding hole 831 formed in the shape corresponding to the rotational trajectory of the door 300 may be provided in the hinge case 830. The guiding hole 831 may be formed in the hinge case 830 to pass through the hinge case 830 in the left-right direction. The guiding hole 831 formed in this way may provide a passage for guiding a rotation path of the hinge part 810 in the hinge case 830.

For example, the guiding hole 831 may be provided to form a passage which gradually ascends toward the front and gradually descends toward the rear.

A stopper 811 may be provided in the hinge part 810. The stopper 811 may be provided to protrude from the hinge part 810 so as to protrude in the left-right direction. The stopper 811 may be inserted into the guiding hole 831 and move along the passage formed by the guiding hole 831. That is, the stopper 811 may guide the rotation of the hinge part 810 by moving along the guiding hole 831.

Also, at the front and upper end portions of the guiding hole 831, the stopper 811 may interfere with the hinge case 830 which restricts further forward and upward movements of the hinge part 810. At the rear and lower end portions of the guiding hole 831, the stopper 811 may interfere with the hinge case 830 which restricts further rearward and downward movements of the hinge part 810. That is, the hinge part 810 may limit the range of movement of the stopper 811 to a range corresponding to the range in which the guiding hole 831 is formed.

The mounting projection 820 is connected to any one of the components constituting the converting and outputting part 840 inside the hinge case 830 and protrudes toward the inside of the cooking space 105 via the first slot 835 formed in the hinge case 830 and the second slot 125 formed in the housing 100. Here, the second slot 125 may be formed in the lateral surface of the housing 100 and formed with a shape overlapping the first slot 835 and at a position overlapping the first slot 835.

The converting and outputting part 840 is provided inside the hinge case 830. The converting and outputting part 840 may convert a rotary force input by a change in the posture of the hinge part 810 to a linear force for moving the mounting projection 820 in the front-rear direction. The converting and outputting part 840 may include a moving member and a converting member.

The moving member corresponds to a component which moves the mounting projection 820 in the front-rear direction. Also, the converting member corresponds to a component which moves the moving member in the front-rear direction in association with a change in the posture of the hinge part 810, that is, movement of the hinge part 810.

For example, the converting and outputting part 840 may include a belt 841, a plurality of rotary gears 842, 843, 844, and 845, and a rack gear 846. Among the components, the belt 841 and the plurality of rotary gears 842, 843, 844, and 845 are illustrated as corresponding to the converting members. The rack gear 846 is illustrated as corresponding to the moving member.

The belt 841 is provided in the form of an open timing belt in which teeth are formed on at least one of an upper surface and a lower surface. A first guide rib 832 provided to protrude from an inner lateral surface of the hinge case 830 may restrict a vertical position of the belt 841 and guide a front-rear movement path of the belt 841.

A rear side end portion of the belt 841 may be connected to the hinge part 810. The belt 841 may be moved in the front-rear direction in association with a change in the posture of the hinge part 810. For example, when the hinge part 810 moves forward and upward, the belt 841 may move forward in association with the movement of the hinge part 810. Also, when the hinge part 810 moves rearward and downward, the belt 841 may move rearward in association with the movement of the hinge part 810.

The teeth formed at the belt 841 may be engaged with the plurality of rotary gears 842, 843, 844, and 845.

The first rotary gear 842 is disposed most adjacent to the belt 841 among the plurality of rotary gears 842, 843, 844, and 845. In the present embodiment, the first rotary gear 842 is illustrated as being formed including a timing gear. The first rotary gear 842 may be engaged with the belt 841 and be rotated in association with the movement of the belt 841.

The second rotary gear 843 and the third rotary gear 844 are disposed between the first rotary gear 842 and the fourth rotary gear 845 to transmit rotation of the first rotary gear 842 to the fourth rotary gear 845.

That is, the movement of the belt 841 is performed in association with a change in the posture of the hinge part 810, and the rotation of the plurality of rotary gears 842, 843, 844, and 845 is performed in association with the movement of the belt 841. Therefore, a change in the posture of the hinge part 810 causes the rotation of the fourth rotary gear 845.

The fourth rotary gear 845 rotated as described above may be engaged with the rack gear 846 disposed below the fourth rotary gear 845. A second guide rib 833 provided to protrude from the inner lateral surface of the hinge case 830 may restrict a vertical position of the rack gear 846 and guide a front-rear movement path of the rack gear 846.

The rack gear 846 may be moved in the front-rear direction in association with rotation of the fourth rotary gear 845. For example, when the hinge part 810 moves forward and upward and the fourth rotary gear 845 is rotated in a first direction according to the movement of the hinge part 810, the rack gear 846 interlocked therewith may move forward (see FIG. 32). Also, when the hinge part 810 moves rearward and downward and the fourth rotary gear 845 is rotated in a second direction, which is the reverse of the first direction, according to the movement of the hinge part 810, the rack gear 846 interlocked therewith may move rearward (see FIG. 29).

The mounting projection 820 is coupled to the rack gear 846. Accordingly, the mounting projection 820 may be associated with movement of the rack gear 846 and move in the front-rear direction. For example, when the rack gear 846 moves forward, the mounting projection 820 may also move forward according to the movement of the rack gear 846, and, when the rack gear 846 moves rearward, the mounting projection 820 may also move rearward according to the movement of the rack gear 846.

In summary, each of the hinge assemblies 800 having the above-described configuration is provided so that states of the components constituting each of the hinge assemblies 800, that is, the hinge part 810 and the converting and outputting part 840, may be changed in association with the rotation of the door 300 and the components whose states are changed in this way may move the mounting projection 820 in the front-rear direction.

As illustrated in FIGS. 30 to 32, when the door 300 rotates upward to open the cooking space 105, a rotary force due to the rotation of the door 300 changes the state of the hinge part 810 of the hinge assembly 800, and the mounting projection 820 moves forward as a result. Also, the tray 200 may move forward due to the mounting projection 820 moving forward and be withdrawn to the outside of the cooking space 105.

That is, when the door 300 is opened, the tray 200 is automatically withdrawn. Accordingly, the user may easily and safely put food to be cooked on the tray 200 or take out the cooked food on the tray 200 from the tray 200 and may easily take out the tray 200, which has withdrawn forward, from the inside of the cooking space 105 and move the tray 200.

Furthermore, in the cooking appliance of the present embodiment, the door 300 is provided to be able to open both the front surface and the upper surface of the cooking space 105. Accordingly, the user may insert or withdraw food or the tray 200 into or from the cooking space 105 through a much larger opening as compared with a cooking appliance where the door only opens at the front side of the cooking space 105.

That is, the cooking appliance of the present embodiment may not only provide a much larger opening for allowing the user to easily and conveniently insert or withdraw food or the tray 200 into or from the cooking space 105 but also provide a function of allowing the food or the tray 200 to be more easily and conveniently withdrawn by the automatic withdrawal of the tray 200 when the door 300 is opened.

The cooking appliance of the present embodiment may also provide a function of allowing the tray 200 to be automatically inserted into the cooking space 105 when the door 300 is closed as long as the tray 200 is mounted on the mounting projection 820. The function may contribute to improving convenience and safety of the cooking appliance by eliminating the need for the user to put their hand inside the cooking space 105 filled with hot air when the user wants to put the tray 200 back into the cooking space 105 after taking out the tray 200 from the cooking space 105 while cooking is performed.

Further, according to the cooking appliance of the present embodiment, since the door 300 is opened by rotating upward as opposed to the door being unfolded forward, there is little concern about the center of gravity of the cooking appliance being biased toward the front even when the door 300 is opened. Rather, when the door 300 is opened, the center of gravity of the door 300 moves further to the rear than when the door 300 is closed.

In the structure in which the center of gravity of the cooking appliance moves to the rear when the door 300 is opened, the risk of the cooking appliance's falling over when the door 300 is opened is significantly lowered. Also, in the structure, the weight of the tray 200 may be freely increased because the risk of the cooking appliance's falling over is low even when the weight of the tray is increased. That is, in the above structure, it is possible to use the tray 200 which is thicker and heavier than that used in the structure in which the door unfolds forward.

The thicker and heavier the tray 200 is, the better the high-temperature cooking performance and the easier it is to maintain warmth for a long time. Therefore, better cooking performance may be expected to an extent that the tray 200 is thicker and heavier.

Also, the tray 200 usable in an environment heated by the induction heating part generally weighs more than an ordinary tray. Therefore, when it becomes possible to use the tray 200 which is much thicker and heavier than the ordinary tray, even when the second heating part 600 is provided in the form of an induction heating part, it is possible to provide the tray 200 suitable for the second heating part 600.

[Structure for Suppressing Fall of Cooking Appliance]

As described above, in the cooking appliance of the present embodiment, the tray 200 may be withdrawn forward when the door 300 is opened. Also, the tray 200 may be provided that is thicker and heavier than ordinary trays in order to improve high-temperature cooking performance and warmth maintaining performance.

In a state in which the tray 200 is withdrawn forward, the center of gravity of the cooking appliance is biased toward the front as much as the extent to which the tray 200 is withdrawn, and thus a risk of the cooking appliance's falling over is inevitably increased.

In consideration of such an aspect, the cooking appliance of the present embodiment includes various forms of configurations for preventing the cooking appliance from falling over when the door 300 is opened.

Hereinafter, configurations for preventing the cooking appliance from falling over when the door 300 is opened will be described in detail.

FIG. 33 is a view illustrating a center-of-mass change state in the door-opened state of the cooking appliance.

Referring to FIGS. 30 to 33, the hinge part 810 is disposed at both the lateral surfaces 120 and 130 of the housing 100 in such a way that the hinge part 810 is disposed at sides adjacent to the rear surface 140 of the housing 100. That is, the hinge part 810 is disposed at the rear of both sides of the housing 100.

The hinge part 810 is coupled to the door 300 in such a way that the hinge part 810 is coupled to the rear side of the door upper surface part 310. That is, the hinge part 810 is coupled to the rear of each sides of the door upper surface part 310, and the door 300 may open or close the cooking space 105 by rotating in the up-down direction about the rear side of the door upper surface part 310 coupled to the hinge part 810 as described above.

The door 300 may rotate about the rear side of the door upper surface part 310 such that, in a state in which the front surface and the upper surface of the housing 100 are opened (hereinafter referred to as "opened state"), the door 300 is located further behind than in a state in which the front surface and the upper surface of the housing 100 are closed (hereinafter referred to as "closed state").

By the door 300 rotating about the rear side of the door upper surface part 310 as described above, the position of the door 300 may be further biased toward the rear in the opened state than in the closed state.

The door 300 whose position is relatively further biased toward the rear in the opened state as described above may cause the center of gravity of the cooking device to be biased toward the rear from the center of the cooking appliance in the front-rear direction when the door 300 is in the opened state.

That is, the first configuration provided for preventing the cooking appliance from falling over when the door 300 is opened is allowing the door 300 to rotate about the rear side of the door upper surface part 310. Accordingly, the position of the door 300 may be further biased toward the rear in the opened state than in the closed state, and, in this way, the center of gravity of the cooking appliance may be formed to be biased toward the rear from the center of the cooking appliance in the front-rear direction ($G_1 \rightarrow G_1'$) when the door 300 is in the opened state.

Meanwhile, when looking at the configuration of the door 300 itself, the door 300 is provided in which the up-down length of the door front surface part 350 is shorter than the front-rear length of the door upper surface part 310. That is, when the door 300 is in the closed state, the up-down length of the door front surface part 350 is shorter than the front-rear length of the door upper surface part 310.

Accordingly, in the door 300, the proportion occupied by the volume of the door upper surface part 310 is larger than the proportion occupied by the volume of the door front surface part 350. Accordingly, in the total weight of the door 300, the proportion occupied by the weight of the door upper surface part 310 is larger than the proportion occupied by the weight of the door front surface part 350. Accordingly, the center of gravity of the door 300 may be placed more eccentrically to the rear than to the front-rear center of the door 300 ($G_2 \rightarrow G_2'$).

When the door 300 is rotated rearward to be opened, the center of gravity of the door 300 gradually moves rearward. In the door 300, the door front surface part 350 is disposed at the front side, and the door upper surface part 310 is disposed behind the door front surface part 350.

Accordingly, the larger the proportion occupied by the weight of the door upper surface part 310 with respect to the total weight of the door 300, the greater the extent to which the center of gravity of the door 300 moves rearward when the door 300 rotates rearward.

In other words, the greater the proportion occupied by the weight of the door upper surface part 310 with respect to the total weight of the door 300, the easier it is for the center of gravity of the door 300 to promptly move rearward when the door 300 rotates rearward. Since the center of gravity of the door 300 moves to the rear, the center of gravity of the cooking appliance may entirely move to the rear more rapidly.

That is, the second configuration provided for preventing the cooking appliance from falling over when the door 300 is opened is providing the door 300 in which the up-down length of the door front surface part 350 is shorter than the front-rear length of the door upper surface part 310. Accordingly, when the door 300 rotates rearward, the center of gravity of the door 300, and thus the center of gravity of the cooking appliance may move further rearward more promptly.

Meanwhile, the first heating part 400 and the see-through window W are provided in the door 300, and the first heating part 400 and the see-through window W are disposed in the door upper surface part 310.

As described above, the see-through window W may include a pair of glasses 330 and 335 (see FIG. 11). Generally, glasses are formed of a heavyweight material. Therefore, when the see-through window W formed of glass is disposed in the door upper surface part 310, the weight of the door upper surface part 310 is inevitably increased as much as the weight of the see-through window W.

Furthermore, the see-through window W of the present embodiment may include a pair of glasses 330 and 335, i.e., two layers of glasses. Therefore, the weight of the door upper surface part 310 is inevitably increased as much as the weight of the see-through window W.

Since the see-through window W is disposed in the door upper surface part 310 as described above, the proportion occupied by the weight of the door upper surface part 310 with respect to the total weight of the door 300 is increased as much as the weight of the glasses forming the see-through window W.

Accordingly, when the door 300 rotates rearward, the center of gravity of the door 300, and thus the center of gravity of the cooking appliance may more promptly move further rearward as much as the increase in the weight of the door upper surface part 310 due to the see-through window W.

Further, the pair of first heating parts 400 are disposed at the bottom surface side of the door upper surface part 310. In this case, the first heating part 400 is disposed at each of the front outer side and the rear outer side of the see-through window W. One of the pair of first heating parts 400 is disposed at the rear side of the door upper surface part 310 adjacent to the hinge part 810.

Since the first heating part 400 is disposed in the door upper surface part 310 as described above, the proportion occupied by the weight of the door upper surface part 310 with respect to the total weight of the door 300 is further increased as much as the weight of the first heating part 400.

Accordingly, when the door 300 rotates rearward, the center of gravity of the door 300, and thus the center of gravity of the cooking appliance may more promptly move further rearward as much as the increase in the weight of the door upper surface part 310 due to the first heating part 400.

Furthermore, due to the first heating part 400 disposed at the rear side of the door upper surface part 310 adjacent to the hinge part 810, the center of gravity of the door 300 may move further rearward. In this way, when the door 300 rotates rearward, the center of gravity of the door 300, and thus the center of gravity of the cooking appliance may more promptly move further rearward.

That is, the third configuration provided for preventing the cooking appliance from falling over when the door 300 is opened is placing the first heating part 400 and the see-through window W in the door upper surface part 310. Accordingly, when the door 300 rotates rearward, the center of gravity of the door 300 may more promptly move further rearward.

In summary, the door 300 of the present embodiment is provided in which the position of the door 300 moves rearward when the door 300 rotates rearward, the up-down length of the door front surface part 350 is shorter than the front-rear length of the door upper surface part 310, and the first heating part 400 and the see-through window W are disposed in the door upper surface part 310.

The door 300 is provided so that, when the cooking space 105 is opened and the tray 200 is withdrawn forward as a result, the door 300 itself is moved toward the rear of the cooking appliance, and the center of gravity of the door 300 promptly moves rearward according to the rearward rotation of the door 300.

Since the door 300 provided as described above causes the center of gravity of the cooking appliance to be biased toward the rear from the center in the front-rear direction when the cooking space 105 is opened and the tray 200 is withdrawn forward as a result, the door 300 may contribute to significantly lowering the risk of the occurrence of the cooking appliance's falling over.

Meanwhile, the door 300 rotates about the rear side of the door upper surface part 310 coupled to the hinge part 810. When the door 300 is in the opened state, most of the load of the door 300 acts toward the hinge part 810.

Since the hinge part 810 is disposed at the rear side of the cooking appliance, when the door 300 is in the opened state, most of the load of the door 300 is concentrated on the rear side of the cooking appliance.

Therefore, when the door 300 is in the opened state, the center of gravity of the cooking appliance moves toward the rear side of the cooking appliance to the extent that most of the load of the door 300 is concentrated on the rear side of the cooking appliance.

In other words, when the door 300 is in the opened state, in addition to the influence of the change in the position of the door 300 itself and the change in the center of gravity of the door 300 itself, an additional influence is caused by most of the load of the door 300 being concentrated on the rear side of the cooking appliance. In this way, the center of gravity of the cooking appliance may be further biased toward the rear side.

That is, the fourth configuration provided for preventing the cooking appliance from falling over when the door 300 is opened is a configuration in which a coupling point between the door 300 and the hinge part 810 is disposed at the rear side of the cooking appliance so that an additional influence is caused by most of the load of the door 300 being concentrated on the rear side of the cooking appliance.

Also, when the door 300 is in the opened state, moment is applied to the cooking appliance around a portion where the door 300 and the hinge part 810 are coupled to each other. The moment acts as a force rotating the cooking appliance forward. That is, as the moment becomes greater, the force attempting to rotate the cooking appliance forward becomes larger, and the risk of the cooking appliance's falling over is also increased.

Further, when the door 300 is in the opened state, the tray 200 is withdrawn forward, and moment acting from the tray 200 withdrawn in this way is applied to the cooking appliance. The moment also acts as the force rotating the cooking appliance forward.

Accordingly, the force equivalent to the sum of the moment acting from the door 300 and the moment acting from the tray 200 may act as a force further increasing the risk of the cooking appliance's falling over.

The size of the moment acting from the door 300 may be determined by a force acting on the door 300 and a distance between a position on which the force acts and a rotation shaft (portion where the door and the hinge part are coupled to each other). In this case, only gravity acts on the door 300 unless a separate force is applied thereto. Since gravity acts on the entire part of the door 300, it can be seen that gravity acts on the center of gravity of the door 300. Therefore, the moment increases ($M_1$) as the center of gravity of the door 300 moves away from the portion where the door 300 and the hinge part 810 are coupled to each other and decreases ($M_2$) as the center of gravity of the door 300 approaches the portion where the door 300 and the hinge part 810 are coupled to each other.

In this embodiment, as the door 300 rotates rearward to open the cooking space 105, the center of gravity of the door 300 also moves rearward, and, as a result, the size of the moment acting from the door 300 may be decreased together ($M_1 \rightarrow M_2$).

That is, when the door 300 is in the opened state, the moment acting from the tray 200 may increase due to the tray 200 being withdrawn forward, but the moment acting from the door 300 may relatively decrease.

In this way, since the cooking appliance of the present embodiment allows the size of the moment acting on the cooking appliance due to the door 300 to be decreased, the risk of the cooking appliance's falling over due to the tray 200 withdrawn forward may be significantly lowered.

That is, the fifth configuration provided for preventing the cooking appliance from falling over when the door 300 is opened is a configuration in which the center of gravity of the door 300 is allowed to be more biased toward the rear so that the size of the moment acting on the cooking appliance due to the door 300 is decreased.

Meanwhile, the mounting projection 820 may protrude toward the inside of the cooking space 105 via the first slot 835 formed in the hinge case 830 and the second slot 125 formed in the housing 100.

The first slot 835 and the second slot 125 may provide a passage for allowing the mounting projection 820, which is connected to the converting and outputting part 840 inside the hinge case 830, to protrude toward the inside of the cooking space 105 and provide a passage required for the mounting projection 820 to move in the front-rear direction.

To this end, the first slot 835 and the second slot 125 may be formed to pass through the hinge case 830 and the lateral surface 120 of the housing 100, respectively, and each of the first slot 835 and the second slot 125 may be formed as a slot having an up-down width corresponding to the thickness of the mounting projection 820 and a length extending in the front-rear direction.

Preferably, the front-rear lengths of the first slot 835 and the second slot 125 may be less than ½ of the front-rear length of the tray 200.

The lengths of the first slot 835 and the second slot 125 are related to a withdrawal range of the tray 200. That is, the tray 200 may be withdrawn as the mounting projection 820 moves forward. Since a forward movement range of the mounting projection 820 is limited by the first slot 835 and the second slot 125, the withdrawal range of the tray 200 may be determined by the first slot 835 and the second slot 125.

Therefore, when the front-rear lengths of the first slot 835 and the second slot 125 are less than ½ of the front-rear length of the tray 200, a distance along which the tray 200 is movable is limited to less than ½ of the front-rear length of the tray 200.

Accordingly, when it is assumed that the tray 200 is completely inserted into the cooking space 105 when the mounting projection 820 is disposed at the rearmost end portions of the first slot 835 and the second slot 125, in a case in which the mounting projection 820 is disposed at the foremost end portions of the first slot 835 and the second slot 125, the tray 200 may be withdrawn to the outside of the cooking space 105 only as much as a length less than ½ of the longitudinal length of the tray 200.

This is a result of designing so that the center of gravity of the tray 200 is located inside the cooking space 105 even when the tray 200 is withdrawn. That is, in consideration of the fact that, when the tray 200 is excessively withdrawn, the risk of the tray 200's falling over increases to the extent that the tray 200 is excessively withdrawn. Thus, the center of gravity of the tray 200 is allowed to be located inside the cooking space 105 even when the tray 200 is withdrawn. Also, when the tray 200 is excessively withdrawn and the center of gravity of the cooking appliance is biased to the front, the size of the moment acting on the cooking appliance increases to the extent that the center of gravity of the cooking appliance is biased to the front, and, as a result, the risk of the cooking appliance's falling over also increases.

In consideration of such aspect, in the present embodiment, the tray 200 is allowed to be withdrawn to the outside of the cooking space 105 only as much as a length less than ½ of the longitudinal length of the tray 200. In this way, since the tray 200 is automatically withdrawn when the door 300 is opened, advantageous effects in that withdrawal of food or the tray 200 is more easily and conveniently performed and the risk of the tray 200 and the cooking appliance's falling over is lowered.

In the case of a conventional cooking appliance in which the door only opens the front of a cooking space, when, as described above, the tray 200 is withdrawn to the outside of the cooking space 105 only as much as the length less than ½ of the longitudinal length of the tray 200, various inconveniences may occur.

That is, since the tray 200 is not completely exposed to the outside of the cooking space, it is difficult to properly check the cooking state of food placed on the tray 200, and there is an inconvenience in placing food on the tray 200 or taking out the food placed on the tray 200.

In contrast, in the cooking appliance of the present embodiment, since the upper surface of the cooking space 105 as well as the front surface thereof are opened together when the door 300 is opened, the entire tray 200 may be exposed to the outside even when, as described above, the tray 200 is withdrawn to the outside of the cooking space 105 only as much as the length less than ½ of the longitudinal length of the tray 200.

Therefore, even when the tray 200 is withdrawn to the outside of the cooking space 105 only as much as the length less than ½ of the longitudinal length of the tray 200, it is easy to check the cooking state of the entire food placed on the tray 200, and placing food on the tray 200 or taking out the food placed on the tray 200 may be easily and promptly performed.

That is, the sixth configuration provided for preventing the cooking appliance from falling over when the door 300 is opened is a configuration in which the tray 200 is allowed to be withdrawn to the outside of the cooking space 105 only as much as the length less than ½ of the longitudinal length of the tray 200 so that the tray 200 may be exposed to the outside while the risk of the occurrence of the cooking appliance's falling over is lowered.

[Disposition Structure of Components of Door]

In this embodiment, the manipulation device 1000 and the first control board 500 may be disposed in the door front surface part 350, and the see-through window W and the first heating part 400 may be disposed in the door upper surface part 350.

The above disposition structure is designed to improve the convenience and safety of the cooking appliance as much as possible rather than selected in an arbitrary manner.

Accordingly, the manipulation device 1000 may be disposed in the door front surface part 350 rather than the door upper surface part 310. The see-through window W may be disposed in the door upper surface part 310. Since the see-through window W takes up most of the area of the door upper surface part 310, there is not enough space for the manipulation device 1000 in the door upper surface part 310.

Considering most of the area of the door upper surface part 310 is covered by the glass 330, there is not enough space for the manipulation device 1000 in the door upper surface part 310.

The first heating part 400 may be disposed in the door upper surface part 310 in addition to the see-through window W. The first heating part 400 may be a heat-generating component that generates high-temperature heat, and most of the area of the door upper surface part 310 may be covered with the glass 330 to suppress an increase in the temperature of an outer surface of the door upper surface part contacted by the user.

Since the glass 330 has a thermal conductivity lower than that of a metallic material forming the skeleton of the exterior of the door 300, when most of the area of the upper surface of the door upper surface part 310 is covered with the glass 330, an increase in the temperature of the outer surface of the door upper surface part 310 contacted by the user, which is caused by heat generated by the first heating part 400 and the like, may be suppressed as much as possible.

Even if the glass 330 only covers the see-through widow W instead of covering most of the area of the door upper surface part 310, the manipulation device 1000 may be limitedly installed in the outer area of the see-through window W in the direction of the flat surface of the see-through window W.

However, when the manipulation device 1000 is installed in the outer area, the manipulation device 1000 may be exposed to high-temperature heat since the outer area is right above the first heating part 400.

The manipulation device 1000, installed in such an environment, may adversely affect each of the manipulation switches constituting the manipulation device 1000, a cable electrically connected to each of the manipulation switches or various types of electronic components.

Additionally, the temperature of the door upper surface part 310 may be higher than that of the door front surface part 350 due to the feature in which heat goes up. Further, considering that the first heating part 400 is disposed in the door upper surface part 310, the temperature of most of the area of the door upper surface part 310 may be higher than that of the door front surface part 350.

In this case, the manipulation device 1000, disposed in the door upper surface part 310, may adversely affect the manipulation device 1000 itself, and may cause burns of the user who contacts the door upper surface part 310 during the user's manipulation.

The first heating part 400 may be disposed in the door upper surface part 310. Specifically, the first heating part 400 may be disposed in the upper portion to face the second heating part 600 with the tray 200 between the first heating part 400 and the second heating part 600. When the first heating part 400 is disposed over the tray 200, the first heating part may evenly heat a food item on the tray 200 from above. To this end, the first heating part 400 needs to be disposed in the door upper surface part 310.

When the see-through window W is disposed in the upper portion of the cooking appliance, the user may look into the cooking space 105 from above through the see-through window W formed in the upper portion of the cooking appliance. Accordingly, the user may check the state in which the food item is cooked conveniently and readily with no need to bend the user's knees or lean forward. To this end, the see-through window W needs to be disposed in the door upper surface part 310.

That is, considering various factors, the first heating part 400 and the see-through window 400 may be preferably disposed in the door upper surface part 310, and thus, most of the area of the door upper surface part 310 may be occupied by the first heating part 400 and the see-through window 400.

Accordingly, the manipulation device 1000 may be disposed in the door front surface part 350 rather than the door upper surface part 310. The user ordinarily uses the cooking appliance in the state in which the user faces the cooking appliance. When the manipulation device 1000 is disposed in the door front surface part 350 that is a surface facing the user, the user may recognize the manipulation device 1000 more readily and may manipulate the manipulation device 1000 more conveniently and readily.

Components of great volume may not be installed in the door front surface part 350 unlike the door upper surface part 310. That is, parts such as the see-through window 400 or the first heating part 400, which are heavy and have a large size, may not be installed in the door front surface part 350. Accordingly, the inside of the door front surface part 350 has a greater spared space than the door upper surface part 310 does.

The first control board 500 may be disposed in a space portion in the door front surface part 350. Advantages of the structure, in which the first control board 500 is installed in the door front surface part 350, are described as follows.

The first control board 500 may be provided with various components, circuits and the like in relation to receipt of a manipulation signal input through the manipulation device 1000, generation of a control signal for controlling operations of the first heating part 400 and the second heating part 600, and the like.

When the first control board 500 is installed in the door front surface part 350, the manipulation device 1000 and the first control board 500 may be very close to each other. The first control board 500 is a component that has to electrically connect to the manipulation device 1000 to receive a manipulation signal input through the manipulation device 1000.

When the first control board 500 is disposed very close to the manipulation device 1000, the first control board 500 and the manipulation device 1000 may electrically connect effectively and readily. In this embodiment, the manipulation device 1000 may electrically connect to the first control board 500 in a way that the manipulation device 1000 is directly mounted onto the first control board 500. Accordingly, the manipulation device 1000 and the first control board 500 may connect to each other efficiently.

Additionally, the first control board 500 installed in the door front surface part 350 may also be disposed very close to the first heating part 400. Accordingly, the first heating part 400 and the first control board 500 may electrically connect to each other efficiently and readily.

When the manipulation device 1000 is disposed in the door front surface part 500 as illustrated in this embodiment, the size, number, position and the like of the manipulation device 1000 may be freely designed since the manipulation device 1000 is disposed in the portion that has a greater space than that of the door upper surface part 310 which does not have enough space for installing the manipulation device 1000, and the manipulation device 1000 may be less affected by high-temperature, thereby ensuring improvement in the reliability in the operation and use of the cooking appliance and electrically connecting the manipulation device 1000 and the first control board 500 and the first heating part 400 efficiently and readily.

When the see-through window W and the first heating part 400 are disposed in the door upper surface part 310 and the manipulation device 1000 and the first control board 500 are disposed in the door front surface part 350, as described above, relatively heavy parts may be disposed in the door upper surface part 310, and relatively lightweight parts may be disposed in the door front surface part 350.

That is, the relatively heavy see-through window W and first heating part 400 may be disposed in the door upper surface part 310, and the relatively lightweight manipulation device 1000 and first control board 500 may be disposed in the door front surface part 350. Accordingly, the door upper surface part 310 may be heavier than the door front surface part 350, and the center of gravity of the door 300 may shift to the rear side of the door 300.

Further, in the door 300, the up-down length of the door front surface part 350 may be less than the front-rear length of the door upper surface part 310. Accordingly, the center of gravity of the door 300 may shift to the rear side of the door 300 definitely.

Additionally, when the door 300 is open, most of the load of the door 300 may be applied intensively to the rear side of the cooking appliance since the hinge part 810 is disposed on the rear side of the cooking appliance.

Accordingly, in the state in which the door 300 is open, the center of gravity of the cooking appliance may shift to the rear side of the cooking appliance as much as the load of the door 300 intensively applied to the rear side of the cooking appliance.

Thus, even when the door is opened, it is unlikely that the center of gravity of the cooking appliance shifts forward, the cooking appliance may be prevented from falling, thereby ensuring improvement in safety and usability of the cooking appliance.

In this embodiment, the manipulation device 1000 may be disposed at the door 300 rather than in the housing 100, as described above.

In this embodiment, the door 300 may include a door upper surface part 310 disposed on the upper side thereof and the door front surface part 350 disposed on the front side thereof. Additionally, the see-through window W, which is a component taking up most of the area of the door in a cooking appliance of the related art, may be disposed in the door upper surface part 310. Accordingly, the door front surface part 350 may have enough space for installing the manipulation device 100.

Additionally, since components such as the see-through window W and the first heating part 400 may not be disposed in the door front surface part 350, an enough space portion for installing the first control board 500, a component that needs to be disposed close to the manipulation device 1000, may be formed in the door front surface part 350.

The cooking appliance in this embodiment may create an environment in which the manipulation device 1000 is disposed at the door 300, and accordingly, the manipulation device 1000 may be efficiently disposed at the door 300.

Since the manipulation device 1000 and the first control board 500 are disposed at the door 300 as described above, the first heating part 400, the manipulation device 1000 and the first control board 500 disposed at the door 300 may electrically connect to one another more efficiently.

That is, the electric connection among the first heating part 400, the manipulation device 1000 and the first control board 500 may be done in the door 300, and the length of wires for the electric connection may decrease. Thus, the wiring may be simplified and the wires may tidy up, and the wiring may be done in the door 300 such that wires are not exposed outward.

Further, when the manipulation device 1000 is disposed at the door 300 as in this embodiment, a space for installing the manipulation device 1000 and the first control board 500 may not be prepared in the housing 100.

As a result, the housing 100 may be designed to have a size and shape based on the size of the cooking space 105 and the size of the door 300 without considering a space for installing the manipulation device 1000 and the first control board 500.

Thus, the housing 100 may be scaled down by the space for installing the manipulation device 1000 and the first control board 500, and the door 300 may be scaled up by the size of the hosing 100.

The cooking appliance in this embodiment may have an entrance large enough for the tray 200 and a food item to come in and out while the housing 100 is scaled down, thereby ensuring a compact exterior and improvement in the usability of the cooking appliance.

[Structure in Door Front Surface Part]

FIG. 34 is a perspective view separately showing components constituting a door front surface part.

Referring to FIGS. 14 and 34, the door 300 may include a door main body part 300a. The door main body part 300a may form the exterior of the door 300. The door main body part 300a may be formed in a way that a portion forming the exterior of the door upper surface part 310 and a portion forming the exterior of the door front surface part 350 integrally connect to each other in an L-shape. Hereunder, the portion of the door main body part 300a, forming the exterior of the door upper surface part 310, is referred to as a first door main body part 310a, and the portion of the door main body part 300a, forming the exterior of the door front surface part 350, is referred to as a second door main body part 350a.

The door main body part 300a may be provided with an accommodating space therein. A supporting panel 550 described below, and electronic components such as the first control board 500, a temperature sensor 580 and the like disposed on the supporting panel and the like may be accommodate, in the accommodating space.

An accommodating space in the door main body part 300a may be open toward one side. An accommodating space formed in a first door main body part 310a of the door main body part 300a may be open toward a lower portion. Additionally, an accommodating space formed in a second door main body part 350a of the door main body part 300a may be open toward a rear.

A door rear surface cover 350b may cover one side open of the door main body part 300a. In this embodiment, the door rear surface cover 350b is disposed at a rear of the second door main body part 350a, for example. The door rear surface cover 350b may be disposed at the rear of the second door main body part 350a and cover the rear open of the second door main body part 350a.

Though described hereunder, the door rear surface cover 350b may be coupled to the door main body part 300a by a bracket 590. The door rear surface cover 350b coupled to the door main body part 300a may cover the rear open of the second door main body part 350a such that various electronic components accommodated in the second door main body part 350a are protected in a space encircled by the door main body part 300a and the door rear surface cover 350b.

The supporting panel 550 may be installed in the space encircled by the second door main body part 350a and the door rear surface cover 350b. That is, the supporting panel 550 may be disposed in the door front surface part 350. The supporting panel 550 may be coupled to any one of the door main body part 300a and the door rear surface cover 350b and fixed to an inside of the door main body part 300a.

For example, the supporting panel 550 may be coupled to the second door main body part 350a and the door rear surface cover 350b by a bracket 590. The supporting panel 550 coupled to the second door main body part 350a and the door rear surface cover 350b may be fixed to a position spaced a predetermined distance apart from the second door main body part 350a and the door rear surface cover 350b, specifically, a front surface of the second door main body part 350a. Description in relation this is provided hereunder.

The first control board 500 may be fixed to the supporting panel 550. That is, the first control board 500 may be fixed to the supporting panel 550 and fixed to an inside of the second door main body part 350a. The encoder 1200 and the shaft 110 may be disposed on the first control board 500, and the manipulation device 1000 may connect to the shaft 110.

A through hole 351a, which forms a passage needed to allow the manipulation device 1000 to connect to the shaft 110, may be formed at the second door main body part 350a. A portion of the manipulation device 1000 disposed on the front surface of the door 300 may be inserted into the second door main body part 350a through the through hole 351a.

[Structure of Supporting Panel—Area Regarding First Control Board]

FIG. 35 is a front perspective view separately showing the supporting panel in FIG. 34.

Referring to FIGS. 14, 33 and 34, the supporting panel 550 may have a shape similar to a shape of the front surface of the second door main body part 350a. For example, a front surface of the second door main body part 350a may have a rectangular shape, and similarly, the supporting panel 550 may have a rectangular shape. The supporting panel 550 may include a main panel part 551 and a portion regulating part.

The main panel part 551 may form a skeleton of the supporting panel 550. The main panel part 551 may form a supporting surface that supports the first control board 500.

In this embodiment, the main panel part 551 has a shape, e.g., a rectangular shape, similar to the shape of the front surface of the second door main body part 350*a*, for example.

The main panel part 551 may be made of a hard plastic material. The main panel part 551 may be made of a lightweight insulating material and have enough strength to support the first control board 500 and various electronic components disposed on the first control board.

The position regulating part may be disposed at the main panel part 551. The position regulating part may regulate a position of the first control board 500 supported by the main panel part 551 and may be provided as a structure protruding from the main panel part 551.

The position regulating part may include at least one of a lower portion supporting part 553, a lateral portion supporting part 555. In this embodiment, the position regulating part includes both of the lower portion supporting part 533 and the lateral portion supporting part 555, for example.

The lower portion supporting part 553 may be disposed in a lower portion of the first control board 500, and the lateral portion supporting part 555 may be disposed in a lateral portion of the first control board 500. In this embodiment, the supporting panel 550 may include a first area 550*a* and a second area 550*b*.

The first area 550*a* may be an area in which the first control board 500 is installed, and the second area 550*b* may be an area in which the first control board 500 is not installed. The lower portion supporting part 553 may be disposed in a lower portion of the first area 550*a* while being disposed in the second area 550*b*. The lateral portion supporting part 555 may be disposed in the lower portion of the first area 550*a* while being disposed in the second area 550*b*.

A position of the first control board 500 in the up-down direction and a lateral direction may be regulated by the lower portion supporting part 553 and the lateral portion supporting part 555. The position of the first control board 500 in the up-down direction may be regulated by the lower portion supporting part 553 in the lower portion of the first area 550*a*, and the position of the first control board 500 in the lateral direction may be regulated by the lateral portion supporting part 555 in a lateral portion of the first area 550*a*. Accordingly, the position at which the first control board 500 is disposed may be guided into the first area 550*a*.

At least one of the lower portion supporting part 553 and the lateral portion supporting part 555 may include a hook. The hook may include a body part 553*a* and a protruding part 553*b*. The body part 553*a* may be formed in a way that protrudes forward from the main panel part 551.

In this case, the body part 553*a* may be formed in a way that the body part 553*a* is elastically deformed in the lateral direction or the up-down direction. The protruding part 553*b* may protrude from a position spaced a predetermined distance apart from the main panel part 551 while protruding from the body part 553*a* toward the first control board 500.

In this embodiment, both of the lower portion supporting part 553 and the lateral portion supporting part 555 may include a hook, for example. A protruding part 553*b* of the hook included in the lower portion supporting part 553 may protrude upward from the body part 553*a*, and a protruding part 553*b* of the hook included in the lateral portion supporting part 555 may protrude laterally from the body part 553*a*.

In this case, each protruding part 553*b* may protrude from a position spaced apart from the main panel part 551 by a thickness of the first control board 500 while protruding from a position spaced a predetermined distance apart from the main panel part 551. A portion of the first control board 500 may be inserted into a space that is formed between the main panel part 551 and the protruding part 553*b* as a result of the protrusion of the protruding part 553*b*. That is, a lower end of the first control board 500 may be inserted into the lower portion supporting part 553, and a lateral end of the first control board 500 may be inserted into the lateral portion supporting part 555.

Accordingly, a front-rest position of the first control board 500 may be regulated by the lower portion supporting part 553 and the lateral portion supporting part 555. That is, a rear of the first control board 500 may be supported by the main panel part 551, and the front of the first control board 500 may be supported by the protruding part 553*b*. Thus, the front-rear position of the first control board 500 may be regulated.

In summary, the position of the first control board 500 in the lateral direction may be regulated by the lower portion supporting part 553 and the lateral portion supporting part 555, and the position of the first control board 500 in the front-rear direction may be regulated by the main panel part 551 and the protruding part 553*b*.

As a result, the first control board 500 may be exactly disposed in the first area 550*a*, i.e., at a position at which the first control board 500 is designed to seat, and may be stably fixed onto the supporting panel 550.

The lower portion supporting part 553 may include a plurality of hooks spaced a predetermined distance apart in a left-right direction. Accordingly, the lower portion of the first control board 500 may be supported by the lower portion supporting part 553 more stably, and the first control board 500 may be fixed onto the supporting panel 550 more stably.

The supporting panel 550 may further include a rib 552. The rib 552 may protrude forward from the main panel part 551 and be disposed between the main panel part 551 and the first control board 500. The rib 552 may be provided as a structure for improving rigidity of the supporting panel 550 structurally. Additionally, a predetermined gap may be formed between the first control board 500 and the main panel part 551 by the rib 552 such that the rib 552 serves as a passage needed to emit heat of the first control board 500.

[Structure of Supporting Panel—Area Regarding Electronic Component Except for First Control Board]

FIG. 36 is a rear perspective view showing a rear surface of the supporting panel in FIG. 35, and FIG. 37 is a rear perspective view showing a state in which a temperature sensor is installed.

The cooking appliance in this embodiment may further include a temperature sensor 580 as illustrated in FIGS. 34 to 37.

The temperature sensor 580 may be provided to measure a temperature in the cooking space 105. The temperature sensor 580 may include a sensor main body 581 having a long thin rod shape and a flange 583 protruding from the sensor main body 581. The flange 583 may be formed into a rectangular plate protruding from the sensor main body 581 in the centrifugal direction.

The temperature sensor 580 may be disposed inside the door front surface part 350 in a state of being fixed onto the supporting panel 550. To this end, the supporting panel 550 may further include a temperature sensor supporting part 557.

The temperature sensor supporting part 557 may be disposed in the second area 550*b*, i.e., an area in which the first control board 550 is not installed. The temperature sensor supporting part 557 may support the temperature sensor 580, and the temperature sensor 580 may be supported by the temperature sensor supporting part 557 and disposed in the second area 550b.

The temperature sensor supporting part 557 may include a second lateral wall part 557a. The second lateral wall part 557a may protrude rearward from the main panel part 551. An inside of the second lateral wall part 557a may penetrate in the front-rear direction. For example, the second lateral wall part 557a may be formed into a rectangular pillar which protrudes rearward from the main panel part 551 and the inside of which penetrates in the front-rear direction.

The temperature sensor 580 may be inserted into the second lateral wall part 557a. In this case, a position of the flange 583 of the temperature sensor 580 in the upward, downward, left and right directions may be regulated by a first lateral wall part 556a.

The temperature sensor supporting part 557 may further include a second supporting surface part 557b. The second supporting surface part 557b may protrude from the second lateral wall part 557a to the inside of the second lateral wall part 557b, and may form a flat surface crossing the front-rear direction. For example, the second supporting surface part 557b may be formed into a shape in which a flat surface parallel with the main panel part 551 protrudes to the inside of the second lateral wall part 557a.

The flange 583 inserted into the second lateral wall part 557a may contact the second supporting surface part 557b disposed at a rear of the flange 583. Thus, a rearward movement of the temperature sensor 580 may be regulated.

That is, the position of the temperature sensor 580, inserted into the second lateral wall part 557a, in the upward, downward, left and right directions may be regulated as a result of interference between the second lateral wall part 557a and the flange 583, and the position of the temperature sensor 580 in the front-rear direction may be regulated as a result of interference between the second supporting surface part 557b and the flange 583. Thus, the temperature sensor 580 may be stably mounted onto the temperature sensor supporting part 557.

Additionally, the temperature sensor supporting part 557 may further include a boss part 557c. The boss part 557c may protrude forward from the second supporting surface part 557b. That is, the second supporting surface part 557b may be disposed further rearward than the main panel part 551, and the boss part 557c may protrude forward from the second supporting surface part 557b. In this case, the boss part 557c may not protrude further forward than the main panel part 551.

A fastening hole in the form of a hollow hole extending in the front-rear direction may be formed in the boss part 557c. The fastening hole may be open to the rear of the second supporting surface part 557b. Additionally, a fastening hole may also be formed at the flange 583. In this case, the fastening hole of the flange 583 may be formed at a position where the fastening hole of the flange 583 and the fastening hole of the boss part 557c overlap in the front-rear direction.

When a screw passes though fastening holes from the rear of the flange 583 and is coupled to the boss part 557c in a state in which the flange 583 contacts the second supporting surface part 557b such that the fastening hole of the flange 583 and the fastening hole of the boss part 557c overlap, the flange 583 may be fixed to the temperature sensor supporting part 557 while closely contacting the second supporting surface part 557b. Accordingly, the temperature sensor 580 may be stably fixed onto the supporting panel 550.

The temperature sensor supporting part 557 may further include a hook 557d. The hook 557d may protrude from the first lateral wall part 557a to an inside of the temperature sensor supporting part 557, i.e., the inside of the second lateral wall part 557a in the upward direction or the downward direction.

For example, a hook 557d disposed on a lower side of the second lateral wall part 557a may protrude in the upward direction, and a hook 557d disposed on an upper side of the second lateral wall part 5567a may protrude in the downward direction. In this embodiment, one or more hooks 557d are disposed respectively on the lower side and the upper side of the second lateral wall part 557a, for example. The hook 557d may be disposed at the front of the second supporting surface part 557b.

In this case, each hook 557d may be disposed at a position spaced from a first supporting surface part 557b by a thickness of a portion of the temperature sensor 580, specifically, a thickness of the flange 583, while being disposed at a position spaced a predetermined distance from the second supporting surface part 557b. A portion of the temperature sensor 580, i.e., the flange 583, may be inserted into a space that is formed between the second supporting surface part 557b and the hook 557d as a result of the disposition of the hook 557d.

Thus, the temperature sensor 580 may be primarily fixed, and the fastening of the temperature 580 may be performed more readily.

In the temperature sensor 580 installed as described above, a rear of the sensor main body 581 may pass through the door rear surface cover 350b and be exposed to the outside of the door 300. That is, the temperature sensor 580 may protrude from the inside of the door front surface part 350 to the rear of the door front surface part 350, and be exposed to the cooking space 105. The temperature sensor 580, in which the rear of the sensor main body 581 is exposed to the outside of the door 300, may measure a temperature of the cooking space 105 in the cooking space 105 (see FIG. 63).

Additionally, a front of the sensor main body 581 may be exposed to the inside of the door 300 and connect to the first control board 500. That is, the front of the sensor main body 581 may electrically connect to the first control board 500 through a cable.

Accordingly, results of measurement of the temperature sensor 580 may be transmitted to the first control board 500, and based on the results, the first control board 500 may control an operation of the first heating part 400 and the like to adjust the temperature in the cooking space 105.

The temperature sensor supporting part 557 may be formed in a way that protrudes rearward from the supporting panel 550. In response, the door rear surface cover 350b may be provided with a dent part 351b. The dent part 351b may be formed in a way that a portion of the door rear surface cover 350b, disposed at the rear of the temperature sensor supporting part 557, is dented rearward. When seen from the front, the dent part 351b may be dented rearward, and when seen from the rear, may protrude rearward.

The temperature sensor supporting part 577 may be accommodated in a space encircle by the dent part 351b. A passage hole 352b needed for the sensor main body 581 to pass through the door rear surface cover 350b may be formed at the dent part 351b.

The supporting panel 550 in this embodiment may further include a cable fixing part 558. The cable fixing part 558 may protrude forward from the main panel part 551 and may be disposed between the first control board 500 and the temperature sensor supporting part 557. The cable fixing part 558 may fix a cable for connecting between the first control board 500 and the temperature sensor supporting part 557 onto the supporting panel 550.

The cable fixing part 558 may include a pair of hooks. Each of the hooks may include a body part 558a and a protruding part 558b. The body part 558a may protrude forward from the main panel part 551.

In this case, the body part 558a may be formed in a way that the body part 558a is elastically deformed in the lateral direction. The protruding part 558b may protrude from the body part 558a to another adjacent hook.

That is, the protruding parts 558b of the hooks protrude toward each other while the pair of hooks is disposed to face each other. Accordingly, a gap between front portions of the two hooks, in which the protruding parts 558b are disposed, may be much less than a gap between rear portions of the two hooks, in which the body parts 558a are disposed. Preferably, a gap between the two protruding parts 558b may be less than a diameter of the cable or the hooks may disposed such that the two protruding parts 558b contact each other.

Accordingly, the cable may be inserted into the cable fixing part 558 from a front of the cable fixing part 558. The cable inserted into the cable fixing part 558 may not escape from the cable fixing part 558 easily.

Further, a plurality of cable fixing parts 558 may be spaced a predetermined distance from each other on the supporting panel 550.

In this embodiment, the first control board 500 may be provided with a terminal 501 for connecting between the cable and the first control board 500. The terminal 501 may be disposed on a side eccentric to the lower portion on the first control board 500.

Referring to FIGS. 14, 34 and 35, components, i.e., the shaft 110 and the encoder 1200, in relation to the manipulation device 1000 may be disposed on a side eccentric to an upper portion of the first control board 500 on the first control board 500. Since the manipulation device is disposed on a side eccentric to an upper portion of the door front surface part 350 on the door front surface part 350, the shaft 110, the encoder 1200 and the like connected to the manipulation device need to be disposed on a side eccentric to the upper portion of the first control board 500 on the first control board 500.

The handle 305 may be disposed at a position eccentric to a lower portion of the door front surface part 350 on the door front surface part 350. Accordingly, there is difficulty in ensuring a space appropriate for installing the manipulation device 1000 in the door front surface part 350. Additionally, when the manipulation device 1000 is disposed in the upper portion of the door front surface part, the user may manipulate the manipulation device 1000 easily.

If the handle 305 is disposed at a position eccentric to the upper portion of the door front surface part 350 on the door front surface part 350, the manipulation device 1000 needs to be disposed below the handle. In this case, the user may have difficulty in manipulating the manipulation device 1000 due to the handle 305 and the handle may deteriorate the aesthetic quality of the cooking appliance.

If the handle 305 is disposed at a position eccentric to the upper portion of the door front surface part 350 on the door front surface part 350, a large force needs to be applied to open and close the door 300, and it is not easy for the user to manipulate the manipulation device.

For this reason, the manipulation device 1000 may be disposed at a position eccentric to the upper portion of the door front surface part 350 on the door front surface part 350.

Since the manipulation device 1000 may be disposed at a position eccentric to the upper portion of the door front surface part 350 on the door front surface part 350 as described above, the shaft 110, the encoder 1200 and the like may be disposed on a side eccentric to the upper portion of the first control board 500 on the first control board 500. Additionally, most of the upper area of the first control board 500 is occupied by the shaft 110, the encoder 1200 and the like, the terminal 501 may be disposed at a position eccentric to the lower portion of the first control board 500 on the first control board 500.

The temperature sensor supporting part 557 and the temperature sensor 580 mounted thereon may be disposed at a position eccentric to an upper portion of the supporting panel 550 on the supporting panel 550. The temperature sensor 580 may be disposed further upward than a communication module 570, and may be disposed at a height closer to the shaft 110 and the encoder 1200 than to the terminal 501. The reason why the temperature sensor 580 is disposed at a position eccentric to the upper portion of the supporting panel 550 on the supporting panel 550 is described hereunder.

Since there is a difference in heights of the temperature sensor 580 and the terminal 501 as described above, a distance between the temperature sensor 580 and the terminal 501 may become great. As the temperature sensor 580 becomes far from the terminal 501, a cable for connecting between the temperature sensor 580 and the terminal 501 needs to be elongated. Accordingly, the inside of the door 300 may be untidy due to the cable.

To solve the problem, in this embodiment, a plurality of cable fixing parts 558 may be disposed in a lower portion of the temperature sensor supporting part 557. The plurality of cable fixing parts 558 may fix a cable, which is disposed to extend in the up-down direction considering the positions of the temperature sensor 580 and the terminal 501, at a plurality of points.

Accordingly, the cable connecting between the temperature sensor 580 and the first control board 500 may be fixed stably onto the supporting panel 550, and the inside of the door 300 may become neat and tidy.

The supporting panel 550 in this embodiment, may further include a cable supporting part 559. The cable supporting part 559 may protrude forward from the main panel part 551 and may be disposed outside the first control board 500.

The cable fixing part 558 may support a cable connected to the first control board 500. The cable supported by the cable supporting part 559 may be a cable connecting between the first control board 500 and the first heating part or between the first control board 500 and the second control board.

The cable supporting part 559 may include a first projection 559a and a second projection 559b. The first projection 559a may protrude forward from the main panel part. The second projection 559b may protrude from the first projection 559a in a direction parallel with the main panel part 551. In this case, the second projection 559b may be spaced a predetermined distance apart from the main panel part 551.

The supporting panel 550 may be provided with a plurality of cable supporting parts 559. The plurality of cable supporting parts 559 may be disposed near an edge of the supporting panel 550. Some of the plurality of cable supporting parts 559 may be disposed near a lower edge of the supporting panel 550, and the others may be disposed near lateral edges of the supporting panel 550.

In this embodiment, the cable supporting parts 559 disposed near the lower edge of the supporting panel 550 and the cable supporting parts 559 disposed near the lateral edges of the supporting panel 550 may have different shapes. For example, in the cable supporting parts 559 disposed near the lower edge of the supporting panel 550, the second projection 559*b* may protrude upward or downward. In the cable supporting parts 559 disposed near the lateral edges of the supporting panel 550, the second projection 559*b* may protrude in the lateral direction.

A cable may be supported by the cable supporting part 559 in a way that the cable is inserted into a space encircles by the first projection 559*a* and the second projection 559*b*. Accordingly, the cable may be guided into an area near the edges of the supporting panel 550. The cable guided as described above may connect to the first control board 500 while being disposed near the edges of the supporting panel 550.

As a result, the cable connected to the first control board 500 may be stably fixed onto the supporting panel 550 in a state of being disposed near the edges of the supporting panel 550. Thus, the inside of the door 300 may become more neat and tidy, and unnecessary contact between various components mounted onto the first control board 500 and cables may be prevented.

The supporting panel 550 may further include a supporting projection 560. The supporting projection 560 may protrude from the main panel part 551 toward the door main body part 300*a* facing the main panel part 551, specifically, toward the front surface of the second door main body part 350*a*.

The supporting projection 560 may be disposed further downward than the first control board 500. For example, the supporting projection 560 may be disposed at a position near the lower edge of the supporting panel 550.

The supporting projection 560 may guide a gap between the front surface of the second door main body part 350*a* and the supporting panel 550 by interfering with the front surface of the second door main body part 350*a*. Additionally, the supporting projection 560 may maintain the gap between the front surface of the second door main body part 350*a* and the supporting panel 550.

In this embodiment, the shaft 110 and the encoder 1200 may be disposed in the upper area of the first control board 500. Additionally, the socket member 1600 encircling the shaft 110 and the encoder 1200 may also be disposed in the upper area of the first control board 500.

A rear side of the socket member 1600 may be coupled to the first control board 500, and a front side of the socket member 1600 may contact the front surface of the second door main body part 350*a*. That is, the socket member 1600 may be interposed between the front surface of the second door main body part 350*a* and the supporting panel 550, and the gap between the front surface of the second door main body part 350*a* and the supporting panel 550 may be maintained by the socket member 1600.

Thus, the upper area of the supporting panel 550 may be supported by the socket member 1600 not to bend toward the front surface of the second door main body part 350*a*. Also, the front surface of the second door main body part 350*a* may be supported by the socket member 1600 not to bend toward the supporting panel 550.

However, a lower area of the supporting panel 550 on which a structure such as the socket member 1600 is not disposed is likely to bend toward the front surface of the second door main body part 350*a*. Also, a lower area of the front surface of the second door main body part 350*a* may bend toward the supporting panel 550.

For example, when the front surface of the second door main body part 350*a* is pressed and bent or the door rear surface cover 350*b* is pressed and bent, the gap between the front surface of the second door main body part 350*a* and the supporting panel 550 may be excessively narrowed. In this case, the components mounted onto the first control board 500 may be broken, or the front surface of the second door main body part 350*a* may be deformed, thereby causing deterioration of an aesthetic quality of the door 300.

To solve the problem, in this embodiment, the supporting projection 560 may be disposed on a lower side of the supporting panel 550. The supporting projection 560 may support the front surface of the second door main body part 350*a* to prevent the front surface of the second door main body part 350*a* from bending rearward while maintaining the gap between the front surface of the second door main body part 350*a* and the supporting panel 550.

In summary, the socket member 1600 may be disposed on an upper side of the supporting panel 550 to support between the front surface of the second door main body part 350*a* and the upper side of the supporting panel 550, and the supporting projection 560 may be disposed on the lower side of the supporting panel 550 to support between the front surface of the second door main body part 350*a* and the upper side of the supporting panel 550.

Accordingly, the supporting panel 550 and the first control board 500 mounted onto the supporting panel 550 may be fixed to the inside of the door 300 while stably maintaining the gap between the front surface of the second door main body part 350*a*, and the supporting panel 550 and the first control board 500. Additionally, the deformation of the front surface of the second door main body part 350*a*, caused by an impact or pressure, may be suppressed. As a result, the structural reliability of the door 300 may improve effectively.

[Coupling Structure Among Door, Supporting Panel and Door Rear Surface Cover]

FIG. 38 is a perspective view separately showing the bracket in FIG. 34, and FIG. 39 is a cross-sectional view showing a coupling structure between a supporting panel and a door rear surface cover. Additionally, FIG. 40 is a cross-sectional view showing a coupling structure between a front surface of a door main body part and a supporting panel, and FIG. 41 is an enlarged view showing a portion of a configuration in a door front surface part.

Referring to FIGS. 34 and 35, and 38 to 41, the cooking appliance in this embodiment may further include a bracket 590. The bracket 590 may be disposed between the front surface of the second door main body part 350*a* and the supporting panel 550. The bracket 590 may space the supporting panel 500 from the front surface of the second door main body part 350*a* by a predetermined distance in the front-rear direction, and couple the supporting panel 550 to the door main body part 300*a*.

The supporting panel 550 may further include a coupling area 550*c* in addition to the first area 550*a* and the second area 550*b*. The coupling area 550*c* may be respectively disposed outside both sides of an area including the first area 550*a* and the second area 550*b* in the left-right direction. For example, the coupling area 550*c* may be disposed in both lateral edge portions of the supporting panel 550 in the lateral direction thereof.

The bracket 590 may be respectively disposed between the front surface of the second door main body parts 350*a*, and each coupling area 550*c*. Each bracket 590 may be coupled to the coupling area 550*c*. Each bracket 590 may include a first coupling part 591, a second coupling part 593 and a connecting part 595.

The first coupling part 591 may form a coupling surface parallel with the coupling area 550*c*. For example, the first coupling part 591 may be formed into a flat surface having a rectangular shape in which an up-down length is greater than a left-right length.

The second coupling part 593 may form a coupling surface parallel with the front surface of the second door main body part 350*a*. For example, the second coupling part 593 may be formed into a flat surface having a rectangular shape similar to that of the first coupling part 591. In this case, unlike the first coupling part 591, the second coupling part 593 may be formed into a shape in which a left-right length is greater than an up-down length.

In this embodiment, the front surface of the second door main body part 350*a* is disposed in parallel with the coupling area 550*c* in the front-rear direction, for example. Accordingly, the first coupling part 591 and the second coupling part 593 may also be disposed in parallel with each other in the front-rear direction.

The connecting part 595 may connect the first coupling part 591 and the second coupling part 593 in a way that the first coupling part 591 is spaced a predetermined distance apart from the second coupling part 593 in the front-rear direction. The connecting part 595 may be disposed between the first coupling part 591 and the second coupling part 593. For example, the connecting part 595 may be formed into a flat surface having a rectangular shape crossing the first coupling part 591 and the second coupling part 593, preferably, orthogonal to the first coupling part 591 and the second coupling part 593.

The bracket 590 may be formed in a way that the first coupling part 591, the second coupling part 593 and connecting part 595 described above integrally connect. When seen from above, the bracket 590 may be formed in a way that the first coupling part 591, the connecting part 595 and the second coupling part 593 connect in a "⊏" shape.

In this embodiment, a pair of brackets 590 is disposed between the front surface of the second door main body part 350*a* and the supporting panel 550, for example. On the supporting panel 550, the coupling area 550*c* may be disposed respectively on the left side and the right side of the first area 550*a* and the second area 550*b*, and the bracket 590 may be respectively disposed between the front surface of the second door main body part 350*a* and the left coupling area 550*c* and between the front surface of the second door main body part 350*a* and the right coupling area 550*c*.

In this case, in the left bracket 590 of the pair of brackets 590, left ends of the first coupling part 591 and the second coupling part 593 may be connected by the connecting part 595. Additionally, in the right bracket 590 of the pair of brackets 590, right ends of the first coupling part 591 and the second coupling part 593 may be connected by the connecting part 595.

For example, the left bracket 590 may be formed in a way that the first coupling part 591, the connecting part 595 and the second coupling part 593 connect in a "⊏" shape, and the left bracket 590 may be formed in a way that the first coupling part 591, the connecting part 595 and the second coupling part 593 connect in a "⊐" shape.

A guiding projection 561 may be disposed in any one of the first coupling part 591 and the coupling area 550*c*.

Additionally, a guiding hole 591*a* may be disposed in the other of the first coupling part 591 and the coupling area 550*c*.

The guiding projection 561 may protrude from any one of the first coupling part 591 and the coupling area 550*c* to the other of the first coupling part 591 and the coupling area 550*c*. The guiding hole 591*a* may be formed in a way that the guiding hole 591*a* penetrates the other of the first coupling part 591 and the coupling area 550*c*. The guiding projection 561 protruding from any one of the first coupling part 591 and the coupling area 550*c* may be inserted into the guiding hole 591*a* formed in the other of the first coupling part 591 and the coupling area 550*c*.

In this embodiment, the guiding projection 561 is disposed in the coupling area 550*c*, and the guiding hole 591*a* is formed in the first coupling part 591, for example. The guiding projection 561 may protrude forward from the coupling area 550*c*, be inserted into the guiding hole 591*a* disposed in front of the guiding projection 561 and pass through the first coupling part 591.

In this embodiment, a plurality of guiding projections 561 is disposed in each coupling area 550*c*, and a plurality of guiding holes 591*a* is disposed in each first coupling part 591, for example. In each coupling area 550*c*, a pair of guiding projections 561 may be spaced a predetermined distance in the up-down direction, and in each first coupling part 591, a pair of guiding holes 591*a* may be spaced a predetermined distance in the up-down direction.

Additionally, the guiding projection 561 and the guiding hole 591*a* may be disposed at a position where one guiding projection 561 and one guiding hole 591*a* overlap in the front-rear direction. That is, the plurality of guiding projections 561 and the plurality of guiding holes 591*a* may be arranged such that one guiding projection 561 is inserted tin to one guiding hole 591*a*.

Each guiding projection 561 may include a hook. The hook may include a body part 561*a*, and a protruding part 561*b*. The body part 561*a* may protrude forward from the main panel part 551.

In this case, the body part 561*a* may be formed in a way that is elastically deformed in the up-down direction. The protruding part 561*b* may protrude against another hook adjacent to the hook in the up-down direction while protruding from the body part 561*a*.

For example, a protruding part 561*b* of an upper hook of the pair of hooks may protrude upward, and a protruding part 561*b* of a lower hook of the pair of hooks may protrude downward.

The guiding projection 561, disposed as described above, may be coupled to the first coupling part 591 while passing through the first coupling part 591 through the guiding hole 591*a*. As a result of coupling between the guiding projection 561 and the first coupling part 591, the supporting panel 550 and the bracket 590 may be primarily coupled.

The primary coupling may denote a state in which the supporting panel 550 and the bracket 590 is detachably coupled and in which a position, where the supporting panel 550 and the bracket 590 are coupled, is guided.

Fastening holes 562 and 591*b* may be respectively arranged in the coupling area 550*c* and the first coupling part 591. The fastening holes 562 and 591*b* are provided for fastening between the supporting panel 550 and the bracket 590 using a fastening member 565. The fastening member 565 may be provided in the form of a screw identical with or similar to the above fastening member 563.

In a state in which the coupling area 550*c* and the first coupling part 591 contact each other such that the fastening hole 562 of the coupling area 550c and the fastening hole 591b of the first coupling part 591 overlap in the front-rear direction, a screw may pass through the coupling area 550c and the first coupling part 591 through the fastening holes 562 and 591b to couple the coupling area 550c and the first coupling part 591.

The alignment of the positions of the supporting panel 550 and the bracket 590 to overlap the fastening hole 562 of the coupling area 550c and the fastening hole 591b of the first coupling part 591 in the front-rear direction may be led as a result of the coupling between the guiding projection 561 and the first coupling part 591.

That is, as long as the guiding projection 561 is fitted into the first coupling part 591, the supporting panel 550 and the bracket 590 may be aligned such that the fastening hole 562 of the coupling area 550c and the fastening hole 591b of the first coupling part 591 overlap in the front-rear direction.

In this embodiment, the fastening holes 562 and 591b are disposed further outward than the guiding projection 561 in the up-down direction, for example. The supporting panel 550 and the bracket 590 may be coupled by a screw. As a coupling position of the screw becomes closer to ends on the upper side and the lower side of the supporting panel 550 and the bracket 590, the coupling between the supporting panel 550 and the bracket 590 may become more reliable. To this end, the fastening holes 562 and 591b may be disposed further outward than the guiding projection 561 in the up-down direction.

That is, the positions adjacent to the upper ends of the supporting panel 550 and the bracket 590, and the positions adjacent to the lower ends of the supporting panel 550 and the bracket 590 may be firmly fixed by the screw such that the upper ends or the lower ends of the supporting panel 550 and the bracket 590 are firmly coupled to each other without separating from each other.

Additionally, since a hook coupling using the guiding projection 561 may be done in central portions of the supporting panel 550 and the bracket 590, which are not fastened using a screw, to suppress the separation between the central portions of the supporting panel 550 and the bracket 590.

Hereunder, the effect of the coupling structure between the coupling area 550c and the first coupling part 591 are described hereunder.

The supporting panel 550 and the bracket 590 may be primarily coupled as a result of coupling between the guiding projection 561 and the first coupling part 591. When the supporting panel 550 and the bracket 590 are primarily coupled, the positions of the supporting panel 550 and the bracket 590 may be aligned. Accordingly, the conditions for the coupling between the supporting panel 550 and the bracket 590 using a screw may be set out. When the supporting panel 550 and the bracket 590 are primarily coupled, the supporting panel 550 and the bracket 590 may be temporarily fixed to ease screw fastening.

Then the portions adjacent to the upper ends of the supporting panel 550 and the bracket 590, and the portions adjacent to the lower ends of the supporting panel 550 and the bracket 590 may be firmly fixed by the screw, and the supporting panel 550 and the bracket 590 may be coupled by the guiding projection 561 in the central portions of the supporting panel 550 and the bracket 590 in the up-down direction.

Accordingly, the supporting panel 550 and the bracket 590 may be firmly coupled without separating from each other, and the screw fastening between the supporting panel 550 and the bracket 590 may be performed more readily.

The second coupling part 593 may be coupled to the door main body part 300a, specifically, a front surface of the second door main body part 350a. To this end, fastening holes 353a and 593a may be respectively disposed on the front surface of the second door main body part 350a and in the second coupling part 593. The fastening holes 353a and 593a may be provided to fasten the door main body part 300a and the bracket 590 using a fastening member 563 described below.

In a state in which the front surface of the second door main body part 350a and the second coupling part 593 contact each other such that the fastening hole 353a of the front surface of the second door main body part 350a and the fastening hole 593a of the second coupling part 593 overlap in the front-rear direction, the fastening member 563 may pass through the front surface of the second door main body part 350a and the second coupling part 593 through the fastening holes 353a and 593a such that the front surface of the second door main body part 350a and the second coupling part 593 are coupled.

The fastening member 563 may be provided in a screw form. Specifically, the fastening member 563 may include a body part 553a and a head part 563b. The body part 553a may be formed into an approximately circular rod, and a screw thread may be formed on an outer circumferential surface of the body part 553a. The head part 563b may protrude in a centrifugal direction of the body part 553a at a length-wise end of the body part 553a.

In this embodiment, the coupling between the second coupling part 593 of the bracket 590 and the front surface of the second door main body part 350a, and the coupling between the front surface of the second door main body part 350a and the handle 305 may be performed together by a single fastening member 563.

That is, the fastening member 563 may be inserted into the handle 305 while passing through the second coupling part 593 and the front surface of the second door main body part 350a. Accordingly, the handle 305 and the second coupling part 593 may be coupled to the front surface of the second door main body part 350a. That is, the handle 305 and the second coupling part 593 may be coupled with the front surface the second door main body part 350a therebetween.

To this end, the fastening member 563 may be inserted into the handle 503 from a rear of the second coupling part 593 while passing through the second coupling part 593 and the front surface of the second door main body part 350a such that the heat part 563b is disposed at the rear of/behind the second coupling part 593.

If the coupling between the bracket 590 and the door main body part 300a and the coupling between the door main body part 300a and the handle 305 are performed at different positions, a coupling portion between the bracket 590 and the door main body part 300a is exposed to the outside of the door 300.

For example, when the bracket 590 and the door main body part 300a are coupled from the front of the door 300 using the fastening member 563, the head part 563b of the fastening member 563 is exposed to the outside of the door 300.

Additionally, when the bracket 590 and the door main body part 300a are coupled from a rear of the bracket 590 using the fastening member 563, the body part 553a of the fastening member 563 is exposed to the outside of the door 300. Thus, an additional structure needs to be added to the outside of the door 300 to cover the fastening member 563.

Further, since the front surface of the second door main body part 350*a* and the second coupling part 593 are not that thick, coupling strength between the door main body part 300*a* and the bracket 590 may not be sufficiently ensured. When the coupling between the bracket 590 and the door main body part 300*a* and the coupling between the door main body part 300*a* and the handle 305 are performed at different positions, man hours for the fastening procedure may increase.

To solve the problem, in this embodiment, the bracket 590, the door main body part 300*a* and the handle 305 may be coupled together using a single fastening member 563 as a result of one-time fastening.

In this case, the bracket 590 may pass through the door main body part 300*a*, and a portion of the fastening member 563, protruding to the outside of the door main body part 300*a*, may be inserted into the handle 305, such that bracket 590 and the door main body part 300*a* are coupled.

Thus, the bracket 590 and the door main body part 300*a* may be coupled while no portion of the fastening member 563 is exposed to the outside of the door 300. Additionally, although the front surface of the second door main body part 350*a* and the second coupling part 593 are not that thick, a depth, to which the fastening member 563 is inserted, may be ensured by the handle 305. Thus, the coupling strength between the door main body part 300*a* and the bracket 590 may be sufficiently ensured.

As a result of one-time fastening, the bracket 590, the door main body part 300*a*, and the handle 305 may be coupled together, and man hours for the fastening procedure may be reduced.

The fastening member 563 may couple the bracket 590 and the door main body part 300*a* while passing through the second coupling part 593, and the front surface of the second door main body part 350*a* through the fastening hole 593*a* of the second coupling part 593 and the fastening hole 353*a* of the front surface of the second door main body part 350*a*.

In this case, the fastening hole 593*a* of the second coupling part 593 may be disposed at a position where the second coupling part 593 and the first coupling part 591 do not overlap in the front-rear direction or a position where a rear of the fastening hole 593*a* is not covered by the first coupling part 591. That is, the fastening hole 593*a* of the second coupling part 593 may be disposed at a position where the fastening hole 593*a* of the second coupling part 593 is exposed to the outside of the first coupling part 591 when seen from the rear.

In this embodiment, the second coupling part 593 has an up-down length less than a left-right length unlike the first coupling part 591, for example. The second coupling part 593 of the bracket 590 disposed on the left side may protrude further rightward than the first coupling part 591, and the second coupling part 593 of the bracket 590 disposed on the right side may protrude further leftward than the first coupling part 591.

The fastening hole 593*a* of the second coupling part 593 may be disposed at a position protruding further rightward and leftward than the first coupling part 591. That is, the fastening hole 593*a* of the second coupling part 593 of the bracket 590 on the left side may be disposed at a position protruding further rightward than the first coupling part 591, and the fastening hole 593*a* of the second coupling part 593 of the bracket 590 on the right side may be disposed at a position protruding further leftward than the first coupling part 591.

Accordingly, the fastening procedure using the fastening member 563 may be performed more readily.

That is, since the coupling procedure using the fastening member 563 is performed at a rear of the bracket 590, it may be difficult for the fastening procedure to be performed when the fastening hole 593*a* of the second coupling part 593 is covered by the first coupling part 591.

To solve the problem, in this embodiment, the fastening hole 593*a* of the second coupling part 593 may be disposed at a position where the fastening hole 593*a* of the second coupling part 593 is exposed to the outside of the first coupling part 591. Accordingly, the fastening procedure using the fastening member 563 may be performed more readily with no interference by another structure such as the first coupling part 591.

Figure 43:
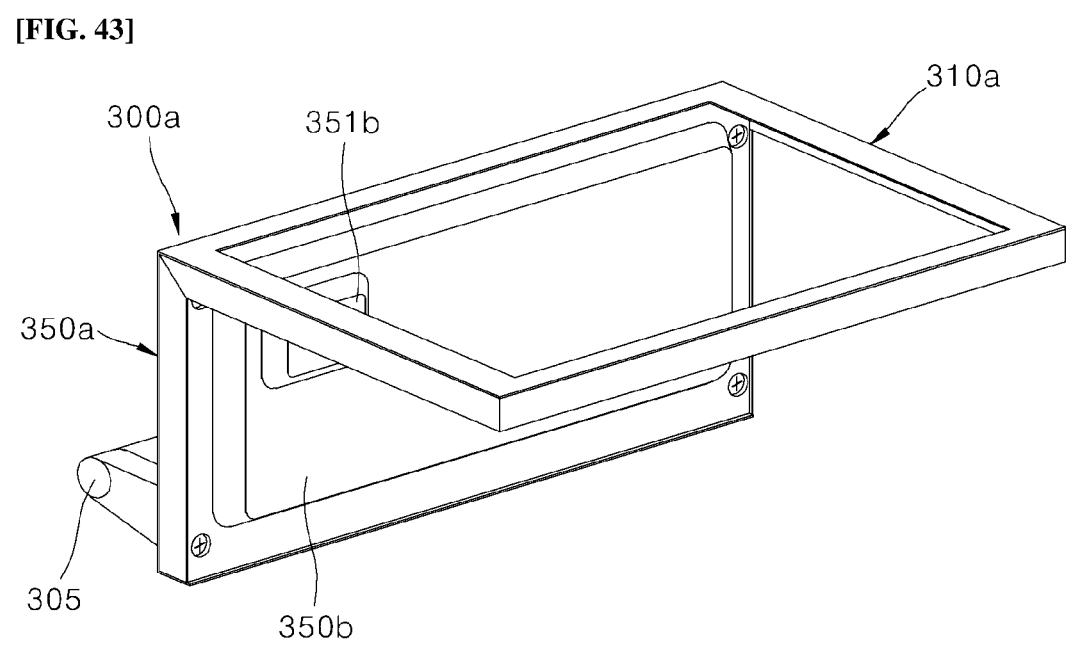

FIGS. 42 to 44 are rear perspective views showing a procedure for assembly of a door front surface part.

Hereunder, a procedure for assembly of the door front surface part is described with reference to FIGS. 39 to 44.

Referring to FIGS. 39 and 42, to assemble the door front surface part 350, the bracket 590 and the door main body part 300*a* may be coupled first. The bracket 590 and the door main body part 300*a* may be coupled as follows.

The handle 305 may be disposed at a front of the front surface of the second door main body part 350*a*, and the bracket 590 may be disposed at a rear of the front surface of the second door main body part 350*a*. In this case, a fastening hole formed in the handle 305, the fastening hole 353*a* formed on the front surface of the second door main body part 350*a*, and the fastening hole 593*a* formed in the second coupling part 593 of the bracket 590 need to overlap in the front-rear direction.

In this state, the fastening member 563 may be coupled to the second coupling part 593 and the front surface of the second door main body part 350*a* from the rear to the front of the second coupling part 593. Accordingly, the fastening member 563 may be inserted into the handle 305 while passing through the second coupling part 593 and the front surface of the second door main body part 350*a* from the rear of the second coupling part 593.

Thus, the bracket 590, the door main body part 300*a* and the handle 305 may be coupled together using a single fastening member 563 as a result of one-time fastening.

In this embodiment, each bracket 590 has two points for the fastening using the fastening member 563, for example. In each second coupling part 593, a pair of fastening holes 593*a* may be spaced from each other in the up-down direction, and fastening holes 353*a* may be disposed respectively on the front surface of the second door main body part 350*a* at positions corresponding to those of the fastening holes 593*a*. In this case, the handle 305, the door 300 and the bracket 590 may be completely coupled as a result of four-time fastening using the fastening member 563.

Additionally, a fitting hole 593*b* may be formed between the pair of fastening holes 593*a*, on the second coupling part 593. A fitting hole 355*a* may also be formed on the front surface of the second door main body part 350*a*.

The handle 305 may be provided with a fitting projection 305*a*. The fitting projection 305*a* may protrude from ends at rears of both sides of the handle to the rear. The fitting projection 305*a* may be inserted into the fitting holes 355*a* and 593*b* and coupled to the front surface of the second door main body part 350*a* and the second coupling part 593.

The position of the coupling between the handle 350 and the door front surface part 350 may be guided as a result coupling among the fitting projection 305*a*, the front surface of the second door main body part 350*a* and the second coupling part 593. That is, when the fitting projection 305*a* is inserted into the fitting holes 355*a* and 593*b*, the handle 305, the door front surface part 350 and the fastening holes of the second coupling part 593 may be aligned and may overlap in the front-rear direction.

Accordingly, the coupling among the handle 305, the door 300 and the bracket 590 may be performed more accurately and readily.

The handle 305, the door 300 and the bracket 590 may be coupled as described above, and then the supporting panel 550 and the bracket 590 may be primarily coupled as illustrated in FIGS. 39 and 43. The supporting panel 550 and the bracket 590 may be primarily coupled as a result of coupling between the guiding projection 561 and the first coupling part 591.

Thus, the supporting panel 550 and the bracket 590 may be detachably coupled, and the positions of the supporting panel 550 and the bracket 590 may be aligned such that the fastening hole 562 of the supporting panel 550 and the fastening hole 591b of the first coupling part 591 overlap in the front-rear direction.

Then, as illustrated in FIGS. 39 and 44, the open rear of the door main body part 300a may be covered with the door rear surface cover 350b. In this state, a screw may be coupled to the door rear surface cover 350b from the rear to the front of the door rear surface cover 350b.

Accordingly, the door rear surface cover 350b, the coupling area 550c, and the first coupling part 591 may be coupled by a single screw. That is, the door rear surface cover 350b, the supporting panel 550 and the bracket 590 may be coupled by a single screw at a time.

In this embodiment, each bracket 590 has two points for the fastening using the screw, for example. In each first coupling part 591, a pair of fastening holes 591b may be spaced from each other in the up-down direction, and fastening holes 562 may be disposed respectively on the door rear surface cover 350b and the supporting panel 550 at positions corresponding to those of the fastening holes 591b. In this case, the door rear surface cover 350b, the supporting panel 550 and the bracket 590 may be completely coupled as a result of four-time fastening using the screw.

In summary, the handle 305, the door 300 and the bracket 590 may be completely coupled during a total of four fastening procedures, and the door rear surface cover 350b, the supporting panel 550 and the bracket 590 may be completely coupled during a total of four fastening procedures. The door front surface part 350 may be completely assembled during a small number of fastening procedures.

Thus, man hours for assembly of the door 300 may be significantly reduced and the door 300 may be assembled more easily and rapidly.

[Disposition Structure of Temperature Sensor]

FIG. 45 is a cross-sectional view schematically showing a structure in a cooking appliance.

As illustrated in FIGS. 43 and 45, the cooking appliance in this embodiment may include a temperature sensor 580. The temperature sensor 580 may be provided to measure a temperature in the cooking space 105. In this embodiment, the temperature sensor 580 is provided in a thermostat form, for example.

The temperature sensor 580 may be used to maintain the temperature of the cooking space 105 at a predetermined temperature. The temperature sensor 580 may be used to maintain the temperature of the cooking space 105 to prevent the inside of the cooking space 105 from being excessively heated.

The temperature sensor 580 may be disposed in the door front surface part 350, and a height of the temperature sensor 580 may be determined between the bottom surface 110 of the housing 100 and the first heating part 400. For example, the temperature sensor 580 may be disposed closer to the first heating part 400 than to the bottom surface 110 of the housing 100. That is, the temperature sensor 580 may be disposed at a height eccentric to the upper portion in the cooking space 105.

Specifically, the temperature sensor 580 may be disposed between the tray 200 and the first heating part 400. More specifically, the temperature sensor 580 may be disposed closer to the first heating part 400 than to the tray 200.

The temperature sensor 580 may be disposed as described above considering the distribution of temperature in the cooking space 105 and the possibility of interference between an object to be cooked and the temperature sensor 580 in the cooking space 105.

In the cooking appliance, a food item may be cooked in the cooking space 105. To this end, the food item may be mounted onto the tray 200. That is, a food item may ordinarily be cooked in a state of being mounted onto the tray 200 as a result of heating of the inside of the cooking space 105, performed by any one of the first heating part 400 and the second heating part 600.

In the state in which a food item is mounted onto the tray 200, the possibility of interference between the food item mounted onto the tray 200 and the temperature sensor 580 may not be excluded. When the food item interferes with the temperature sensor 580, the temperature sensor 580 may not produce measurement results accurately or operational errors of the temperature sensor 580 may occur. Accordingly, the temperature sensor 580 needs to be disposed at a position where the interference between a food item and the temperature sensor 580 does not occur.

The temperature in the cooking space 105 may increase toward the upper portion of the cooking space 105 since heated air goes up or the first heating part 400, which heats the inside of the cooing space 105, is disposed in the upper portion of the cooking space 105.

The cooking space 105 may also be provided with the second heating part 600 (see FIG. 64) in the lower portion thereof. Unlike the first heating part 400 performing direct heating, the second heating part 600 may not perform direct heating. Accordingly, in the cooking space 105, the temperature tends to be higher in the upper portion than in the lower portion.

In this embodiment, the temperature sensor 580 is used to maintain the temperature of the cooking space 105 at a predetermined temperature or to prevent the cooking space from overheating, for example. For the temperature sensor 580 to play the above role effectively, the temperature sensor 580 disposed at a position of the cooking space 105, having a relatively high temperature, may have an advantage over the temperature sensor 580 disposed at a position having a relatively low temperature.

Ordinarily, the effect of the cooking space's temperature higher than an intended temperature on an object to be cooked may be greater than the effect of the cooking space's temperature lower than the intended temperature on the object to be cooked. Accordingly, it would be good to measure a temperature of a point having a high temperature. In particular, when the temperature sensor 580 is used to prevent the cooking space from overheating, it is preferable to measure a temperature of a point having a high temperature.

Further, since a temperature measuring module 640 (see FIG. 67) is disposed near a lower portion of the cooking space 105 and measures a temperature, the temperature sensor 580 may be preferably disposed at a position spaced a certain distance from the temperature measuring module 640 rather than a position very close to the temperature measuring module 640.

In this case, in this embodiment, the temperature sensor 580 may be disposed at a height eccentric to the upper portion further in the cooking space 105. Accordingly, the temperature sensor 580 may play its role effectively such that the temperature of the cooking space 105 is maintained at a predetermined temperature or the cooking space is prevented from overheating.

As illustrated in FIGS. 51, 52 and 61, the second area 550*b* may be disposed outside the first area 550*a* in the lateral direction, and the temperature sensor 580 may be disposed in the second area 550*b*.

As described above, the first control board 500 may be disposed in the first area 550*a*, and components such as the shaft 110, the encoder 1200 and the like in relation to the manipulation device 1000 may be disposed on the first control board 500. Accordingly, the first control board 500 may have a size large enough to take up a wide area on the supporting panel 550. That is, the first control board 500 may occupy more than half of the area of the supporting panel 550.

In this embodiment, the manipulation device 1000 is disposed at a position eccentric to the upper portion on the door front surface part 350. Accordingly, the first control board 500 needs to be disposed at a position eccentric to the upper portion on the door front surface part 350 such that the components in relation to the manipulation device 1000 are disposed on the first control board 500.

Thus, most of the upper portion of the supporting panel 550 may be occupied by the first control board 500. Further, there is not enough space for installing the temperature sensor 580, i.e., the temperature sensor supporting part 557, in the upper portion of the first control board 500.

To solve the problem, in this embodiment, the temperature sensor 580 may be disposed on one side of the first control board 500 in the lateral direction thereof such that the temperature sensor 580 and the first control board 500 do not overlap in the front-rear direction. That is, the temperature sensor 580 may be disposed eccentrically on one side in the lateral direction while being disposed at a position eccentric to the upper portion in the cooking space 105. For example, the temperature sensor 580 may be disposed at a position adjacent to an edge on an upper side of the door front surface part 350 having a rectangular shape.

Accordingly, the temperature sensor 580 may be disposed at a position where the temperature sensor avoids interference with another component such as the first control board 500 and the like and plays its role effectively.

Considering a food item is ordinarily disposed at the center of the cooking space 105, when the temperature sensor 580 is disposed at a position adjacent to the edge on the upper side of the door front surface part 350, as described above, the temperature sensor 580 is less likely to contact the food item.

In this embodiment, the cooking appliance may further include a shielding plate 328. The shielding plate 328 may be disposed in the lower portion of the door upper surface part 310. The shielding plate 328 may be formed into a plate having a length extending along a length-wise direction of the first heating part 400.

In this embodiment, a pair of first heating parts 400 may be disposed in the lower portion of the door upper surface part 310, and a pair of shielding plates 328 may be provided to correspond to the pair of first heating parts 400. Each of the shielding plates 328 may be disposed near the first heating part 400, and guide a direction in which the first heating part 400 emits heat.

For example, a shielding plate 328, which is disposed near a first heating part 400, adjacent to the door front surface part 350, of the pair of first heating parts 400, may be disposed between the door front surface part 350 and the first heating part 400, and a shielding plate 328, which is disposed near a first heating part 400, disposed relatively rearward, of the pair of first heating parts 400, may be disposed between the rear surface of the housing 100 and the first heating part 400.

The shielding plate 328, disposed as described above, may guide the heat emitted by the first heating part 400 to a central side of the cooking space. The shielding plate 328 may block the heat of the first heating part 400 from being emitted toward the door front surface part 350 or the rear surface 140 of the housing 100.

The first heating part 400 may be disposed near the door front surface part 350 or the rear surface 140 of the housing 100. Accordingly, the door front surface part 350 and the rear surface 140 of the housing 100 may be directly heated by the first heating part 400.

Various electronic components may be disposed in the door front surface part 350 and at the rear of the housing 100. Accordingly, intensive heat emitted toward the door front surface part 350 and the rear surface 140 of the housing 100 needs to be avoided.

Thus, in this embodiment, the shielding plate 328 may be respectively disposed between the door front surface part 350 and the first heating part 400 and between the rear surface of the housing 100 and the first heating part 400. The shielding plate, disposed as described above, may block the heat of the first heating part 400 from being emitting to the door front surface part 350 or the rear surface 140 of the housing 100, thereby preventing thermal degradation of the electronic components.

Additionally, the shielding plate 328 near the door front surface part 350 may be disposed between the temperature sensor 580 and the first heating part 400. In this case, the temperature sensor 580 may be disposed in a state in which the shielding plate 328 blocks the temperature sensor 580 from the first heating part 400.

Accordingly, the temperature sensor 580 may be disposed in an area that is not directly affected by the heat of the first heating part 400. That is, the temperature sensor 580 may be disposed in an area that is adjacent to the first heating part 400 and is not directly affected by the heat of the first heating part 400.

As a result, the temperature sensor 580 may provide reliable measurement results close to an actual temperature in the cooking space 105 even through the temperature sensor 580 is disposed at a position adjacent to the first heating part 400.

[Structure of Touch Manipulation Part]

Figure 46:
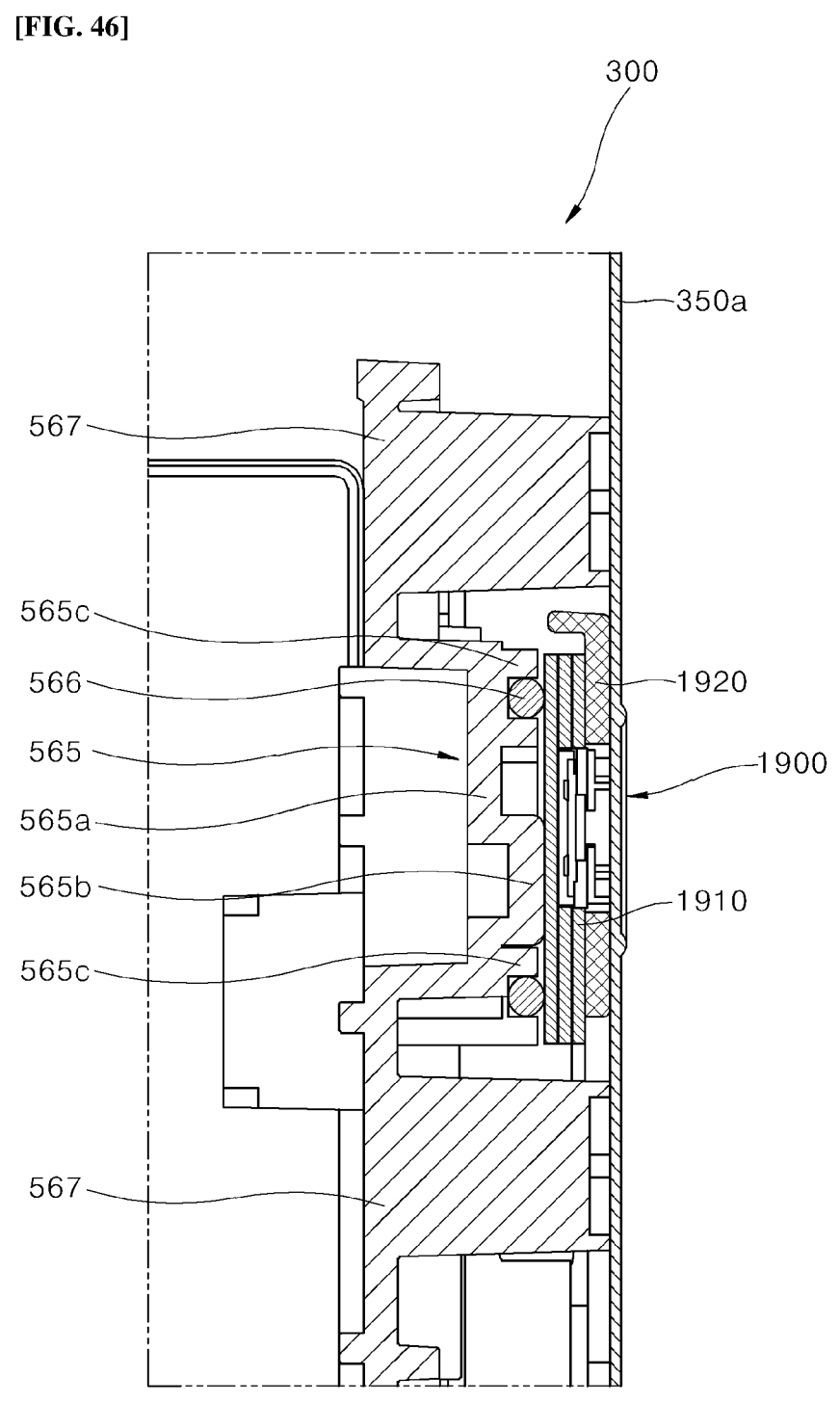

FIG. 46 is a cross-sectional view taken along line "XXXXVI-XXXXVI" in FIG. 27.

Referring to FIGS. 14, 27 and 46, the cooking appliance in this embodiment may further include a touch manipulation part 1900. The touch manipulation part 1900 may be disposed on a front surface of the door front surface part 350 along with the manipulation device 1000. In this embodiment, the touch manipulation part 1900 is disposed in a lateral portion of the manipulation device 1000 while being disposed near the manipulation device 1000, for example. The user may directly manipulate the touch manipulation part 1900 together with the manipulation device 1000 to control an operation of the cooking appliance.

In an example, the touch manipulation part 1900 may include at least one of a manipulation switch for controlling the turn-on/off of the first heating part 400, and a manipulation switch for selecting the sort and state of an object to be cooked.

The touch manipulation part 1900 may include a board 1910 and a booster 1920.

The board 1910 may be disposed in the door front surface part 350 in a state of being fixed to the supporting panel 550. To this end, the supporting panel 550 may further include a touch panel supporting part 565.

The touch panel supporting part 565 may be disposed in the second area 550*b*, i.e., in an area where the first control board 550 is not installed. The touch panel supporting part 565 may support the touch manipulation part 1900, and accordingly, the touch manipulation part 1900 may be supported by the touch panel supporting part 565 and disposed in the second area 550*b*.

The touch panel supporting part 565 may include a protruding surface part 565*a*, a protruding and supporting surface part 565*b* and a protruding rib part 565*c*.

The protruding surface part 565*a* may protrude forward from the main panel part 551 and form a flat surface parallel with the main panel part 551.

The protruding and supporting surface part 565*b* may protrude forward from the protruding surface part 565*a* and form a flat surface parallel with the main panel part 551. The protruding and supporting surface part 565*b* may support the board 1910 at a position which is further forward than the main panel part 551 and the protruding surface part 565*a*.

Since the board 1910 is supported by the protruding and supporting surface part 565*b*, the touch manipulation part 1900 may be fixed to the inside of the door front surface part 350, in close contact with the front surface of the first door main body part 350*a*.

The protruding rib part 565*c* may be disposed near the protruding and supporting surface part 565*b*. In the touch panel supporting part 565, a pair of protruding rib parts 565*c* may be spaced from each other with the protruding and supporting surface part 565*b* therebetween. In this embodiment, the pair of protruding rib parts 565*c* is spaced from each other in the up-down direction with the protruding surface part 565*a* therebetween, for example.

Each of the protruding rib parts 565*c* may protrude forward from the protruding surface part 565*a*. For example, each of the protruding rib parts 565*c* may protrude forward to the degree that the protruding and supporting surface part 565*b* protrudes.

Each of the protruding rib parts 565*c* may have a fixing groove. A packing member 566 may be inserted into the fixing groove. The packing member 566 may be inserted into the fixing groove, and fixed to the protruding rib part 565*c*.

The packing member 566 may be disposed between the touch panel supporting part 565 and the board 1910, specifically, between the protruding surface part 565*a* and the board 1910. When the packing member 566 is inserted into the fixing groove, the packing member 566 may protrude further forward than the protruding rib part 565*c* and the protruding and supporting surface part 565*b*. Additionally, the packing member 566 may be formed in a way that the packing member 566 is elastically deformed.

The packing member 566 may be disposed between the protruding surface part 565*a* and the board 1910 such that the packing member 566 and the board 1910 overlap. The packing member 566 may apply a force of pushing the board 1910 forward to the board 1910, and accordingly, the touch manipulation part 1900 may come into close contact with the front surface of the first door main body part 350*a* effectively.

Additionally, the supporting panel 550 may further include an outer support projection 567. In this embodiment, a plurality of outer support projections 567 is disposed outside the touch panel supporting part 565 and the touch manipulation part 1900, for example.

In this case, the outer support projection 567 may be disposed respectively outside the touch panel supporting part 565 and the touch manipulation part 1900 in the up-down direction and outside the touch panel supporting part 565 and the touch manipulation part 1900 in the left-right direction. Additionally, each of the outer support projections 567 may protrude forward from the main panel part 551 of the supporting panel 550.

Each of the outer support projections 567 may protrude to contact the front surface of the first door main body part 350*a*. The outer support projections 567 formed as described above may support the front surface of the first door main body part 350*a* from the rear around the touch manipulation part 1900.

The user needs to press the front surface of the first door main body part 350*a* to manipulate the touch manipulation part 1900. When the manipulation of the touch manipulation part 1900 is repeated, the front surface of the first door main body part 350*a* may be deformed as a result of repetitive press of the front surface of the first door main body part 350*a*. Since the outer support projection 567 supports the front surface of the first door main body part 350*a* around the touch manipulation part 1900, the deformation of the door 300, caused by the repetitive manipulation of the touch manipulation part 1900, may be effectively suppressed.

Additionally, the outer support projection 567 may support the front surface of the first door main body part 350*a* such that the front surface of the first door main body part 350*a* is pressed only in a front area of the touch manipulation part 1900, thereby ensuring improvement in reliability of the manipulation of the touch manipulation part 1900.

In an example, the touch manipulation part 1900 installed in the touch panel supporting part 565, having the above structure, may be a metal touch switch to which a capacitive sensor is applied. One or more capacitive parts may be formed on the board 1910 of the touch manipulation part 1900.

The board 1910 may be provided with a booster 1920 at a front thereof. The booster 1920 may be disposed between the front surface of the first door main body part 350*a* and the board 1910. The booster 1920 may be disposed in close contact with the front surface of the first door main body part 350*a*.

An area of the front surface of the first door main body part 350*a*, closely contacting the booster 1920, may be provided with function icons corresponding functions of the touch manipulation part 1900, and the function icons may be formed using raised relief or sunken relief. When the area of the front surface of the first door main body part 350*a* is pressed, the booster 1920 may also be pressed, and move rearward. Accordingly, a gap between the booster 1920 and the capacitive part may change, and accordingly, a touch on the touch manipulation part 1920 may be recognized based on a change in electric capacity caused by the change in the gap.

When the booster 1920 closely contacts the front surface of the first door main body part 350*a*, a recognition rate of a touch on the touch manipulation part 1900 may increase. In this embodiment, the packing member 566 installed in the protruding rib part 565c may apply a force of pushing the board 1910 forward to the board 1910, and accordingly, the booster 1920 may come into close contact with the front surface of the first door main body part 350a effectively.

[Structure of Second Heating Part, Receiver Coil and Second Control Board]

Figure 50:
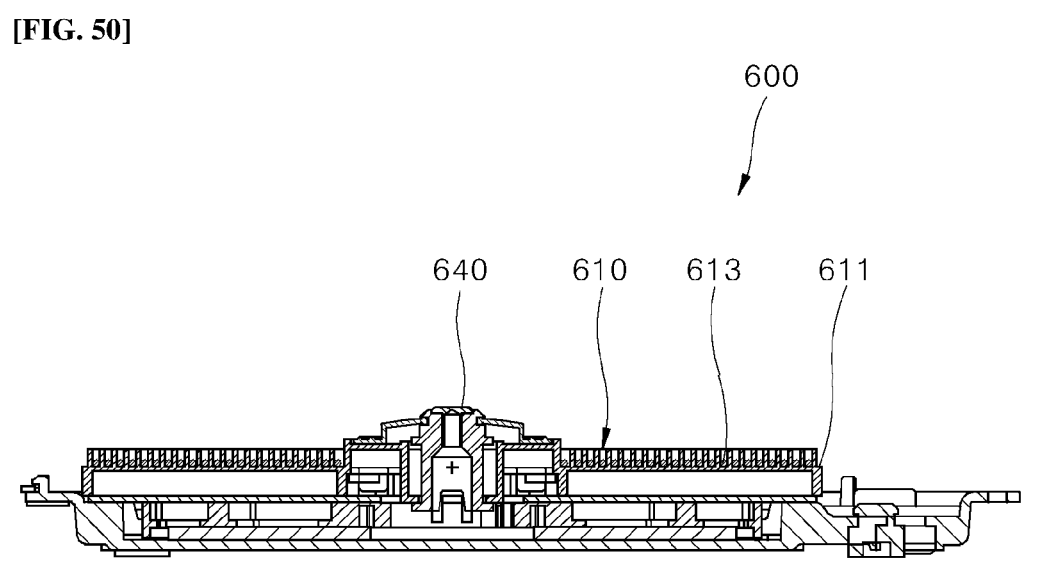

FIG. 47 is an exploded perspective view separately showing a housing and a second heating part in one embodiment, FIG. 48 is a plan view showing the second heating part in FIG. 47. Additionally, FIG. 49 is an exploded perspective view separately showing the second heating part, the receiver coil and the electromagnetic shielding plate in FIG. 47, and FIG. 50 is a cross-sectional view showing a coupling between the second heating part and the temperature sensor, and a coupling between the receiver coil and the electromagnetic shielding plate in FIG. 47. Further, FIG. 51 is a rear view showing the second control board in FIG. 47, and FIG. 52 is a rear view showing a state in which a rear surface cover is disposed on a rear surface of the second control board in FIG. 51.

Referring to FIG. 3 and FIGS. 47 and 48, the second heating part 600 is disposed in the lower portion of the tray 200. The second heating part 600 is installed in the lower portion of the bottom surface 110 of the housing 100 and is provided in the form of a heating part which heats the tray 200 using a heating method different from that of the first heating part 400, e.g., in the form of an induction heating part. The induction heating part may include a working coil 610 installed in the lower portion of the bottom surface 110 of the housing 100 and may induce heating of the tray 200 in the lower portion of the tray 200.

The working coil 610 includes a coil installation base 611. In this embodiment, the coil installation base 611 is illustrated as being formed in a rectangular shape similar to the shape of the tray 200. Accordingly, the size and shape of the working coil 610 is similar to those of the tray 200 such that the entire area of the tray 200 is heated by the working coil 610.

As illustrated in FIGS. 66 and 67, the coil installation base 611 has a spiral groove, in which a coil 613 is installed. The coil 613 is housed in the spiral groove and fixed by being densely wound in an upper portion of the coil installation base 611. A coil connection wiring 615 connected to a coil control printed circuit board (PCB) for controlling the coil 613 is provided at an end of the coil 613.

Further, the second heating part 600 may further include a receiver coil 620. The receiver coil 620 is a component provided to receive wirelessly-transmitted power and is disposed in a lower portion of the second heating part 600. Also, a base 180 is disposed in a lower portion of the receiver coil 620. The base 180 is coupled to the lower portion of the bottom surface 110 of the housing 100 and supports the working coil 610, the receiver coil 620, and the like from the lower portion of the receiver coil 620 while forming an exterior of the bottom surface of the cooking appliance.

Like the working coil 610, the receiver coil 620 may include a coil installation base 621 and a coil 623. Unlike the coil installation base 611 of the working coil 610, the coil installation base 621 of the receiver coil 620 is formed in an approximately circular shape. Accordingly, the shape of the receiver coil 620 is similar to the shape of a working coil of an induction heating part provided at a cooktop.

In this embodiment, the receiver coil 620 is provided to receive power from an induction heating part of another cooking appliance, i.e., a cooktop, which is provided in addition to the cooking appliance in this embodiment.

For example, the cooking appliance in this embodiment may be used in a state of being placed on a cooktop. In this case, power required for operation of the cooking appliance may be received from an induction heating part of the cooktop.

In an example, when the working coil of the cooktop and the cooking appliance in this embodiment are operated together while the cooking appliance in this embodiment is placed on the cooktop, power supplied through the cooktop may be delivered to the receiver coil 620.

In this case, a current is induced toward the receiver coil 620 through a magnetic field which changes in the working coil of the cooktop due to magnetic induction phenomenon. In this way, power supplied through the cooktop may be delivered to the receiver coil 620. In this procedure, in order to improve power reception efficiency of the receiver coil 620, the cooking appliance in this embodiment may be placed on the cooktop such that the position of the receiver coil 620 overlaps with the position of the working coil provided in the induction heating part of the cooktop in the up-down direction.

Further, the induction heating part may further include an electromagnetic shielding plate 630 disposed between the working coil 610 and the receiver coil 620. The electromagnetic shielding plate 630 may be provided in the form of a metal plate. The electromagnetic shielding plate 630 is disposed between the working coil 610 and the receiver coil 620 and serves to minimize an influence of electromagnetic interference (EMI) due to the working coil 610 on the receiver coil 620 or an influence of EMI due to the receiver coil 620 on the working coil 610.

The cooking appliance in this embodiment including the receiver coil 620 may be driven by wirelessly receiving power from the induction heating part of the cooktop. Since the cooking appliance does not require untidy power cables, the cooking appliance may be provided with a simple and neat exterior, and may be operated by wirelessly receiving power just by being placed on the cooktop, and thus the user's satisfaction may be further met.

As illustrated in FIGS. 47 to 51, the receiver coil 620 is electrically connected to the second control board 700 disposed behind the working coil 610 and the receiver coil 620. The power wirelessly delivered from the working coil of the cooktop to the receiver coil 620 is transmitted to the second control board 700 electrically connected to the receiver coil 620.

In this embodiment, the inner space in the lower portion of the bottom surface 110 of the housing 100 and the inner space at the rear of the rear surface 140 of the housing 100 are connected to each other. The working coil 610 of the induction heating part disposed at the lower portion of the bottom surface 110 of the housing 100 and the second control board 700 disposed at the rear of the rear surface 140 of the housing 100 may be electrically connected to each other by a cable. The cable connects the working coil 610 and the second control board 700 through the inner space at the lower portion of the bottom surface 110 of the housing 100 and the inner space at the rear of the rear surface 140 of the housing 100 which are connected to each other.

A power processing part provided at the second control board 700 supplies power required for operation of the induction heating part and the like of the second heating part 600. The power processing part is connected to the receiver coil 620 and receives power from the receiver coil 620 and processes the received power to a form suitable for use in the second heating part 600 and the like. The power processing part may include a noise filter PCB, and a coil control PCB for controlling operation of the working coil 610 may be provided on the second control board 700.

The noise filter PCB serves to remove noise from power to be supplied to the working coil 610, and the coil control PCB controls the operation of the working coil 610. A chip for controlling the operation of the working coil 610, e.g., an insulated gate bipolar transistor (IGBT) chip, may be mounted on the coil control PCB.

The IGBT chip is a kind of high heat generation chip that may require temperature management. When the IGBT chip is overheated to a predetermined temperature or more, the IGBT chip is unable to control the working coil 610.

In consideration of such an aspect, a second cooling fan 730 is installed at the second control board 700. The second cooling fan 730 may be a sirocco fan which sucks air from an outside environment of the housing 100 and discharges the air toward the IGBT chip.

The second cooling fan 730 may be disposed at the side of the IGBT chip and may suck air from the rear side of the housing 100 and discharge the air sideward toward the IGBT chip.

The air introduced into the space portion at the rear of the rear surface of the housing 100 through the second cooling fan 730 may first come into contact with the IGBT chip and a heat sink for cooling the IGBT chip, cool the IGBT chip and the heat sink, cool a portion of the noise filter PCB, and then be discharged to the outside environment.

The second control board 700 and the second cooling fan 730 may be fixed to a rear surface supporting panel 750, and fixed to the rear surface 140 of the housing 100.

The rear surface supporting panel 750, as illustrated in FIGS. 3 and 51, may be disposed at the rear of the housing 100. The rear surface supporting panel 750 may be coupled to the rear surface 140 of the housing 100, and fixed to the rear of the housing 100. The rear surface supporting panel 750 may include a main panel part 751 and a first protruding edge part 755.

The main panel part 751 may form a supporting surface supporting the second control board 700. In this embodiment, the main panel part 751 has a shape, e.g., a rectangular shape, similar to the shape of the rear surface 140 of the housing 100, for example.

The main panel part 751 may be made of a lightweight insulating material, and have enough strength to support the second control board 700 and various electronic components disposed on the second control board.

The first protruding edge part 755 may be disposed on an edge of the main panel part 751. The first protruding edge part 755 may protrude rearward from the edge of the main panel part 751. Accordingly, a space encircled by the main panel part 751 and the first protruding edge part 755 may be formed at the rear of the main panel part 751. Additionally, the second control board 700 and the second cooling fan 730 may be disposed in the space.

The rear surface supporting panel 750 may include a first area 750*a* and a second area 750*b*. The first area 750*a* may be an area in which the second control board 700 is disposed, and the second area 750*b* may be an area in which the second control board 700 is not disposed. In this embodiment, the first area 750*a* and the second area 750*b* are disposed in the left-right direction, for example. The first area 750*a* may be disposed on the left side, and the second area 750*b* may be disposed on the right side. The first area 750*a* may occupy most of the area of the rear surface supporting panel 750.

The second cooling fan 730 may be disposed in the second area 750*b*. Additionally, a power source connecting part 735 and a communication module 740 may be disposed in the second area 750*b*.

The power source connecting part 735 may be installed in the second area 750*b* while being disposed on the rear surface supporting panel 750. The power source connecting part 735 may be disposed in a lateral portion of the second control board 700 and electrically connected to the second control board 700.

In an example, the power source connecting part 735 may be provided in an inlet power socket form. The power source connecting part 735 may connect to a plug of a power cable connected to an external power source, to connect to the external power source. Power supplied through the power source connecting part 735 may be processed by the power processing part of the second control board 700 in an appropriate form to be used by the second heating part 60 and the like.

The power source connecting part 735 may be disposed further downward than the second cooling fan 730 while being disposed in the lateral portion of the second control board 700. When the power source connecting part 735 is disposed further upward than the second cooling fan 730, the power source connecting part 735 and a power cable connected to the power source connecting part may be exposed as much as the power source connecting part 735 is disposed further upward than the second cooling fan 730.

When the power cable connected to the power source connecting part 735 is disposed upward, the power cable may act as an obstacle and may be a cause for the fall of the cooking appliance while the cooking appliance is used.

Accordingly, in this embodiment, the power source connecting part 735 may be disposed at a position wherein the power source connecting part 735 is hardly exposed, e.g., on an edge of the lower end of the rear surface of the cooking appliance. Thus, deterioration of aesthetic qualities of the cooking appliance, caused due to the power source connecting part 735 and the power cable connected to the power source connecting part 735, may be effectively prevented, or safety issues, caused by the power cable, may be effectively dealt with.

The communication module 740 may be a communication module enabling wireless communication between an external device, e.g., a smartphone, and the cooking appliance.

In an example, the communication module 740 may be a short-range communication module. For example, the communication module 740 may be a communication module assisting with low power wireless communication such as Bluetooth Low Energy (BLE). In addition, the communication module 740 may include a module such as a Bluetooth communication module, an NFC communication module and the like, assisting with various types of short-range communication.

In another example, the communication module 740 may be a mobile communication module. For example, the communication module 740 may include a module assisting with wireless communication such as Long Term Evolution (LTE), Wi-Fi and the like.

The communication module 740 may be disposed in the lateral portion of the second control board 700. Additionally, the communication module 740 may be disposed in a lower portion of the second cooling fan 730 and in an upper portion of the power source connecting part 735. That is, the communication module 740 may be disposed between the second cooling fan 730 and the power source connecting part 735 while being disposed in the lateral portion of the second control board 700.

In the disposition structure of the communication module 740, while the power source connecting part 735 is disposed at a lowest position among the second cooling fan 730, the communication module 740 and the power source connecting part 735, the communication module 740 may be disposed at a position where a length of wire between the communication module 740 and the second control board 700 is shortest.

The cooking appliance in this embodiment, as illustrated in FIGS. 3, 51 and 52, may further include a rear surface cover 760. The rear surface cover 760 may be disposed behind the rear surface supporting panel 750 and coupled to the rear surface supporting panel 750. The rear surface cover 760 may include a main cover part 761 and a second protruding edge part 765.

The main cover part 761 may form a flat surface parallel with the rear surface supporting panel 750, specifically, the main panel part 751. In this embodiment, the main cover part 761 is formed into a shape, e.g., a rectangle, similar to the shape of the main panel part 751, for example. The main cover part 761 may be made of a lightweight insulating material.

The main cover part 761 and the rear surface cover 760 including the main cover part may be disposed between a rear surface of the cabinet 170 and the second control board 700. The rear surface cover 760 disposed as described above may be provided as an insulating structure for insulating the cabinet 170 made of metal from the second control board 700.

Additionally, the rear surface cover 760 may be provided with a vent hole 762. The vent hole 762 may be formed on the main cover part 761 in a way that penetrates in the front-rear direction. The vent hole 762 may form a passage allowing air to come in and out on the main cover part 761.

The vent hole 762 may be spaced a predetermined distance from the second cooling fan 730. For example, when the second cooling fan 730 is disposed at a position eccentric to the right side on the rear surface of the cooking appliance, the vent hole 752 may be disposed at a position eccentric to the left side.

Accordingly, air discharged from the second cooling fan 730 may be prevented from leaking out of the rear of the rear surface cover 760 too early.

The rear surface cover 760 may have a fan installing hole 763. The fan installing hole 763 may form a passage allowing a portion of the second cooling fan 730, disposed between the rear surface supporting panel 750 and the rear surface cover 760, to be exposed to the rear of the rear surface cover 760. The fan installing hole 763 may be formed on the main cover part 761 in a way that penetrates in the front-rear direction and have a shape corresponding to a shape of the second cooling fan 730.

Most of the area of the second cooling fan 730, specifically, a portion of the second cooling fan 730 exposed to the outside, may be made of an insulating material. Accordingly, even when the portion of the second cooling fan 730 is exposed to the rear of the rear surface cover 760 or contacts the cabinet 170, there is little possibility of an electric problem.

Among components disposed on the rear surface supporting panel 750, the second cooling fan 730 may protrude farthest toward the rear. When a portion of the second cooling fan 730 is exposed to a rear of the rear surface cover 760 as described above, the rear surface cover 760 may be disposed on the rear surface of the cooking appliance such that the rear surface cover 760 does not protrude rearward as much as the portion of the second cooling fan 730 is exposed to the rear of the rear surface cover 760.

That is, a size of the cooking appliance in the front-rear direction may be reduced as much as the portion of the second cooling fan 730 is exposed to the rear of the rear surface cover 760 or the rear surface cover 760 is disposed on the rear surface of the cooking appliance. Additionally, as a result of fitted-coupling between the second cooling fan 730 and the rear surface cover 760, a position where the rear surface supporting panel 750 and the rear surface cover 760 are coupled may be guided, thereby easing the installation of the rear surface cover 760.

The rear surface cover 760 may have a cut part 764. The cut part 764 may be formed in a way that a portion of the main cover part 761 is cut. The cut part 764 may form a passage, connecting between the power source connecting part 735 and the cabinet 170, on the rear surface cover 760.

A second protruding edge part 765 may be disposed on an edge of the main cover part 761. The second protruding edge part 765 may protrude rearward from the edge of the main cover part 761. The second protruding edge part 765 may be coupled to the first protruding edge part 755 of the rear surface supporting panel 750. As a result of the coupling between the second protruding edge part 765 and the first protruding edge part 755, the rear surface cover 760 and the rear surface supporting panel 750 may be coupled such that a predetermined accommodating space is formed between the rear surface cover 760 and the rear surface supporting panel 750.

In an example, any one of the first protruding edge part 755 and the second protruding edge part 765 may be provided with a hook 756, and the other of the first protruding edge part 755 and the second protruding edge part 765 may be provide with a hook 756 may be provided with a hook groove for a coupling with the hook 756.

A through hole 171 may be formed on the rear surfaces of the second control board 700 and the cabinet 170 in a way that penetrates in the front-rear direction. An intake and exhaust grill 175 may be disposed in the through hole 171.

The through hole 171 may form a passage allowing external air to pass through the cabinet 170 and flow into the second control board 700 or allowing air around the second control board 700 to pass through the cabinet 170 and be discharged outward.

The intake and exhaust grill 175 may block a foreign substance from permeating through the through hole 171 while allowing air to be introduced and discharged through the through hole 171. For example, the intake and exhaust grill 175 may include a louver structure.

Meanwhile, as illustrated in FIGS. 47 to 50, the second heating part 600 of the present embodiment may further include a temperature measuring module 640. The temperature measuring module 640 is provided to measure a temperature of the tray or a temperature of the inside of the cooking space 105 in which the tray is disposed.

The temperature measuring module 640 may be disposed at the center of the working coil 610. Specifically, the temperature measuring module 640 may be disposed at a portion where the coil 613 is not disposed on the coil installation base 611, e.g., a central portion of the coil installation base 611.

The temperature measuring module 640 may be fitted and coupled to the working coil 610 via a through hole formed in the central portion of the coil installation base 611. Also, the temperature measuring module 640 installed in this way may include a temperature sensor such as a thermistor and may be disposed at the lower portion of the bottom surface 110 of the housing 100 and measure the temperature of the tray or the temperature of the inside of the cooking space 105 in which the tray is disposed.

[Disposition Relationship Among Hinge Assembly, Second Heating Part, Second Control Board, See-Through Window, First Heating Part, Manipulation Device and First Control Board]

Referring to FIG. 3 and FIGS. 47 to 52, the hinge assemblies 800, the second heating part 600, and the second control board 700 are disposed in the housing 100.

The cooking space 105 may be formed inside the housing 100, and the tray 200 may be installed in the cooking space so as to be withdrawable therefrom. The second heating part 600 for heating the tray 200 is disposed at the lower portion of the housing 100. Also, the hinge assembly 800 which rotatably supports the door 300 is disposed at each lateral portion of the housing 100.

The hinge assemblies 800 are disposed at both lateral portions of the housing 100 in order to stably support the door 300 from both sides of the door 300. Also, the hinge assemblies 800 are associated with rotation of the door 300 and causes the tray 200 to be withdrawn or inserted. To allow the hinge assemblies 800 to be coupled to the tray 200 so that the hinge assemblies 800 may move the tray 200 in the front-rear direction, the hinge assemblies 800 are disposed at both lateral portions of the housing 100.

That is, the hinge assemblies 800 is disposed at both lateral portions of the housing 100 for the hinge assemblies 800 to be coupled to the tray 200 so that the hinge assemblies 800 may stably support the door 300 and move the tray 200 in the front-rear direction.

Further, since the upper surface and the front surface of the housing 100 are open and the second heating part 600 is installed at the lower portion of the housing 100, the hinge assemblies 800 are inevitably disposed at the rear or both lateral portions of the housing 100. Due to the above-described reasons, in many ways, it is advantageous for the hinge assemblies 800 to be disposed at both lateral portions of the housing 100.

The receiver coil 620 is disposed at the lower portion of the housing 100, more specifically, at the lower portion of the second heating part 600. Since the receiver coil 620 is disposed at a position most adjacent to a target of wireless power transmission, e.g., the working coil of the cooktop, the receiver coil 620 may be disposed at the lower portion of the housing 100.

When the receiver coil 620 is disposed at the lower portion of the housing 100 together with the working coil 610 of the second heating part 600 as described above, the EMI of the working coil 610 or the receiver coil 620 may affect each other. In consideration of such an aspect, the electromagnetic shielding plate 630 may be disposed between the working coil 610 and the receiver coil 620.

Since the second control board 700 is a component closely related to power reception through the receiver coil 620 and the operation of the working coil 610, the second control board 700 may be disposed at a position adjacent to the receiver coil 620 and the working coil 610.

Since the second heating part 600 and the receiver coil 620 are disposed at the lower portion of the housing 100, and the hinge assemblies 800 are disposed at both lateral portions of the housing 100, the rear of the housing 100 may be the most suitable position for arrangement of the second control board 700.

In consideration of such aspect, the second control board 700 may be installed in a space at the rear of the rear surface 140 of the housing 100. The second control board 700 installed in this way may be disposed at a position very close to the working coil 610 and the receiver coil 620. Accordingly, wires for connecting the second control board 700, the working coil 610, and the receiver coil 620 may be simply configured.

Also, the position of the second control board 700 disposed at the rear of the housing 100 as described above is also close to the hinge assemblies 800. Accordingly, when configuring wires for connecting the second control board 700 and the components disposed in the door 300, the wires may be easily concealed inside the hinge assemblies 800. There is an advantage in that it is possible to configure the wires in a neat and simple manner such that the wires are not easily exposed to the outside.

As described above, the second heating part 600 and the receiver coil 620, the hinge assemblies 800, and the second control board 700 are disposed at the lower portion of the housing 100, both lateral portions of the housing 100, and the rear of the housing 100, respectively. The components are those suitable to be disposed in the housing 100 and are disposed at optimal positions that allow the components to function optimally, have high structural stability, have neat and simple wiring configurations, and efficiently avoid interference therebetween.

Meanwhile, referring to FIGS. 3, 5 and 34, the see-through window W, the first heating part 400, the manipulation device 1000, and the first control board 500 are disposed in the door 300. The components are those more suitable to be disposed in the door 300 than in the housing 100 due to functions thereof. Also, in consideration of an aspect that various other components are already disposed in the housing 100 and thus it is difficult for other components to be disposed in the housing 100, the see-through window W, the first heating part 400, the manipulation device 1000, and the first control board 500 are more suitable to be disposed in the door 300 than in the housing 100.

The see-through window W is disposed at the upper portion of the cooking appliance. In consideration of a characteristic of the cooking appliance provided in the form of a mini oven in that the cooking appliance is generally used at a position lower than a user's gaze, the see-through window W may be disposed at the upper portion of the cooking appliance rather than being disposed at the front of the cooking appliance.

The see-through window W is disposed at the upper surface of the door 300, more specifically, at the door upper surface part 310. In this case, the larger the size of the see-through window W, the more advantageous it is for securing the field of view for the inside of the cooking space 105. However, the size of the see-through window W may be set to a size that allows a space required for installation of the first heating part 400 and the cable mounting parts 340 and 345 to be secured in the door upper surface part 310.

Like the see-through window W, the first heating part 400 is disposed in the door upper surface part 310. This is a result of designing the first heating part 400 to be disposed at an upper portion facing the second heating part 600 with the tray 200 disposed therebetween. That is, the first heating part 400 is disposed on the door upper surface part 310 so as to be disposed higher than the tray 200.

The first heating part 400 installed in the door upper surface part 310 together with the see-through window W as described above may be disposed at a position at which the first heating part 400 is not exposed through the see-through window W when viewed from the top. When the first heating part 400 is disposed in a region exposed through the see-through window W, it is aesthetically not pleasing, a problem may occur in securing the field of view through the see-through window W, and a problem that the temperature of a portion of the see-through window W rises may also occur.

Also, in consideration of the shape of the door front surface part 350 having a rectangular shape in which a front-rear length is longer than a left-right length, the first heating part 400 may be disposed at the front outer side and the rear outer side of the see-through window W so that a length of the first heating part 400 may be increased accordingly, and improvement in thermal power of the first heating part 400 may be expected as much as the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving thermal power of the first heating part 400.

Since the see-through window W and the first heating part 400 are disposed in the door upper surface part 310 as described above, most of the region of the door upper surface part 310 is occupied by the see-through window W and the first heating part 400. Also, the manipulation device 1000 and the first control board 500 are disposed in the door front surface part 350 instead of the door upper surface part 310.

In consideration of the state in which most of the region of the door upper surface part 310 is occupied by the see-through window W and the first heating part 400, it is not easy to secure a space for installing the manipulation device 1000 in the door upper surface part 310. Also, when the manipulation device 1000 is disposed in the door upper surface part 310, in the process of opening the door 300, a collision may occur between the manipulation device 1000 and an obstacle disposed at the upper portion of the cooking appliance, and there is a risk of damage of the manipulation device 1000. Particularly, when the manipulation device 1000 is provided in the form protruding from the door 300, the risk is even greater.

Also, the door upper surface part 310 in which the first heating part 400 is disposed is likely to have a higher temperature than the door front surface part 350. Considering that the manipulation device 1000 is a component held by the user's hand and manipulated, when the manipulation device 1000 is disposed in the door upper surface part 310, the possibility that the user will come into contact with a hot portion of the door upper surface part 310 in the process of manipulating the manipulation device 1000 may be increased. That is, when the manipulation device 1000 is disposed in the door upper surface part 310, a risk that the user will suffer an injury such as a burn in the process of manipulating the manipulation device 1000 may be increased.

In consideration of such aspect, the manipulation device 1000 is disposed in the door front surface part 350 instead of the door upper surface part 310. Since the manipulation device 1000 is disposed in the door front surface part 350, the user may safely and conveniently control the operation of the cooking appliance from the front of the cooking appliance.

In addition to the manipulation device 1000, the first control board 500 is also disposed in the door front surface part 350. Various components and circuits related to reception of manipulation signals input via the manipulation device 1000, generation of control signals for controlling operations of the first heating part 400 and the second heating part 600, and the like may be provided in the first control board 500. Therefore, in particular, the first control board 500 may be electrically connected to the manipulation device 1000.

In this embodiment, like the manipulation device 1000, the first control board 500 is installed in the door front surface part 350 and disposed at a position very close to the manipulation device 1000. Therefore, connection between the manipulation device 1000 and the first control board 500 may be configured in the form in which the manipulation device 1000 is directly connected to the first control board 500, and, accordingly, a very simple and stable connection structure may be provided for the manipulation device 1000 and the first control board 500.

Also, since the first control board 500 is installed in the door front surface part 350 instead of the door upper surface part 310 in which the first heating part 400, which is a heat generating component, is disposed, the first control board 500 may be disposed at a position deviated, to some extent, from an influence of heat generated by the first heating part 400. In this way, since an influence of heat, which is generated during operation of the first heating part 400, on the first control board 500 may be reduced accordingly, and the stability and operational reliability of the cooking appliance may be further improved.

[Structure of Door Frame]

FIG. 55 is a perspective view separately showing the door frame in FIG. 54, and FIG. 56 is a cross-sectional view taken along line "XXXXXVI-XXXXXVI" in FIG. 53. Additionally, FIG. 57 is a cross-sectional view taken along line "XXXXXVII-XXXXXVII" in FIG. 53. Further, FIG. 58 is a cross-sectional view taken along line "XXXXXVIII-XXXXXVIII" in FIG. 53, and FIG. 59 is an enlarged view showing a portion of the door frame in FIG. 53. Furthermore, FIG. 60 is a perspective view showing a coupling structure between a door frame and a hinge part, FIG. 61 is a cross-sectional view showing a coupling structure between a door frame and a hinge part, and FIG. 62 is a cross-sectional view showing a coupling structure among a door frame, a hinge part and a door.

In FIG. 56, a glass and a reflector are excluded, and in FIGS. 58 to 61, a glass is excluded.

Referring to FIGS. 53 to 56, the door frame 320 is coupled to the door 300 in such a way that the door frame 320 covers the lower portion of the door upper surface part 310. The door frame 320 may be coupled to the door 300 in such a way that the door frame 320 supports the first heating part 400. Also, the first heating part 400 coupled to the door frame 320 may be maintained in a state of being disposed in the door 300, more specifically, at the lower portion of the door upper surface part 310.

The door frame 320 may include a coupling part 321 and a heater mounting part 325. The heater mounting part 325 may be provided in the form protruding from the coupling part 321, and the first heating part 400 may be coupled to the heater mounting part 325.

The coupling part 321 may be coupled to the door upper surface part 310 so that the heater mounting part 325 is supported by the door upper surface part 310. The coupling part 321 may be provided in the form of a square-shaped frame in which a through hole is formed.

A seating surface 322 may be formed at an inner lateral surface of the coupling part 321 adjacent to the through hole. The seating surface 322 may form a plane whose height is lower than that of an upper surface of the coupling part 321, and surrounding portions of edges of the glass 335 may be seated on the seating surface 322.

In this way, the glass 335 seated on the seating surface 322 may be disposed at upper portions of the heater mounting part 325 and the first heating part 400 installed at the heater mounting part 325 in such a way that the glass 335 covers the through hole from the top. In this case, the seating surface 322 may form a plane whose height is lower than that of the upper surface of the coupling part 321. The seating surface 322 may form a plane whose height is lower than that of the coupling part 321 as much as a height substantially corresponding to a thickness of the glass 335. In this way, the glass 335 may be installed in the door frame 320 while being disposed at a position where the glass 335 does not protrude upward past the upper surface of the coupling part 321.

The seating surface 322 may be disposed at both sides of the through hole in the left-right direction. The seating surface 322 may also be disposed at one side or the other side of the through hole in the front-rear direction. In the present embodiment, the seating surface 322 is disposed on both sides of the through hole in the left-right direction and the front-rear direction of the through hole. Accordingly, the glass 335 may be stably installed in the door frame 320 such that surrounding portions of four edges of the glass 335 are supported by the seating surface 322.

Also, since movement of the glass 335 in the left-right direction is restricted by the inner lateral surface of the coupling part 321 surrounding the seating surface 322, an installation position of the glass 335 may be guided in the left-right direction, and shaking of the glass 335 may be suppressed in the left-right direction such that the installation of the glass 335 may be stably performed.

Meanwhile, the first heating part 400 may include a heating element 410, a first connecting end 420, and a second connecting end 430.

The heating element 410 corresponds to a portion emitting heat in the first heating part 400 provided in the form of an electric heater. The heating element 410 may be formed in the shape of a rod having a predetermined length.

The first connecting end 420 is disposed at an end of one side of the heating element 410 in the length-wise direction, and the second connecting end 430 is disposed at an end of the other side of the heating element 410 in the length-wise direction.

At least one of the first connecting end 420 and the second connecting end 430 includes a cylinder-shaped part 421 and a key-shaped part 425. In the present embodiment, both the first connecting end 420 and the second connecting end 430 are illustrated as including the cylinder-shaped part 421 and the key-shaped part 425.

The cylinder-shaped part 421 is disposed at an end of the heating element 410 in the length-wise direction. The cylinder-shaped part 421 may be formed in a cylindrical shape in which an underside of a circular shape is disposed at the outermost end of the first heating part 410.

The key-shaped part 425 is disposed between the heating element 410 and the cylinder-shaped part 421. That is, the key-shaped part 425 is disposed at both side ends of the heating element 410 in the length-wise direction, and the cylinder-shaped part 421 is disposed at the outermost side of the heating element 410 in the length-wise direction.

The key-shaped part 425 may be formed in a flat hexahedral shape whose thickness is smaller than a diameter of the cylinder-shaped part 421 and whose width is larger than the diameter of the cylinder-shaped part 421. For example, a pair of quadrilateral surfaces 426 (hereinafter referred to as "first surfaces") parallel to a width direction of the key-shaped part 425 may be disposed to be spaced apart from each other in a thickness direction of the key-shaped part 425 and form two lateral surfaces of the key-shaped part 425. Also, two pairs of quadrilateral surfaces 427 (hereinafter referred to as "second surfaces") parallel to the thickness direction of the key-shaped part 425 may be disposed between the pair of first surfaces 426 and form an upper surface and a lower surface of the key-shaped part 425.

In this case, the first surface 426 may be formed of a quadrilateral surface having a side longer than the diameter of the cylinder-shaped part 421, and the second surface 427 may be formed of a quadrilateral surface having a side shorter than the diameter of the cylinder-shaped part 421.

Therefore, when the first connecting end 420 or the second connecting end 430 is viewed in the length-wise direction of the first heating part 410, the cylinder-shaped part 421 may protrude outward past the key-shaped part 425 in the radial direction of the cylinder-shaped part 421 in most of the region, and the key-shaped part 425 may protrude outward past the cylinder-shaped part 421 in the radial direction of the cylinder-shaped part 421 only in a portion of the region.

The heater mounting part 325 is provided to fix the first connecting end 420 and the second connecting end 430 as described above. The heater mounting part 325 may include a first connecting end fixing part 326 which fixes the first connecting end 420 and a second connecting end fixing part 327 which fixes the second connecting end 430.

At least one of the first connecting end fixing part 326 and the second connecting end fixing part 327 may include a cover a and a support wall b. In the present embodiment, both the first connecting end fixing part 326 and the second connecting end fixing part 327 are illustrated as identically including the cover a and the support wall b.

The cover a is provided in the form of surrounding surrounding portions of the connecting end from the outer side of the connecting end in the circumferential direction. The cover a may be formed in a curved shape surrounding a lower portion and a lateral portion of the connecting end and may be formed in a length corresponding to a length of the connecting end or in a length slightly longer than the length of the connecting end.

In this embodiment, the cover a has a "U" shape, for example. The cover a may be formed in a way that encircles a lower portion and both lateral portions of a support wall b while encircling the support wall b. The cover a may have an upper portion that is open.

Further, the heater mounting part 325 may further include a first transverse supporter 323. The first transverse supporter 323 is disposed at a side farther from the center of the cooking space in the front-rear direction than the first heating part 400 and connects the first connecting end fixing part 326 and the second connecting end fixing part 327 to each other. The first transverse supporter 323 may be formed into a plate having a length extending along the length-wise direction of the first heating part 400.

Additionally, the heater mounting part 325 may further include a second transverse supporter 324. The second transverse supporter 324 may be disposed closer to a center of the cooking space in the front-rear direction thereof than to the first heating part 400 and may connect between the first connecting end fixing part 326 and the second connecting end fixing part 327. In other words, the second transverse supporter 324 may be disposed to face the first transverse supporter 323 with the cover a between the first transverse supporter 323 and the second transverse supporter 324 and may connect between the first connecting end fixing part 326 and the second connecting end fixing part 327.

Like the first transverse supporter 323, the second transverse supporter 324 may be formed into a plate having a length extending along the length-wise direction of the first heating part 400

In this embodiment, the first connecting end fixing part 326 and the second connecting end fixing part 327 may be respectively disposed at ends of both sides of the first heating part 400 in the length-wise direction thereof. Additionally, the first transverse supporter 323 may be disposed farther from a center of the cooking space in the front-rear direction thereof than the first heating part 400. The second transverse supporter 324 may be disposed closer to the center of the cooking space in the front-rear direction thereof than the first heating part 400.

Additionally, the cover a may be respectively mounted onto the first connecting end fixing part 326 and the second connecting end fixing part 327, and each cover a may connect respectively to ends of the first transverse supporter 323 and the second transverse supporter 324 in the length-wise direction thereof.

That is, upper sides of each of the covers a may respectively connect to the first transverse supporter 323 and the second transverse supporter 324.

The support wall b is disposed in the space surrounded by the cover a. The support wall b may be formed to protrude toward the space from the cover a. The support wall b formed in this way may divide the space surrounded by the cover a into an inner side space and an outer side space in the length-wise direction of the first heating part 400. Also, the connecting end may be fitted and coupled to the support wall b.

The support wall b may have a seating groove c.

The seating groove c may be concavely formed on the support wall b. An entrance of the seating groove c may be open upward. By a cylinder-shaped part a being fitted into the seating groove c, the connecting end may be fitted and coupled to the support wall b.

Also, the connecting end may further include an extension part 422. The extension part 422 may be formed by the cylinder-shaped part 421 extending toward the key-shaped part 425. The extension part 422 is formed to protrude outward in the thickness direction of the key-shaped part 425 from the first surface 426 of the key-shaped part 425 so that a step 423 is formed at a surface of the extension part 422 parallel to the width direction of the key-shaped part 425, that is, between the extension part 422 and the first surface 426. By having the extension part 422 formed in this way, a region in which the extension part 422 and the key-shaped part 425 overlap with each other is formed in a portion of the key-shaped part 425 adjacent to the cylinder-shaped part 421.

In this region, the extension part 422 protrudes further in the thickness direction of the key-shaped part 425 than the first surface 426 of the key-shaped part 425, and the second surface 427 of the key-shaped part 425 protrudes further in the width direction of the key-shaped part 425 than the extension part 422.

Since the extension part 422 is formed as described above, a strength of a coupling portion between the cylinder-shaped part 421 and the key-shaped part 425 may be further reinforced. When the extension part 422 is not present, the coupling portion between the cylinder-shaped part 421 and the key-shaped part 425 would be limited to an end portion of a lateral surface of the key-shaped part 425. However, since the extension part 422 is formed at the connecting end, the coupling portion between the cylinder-shaped part 421 and the key-shaped part 425 may extend to the point where the extension part 422 and the key-shaped part 425 overlap with each other, and thus the strength of the coupling portion between the cylinder-shaped part 421 and the key-shaped part 425 may be further reinforced.

The heater mounting part 325 may further include a connecting end supporting member 329. The connecting end supporting member 329 may fix a connecting end to the support wall b while pressing the connecting end seated in the seating groove c in a direction where the connecting end closely contacts the support wall b. The connecting end supporting member 329 may include a coil spring 329a disposed in upper portions of the seating groove c and the support wall b.

The coil spring 329a may be disposed in a direction across an entrance of the seating groove c in the upper portion of the seating groove c. The coil spring disposed as described above may be disposed to block the entrance of the seating groove c from the connecting end.

The coil spring 329a may be provided with a first coupling part 329b at one end of the coil spring 329a in a length-wise direction thereof, and a second coupling part 329c at the other end in the length-wise direction thereof.

The support wall b may be provided with a first spring coupling part j and a second spring coupling part k in the upper portion thereof. The first spring coupling part j and the second spring coupling part k may be spaced a predetermined distance apart from each other with the seating groove c therebetween while being disposed in the upper portion of the support wall b.

The first coupling part 329b may be coupled to the first spring coupling part j, and the second coupling part 329c may be coupled to the second spring coupling part k.

In this embodiment, the first coupling part 329b and the second coupling part 329c are respectively formed into a ring having a hollow hole that is formed in the up-down direction, for example.

Additionally, any one of the first spring coupling part j and the second spring coupling part k may be formed into a projection protruding upward from the support wall b, and the other of the first spring coupling part j and the second spring coupling part k may have a fastening hole that extends in the up-down direction in the support wall b.

In this embodiment, the first spring coupling part j is formed into a projection protruding upward from the support wall b, and the second spring coupling part k has a fastening hole that is formed in the support wall b, for example.

In this case, as a result of fitted-coupling between the first coupling part 329b and the first spring coupling part j, one side of the connecting end supporting member 329 in the length-wise direction and the support wall b may be coupled. As a result of screw-coupling between the second coupling part 329c and the second spring coupling part k, the other side of the connecting end supporting member 329 in the length-wise direction and the support wall b may be coupled.

The coil spring installed as described above may keep pressing the connecting end downward, in the upper portion of the connecting end. Accordingly, the connecting end may be elastically supported by the coil spring, i.e., the connecting end supporting member 329, in the seating groove c.

With the above structure for supporting the connecting end, the first heating part 400 is much less likely to be broken. In the above structure for supporting the connecting end, when an impact is applied to the first heating part 400 or an impact applied to the door 300 is delivered to the first heating part 400 during opening and closing the door 300, the impact on the first heating part 400 may be significantly buffered.

If the first heating part 400 is firmly fixed to an inside of the seating groove c not to make any movement, the first heating part 400 may be entirely affected by an impact applied to the first heating part 400, and may be highly likely to be broken.

In this embodiment, the first heating part 400 may be elastically supported by the connecting end supporting member 329. Accordingly, when an impact is applied to the first heating part 400, the first heating part 400 may not be affected by the impact to a certain degree while moving in the seating groove c, and then return to a primary state and then maintain the state stably.

That is, in this embodiment, the first heating part 400 may be stably disposed on the heater mounting part 325 while being elastically supported by the connecting end supporting member 329, and the damage to the first heating part 400, caused by an impact, may be effectively suppressed.

In the above structure for supporting the connecting end, the first heating part 400 may be installed simply by screw-coupling the other side of the connecting end supporting member 329 in the length-wise direction may be screw-coupled to the second spring coupling part k in a state in which one side of the connecting end supporting member 329 in the length-wise direction thereof is held and fixed to the first spring coupling part j.

In summary, with the above structure for supporting the connecting end using the connecting end supporting member 329, the first heating part 400 may be stably installed, less likely to be broken, and ensure improvement in convenience of installation.

Meanwhile, each of the first connecting end fixing part 326 and the second connecting end fixing part 327 may further include an outer wall f. The outer wall f may be disposed at an outer side of each support wall b in a length-wise direction of the heating element 410 and may be connected to the inner lateral surface of the coupling part 321. The outer wall f forms an outermost side wall of each of the first connecting end fixing part 326 and the second connecting end fixing part 327 in the length-wise direction of the heating element 410.

A space surrounded by the cover a, the support wall b, and the outer wall f is formed in each of the first connecting end fixing part 326 and the second connecting end fixing part 327. The corresponding space is a space whose side and lower portions are surrounded by the cover a, the support wall b and the outer wall f. At least a portion of the cylinder-shaped part 421 at a fixing end fixed to the first connecting end fixing part 326 or the second connecting end fixing part 327 is inserted into the space.

In the space, the cylinder-shaped part 421 may be connected to a cable. The cable connected to the cylinder-shaped part 421 may be a signal cable which transmits a control signal generated in the first control board 500 to the first heating part 400, may be a power cable which supplies power to the first heating part 400, or may be both the signal cable and the power cable.

Referring to FIG. 7, the signal cable and the power cable may be installed at the cable mounting parts 340 and 345 provided in the door upper surface part 310. Also, the coupling between the door upper surface part 310 and the door frame 320 is performed in a state in which the coupling part 321 covers the portions where the cable mounting parts 340 and 345 are disposed.

A plurality of fastening bosses 341 and 346 may be disposed in the cable mounting parts 340 and 345. Also, a plurality of fastening holes 320a may be disposed in the door frame 320 so as to correspond to the fastening bosses. When portions where the fastening holes 320a and the fastening bosses are formed are fastened using a fastening member after matching the positions of the door upper surface part 310 and the door frame 320 so that the positions of the fastening holes 320a and the fastening bosses 341 and 346 match with each other, the coupling between the door upper surface part 310 and the door frame 320 may be performed. In this case, the portions where the cable mounting parts 340 and 345 are disposed are covered by the coupling part 321.

Although the glasses 330 and 335 do not cover the portions where the cable mounting parts 340 and 345 are disposed, the first heating part 400 and the heater mounting part 325 are disposed at a lower portion of a region covered by the glass 335. Therefore, for the cables installed at the cable mounting parts 340 and 345 to be connected to the connecting end, as illustrated in FIGS. 53 to 56, a passage should be formed between the region of the coupling part 321 not covered by the glass 335 and the region of the heater mounting part 325 covered by the glass 335.

In consideration of such aspect, in the present embodiment, a concave groove g is provided in a connecting portion between the outer wall f and the coupling part 321. At the connecting portion between the outer wall f and the coupling part 321, the concave groove g forms the upper surface of the coupling part 321, more specifically, a surface more concave than the seating surface 322 of the coupling part 321. The concave groove g formed in this way provides a gap through which the cable may pass to be disposed at a lower portion of the glass 335 seated on the seating surface 322, thereby allowing a passage through which the cable may pass to be disposed between the cable mounting parts 340 and 345 (see FIG. 7) and the space housing the cylinder-shaped part 421 of the connecting end.

Meanwhile, the cooking appliance of the present embodiment may further include a reflector 440 and a protective grill 450.

The reflector 440 may be a component configured to reflect heat of the first heating part 400 to concentrate the heat of the first heating part 400 on the tray 200 (see FIG. 1). The reflector 440 may reflect the heat of the first heating part 400 while blocking the first heating part 400 from the first transverse supporter 323 and blocking the first heating part 400 from the glass 335.

The reflector 440, as illustrated in FIGS. 54, 57 and 58, may include a first reflector 441 and a second reflector 445.

The first reflector 441 may be disposed between the first heating part 400 and the glass 335. The first reflector 441 may block the first heating part 400 from the glass 335, and block the first heating part 400 from the first transverse supporter 323.

The first reflector 441 may be formed into a surface that is across among the first heating part 400, the first transverse supporter 323, and the glass 335 at a slant. In this embodiment, the first reflector 441 has a rounded inclined shape, e.g., a shape similar to a " Ɔ" shape, for example.

The second reflector 445 may be disposed between the first reflector 441 and the glass 335. The second reflector 445 may block the first reflector 441 from the glass 335.

The second reflector 445 may be formed into a flat surface parallel with the glass 335. The second reflector 445 may connect to the first reflector 441 in an upper portion of the first reflector 441.

The reflector 440 may be formed in a way that a single metal plate is bent such that the first reflector 441 and the second reflector 445 integrally connect to each other. For example, the reflector 440 may be formed in a way that a single metal plate is bent such that the first reflector 441 in an upper portion and the second reflector 445 in a lower portion connect to each other in a " ㄷ" shape.

The reflector 440 may be made of an elastically deformable metal material. In the reflector 440, the first reflector 441 rounded of the first reflector 441 and the second reflector 445 may be elastically deformed in the up-down direction or in the front-rear direction.

Between the first reflector 441 and the second reflector 445 disposed in the up-down direction, a space encircled by the first reflector 441 and the second reflector 445 and the first transverse supporter 323 may be formed.

In the space, heat transfer between the first reflector 441 and the second reflector 445 may be suppressed. That is, the space may suppress the transfer of heat of the first heating part 400, which heats the first reflector 441 adjacent to the first heating part 400, to the second reflector 445.

Accordingly, an increase in temperature of the upper surface of the door 300, i.e., the door upper surface part 310, caused by the heat of the first heating part 400, may be suppressed to some degree.

The reflector 440 may be disposed on the door frame 320 as a result of coupling to the second transverse supporter 324 and the cover a.

To this end, the second transverse supporter 324 may be provided with a first reflector supporting projection 1, and the cover a may be provided with a second reflector supporting projection m.

The second reflector supporting projection m may protrude from the cover a. In this embodiment, the cover a may have a "U" shape that encircles the reflector 440 from the front, the rear and the lower portion. The cover a may include a floor surface disposed in a lower portion of the reflector 440, and a lateral wall disposed at a front or a rear of the reflector 440.

The first reflector supporting projection 1 may protrude from the second transverse supporter 324 toward the first transverse supporter 323. The first reflector supporting projection 1 may be disposed further upward than the reflector 440. In this case, the first reflector supporting projection 1 may be disposed near a lateral wall of the lateral walls of the cover a, which is adjacent to the second transverse supporter 324.

The second reflector supporting projection m may be disposed near a lateral wall of the lateral walls of the cover a, which is adjacent to the first transverse supporter 323. The second reflector supporting projection m may protrude at a position spaced a predetermined distance apart from the lateral walls of the cover a while protruding from the floor surface of the cover a.

The first reflector supporting projection 1 disposed further upward than the reflector 440 may interfere with the second reflector 445 to regulate an up-down position of the second reflector 445. That is, an upper surface of the second reflector 445 may contact the first reflector supporting projection 1 disposed further upward than the reflector 440. Accordingly, the up-down position of the second reflector 445 may be regulated to an area further downward than the first reflector supporting projection 1.

An end on a lower side of the first reflector 441 may be inserted into a space between the lateral wall of the cover a and the second reflector supporting projection m. Accordingly, the first reflector 441 and the cover a may be fitted-coupled. As a result of the fitted-coupling between the first reflector 441 the cover a, a front-rear position of the first reflector 441 may be regulated.

As described above, the up-down position of the second reflector 445 may be regulated by the first reflector supporting projection 1, and the front-rear and up-down positions of the first reflector 441 may be regulated by the second reflector supporting projection m. Accordingly, the reflector 440 may be guided and installed into an area between a floor surface of the cover a and the first reflector supporting projection 1 and into an area between both lateral walls of the cover a.

The reflector 440 may have an up-down length greater than a distance between the floor surface of the cover a and the first reflector supporting projection 1, and may be elastically deformed in the up-down and front-rear directions. Accordingly, for the reflector 440, the first reflector 441 may be fitted-coupled to the cover a, and the second reflector 445 may be fixed to an inner area of the cover a in a way that the second reflector 445 is fitted to a lower portion of the first reflector supporting projection 1.

In this case, the reflector 440 may be installed in a way that the reflector 440 contracts in the up-down direction between the floor surface of the cover a and the first reflector supporting projection 1. Thus, the reflector 440 may be firmly fixed to the inner area of the cover a.

The reflector 400 installed as described above may reflect heat of the first heating part 400 while blocking the first heating part 400 from the first transverse supporter 323 and blocking the first heating part 400 from the glass 335, thereby contributing to the concentration of the heat of the first heating part 400 on the tray 200.

The protective grill 450, as illustrated in FIGS. 53 to 56, is provided as a component for protecting the first heating part 400 while allowing the heat of the first heating part 400 to be transmitted to the tray 200. The protective grill 450 is spaced apart from the first transverse supporter 323 with the first heating part 400 between the protective grill 450 and the first transverse supporter 323, or spaced apart from the glass 335 with the first heating part 400 between the protective grill 450 and the glass 335.

The protective grill 450 may include a plurality of steel wires 451. Each steel wire 451 has a length extending in the length-wise direction of the first heating part 400 in such a way that each steel wire 451 has a length substantially corresponding to the length of the first heating part 400 or a length slightly longer than the length of the first heating part 400.

The plurality of steel wires 451 are arranged in the form surrounding the surrounding portion of the first heating part 400 from the outside of the first heating part 400 in the circumferential direction. The plurality of steel wires 451 may be spaced a predetermined distance apart from each other in the circumferential direction of the first heating part 400.

In this embodiment, the surrounding portion of the first heating part 400 in the circumferential direction is surrounded by the reflector 440 and the protective grill 450. That is, one side of the first heating part 400 in the front-rear direction and an upper portion of the first heating part 400 are surrounded by the reflector 440, and the remaining portions of the first heating part 400, that is, the other side of the first heating part 400 in the front-rear direction, and the lower portion of the first heating part 400 are surrounded by the protective grill 450.

Accordingly, the plurality of steel wires 451 are arranged in the form of surrounding the other side of the first heating part 400 in the front-rear direction and the lower portion of the first heating part 400 from the outer side of the first heating part 400 in the circumferential direction.

The protective grill 450 may be installed in the door frame 320 in such a way that ends of both sides of the protective grill 450 in the length-wise direction thereof are respectively fixed to the first connecting end fixing part 326 and the second connecting end fixing part 327 and disposed on the door frame 320.

To this end, a grill fixing part may be provided in each of the first connecting end fixing part 326 and the second connecting end fixing part 327. The grill fixing part is provided as a means for fixing the steel wires 451 of the protective grill 450 to the heater mounting part 325. The grill fixing part may include a plurality of fixing ribs h.

The plurality of fixing ribs h are spaced a predetermined distance apart from each other in the direction in which the plurality of steel wires 451 are arranged. Also, each fixing rib h is formed to protrude from the cover a toward the first heating part 400. Accordingly, a fixing groove may be formed between the fixing ribs h. The distance between the fixing ribs h may be determined such that the fixing groove has a width corresponding to a thickness of the steel wire 451.

By fitting and fixing the steel wire 451 to each of the fixing grooves formed among the plurality of fixing ribs h as described above, the protective grill 450 and the grill fixing part may be fitted-coupled. In this way, the protective grill 450 may be easily and rapidly installed in the door frame 320 simply by fitting and fixing the ends of both sides of the protective grill 450 to the grill fixing part formed in each of the first connecting end fixing part 326 and the second connecting end fixing part 327.

Further, the plurality of fixing ribs h formed to protrude from the cover a as described above may also serve as reinforcing structures for improving the strength of the cover a.

The heater mounting part 325 may further include a grill supporting part 328. The grill supporting part 328 may be disposed between a first connecting end fixing part 326 and a second connecting end fixing part 327. The grill supporting part 328 may support steel wires between the first connecting end fixing part 326 and the second connecting end fixing part 327.

The grill supporting part 324 may include a cover 328a and a plurality of fixing ribs 328b. The cover 328a may have a shape identical with or similar to a shape of the cover a of the first connecting end fixing part 326 or the second connecting end fixing part 327. For example, the cover 328a may have a "U" shape having an upper portion open.

The plurality of fixing ribs 328b may have a shape identical with or similar to a shape of the fixing rib h of the first connecting end fixing part 326 or the second connecting end fixing part 327. That is, the fixing ribs 328b may be spaced a predetermined distance apart from each other along a direction in which a plurality of steel wires 451 are arranged. Each of the fixing ribs 328b may protrude from the cover 328a, and accordingly, a fixing groove may be formed between the fixing ribs 328b.

The steel wire 451 may be fitted and fixed into each of the fixing grooves formed among the plurality of fixing ribs

328b, such that the protective grill 450 and the grill supporting part 324 are fitted-coupled.

The grill supporting part 324, disposed between the first connecting end fixing part 326 and the second connecting end fixing part 327 as described above, may support the protective grill 450 between the first connecting end fixing part 326 and the second connecting end fixing part 327, to suppress sagging of a central portion of the protective grill 450 in a length-wise direction thereof and to ensure stable fixation of the protective grill 450.

Additionally, the cover a of any one of the first connecting end fixing part 326 and the second connecting end fixing part 327 may be provided with a grill passing hole, as illustrated in FIGS. 55 and 59. In this embodiment, the cover a of the first connecting end fixing part 326 is provided with the grill passing hole, for example. The grill passing hole may form a passage needed for the steel wire 451 of the protective grill 450 to pass through the cover a in the up-down direction.

The grill passing hole may be disposed at an end of the cover a, specifically, at an end of one side of the cover a, facing the second connecting end fixing part 327. In this embodiment, the fixing rib h may be disposed between the support wall b and the grill passing hole. The grill passing hole may be open toward the second connecting end fixing part 327 and may include a wide width part n and a narrow width part o.

The wide width part n may be disposed at an end of the cover a in a length-wise direction thereof, specifically, between the end of one side of the cover a, facing the second connecting end fixing part 327, and the fixing rib h. The wide width part n may be formed in a way that passes through the cover a.

The narrow width part o may be disposed between the wide width part n and the fixing rib h, and formed in a way that passes through the cover a. The narrow width part o may be open toward the second connecting end fixing part 327. The narrow width part o may connect to the wide width part n and may have a width less than a width of the wide width part n.

The narrow width part o may have a width less than that of the wide width part n, and may be disposed inside the wide width part n in a width-wise direction thereof. The narrow width part o may have a width corresponding to a thickness of the steel wire 451 while having a width greater than the thickness of the steel wire 451.

At least one of the fixing grooves, formed among the plurality of fixing ribs h disposed in the first connecting end fixing part 326, may be disposed at a position where at least one of the fixing grooves does not overlap the narrow width part o in the up-down direction while overlapping the wide width part n in the up-down direction.

Thus, the first connecting end fixing part 326 may be provided with a passage needed for the steel wire 451 of the protective grill 450 to pass through the cover a in the up-down direction, and a structure for fixing the steel wire 451 to the first connecting end fixing part 326.

In this embodiment, the steel wire 451 may be installed in a way that one side of the steel wire 451 in a length-wise direction thereof is fixed to the second connecting end fixing part 327 and then the other side of the steel wire 451 in the length-wise direction thereof is fixed to the first connecting end fixing part 326.

If the first heating part 400 or the reflector 450 is first installed, it is difficult for the steel wire 451 to be installed in a way that the steel wire 451 is fitted into the first connecting end fixing part 326 and the second connecting end fixing part 327 from an upper portion of the door frame 320 to a lower portion thereof.

In this case, the steel wire 451 may be installed in a way that the steel wire 451 is fitted into the first connecting end fixing part 326 and the second connecting end fixing part 327 in the lateral direction.

To this end, the steel wire 451 may pass through the inner area of the grill supporting part 324 from the first connecting end fixing part 326 side in the lateral direction. Then the steel wire 451 may be pushed in the lateral direction, fitted into the second connecting end fixing part 327, fitted into the fixing groove of the second connecting end fixing part 327 and then fixed.

In a state in which one side of the steel wire 451 in the length-wise direction thereof is fixed, the other side of the steel wire 451 in the length-wise direction thereof may be disposed in the lower portion of the first connecting end fixing part 326. For the other side of the steel wire 451 in the length-wise direction thereof to be fitted into the first connecting end fixing part 326, the other side of the steel wire 451 in the length-wise direction thereof needs to pass through the cover a in the upward direction.

In this embodiment, the other side of the steel wire 451 in the length-wise direction thereof may pass through the grill passing hole, pass through the cover a, and inserted into the first connecting end fixing part 326. The steel wire 451, inserted into the first connecting end fixing part 326 as described above, may be fitted into and fixed to the fixing groove of the first connecting end fixing part 326.

Though not illustrated, after the first heating part 400 is installed and the connecting ends and the cables are connected, upper portions open of the first connecting end fixing part 326 and the second connecting end fixing part 327 (see FIG. 31) may be covered with caps so that the connecting ends are protected. For a coupling between the caps, and the first connecting end fixing part 326 and the second connecting end fixing part 327, a coupling projection i may protrude from an upper portion of the cover a.

The reflector 440 may further include a fitted-coupling projection 447. The fitted-coupling projection 447 may protrude from the second reflector 445 in the front-rear direction. The fitted-coupling projection 447 may have a fitting hole. The fitted-coupling projection 447 may be fitted-coupled to the coupling projection i such that the coupling projection i is inserted into the fitting hole.

As result of the coupling between the fitted-coupling projection 447 and the coupling projection i, the cover a and the reflector 440 may be coupled. Accordingly, the reflector 440 may be fixed more stably.

The door frame 320 may be provided with a hinge passing hole 320b, as illustrated in FIG. 55. The hinge passing hole 320b may be formed in a way that passes through the coupling part 321 in the up-down direction. The hinge passing hole 320b may form a passage for allowing a hinge part 910 to pass through the door frame 320, on the door frame 320.

Additionally, the door frame 320 may be provided with a first hinge coupling part 320c and a second hinge coupling part 320d, as illustrated in FIGS. 55 and 60 to 62. The first hinge coupling part 320c and the second hinge coupling part 320d may be provided as a structure for coupling between the hinge part 910 of a hinge assembly 900 and the door frame 320.

The first hinge coupling part 320c and the second hinge coupling part 320d may be respectively coupled to the hinge part 910 in different directions. For example, any one of the first hinge coupling part 320c and the second hinge coupling part 320d may be coupled to the hinge part 910 in the lateral direction, and the other of the first hinge coupling part 320c and the second hinge coupling part 320d may be coupled to the hinge part 910 in the up-down direction.

In this embodiment, the first hinge coupling part 320c is coupled to the hinge part 910 in the lateral direction, and the second hinge coupling part 320d is coupled to the hinge part 910 in the up-down direction, for example.

Accordingly, the first hinge coupling part 320c may be disposed in a lateral portion of the hinge passing hole 320b. The first hinge coupling part 320c may protrude from the door frame 320 at a position very close to the hinge passing hole 320b. The first hinge coupling part 320b may form a coupling surface facing the hinge part 910 in the lateral direction.

The second hinge coupling part 320d may be disposed at a front of the hinge passing hole 320b. The second hinge coupling part 320d may form a coupling surface, facing the hinge part 910 in the up-down direction, in the upper portion of the hinge passing hole 320b. In an example, for the second hinge coupling part 320d, a surface, spaced a predetermined distance apart from the hinge passing hole 320b and disposed in the upper portion of the hinge passing hole 320b, may be a coupling surface coupled to the hinge part 910, and the coupling surface may be supported by lateral walls protruding from the door frame 320.

The hinge part 910 and the door frame 320 are coupled as follows. In this embodiment, another coupling between the hinge part 910 of the hinge assembly 900 and the door frame 320 is described. In this case, the hinge part 910 may include a first hinge link 911, a second hinge link 912, a third hinge link 913 and a fourth hinge link 914.

The hinge part 910 may include a plurality of hinge links. Among the hinge links, the first hinge link 911 may be directly coupled to the door frame 320. The first hinge link 911 may be coupled to the door frame 320 and swivel along with the door 300.

The second hinge link 912 and the third hinge link 913 may connect to the first hinge link 911. The second hinge link 912 and the third hinge link 913 may rotatably connect to the first hinge link 911 at different points. The second hinge link 912 and the third hinge link 913 may connect to the fourth hinge link 914 connected to a converting and outputting part 940.

When the door 300 swivels, postures of the second hinge link 912 and the third hinge link 913 connected to the first hinge link 911 may change. Accordingly, a posture of the fourth hinge link 914 connected to the second hinge link 912 and the third hinge link 913 may change. Thus, power needed for moving the tray 200 may be generated, and a direction in which the power is applied may be changed to a linear direction by the converting and outputting part 940, such that the tray 200 moves.

The first hinge link 911 may pass through the hinge passing hole 320b from the lower portion of the door frame 320 and coupled to the door frame 320 in the upper portion of the door frame 320. In this embodiment, the first hinge link 911 is formed into a rectangular rod including both lateral surfaces and an upper surface, for example.

The lateral surface of the first hinge link 911 may be coupled to the first hinge coupling part 320c. The upper surface of the first hinge link 911 may be coupled to the second hinge coupling part 320d. The lateral surface of the first hinge link 911 may be screw-coupled to the first hinge coupling part 320c, and the upper surface of the first hinge link 911 may be screw-coupled to the second hinge coupling part 320d.

In this embodiment, the lateral surface of the first hinge link 911 and the first hinge coupling part 320*c* may be coupled in the lateral direction, and the upper surface of the first hinge link 911 and the second hinge coupling part 320*d* may be coupled in the up-down direction.

Since the hinge part 910 and the door frame 320 are coupled at a plurality of points in different directions as described above, the hinge part 910 and the door frame 320 may be coupled more stably using an increased coupling force.

The door frame 320 may be provided with a plurality of fastening holes 320*a*, and some of the fastening holes 320*a* may be disposed near the hinge passing hole 320*b*. As a result, the door frame 320 and the door upper surface part 310 may be coupled at a position very close to the hinge passing hole 320*b*, thereby suppressing a separation between the door frame 320 and the door upper surface part 310 effectively near the hinge passing hole 320*b*.

The door frame 320 with the above-described configuration in this embodiment may provide the following advantageous effects.

First, since the door frame 320 is coupled to the lower portion of the door upper surface part 310, the door frame 320 may cover the lower portion of the door upper surface part 310 so that the cable mounting parts 340 and 345 (see FIG. 7) inside the door upper surface part 310 and the cables in the cable mounting parts 340 and 345 are not exposed to the outside.

The door frame 320 may be coupled to the lower portion of the door upper surface part 310 in a way that the door frame 320 is fastened to the cable mounting parts 340 and 345 and the like using a fastening member in a state in which the portions, where the cable mounting parts 340 and 345 are disposed, are covered by the coupling part 321. The door frame 320 coupled to the lower portion of the door upper surface part 310 may cover the cable mounting parts 340 and 345 (see FIG. 7) disposed inside the door upper surface part 310 and the cables installed in the cable mounting parts 340 and 345 so that the cable mounting parts 340 and 345 and the cables are not exposed to the outside, and the door frame 320 may be easily separated from the door 300 when necessary. Since the door frame 320 may protect the components inside the door upper surface part 310 while being easily detachable when necessary, the door frame 320 may help to maintain and repair the cooking appliance easily and rapidly.

Second, the door frame 320 provides a frame in which the first heating part 400, the components related thereto, and the glass 335 are assembled to a single unit body. In this way, the door frame 320 may help to manufacture and manage the components more efficiently.

In addition to the structures for fixing the glass 335 to the door frame 320, the structures for fixing the first heating part 400, the reflector 440, and the protective grill 450 to the door frame 320 are also provided in the door frame 320.

Accordingly, the glass 335, the first heating part 400, the reflector 440, and the protective grill 450 may be provided as an integrally-assembled unit body coupled to the door frame 320, and the glass 335, the first heating part 400, the reflector 440, and the protective grill 450 may be assembled at a time simply by coupling the door frame 320 to the lower portion of the door upper surface part 310.

Third, since the door frame 320 provides structures that allow the first heating part 400 to be easily and rapidly installed in the door frame 320, the door frame 320 may help to install the first heating part 400 more efficiently.

In this embodiment, the end of one side of the first heating part 400 is fitted to any one of the first connecting end fixing part 326 and the second connecting end fixing part 327, and the first heating part 400 is moved in the length-wise direction thereof so that the ends of both sides of the first heating part 400 are respectively fitted to the first connecting end fixing part 326 and the second connecting end fixing part 327 and then fixed by the connecting end supporting member 329. During the simple procedures, the first heating part 400 may be installed.

In this case, since the first connecting end fixing part 326 and the second connecting end fixing part 327 are not intended to have directionality, the first heating part 400 may be installed as long as the end of one side of the first heating part 400 is fitted to any one of the first connecting end fixing part 326 and the second connecting end fixing part 327.

The door frame 320, as described above, may help to install the first heating part 400 more efficiently, to manufacture a cooking appliance and further to repair and replace the first heating part 400 easily and rapidly.

Fourth, the first heating part 400 may be elastically supported by the connecting end supporting member 329 and stably disposed on the heater mounting part 325, thereby installing the first heating part 400 easily and rapidly and suppressing damage to the first heating part 400 effectively.

[Another Example of Hinge Assembly]

FIG. 63 is a perspective view showing a cooking appliance in another embodiment, FIG. 64 is a cross-sectional view taken along line "XXXXXXIV-XXXXXXIV" in FIG. 63, and FIG. 65 is a view showing a flow of air in the cooling channel in FIG. 64.

Hereunder, another example of the hinge assembly is described with reference to FIGS. 63 to 65.

Referring to FIGS. 65 and 66, the hinge assembly 900 may be respectively disposed on both sides of the housing 100 in the left-right direction thereof such that the hinge assembly 900 is respectively disposed outside the tray 200 in the left-right direction thereof. Each of the hinge assemblies 900 may include a hinge case 930, a hinge part 910, a mounting projection 920 and a converting and outputting part 940.

The structures and shapes of the hinge case 930, the hinge part 910, the mounting projection 920 and the converting and outputting part 940 in this embodiment are similar to those of the hinge case 830 (see FIG. 29), the mounting projection 820 (see FIG. 29) and the converting and outputting part 940 (see FIG. 29) included in the hinge assemblies 800 (see FIG. 29) in the above-described embodiment. Accordingly, detailed description in relation to this is omitted.

The hinge assemblies 900 in this embodiment may further include a cooling channel 950.

The hinge case 930 may form an exterior of the hinge assemblies 900, and may be provided therein with an accommodating space for accommodating the hinge part 910, the mounting projection 920 and the converting and outputting part 940. Additionally, various types of structures for supporting the hinge part 910, the mounting projection 920 and the converting and outputting part 940 may be formed in the accommodating space in the hinge case 930. The cooling channel 950 may be formed in the accommodating space in the hinge case 930.

The cooling channel 950 may be defined by a structure formed in the hinge case 930. The cooling channel 950 may include a first section 951 and a second section 953.

The first section 951 may correspond to a section of the two of the cooling channel 950, which passes from a lower portion of the hinge case 930 to an area at a front of the converting and outputting part 940. The first section 951 may be disposed at a position adjacent to the front surface of the housing 100 and the door front surface part 350.

The second section 953 may correspond to a section of the two of the cooling channel 950, which passes from an upper side of the first section 951 to an area in an upper portion of the converting and outputting part 940. The second section 953 may be disposed at a position adjacent to the upper surface of the housing 100 and the door upper surface part 310.

An entrance of the cooling channel 950 may be disposed in a lower portion of the cooling channel 950, specifically, in a lower portion of the first section 951. The entrance of the cooling channel 950 may be open to a lower portion of the hinge case 930. A third cooling fan 960 may be disposed at the entrance of the cooling channel 950.

The third cooling fan 960 may be dispose at the hinge assemblies 900, specifically, in a lower portion of the hinge case 930. The third cooling fan 960 may generate an air flow that allows external air to flow into the cooling channel 950 through the entrance of the cooling channel 950.

Based on the air flow generated by the third cooling fan 960, external air may flow into the cooling channel 950 through the entrance of the cooing channel 950. The external air introduced into the cooling channel 950 may cool the hinge case 930 while passing through the first section 951 and the second section 953 of the cooling channel 950.

In this embodiment, the hinge part 910 may connect to the rear side of the door upper surface part 310. The hinge part 910 may be disposed at a position eccentric to a rear in the hinge case 930.

The hinge part 910 may connect to the converting and outputting part 940 in the hinge case 930. In this case, the converting and outputting part 940 may connect to the hinge part 910 at a position eccentric to the rear while connecting to the hinge part 910 in the hinge case 930.

The mounting projection 920 may be disposed in a lower portion of the converting and outputting part 940. The mounting projection 920 may connect to the converting and outputting part 940 and may protrude to the inside of the cooking space 105 to connect to the tray 200.

In the above disposition structure, most of the accommodating space in the front-rear direction except for a part at the front of the accommodating space in the hinge case 930 may be occupied by the hinge part 910 and the converting and outputting part 940. Further, most of the accommodating space in the up-down direction except for a part of an upper portion of the accommodating space may be occupied by the converting and outputting part 940 and the mounting projection 920.

Accordingly, an area of the accommodating space in the hinge case 930, where the cooling channel 950 can be installed, may be limited to a partial area at the front of the accommodating space and a partial area in the upper portion of the accommodating space. In this embodiment, the cooling channel 960 may be disposed in an area at the front of the accommodating space in the hinge case 930 and in an area in the upper portion thereof.

Specifically, the cooling channel 950 may include a first section 951 disposed/in front of the converting and outputting part 940, and a second section 953 disposed over the converting and outputting part 940. The first section 951 and the section 953 may connect to each other at positions corresponding to the front and the upper portion of the converting and outputting part 940/at positions in front of the converting and outputting part 940 and over/on the converting and outputting part 940, e.g., in a portion adjacent to the edge on the upper side of the front of the hinge case 930.

Accordingly, external air introduced into the cooling channel 950 through the entrance of the cooling channel 950 may cool surroundings of the front surface of the housing 100 and the door front surface part 350 while passing through the first section 951. Additionally, the air introduced into the second section 953 past the first section 951 may cool surroundings of the upper surface of the housing 100 and the door upper surface part 310 while passing through the second section 953.

The cooling channel 950 may be provided with a channel guide 955. The channel guide 955 may be disposed in a portion where the first section 951 and the second section 953 connect, while protruding on the cooling channel 950. That is, the channel guide 955 may be disposed in a portion where a flow of air is diverted in the cooling channel 950.

The channel guide 955 may guide a flow of air such that the air, having passed through the first section 951, smoothly flows into the second section 953. In an example, the channel guide 955 may include a projection extending in the up-down direction and a projection extending in the front-rear direction, and a gap between the two projections may connect in the form of a curved surface projection.

The upper surface and the front surface of the housing 100, and the door upper surface part 310 and the door front surface part 350 are highly likely to be contacted by the user. Additionally, the portions are easily affected by heat in the cooking space 105.

To solve the problem, in this embodiment, the cooling channel 950 may be disposed around the portions, and the third cooling fan 960 may be used to introduce external air into the cooling channel 950.

Thus, the portions which are easily affected by heat, causing an increase in the temperature, and is often contacted by the user, may be cooled. As a result, accident risks may be reduced, and damage to the components in the door 300, caused by the overheating of the door 300, may be prevented.

The embodiments are described above with reference to a number of illustrative embodiments thereof. However, the embodiments are provided only as examples, and numerous other modifications and embodiments can be devised by one skilled in the art, based on the above embodiments. Thus, the protection scope of the subject matter should be defined by the appended claims.

DESCRIPTION OF REFERENCE NUMERAL

100: Housing
105: Cooking space
110: Bottom surface
120,130: Lateral surface
125: Second slot
140: Rear surface
150: Rear surface case
160: Insulating plate
170: Cabinet
171: Through hole
175: Intake and exhaust grill
180: Base
200: Tray
205: Tray main body
210: Mounting part
211: First protrusion
213: Second protrusion 214: Sliding surface
215: Mounting groove
220: Water receiving groove
230: Steam cover
300: Door
301: Air intake port
303: Air exhaust port
305: Handle
305a: Fitting projection
310: Door upper surface part
320: Door frame
320a: Fastening hole
320b: Hinge passing hole
321: Coupling part
322: Seating surface
323: First transverse supporter
324: Second transverse supporter
325: Heater mounting part
326: First connecting end fixing part
327: Second connecting end fixing part
328: Grill supporting part 328a: Cover
328b: Fixing rib
329: Connecting end supporting member
329a: Coil spring
329b: First coupling part
329c: Second coupling part
330, 335: Glass
340, 345: Cable mounting part
341, 346: Fastening boss
343: Connecting member
350: Door front surface part
370: First cooling fan
300a: Door main body part
310a: First door main body part
350a: Second door main body part
351a: Through hole
353a: Fastening hole 2
350b: Door rear surface cover
400: First heating part
410: Heating element
420: First connecting end
421: Cylinder-shaped part
422: Extension part
423: Step
425: Key-shaped part
430: Second connecting end
440: Reflector
441: First reflector
445: Second reflector
450: Protective grill
500: First control board
501: Terminal
550: Supporting panel
550a: First area
550b: Second area
550c: Coupling area
551: Main panel part
552: Rib
553: Lower portion supporting part
553a: Body part
553b: Protruding part
555: Lateral portion supporting part
557: Temperature sensor supporting part
557a: Second lateral wall part
557b: Second supporting surface part
557c: Boss part
557d: Hook 558: Cable fixing part
558a: Body part
558b: Protruding part
559: Cable supporting part
559a: First projection
559b: Second projection
560: Supporting projection
561: Guiding projection
561a: Body part
561b: Protruding part
562: Fastening hole
563: Fastening member
563a: Body part
563b: Head part
565: Touch panel supporting part
565a: Protruding surface part
565b: Protruding and supporting surface part
565c: Protruding rib part
566: Packing member
567: Outer support projection
570: Communication module
580: Temperature sensor
581: Sensor main body
583: Flange
590: Bracket
591: First coupling part
591a: Guiding hole
591b: Fastening hole
593: Second coupling part
593a: Fastening hole
593b: Fitting hole
595: Connection part
600: Second heating part
610: Working coil
611: Coil installation base
613: Coil
615: Coil connection wiring
620: Receiver coil
621: Coil installation base
623: Coil
630: Electromagnetic shielding plate
640: Temperature measuring module
700: Second control board
730: Second cooling fan
735: Power source connecting part
740: Communication module
750: Rear surface supporting panel
750a: First area
750b: Second area
751: Main panel part
755: First protruding edge part
756: Hook
760: Rear surface cover
761: Main cover part
762: Vent hole
763: Fan installing hole
764: Cut part
765: Second protruding edge part
800, 900: Hinge assembly
810, 910: Hinge part
820, 920: Mounting projection
830,930: Hinge case
835: First slot
840,940: Converting and outputting part
950: Cooling channel
951: First section
953: Second section

960: Third cooling fan
1000: Manipulation device
1100: Shaft
1200: Encoder
1300: Knob
1310: Shaft coupling part
1311: Shaft coupling hole
1320: Skirt part
1321: Coupling groove
1330: Second connecting and supporting part
1340: Projection
1350: Knob cover
1360: Front surface part
1361: Penetrating part
1370: Lateral surface part
1600: Socket member
1610: Outer supporter
1611: Inserting groove
1620: Inner supporter
1630: First connecting and supporting part
1631: Flange-shaped part
1633: Rib-shaped part
1635: Skirt—shaped part
1640: Light passing hole
1650: First coupling part
1651: First protruding projection
1653: First coupling projection
1660: Second coupling part
1661: Second protruding projection
1663: Second coupling projection
1670: Third coupling part
1680: Magnetic member
1700: Light emitting member
1800: Front surface cover member
1810: Coupling boss
1900: Touch manipulation part
1910: Board
1920: Booster
W: See-through window
a: Cover
b: Support wall
c: Coupling hole
f: Outer wall
g: Concave groove
h: Fixing rib
i: Coupling projection
j: First spring coupling part
k: Second spring coupling part
l: First reflector supporting projection
m: Second reflector supporting projection
n: Wide width part
o: Narrow width part
s: Sealing member

The invention claimed is:

1. A cooking appliance, comprising:
a housing provided therein with a cooking space surrounded by bottom, rear and both lateral surfaces of the housing, and having upper and front surfaces open; and
a door having a door upper surface part that opens and closes the upper surface and the front surface of the housing;
a first heating part at the door;
a door frame supporting the first heating part and coupled to the door, comprising:
a heater mounting part to which the first heating part is coupled; and a coupling part coupled with the door upper surface part and supporting the heater mounting part in the door upper surface part,
wherein the first heating part comprises an electric heater provided with a heating element and a connecting end disposed respectively at an end of one side of the heating element in a length-wise direction thereof and at an end of the other side of the heating element in the length-wise direction thereof, and the heater mounting part comprises a first connecting end fixing part for fixing a connecting end disposed at the end of one side of the heating element in the length-wise direction thereof, and a second connecting end fixing part for fixing a connecting end disposed at the end of the other side of the heating element in the length-wise direction thereof,
wherein at least one of the first connecting end fixing part and the second connecting end fixing part, comprising:
a cover encircling surrounding portions of the connecting end from an outer side of the connecting end in a circumferential direction; and
a support wall which partitions a space surrounded by the cover into inner and outer spaces of the first heating part in a length-wise direction and to which the connecting end is fitted and coupled,
wherein the cooking appliance further comprising:
a glass disposed in an upper portion of the heater mounting part;
a first transverse supporter disposed farther from a center of the cooking space in the front-rear direction thereof than the first heating part, and connecting between the first connecting end fixing part and the second connecting end fixing part; and
a reflector configured to block the first heating part from the first transverse supporter and the glass, and to reflect heat of the first heating part, the reflector, comprising:
a first reflector disposed between the first heating part and the glass, and blocking both glass and the first transverse supporter from the first heating part; and
a second reflector disposed between the first reflector and the glass, and blocking the glass from the first reflector,
wherein a space is formed between the first reflector and the second reflector.

2. The cooking appliance of claim 1, wherein the support wall comprises a seating groove that is concavely formed on the support wall and has an entrance open toward an upper portion, and the heater mounting part further comprises a connecting end supporting member that fixes the connecting end to the support wall while pressing the connecting end seated in the seating groove against the support wall.

3. The cooking appliance of claim 1 wherein the cooking appliance further comprises a hinge assembly disposed in a lateral portion of the housing, and the hinge assembly comprises a hinge case provided therein with an accommodating space, and a cooling channel formed in the hinge case.

4. The cooking appliance of claim 3, wherein an entrance of the cooling channel is open toward a lower portion of the hinge case, and
a cooling fan is disposed at the entrance of the cooling channel.

5. The cooking appliance of claim 3, further comprising a tray mounted in the cooking space.

6. The cooking appliance of claim 5, wherein the hinge assembly includes a hinge part which is coupled to the door and changes a posture in association with the swiveling of the door, whereby the hinge assembly moves the tray in a front-rear direction of the cooking space in association with a change in the posture of the hinge part.

7. The cooking appliance of claim 5, further comprising a second heating part located below the tray.

* * * * *